United States Patent
Kondo et al.

(10) Patent No.: US 7,352,917 B2
(45) Date of Patent: Apr. 1, 2008

(54) IMAGE PROCESSING APPARATUS AND METHOD, AND IMAGE PICKUP APPARATUS

(75) Inventors: Tetsujiro Kondo, Tokyo (JP); Junichi Ishibashi, Saitama (JP); Takashi Sawao, Tokyo (JP); Naoki Fujiwara, Tokyo (JP); Takahiro Nagano, Kanagawa (JP); Seiji Wada, Kanagawa (JP); Toru Miyake, Tokyo (JP)

(73) Assignee: Sony Corporation, Tokyo (JP)

( * ) Notice: Subject to any disclaimer, the term of this patent is extended or adjusted under 35 U.S.C. 154(b) by 808 days.

(21) Appl. No.: 10/362,546

(22) PCT Filed: Jun. 26, 2002

(86) PCT No.: PCT/JP02/06382

§ 371 (c)(1),
(2), (4) Date: Oct. 7, 2003

(87) PCT Pub. No.: WO03/003304

PCT Pub. Date: Jan. 9, 2003

(65) Prior Publication Data

US 2004/0067040 A1     Apr. 8, 2004

(30) Foreign Application Priority Data

Jun. 27, 2001 (JP) .............................. 2001-194607

(51) Int. Cl.
*G06K 9/36* (2006.01)
*H04N 5/228* (2006.01)
(52) U.S. Cl. .................... 382/291; 382/254; 348/222.1
(58) Field of Classification Search ................ 382/162, 382/164, 173, 275, 276, 305, 180, 266, 291; 345/441, 600, 614, 630; 348/222.1; 358/515; 386/4
See application file for complete search history.

(56) References Cited

U.S. PATENT DOCUMENTS 5,633,956 A * 5/1997 Burl ............................ 382/275

(Continued)

FOREIGN PATENT DOCUMENTS

| EP | 0 933 727 | 8/1999 |
|---|---|---|
| JP | 7-336688 | 12/1995 |
| JP | 10-164436 | 6/1998 |
| JP | 2000-30040 | 1/2000 |

(Continued)

OTHER PUBLICATIONS

Mitsunaga T et al: "Key extraction by image differentiation" Proceedings of the International Conference on Image Processing. (ICIP). Washington, Oct. 23-26, 1995, Los Alamitos, IEEE Comp. Soc. Press, US, vol. vol. 3, Oct. 23, 1995, pp. 248-251, XP010197071 ISBN: 0-7803-3122-2.

Defaux F et al: "Motion Estimation Techniques for Digital TV: A Review and a New Contribution" Proceedings of the IEEE, IEEE. New York, US, vol. 83, No. 6, Jun. 1995, pp. 858-875, XP000518740 ISSN: 0018-9219.

*Primary Examiner*—Kanjibhai Patel
(74) *Attorney, Agent, or Firm*—Frommer Lawrence & Haug LLP; William S. Frommer; Thomas F. Presson

(57) ABSTRACT

The present invention aims to recognize the mixture state of images. An area specifying unit 103 specifies a mixed area in which foreground object components which form a foreground object and background object components which form a background object are mixed. An estimated-mixture-ratio calculator 104 detects, in correspondence with the image data, the mixture ratio indicating the ratio of the mixture of the foreground object components to the mixture of the background object components in the mixed area in which the foreground object components and the background object components are mixed. At least one of the area specifying unit 103 and the estimated-mixture-ratio calculator 104 performs image processing on the basis of a plurality of types of components. The present invention can be applied to an image processing apparatus.

40 Claims, 108 Drawing Sheets

U.S. PATENT DOCUMENTS

| | | | | |
|---|---|---|---|---|
| 5,870,103 | A | * | 2/1999 | Luo ............................ 345/630 |
| 6,134,346 | A | | 10/2000 | Berman et al. |
| 6,208,351 | B1 | * | 3/2001 | Borg et al. .................. 345/600 |
| 6,404,901 | B1 | * | 6/2002 | Itokawa ....................... 382/103 |
| 6,839,463 | B1 | * | 1/2005 | Blake et al. ................. 382/173 |

FOREIGN PATENT DOCUMENTS

| | | |
|---|---|---|
| JP | 2001-250119 | 9/2001 |
| JP | 2002-190015 | 7/2002 |
| JP | 2002-190016 | 7/2002 |
| JP | 2002-190028 | 7/2002 |

* cited by examiner

FIG. 3
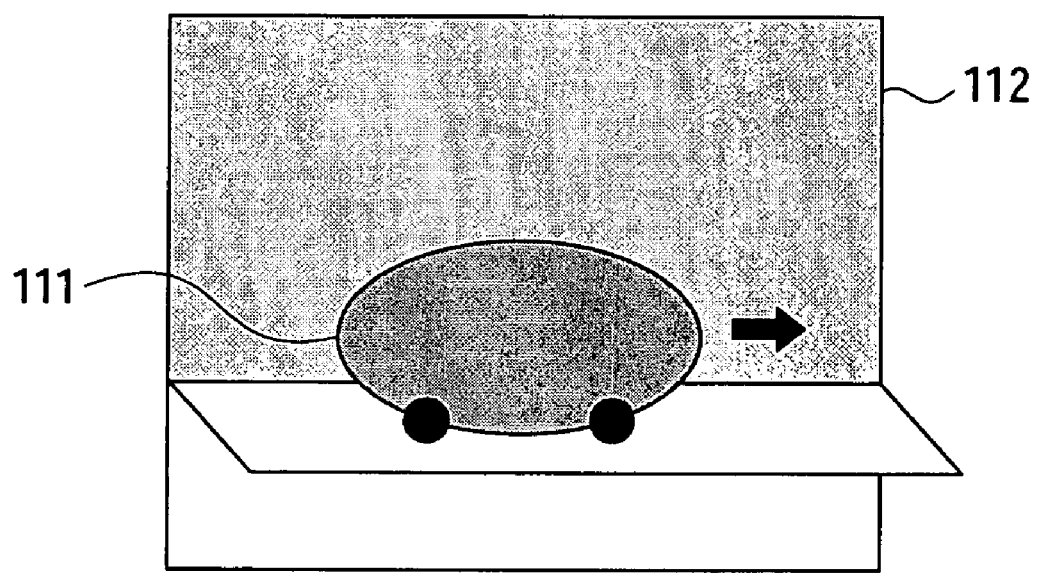
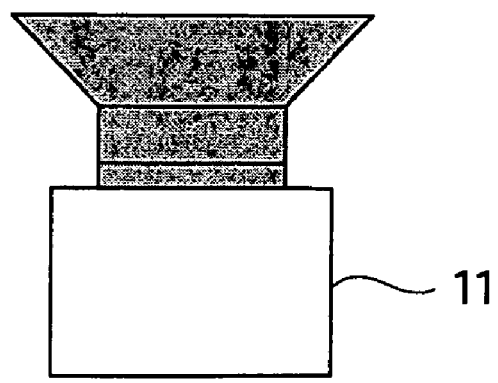

| AREA | | DESCRIPTION |
|---|---|---|
| BACKGROUND AREA | | STATIONARY PORTION |
| FOREGROUND AREA | | MOVING PORTION |
| MIXED AREA | COVERED BACKGROUND AREA | PORTION CHANGING FROM BACKGROUND TO FOREGROUND |
| | UNCOVERED BACKGROUND AREA | PORTION CHANGING FROM FOREGROUND TO BACKGROUND |

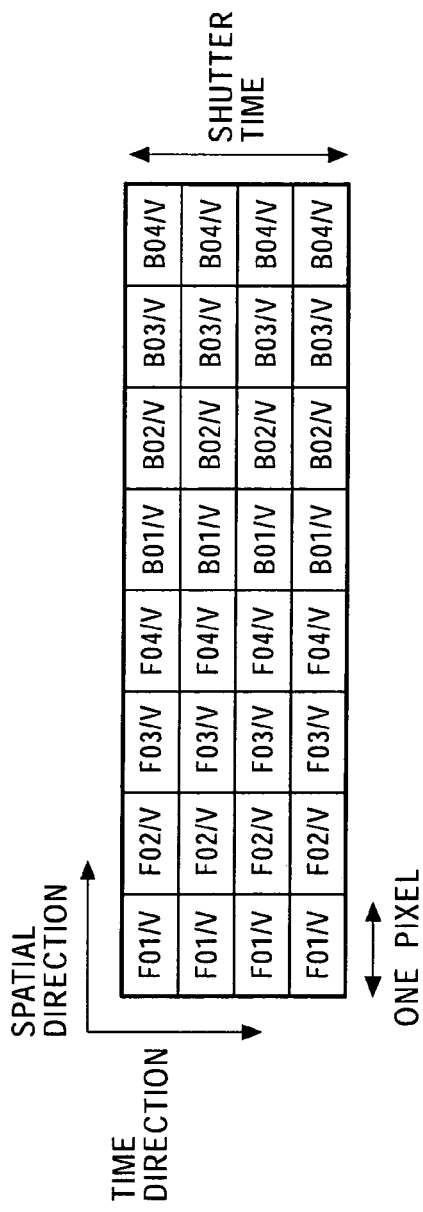
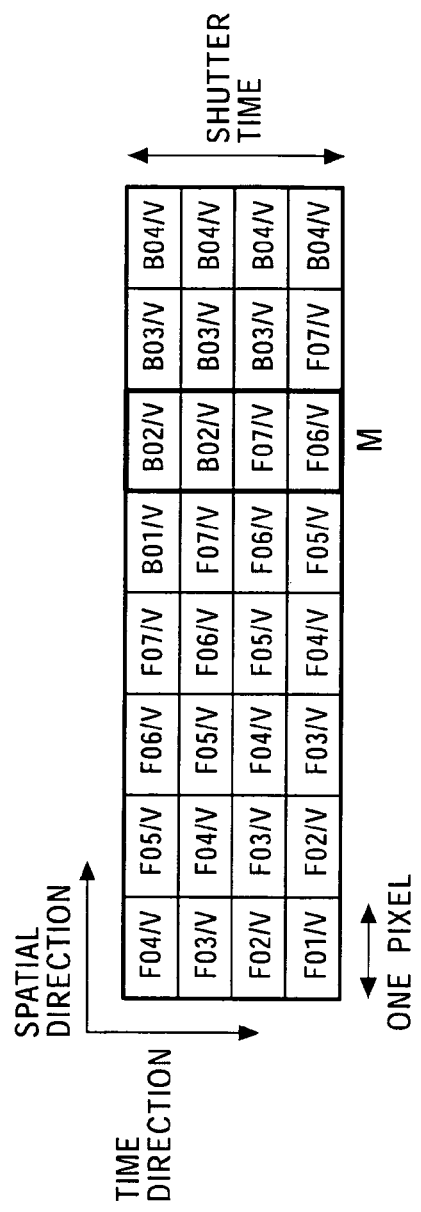

FIG. 25

| AREA DETERMINATION | STATIONARY/MOVING DETERMINATION BETWEEN FRAME #n-2 AND FRAME #n-1 | STATIONARY/MOVING DETERMINATION BETWEEN FRAME #n-1 AND FRAME #n | STATIONARY/MOVING DETERMINATION BETWEEN FRAME #n AND FRAME #n+1 | STATIONARY/MOVING DETERMINATION BETWEEN FRAME #n+1 AND FRAME #n+2 |
|---|---|---|---|---|
| COVERED-BACKGROUND-AREA DETERMINATION | STATIONARY | MOVING | — | — |
| STATIONARY-AREA DETERMINATION | — | STATIONARY | STATIONARY | — |
| MOVING-AREA DETERMINATION | — | MOVING | MOVING | — |
| UNCOVERED-BACKGROUND-AREA DETERMINATION | — | — | MOVING | STATIONARY |

FIG. 33A

| $X_0$ | $X_1$ | $X_2$ |
|---|---|---|
| $X_3$ | $X_4$ | $X_5$ |
| $X_6$ | $X_7$ | $X_8$ |

FIG. 33B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 34A

| $X_0$ | $X_1$ | $X_2$ |
|---|---|---|
| $X_3$ | $X_4$ | $X_5$ |
| $X_6$ | $X_7$ | $X_8$ |

FIG. 34B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 37

| | BACKGROUND AREA | FOREGROUND AREA | COVERED BACKGROUND AREA | UNCOVERED BACKGROUND AREA |
|---|---|---|---|---|
| FRAME #n-1 | — | 1 | 0 | — |
| FRAME #n | 0 | 1 | 1 | 1 |
| FRAME #n+1 | — | 1 | — | 0 |

FIG. 43

| FRAME #n-1 | FRAME #n | FRAME #n+1 |
|---|---|---|
| 0 | 0 | 0 |
| 0 | 0 | 1 |
| 0 | 0 | 1 |
| 0 | 0 | 1 |
| 0 | 0 | 1 |
| 0 | 1 | 1 |
| 0 | 1 | 1 |
| 0 | 1 | 1 |
| 0 | 1 | 0 |
| 1 | 1 | 0 |
| 1 | 1 | 0 |
| 1 | 1 | 0 |
| 1 | 0 | 0 |
| 1 | 0 | 0 |
| 1 | 0 | 0 |
| 1 | 0 | 0 |
| 0 | 0 | 0 |

↕ ONE PIXEL

FIG. 65A
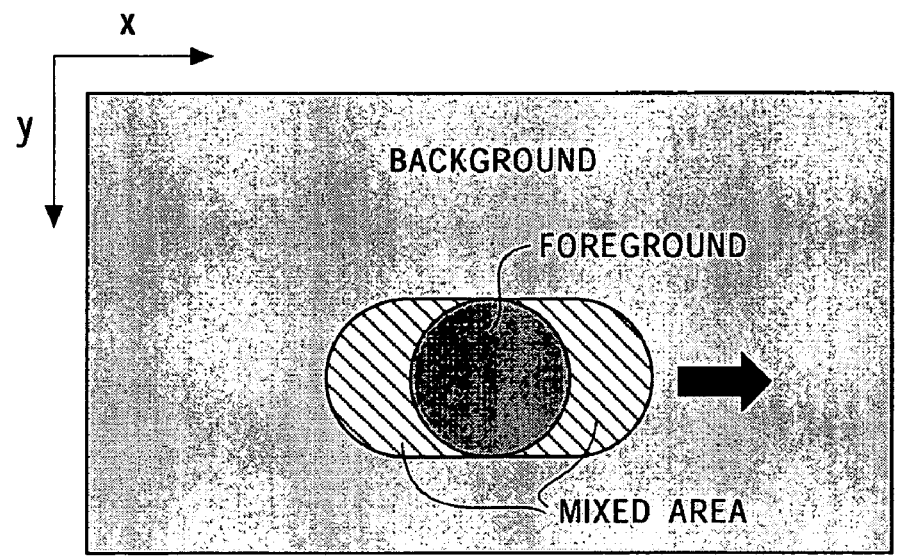
SEPARATE FOREGROUND
AND BACKGROUND
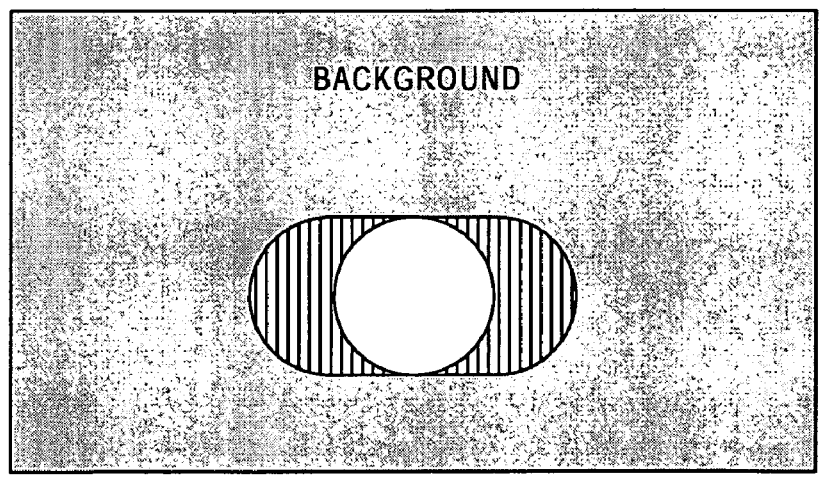
FOREGROUND
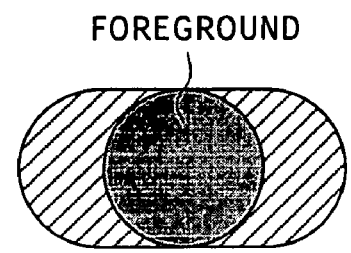

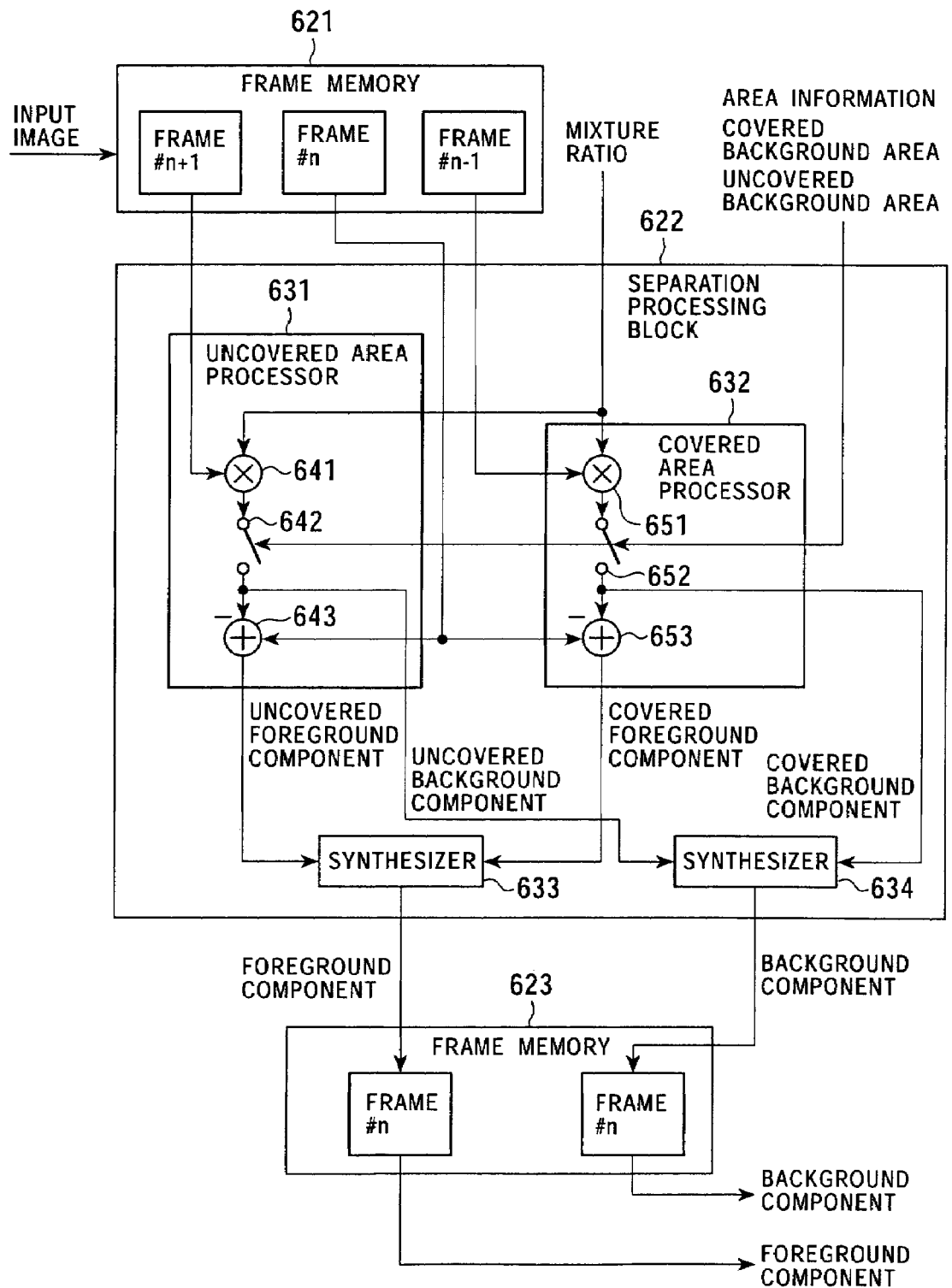

FIG. 81

| C01 | C02 | C03 | C04 | C05 | C06 | C07 | C08 | C09 | C10 | C11 | C12 |
|---|---|---|---|---|---|---|---|---|---|---|---|
| F01/V | F02/V | F03/V | F04/V | F05/V | F06/V | F07/V | F08/V | | | | |
| | F01/V | F02/V | F03/V | F04/V | F05/V | F06/V | F07/V | F08/V | | | |
| | | F01/V | F02/V | F03/V | F04/V | F05/V | F06/V | F07/V | F08/V | | |
| | | | F01/V | F02/V | F03/V | F04/V | F05/V | F06/V | F07/V | F08/V | |
| | | | | F01/V | F02/V | F03/V | F04/V | F05/V | F06/V | F07/V | F08/V |

FIG. 82

| F01/V | F02/V | F03/V | F04/V |       |       |       |       |       |       |       |       |
|-------|-------|-------|-------|-------|-------|-------|-------|-------|-------|-------|-------|
|       | F01/V | F02/V | F03/V |       |       |       |       |       |       |       |       |
|       |       | F01/V | F02/V |       |       |       |       |       |       |       |       |
|       |       |       | F01/V |       |       |       |       |       |       |       |       |
|       |       |       |       | F01/V | F02/V | F03/V | F04/V | F05/V | F06/V | F07/V | F08/V |
| C01   | C02   | C03   | C04   | C05   | C06   | C07   | C08   | C09   | C10   | C11   | C12   |

FIG. 83

| C01 | C02 | C03 | C04 | C05 | C06 | C07 | C08 | C09 | C10 | C11 | C12 |
|-----|-----|-----|-----|-----|-----|-----|-----|-----|-----|-----|-----|
| F01/V | F02/V | F03/V | F04/V | F01 | F02 | F03 | F04 | F05 | F06 | F07 | F08 |
|  | F01/V | F02/V | F03/V | | | | | | | | |
|  |  | F01/V | F02/V | | | | | | | | |
|  |  |  | F01/V | | | | | | | | |

|  | SPACE CORRELATION | TIME CORRELATION |
|---|---|---|
| STATIONARY AREA | WEAK | STRONG |
| MOVING AREA | STRONG | WEAK |

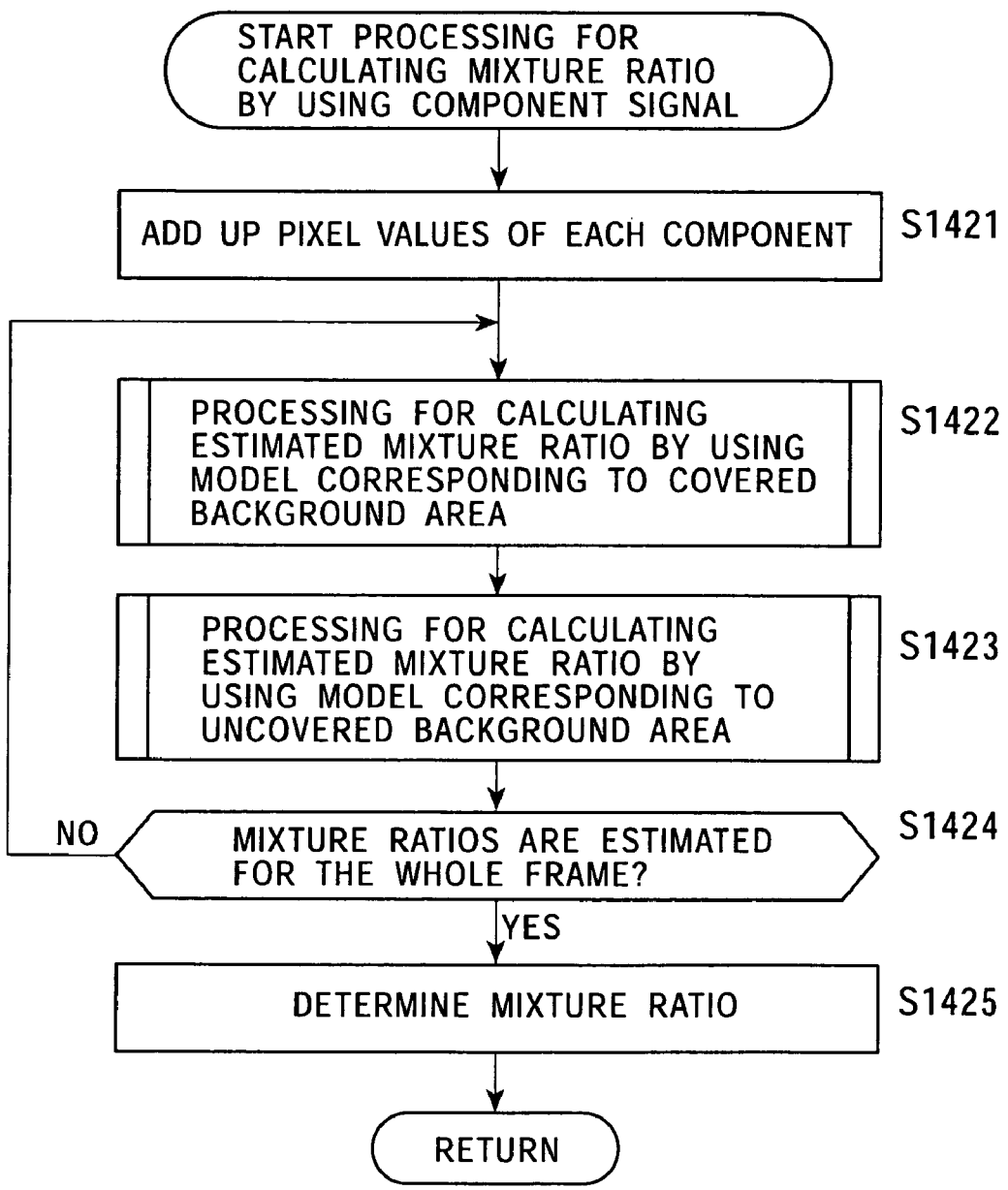

IMAGE PROCESSING APPARATUS AND METHOD, AND IMAGE PICKUP APPARATUS

TECHNICAL FIELD

The present invention relates to image processing apparatuses and methods, and image-capturing apparatuses, and more particularly, to an image processing apparatus and method, and an image-capturing apparatus in which a difference between a signal detected by a sensor and the real world is taken into consideration.

BACKGROUND ART

A technique for detecting incidents occurring in the real world by a sensor and for processing sampled data output from the image sensor is widely used.

For example, motion blur occurs in an image obtained by capturing an object moving in front of a predetermined stationary background with a video camera if the moving speed is relatively high.

However, when an object is moving in front of a stationary background, not only does motion blur caused by the mixture of the moving object itself occur, but also the mixture of the background image and the object image occurs. Hitherto, processing corresponding to the mixture state of the background image and the moving object has not been considered.

DISCLOSURE INVENTION

The present invention has been made in view of such circumstances. Accordingly, it is an object of the present invention to know the mixture state of images.

A first image processing apparatus of the present invention comprises area specifying means for specifying, in correspondence with image data, a mixed area in which foreground object components which form a foreground object and background object components which form a background object are mixed; and mixture-ratio detection means for detecting, in correspondence with the image data, the mixture ratio indicating the ratio of the mixture of the foreground object components to the mixture of the background object components in a mixed area in which the foreground object components and the background object components are mixed, wherein at least one of the area specifying means and the mixture ratio detection means performs image processing on the basis of the plurality of types of components.

The area specifying means may comprise component mixed-area detection means for detecting the mixed area for each of the plurality of types of components and for outputting the detection result corresponding to individual components as component mixed-area information; and mixed-area specifying means for specifying the mixed area corresponding to the image data on the basis of the detection result of the mixed area corresponding to the plurality of types of components detected by the component mixed-area detection means.

The area specifying means may comprise space-correlation-value calculation means for calculating a space correlation value indicating a correlation between designated pixel data corresponding to a designated pixel of a designated frame of the image data and pixel data of a space neighboring pixel positioned in the neighborhood of the designated pixel in the spatial direction on the basis of the plurality of types of components corresponding to the designated pixel; time-correlation-value calculation means for calculating a time correlation value indicating a correlation between the designated pixel data and pixel data of a time neighboring pixel positioned in the neighborhood of the designated pixel in the time direction on the basis of the plurality of types of components corresponding to the designated pixel; and foreground area specifying means for specifying a foreground area formed of only the foreground object components on the basis of the space correlation value and the time correlation value corresponding to the designated pixel.

The area specifying means may comprise mixed-area specifying means for specifying the mixed area on the basis of the foreground area of the designated frame and the foreground area of a neighboring frame in the neighborhood of the designated frame.

The mixture-ratio detection means may comprise component mixture-ratio detection means for detecting the mixture ratio for each of the plurality of types of components; and component integrated mixture-ratio detection means for detecting the mixture ratio corresponding to the image data by integrating the detection results of the mixture ratios corresponding to the plurality of types of components detected by the component mixture-ratio detection means.

The mixture-ratio detection means may comprise integration means for integrating the pixel values of the plurality of types of components for each pixel and for outputting the value as integrated data; and integrated data mixture-ratio detection means for detecting the mixture ratio corresponding to the image data on the basis of the integrated data.

The integration means may add the pixel values of the plurality of types of components for each pixel and may output the added result as the integrated data.

An image processing method of the present invention comprises an area specifying step of specifying, in correspondence with image data, a mixed area in which foreground object components which form a foreground object and background object components which form a background object are mixed; a mixture-ratio detection step of detecting, in correspondence with the image data, the mixture ratio indicating the ratio of the mixture of the foreground object components to the mixture of the background object components in a mixed area in which the foreground object components and the background object components are mixed; and an output control step of controlling the output of the detected mixture ratio, wherein at least one of the area specifying step and the mixture-ratio detection step performs image processing on the basis of the plurality of types of components.

The area specifying step may comprise a component mixed-area detection step of detecting the mixed area for each of the plurality of types of components and for outputting the detection result corresponding to individual components as component mixed-area information; and a mixed-area specifying step of specifying the mixed area corresponding to the image data on the basis of the detection result of the mixed area corresponding to the plurality of types of components detected in the component mixed-area detection step.

The area specifying step may comprise a space-correlation-value calculation step of calculating a space correlation value indicating a correlation between designated pixel data corresponding to a designated pixel of a designated frame of the image data and pixel data of a space neighboring pixel positioned in the neighborhood of the designated pixel in the spatial direction on the basis of the plurality of types of components corresponding to the designated pixel; a time-correlation-value calculation step of calculating a time correlation value indicating a correlation between the designated pixel data and pixel data of a time neighboring pixel positioned in the neighborhood of the designated pixel in the time direction on the basis of the plurality of types of components corresponding to the designated pixel; and a foreground area specifying step of specifying a foreground area formed of only the foreground object components on the basis of the space correlation value and the time correlation value corresponding to the designated pixel.

The area specifying step may comprise a mixed-area specifying step of specifying the mixed area on the basis of the foreground area of the designated frame and the foreground area of a neighboring frame in the neighborhood of the designated frame.

The mixture-ratio detection step may comprise a component mixture-ratio detection step of detecting the mixture ratio for each of the plurality of types of components; and a component integrated mixture-ratio detection step of detecting the mixture ratio corresponding to the image data by integrating the detection results of the mixture ratios corresponding to the plurality of types of components detected in the component mixture-ratio detection step.

The mixture-ratio detection step may comprise an integration step of integrating the pixel values of the plurality of types of components for each pixel and for outputting the value as integrated data; and a data mixture-ratio detection step of detecting the mixture ratio corresponding to the image data on the basis of the integrated data.

In the integration step, the pixel values of the plurality of types of components may be added for each pixel, and the added result may be output as the integrated data.

A program of a first recording medium of the present invention comprises an area specifying step of specifying, in correspondence with image data, a mixed area in which foreground object components which form a foreground object and background object components which form a background object are mixed; a mixture-ratio detection step of detecting, in correspondence with the image data, the mixture ratio indicating the ratio of the mixture of the foreground object components to the mixture of the background object components in a mixed area in which the foreground object components and the background object components are mixed; and an output control step of controlling the output of the detected mixture ratio, wherein at least one of the area specifying step and the mixture-ratio detection step performs image processing on the basis of the plurality of types of components.

The area specifying step may comprise a component mixed-area detection step of detecting the mixed area for each of the plurality of types of components and for outputting the detection result corresponding to individual components as component mixed-area information; and a mixed-area specifying step of specifying the mixed area corresponding to the image data on the basis of the detection result of the mixed area corresponding to the plurality of types of components detected in the component mixed-area detection step.

The area specifying step may comprise a space-correlation-value calculation step of calculating a space correlation value indicating a correlation between designated pixel data corresponding to a designated pixel of a designated frame of the image data and pixel data of a space neighboring pixel positioned in the neighborhood of the designated pixel in the spatial direction on the basis of the plurality of types of components corresponding to the designated pixel; a time-correlation-value calculation step of calculating a time correlation value indicating a correlation between the designated pixel data and pixel data of a time neighboring pixel positioned in the neighborhood of the designated pixel in the time direction on the basis of the plurality of types of components corresponding to the designated pixel; and a foreground area specifying step of specifying a foreground area formed of only the foreground object components on the basis of the space correlation value and the time correlation value corresponding to the designated pixel.

The area specifying step may comprise a mixed-area specifying step of specifying the mixed area on the basis of the foreground area of the designated frame and the foreground area of a neighboring frame in the neighborhood of the designated frame.

The mixture-ratio detection step may comprise a component mixture-ratio detection step of detecting the mixture ratio for each of the plurality of types of components; and a component integrated mixture-ratio detection step of detecting the mixture ratio corresponding to the image data by integrating the detection results corresponding to the plurality of types of components detected in the component mixture-ratio detection step.

The mixture-ratio detection step may comprise an integration step of integrating the pixel values of the plurality of types of components for each pixel and outputting the value as integrated data; and an integrated data mixture-ratio detection step of detecting the mixture ratio corresponding to the image data on the basis of the integrated data.

In the integration step, the pixel values of the plurality of types of components may be added for each pixel, and the added result may be output as the integrated data.

A first program of the present invention causes a computer to execute an area specifying step of specifying, in correspondence with image data, a mixed area in which foreground object components which form a foreground object and background object components which form a background object are mixed; a mixture-ratio detection step of detecting, in correspondence with the image data, the mixture ratio indicating the ratio of the mixture of the foreground object components to the mixture of the background object in a mixed area in which the foreground object components and the background object components are mixed; and an output control step of controlling the output of the detected mixture ratio, wherein, in at least one of the area specifying step and the mixture-ratio detection step, image processing is performed on the basis of the plurality of types of components.

The area specifying step may comprise a component mixed-area detection step of detecting the mixed area for each of the plurality of types of components and for outputting the detection result corresponding to individual components as component mixed-area information; and a mixed-area specifying step of specifying the mixed area corresponding to the image data on the basis of the detection result of the mixed area corresponding to the plurality of types of components detected in the component mixed-area detection step.

The area specifying step may comprise a space-correlation-value calculation step of calculating a space correlation value indicating a correlation between designated pixel data corresponding to a designated pixel of a designated frame of the image data and pixel data of a space neighboring pixel positioned in the neighborhood of the designated pixel in the spatial direction on the basis of the plurality of types of components corresponding to the designated pixel; a time-correlation-value calculation step of calculating a time correlation value indicating a correlation between the designated pixel data and pixel data of a time neighboring pixel positioned in the neighborhood of the designated pixel in the time direction on the basis of the plurality of types of components corresponding to the designated pixel; and a foreground area specifying step of specifying a foreground area formed of only the foreground object components on the basis of the space correlation value and the time correlation value corresponding to the designated pixel.

The area specifying step may comprise a mixed-area specifying step of specifying the mixed area on the basis of the foreground area of the designated frame and the foreground area of a neighboring frame in the neighborhood of the designated frame.

The mixture-ratio detection step may comprise a component mixture-ratio detection step of detecting the mixture ratio for each of the plurality of types of components; and a component integrated mixture-ratio detection step of detecting the mixture ratio corresponding to the image data by integrating the detection results of the mixture ratios corresponding to the plurality of types of components detected in the component mixture-ratio detection step.

The mixture-ratio detection step may comprise an integration step of integrating the pixel values of the plurality of types of components for each pixel and for outputting the value as integrated data; and an integrated data mixture-ratio detection step of detecting the mixture ratio corresponding to the image data on the basis of the integrated data.

In the integration step, the pixel values of the plurality of types of components may be added for each pixel, and the added result may be output as the integrated data.

A first image-capturing apparatus of the present invention comprises image-capturing means for outputting a subject image captured by an image-capturing device including a predetermined number of pixels, the pixels having a time integrating function, as image data which is formed of a predetermined number of pixel data having a plurality of types of components at the same pixel position; area specifying means for specifying, in correspondence with image data, a mixed area in which foreground object components which form a foreground object and background object components which form a background object are mixed; and mixture-ratio detection means for detecting, in correspondence with the image data, the mixture ratio indicating the ratio of the mixture of the foreground object components to the mixture of the background object components in a mixed area in which the foreground object components and the background object components are mixed, wherein at least one of the area specifying means and the mixture-ratio detection means performs image processing on the basis of the plurality of types of components.

The area specifying means may comprise component mixed-area detection means for detecting the mixed area for each of the plurality of types of components and for outputting the detection result corresponding to individual components as component mixed-area information; and mixed-area specifying means for specifying the mixed area corresponding to the image data on the basis of the detection result of the mixed area corresponding to the plurality of types of components detected by the component mixed-area detection means.

The area specifying means may comprise space-correlation-value calculation means for calculating a space correlation value indicating a correlation between designated pixel data corresponding to a designated pixel of a designated frame of the image data and pixel data of a space neighboring pixel positioned in the neighborhood of the designated pixel in the spatial direction on the basis of the plurality of types of components corresponding to the designated pixel; time-correlation-value calculation means for calculating a time correlation value indicating a correlation between the designated pixel data and pixel data of a time neighboring pixel positioned in the neighborhood of the designated pixel in the time direction on the basis of the plurality of types of components corresponding to the designated pixel; and foreground area specifying means for specifying a foreground area formed of only the foreground object components on the basis of the space correlation value and the time correlation value corresponding to the designated pixel.

The area specifying means may comprise mixed-area specifying means for specifying the mixed area on the basis of the foreground area of the designated frame and the foreground area of a neighboring frame in the neighborhood of the designated frame.

The mixture-ratio detection means may comprise component mixture-ratio detection means for detecting the mixture ratio for each of the plurality of types of components; and component integrated mixture-ratio detection means for detecting the mixture ratio for detecting the mixture ratio corresponding to the image data by integrating the detection results of the mixture ratios corresponding to the plurality of types of components detected by the component mixture-ratio detection means.

The mixture ratio detection means may comprise integration means for integrating the pixel values of the plurality of types of components for each pixel and for outputting the value as integrated data; and integrated data mixture-ratio detection means for detecting the mixture ratio corresponding to the image data on the basis of the integrated data.

The integration means may add the pixel values of the plurality of types of components for each pixel and may output the added result as the integrated data.

A second image processing apparatus of the present invention comprises image data obtaining means for obtaining image data; and processing performing means for performing, on the basis of the plurality of types of components of the obtained image data, one of processings of (i) an area specifying step of specifying, in correspondence with the image data, a mixed area in which foreground object components which form a foreground object and background object components which form a background object are mixed and (ii) a mixture-ratio detection step of detecting, in correspondence with the image data, the mixture ratio indicating the ratio of the mixture of the foreground object components to the mixture of the background object components in a mixed area in which the foreground object components and the background object components are mixed.

The processing performing means may perform, on the basis of the plurality of types of components of the obtained image data, an area specifying step of specifying, in correspondence with the image data, a mixed area in which foreground object components which form a foreground object and background object components which form a background object are mixed.

The processing performing means may perform, on the basis of the plurality of types of components of the obtained image data, a mixture-ratio detection step of detecting, in correspondence with the image data, the mixture ratio indicating the ratio of the mixture of the foreground object components to the mixture of the background object components in a mixed area in which the foreground object components and the background object components are mixed.

A second image processing method of the present invention comprises an image data obtaining step of obtaining image data; and a processing performing step of performing, on the basis of the plurality of types of components of the obtained image data, one of processings of (i) an area specifying step of specifying, in correspondence with the image data, a mixed area in which foreground object components which form a foreground object and background object components which form a background object are mixed and (ii) a mixture-ratio detection step of detecting, in correspondence with the image data, the mixture ratio indicating the ratio of the mixture of the foreground object components to the mixture of the background object components in a mixed area in which the foreground object components and the background object components are mixed.

In the processing performing step, on the basis of the plurality of types of components of the obtained image data, an area specifying step of specifying, in correspondence with the image data, a mixed area in which foreground object components which form a foreground object and background object components which form a background object are mixed may be performed.

In the processing performing step, on the basis of the plurality of types of components of the obtained image data, a mixture-ratio detection step of detecting, in correspondence with the image data, the mixture ratio indicating the ratio of the mixture of the foreground object components to the mixture of the background object components in a mixed area in which the foreground object components and the background object components are mixed may be performed.

A program of a second recording medium of the present invention comprises an image data obtaining step of obtaining image data; and a processing performing step of performing, on the basis of the plurality of types of components of the obtained image data, one of processings of (i) an area specifying step of specifying, in correspondence with the image data, a mixed area in which foreground object components which form a foreground object and background object components which form a background object are mixed and (ii) a mixture-ratio detection step of detecting, in correspondence with the image data, the mixture ratio indicating the ratio of the mixture of the foreground object components to the mixture of the background object components in a mixed area in which the foreground object components and the background object components are mixed.

In the processing performing step, on the basis of the plurality of types of components of the obtained image data, an area specifying step of specifying, in correspondence with the image data, a mixed area in which foreground object components which form a foreground object and background object components which form a background object are mixed may be performed.

In the processing performing step, on the basis of the plurality of types of components of the obtained image data, a mixture-ratio detection step of detecting, in correspondence with the image data, the mixture ratio indicating the mixture of the foreground object components to the mixture of the background object components in a mixed area in which the foreground object components and the background object components are mixed may be performed.

A second program of the present invention causes a computer to execute an image data obtaining step of obtaining image data; and a processing performing step of performing, on the basis of the plurality of types of components of the obtained image data, one of processings of (i) an area specifying step of specifying, in correspondence with the image data, a mixed area in which foreground object components which form a foreground object and background object components which form a background object are mixed and (ii) a mixture-ratio detection step of detecting, in correspondence with the image data, the mixture ratio indicating the ratio of the mixture of the foreground object components to the mixture of the background object components in a mixed area in which the foreground object components and the background object components are mixed.

In the processing performing step, on the basis of the plurality of types of components of the obtained image data, an area specifying step of specifying, in correspondence with the image data, a mixed area in which foreground object components which form a foreground object and background object components which form a background object are mixed may be performed.

In the processing performing step, on the basis of the plurality of types of components of the obtained image data, a mixture-ratio detection step of detecting, in correspondence with the image data, the mixture ratio indicating the ratio of the mixture of the foreground object components to the mixture of the background object components in a mixed area in which the foreground object components and the background object components are mixed may be performed.

A second image-capturing apparatus of the present invention comprises image-capturing means for outputting a subject image captured by an image-capturing device including a predetermined number of pixels, the pixels having a time integrating function, as image data which is formed of a predetermined number of pixel data having a plurality of types of components at the same pixel position; and processing performing means for performing, on the basis of the plurality of types of components of the image data, one of processings of (i) an area specifying step of specifying, in correspondence with the image data, a mixed area in which foreground object components which form a foreground object and background object components which form a background object are mixed and (ii) a mixture-ratio detection step of detecting, in correspondence with the image data, the mixture ratio indicating the ratio of the mixture of the foreground object components to the mixture of the background object components in a mixed area in which the foreground object components and the background object components are mixed.

The processing performing means may perform, on the basis of the plurality of types of components of the image data, an area specifying step of specifying, in correspondence with the image data, a mixed area in which foreground object components which form a foreground object and background object components which form a background object are mixed.

The processing performing means may perform, on the basis of the plurality of types of components of the image data, a mixture-ratio detection step of detecting, in correspondence with the image data, the mixture ratio indicating the ratio of the mixture of the foreground object components to the mixture of the background object components in a mixed area in which the foreground object components and the background object components are mixed.

In correspondence with image data, a mixed area in which foreground object components which form a foreground object and background object components which form a background object are mixed is specified. The mixture ratio indicating the ratio of the mixture of the foreground object components to the mixture of the background object components in a mixed area in which the foreground object components and the background object components are mixed is detected. At least one of the area specification operation and the mixture-ratio detection operation performs image processing on the basis of the plurality of types of components.

Image data is obtained, and based on the plurality of types of components of the obtained image data, one of processings of (i) an area specifying step of specifying, in correspondence with the image data, a mixed area in which foreground object components which form a foreground object and background object components which form a background object are mixed and (ii) a mixture-ratio detection step of detecting, in correspondence with the image data, the mixture ratio indicating the ratio of the mixture of the foreground object components to the mixture of the background object components in a mixed area in which the foreground object components and the background object components are mixed is performed.

As a result, the mixture state of the images can be recognized.

BRIEF DESCRIPTION OF THE DRAWINGS

FIG. 3 illustrates the image capturing performed by a sensor.

FIG. 9 illustrates a model in which pixel values are expanded in the time direction and the period corresponding to the shutter time is divided.

FIG. 10 illustrates a model in which pixel values are expanded in the time direction and the period corresponding to the shutter time is divided.

FIG. 25 illustrates the conditions for determining the area.

FIG. 33A illustrates the calculation of a correlation value.

FIG. 33B illustrates the calculation of a correlation value.

FIG. 34A illustrates the calculation of a correlation value.

FIG. 34B illustrates the calculation of a correlation value.

FIG. 37 illustrates determinations made by an area determining portion 342.

FIG. 43 illustrates motion compensation performed by a motion compensator 381.

FIG. 65A illustrates an input image, a foreground component image, and a background component image.

FIG. 69 is a block diagram illustrating an example of the configuration of a separating portion 601.

FIG. 81 illustrates an example of a model in which the relationships between pixel values and foreground components are indicated.

FIG. 82 illustrates the calculation of foreground components.

FIG. 83 illustrates the calculation of foreground components.

FIG. 112 is a flowchart illustrating another processing for determining a mixture ratio using component signals.

FIG. 113 shows still another embodiment of an image processing apparatus for calculating a mixture ratio on the basis of input images and area information, which are input as component signals.

FIG. 114 is a block diagram illustrating the configuration of a mixture-ratio calculator 1421.

FIG. 115 illustrates still another processing for calculating a mixture ratio on the basis of input images and area information, which are input as component signals.

BEST MODE FOR CARRYING OUT THE INVENTION

Figure 1:
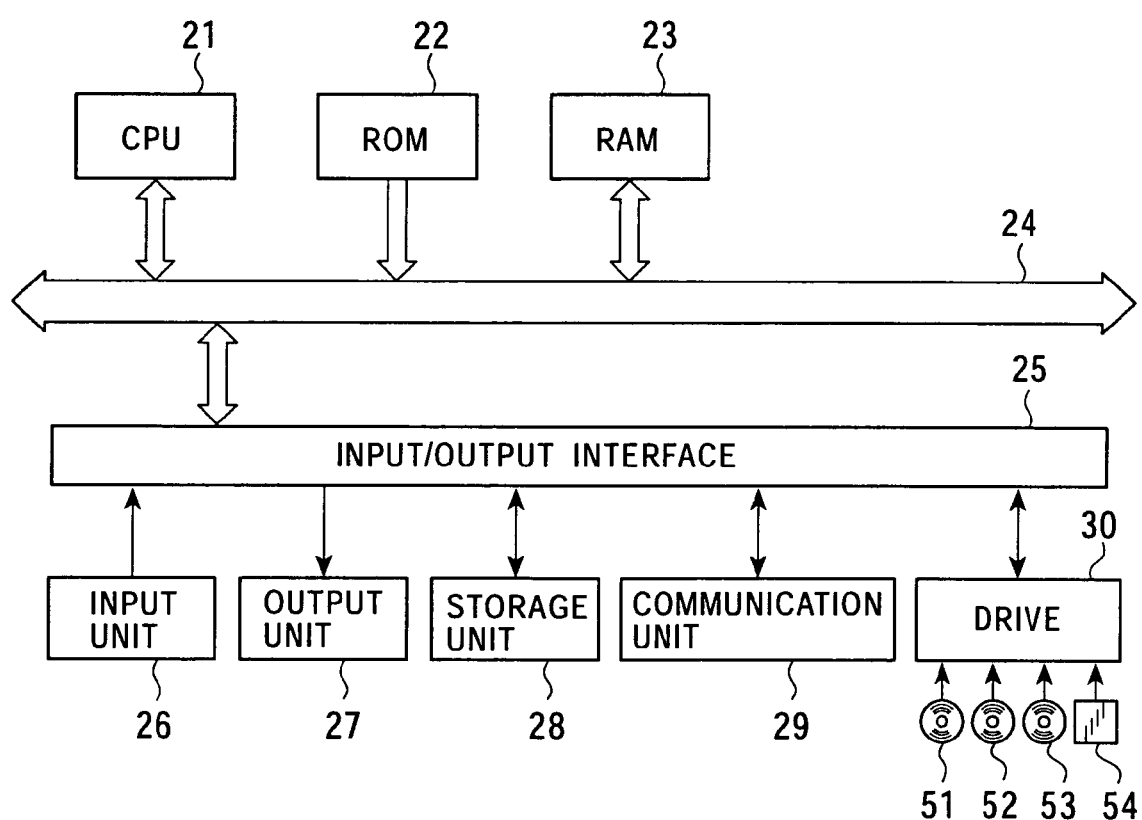
FIG. 1 shows an embodiment of an image processing apparatus of the present invention.

FIG. 1 shows an embodiment of an image processing apparatus of the present invention. A CPU (Central Processing Unit) 21 executes various types of processing according to programs stored in a ROM (Read Only Memory) 22 or in a storage unit 28. Programs executed by the CPU 21 and data are stored in a RAM (Random Access Memory) 23 as required. The CPU 21, the ROM 22, and the RAM 23 are connected to each other by a bus 24.

An input/output interface 25 is also connected to the CPU 21 via the bus 24. An input unit 26, which is formed of a keyboard, a mouse, a microphone, and so on, and an output unit 27, which is formed of a display, a speaker, and so on, are connected to the input/output interface 25. The CPU 21 executes various types of processing in response to a command input from the input unit 26. The CPU 21 then outputs an image or sound obtained as a result of the processing to the output unit 27.

The storage unit 28 connected to the input/output interface 25 is formed of, for example, a hard disk, and stores programs executed by the CPU 21 and various types of data. A communication unit 29 communicates with an external device via the Internet or another network. In this example, the communication unit 29 serves as an obtaining unit for obtaining an output of a sensor.

Alternatively, a program may be obtained via the communication unit 29 and stored in the storage unit 28.

A drive 30 connected to the input/output interface 25 drives a magnetic disk 51, an optical disc 52, a magneto-optical disk 53, a semiconductor memory 54, or the like, when such a recording medium is attached to the drive 30, and obtains a program or data stored in the corresponding medium. The obtained program or data is transferred to the storage unit 28 and stored therein if necessary.

Figure 2:
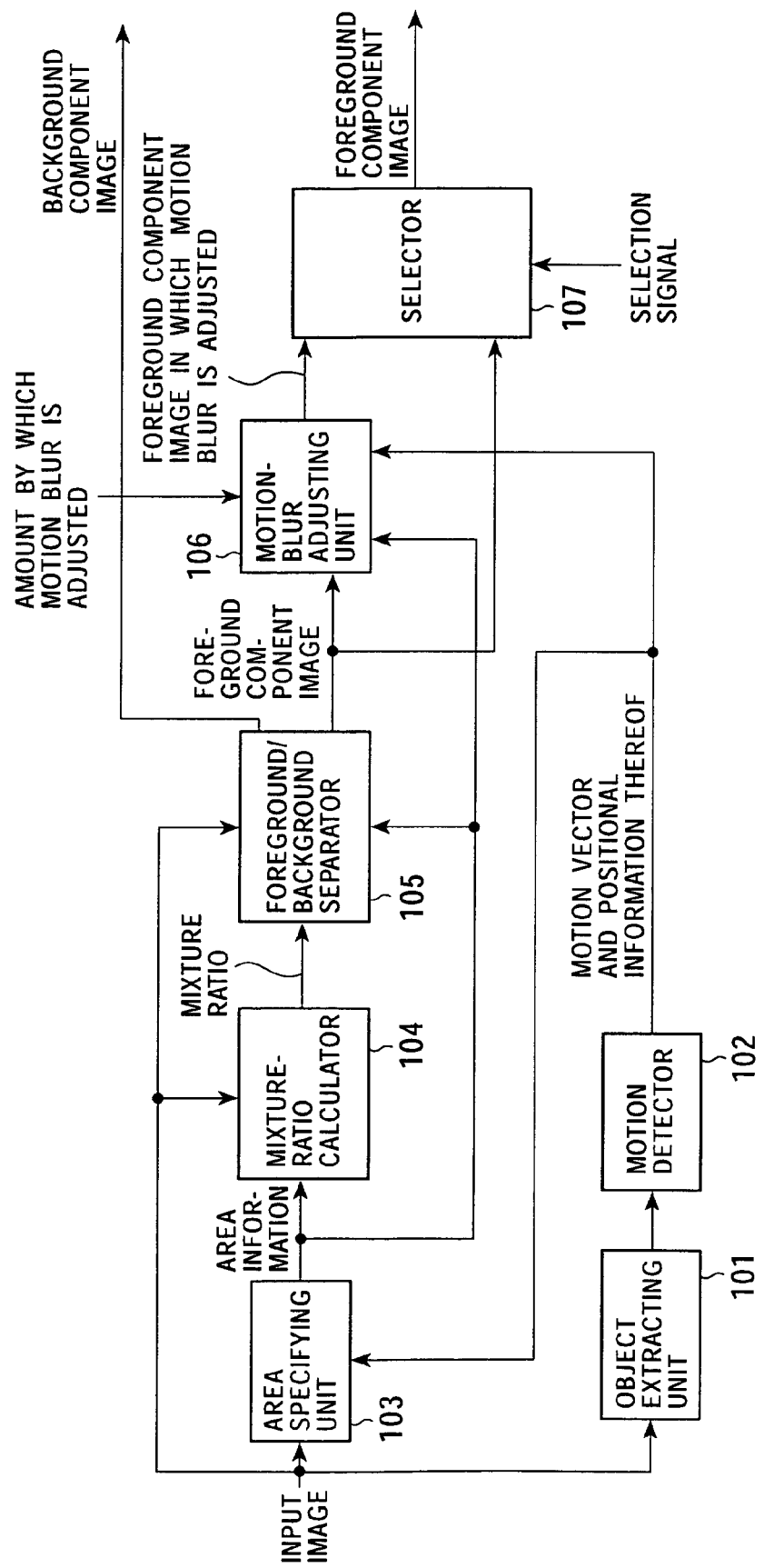
FIG. 2 is a block diagram illustrating the image processing apparatus.

FIG. 2 is a block diagram illustrating the image processing apparatus.

It does not matter whether the individual functions of the image processing apparatus are implemented by hardware or software. That is, the block diagrams of this specification may be hardware block diagrams or software functional block diagrams.

In this specification, an image to be captured corresponding to an object in the real world is referred to as an image object.

An input image supplied to the image processing apparatus is supplied to an object extracting unit 101, an area specifying unit 103, a mixture-ratio calculator 104, and a foreground/background separator 105.

The object extracting unit 101 extracts a rough image object corresponding to a foreground object contained in the input image, and supplies the extracted image object to a motion detector 102. The object extracting unit 101 detects, for example, an outline of the foreground image object contained in the input image so as to extract a rough image object corresponding to the foreground object.

The object extracting unit 101 extracts a rough image object corresponding to a background object contained in the input image, and supplies the extracted image object to the motion detector 102. The object extracting unit 101 extracts a rough image object corresponding to the background object from, for example, the difference between the input image and the extracted image object corresponding to the foreground object.

Alternatively, for example, the object extracting unit 101 may extract the rough image object corresponding to the foreground object and the rough image object corresponding to the background object from the difference between the background image stored in a built-in background memory and the input image.

The motion detector 102 calculates a motion vector of the roughly extracted image object corresponding to the foreground object according to a technique, such as block matching, gradient, phase correlation, or pel-recursive technique, and supplies the calculated motion vector and the motion-vector positional information (which is information for specifying the positions of the pixels corresponding to the motion vector) to the area specifying unit 103, and a motion-blur adjusting unit 106.

The motion vector output from the motion detector 102 contains information corresponding to the amount of movement v.

The motion detector 102 may output the motion vector of each image object, together with the pixel positional information for specifying the pixels of the image object, to the motion-blur adjusting unit 106.

The amount of movement v is a value indicating a positional change in an image corresponding to a moving object in units of the pixel pitch. For example, if an object image corresponding to a foreground is moving such that it is displayed at a position four pixels away from a reference frame when it is positioned in the subsequent frame, the amount of movement v of the object image corresponding to the foreground is 4.

The object extracting unit 101 and the motion detector 102 are needed when adjusting the amount of motion blur corresponding to a moving object.

The area specifying unit 103 determines to which of a foreground area, a background area, or a mixed area each pixel of the input image belongs, and supplies information indicating to which area each pixel belongs (hereinafter referred to as "area information") to the mixture-ratio calculator 104, the foreground/background separator 105, and the motion-blur adjusting unit 106.

The mixture-ratio calculator 104 calculates the mixture ratio corresponding to the pixels contained in a mixed area 63 (hereinafter referred to as the "mixture-ratio $\alpha$") based on the input image, and the area information supplied from the area specifying unit 103, and supplies the mixture ratio $\alpha$ to the foreground/background separator 105.

The mixture ratio $\alpha$ is a value indicating the ratio of the image components corresponding to the background object (hereinafter also be referred to as "background components") to the pixel value as expressed by equation (3), which is shown below.

The foreground/background separator 105 separates the input image into a foreground component image formed of only the image components corresponding to the foreground object (hereinafter also be referred to as "foreground components") and a background component image formed of only the background components based on the area information supplied from the area specifying unit 103 and the mixture ratio $\alpha$ supplied from the mixture-ratio calculator 104, and supplies the foreground component image to the motion-blur adjusting unit 106 and a selector 107. The separated foreground component image may be set as the final output. A more precise foreground and background can be obtained compared to a known method in which only a foreground and a background are specified without considering the mixed area.

The motion-blur adjusting unit 106 determines the unit of processing indicating at least one pixel contained in the foreground component image based on the amount of movement v obtained from the motion vector and based on the area information. The unit of processing is data that specifies a group of pixels to be subjected to the motion-blur adjustments.

Based on the amount by which the motion blur is to be adjusted, which is input into the image processing apparatus, the foreground component image supplied from the foreground/background separator 105, the motion vector and the positional information thereof supplied from the motion detector 102, and the unit of processing, the motion-blur adjusting unit 106 adjusts the amount of motion blur contained in the foreground component image by removing, decreasing, or increasing the motion blur contained in the foreground component image. The motion-blur adjusting unit 106 then outputs the foreground component image in which amount of motion blur is adjusted to the selector 107. It is not essential that the motion vector and the positional information thereof be used.

Motion blur is a distortion contained in an image corresponding to a moving object caused by the movement of an object to be captured in the real world and the image-capturing characteristics of the sensor.

The selector 107 selects one of the foreground component image supplied from the foreground/background separator 105 and the foreground component image in which the amount of motion blur is adjusted supplied from the motion-blur adjusting unit 106 based on, for example, a selection signal reflecting a user's selection, and outputs the selected foreground component image.

An input image supplied to the image processing apparatus is discussed below with reference to FIGS. 3 through 18.

FIG. 3 illustrates image capturing performed by a sensor. The sensor is formed of, for example, a CCD (Charge-Coupled Device) video camera provided with a CCD area sensor, which is a solid-state image-capturing device. An object 111 corresponding to a foreground in the real world moves, for example, horizontally from the left to the right, between an object 112 corresponding to a background and the sensor.

The sensor captures the image of the object 111 corresponding to the foreground together with the image of the object 112 corresponding to the background. The sensor outputs the captured image in units of frames. For example, the sensor outputs an image having 30 frames per second. The exposure time of the sensor can be 1/30 second. The exposure time is a period from when the sensor starts converting input light into electrical charge until when the conversion from the input light to the electrical charge is finished. The exposure time is also referred to as a "shutter time".

Figure 4:
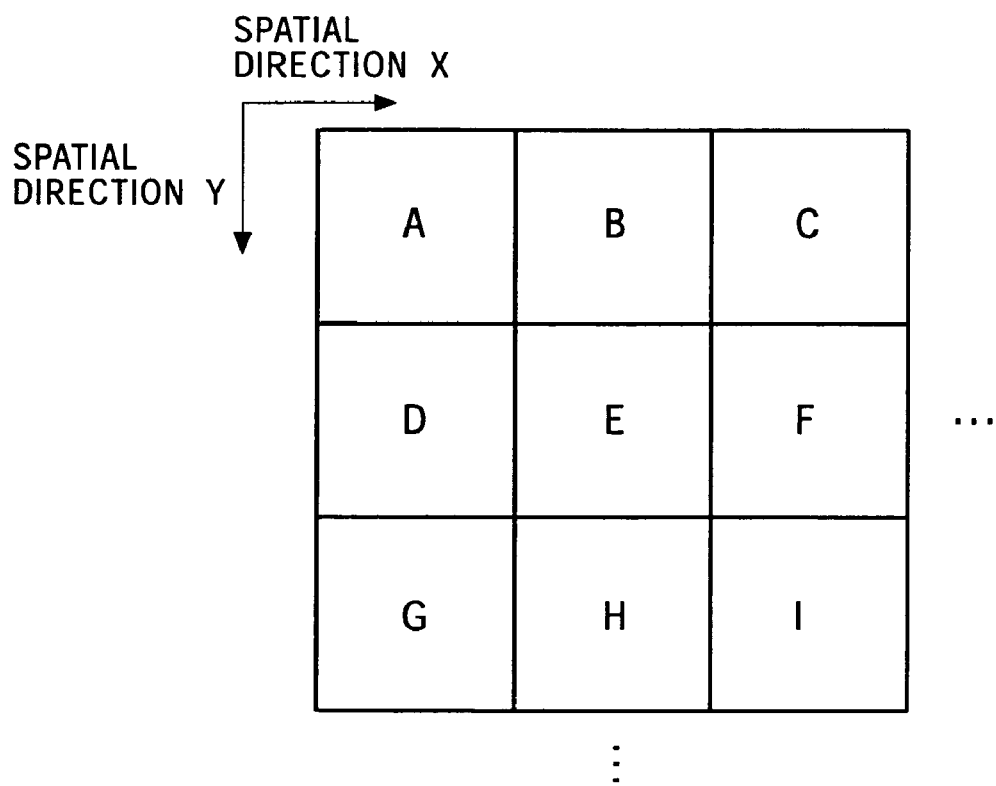
FIG. 4 illustrates the arrangement of pixels.

FIG. 4 illustrates the arrangement of pixels. In FIG. 4, A through I indicate the individual pixels. The pixels are disposed on a plane of a corresponding image. One detection device corresponding to each pixel is disposed on the sensor. When the sensor performs image capturing, each detection device outputs a pixel value of the corresponding pixel forming the image. For example, the position of the detection device in the X direction corresponds to the horizontal direction on the image, while the position of the detection device in the Y direction corresponds to the vertical direction on the image.

Figure 5:
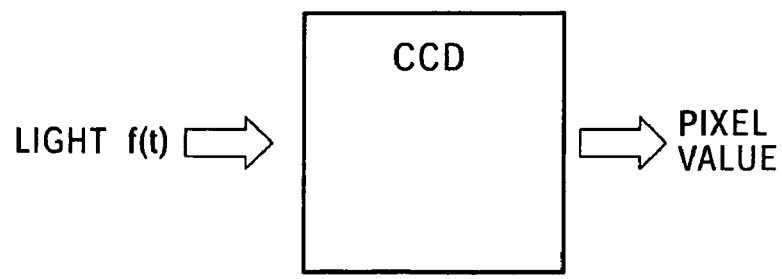
FIG. 5 illustrates the operation of a detection device.

As shown in FIG. 5, the detection device, which is, for example, a CCD, converts input light into electrical charge during a period corresponding to a shutter time, and stores the converted electrical charge. The amount of charge is almost proportional to the intensity of the input light and the period for which the light is input. The detection device sequentially adds the electrical charge converted from the input light to the stored electrical charge during the period corresponding to the shutter time. That is, the detection device integrates the input light during the period corresponding to the shutter time and stores the electrical charge corresponding to the amount integrated light. It can be considered that the detection device has an integrating function with respect to time.

The electrical charge stored in the detection device is converted into a voltage value by a circuit (not shown), and the voltage value is further converted into a pixel value, such as digital data, and is output. Accordingly, each pixel value output from the sensor is a value projected on a linear space, which is a result integrating a certain three-dimensional portion of the object corresponding to the foreground or the background with respect to the shutter time.

The image processing apparatus extracts significant information embedded in the output signal, for example, the mixture ratio $\alpha$, by the storage operation of the sensor. The image processing apparatus adjusts the amount of distortion, for example, the amount of motion blur, caused by the mixture of the foreground image object itself. The image processing apparatus also adjusts the amount of distortion caused by the mixture of the foreground image object and the background image object.

Figure 6A:
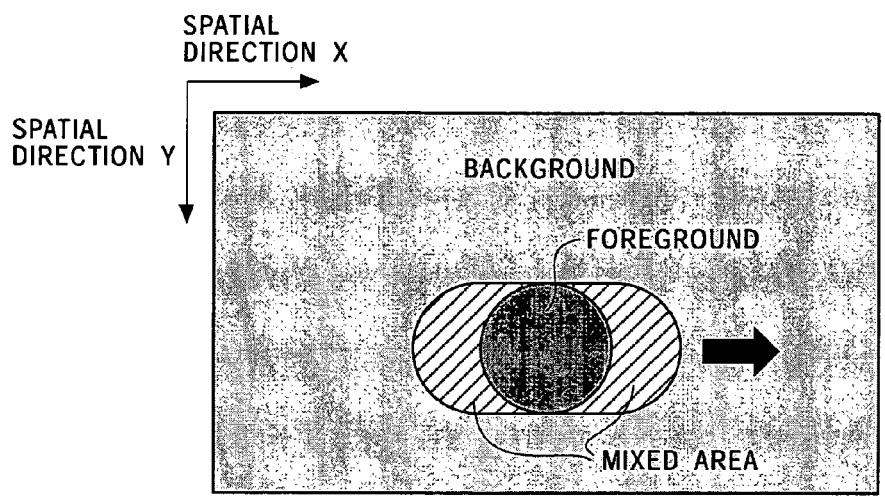
FIG. 6A illustrates an image obtained by image-capturing an object corresponding to a moving foreground and an object corresponding to a stationary background.
Figure 6B:
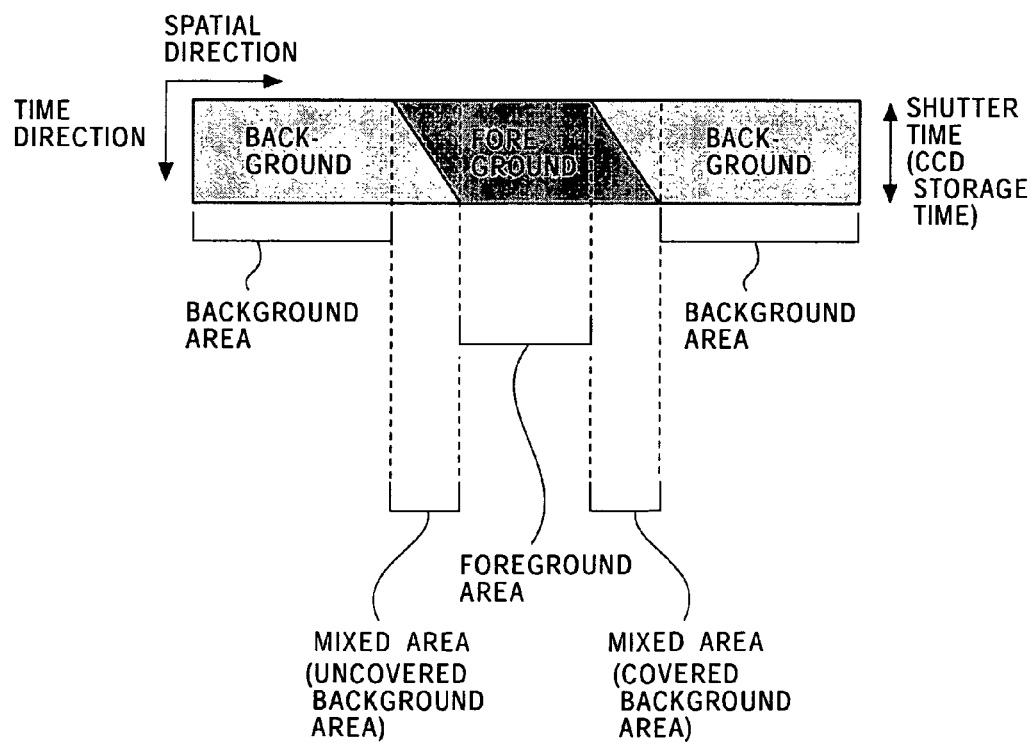
FIG. 6B illustrates a model of an image obtained by image-capturing an object corresponding to a moving foreground and an object corresponding to a stationary background.

FIG. 6A illustrates an image obtained by capturing a object corresponding to a moving foreground and a object corresponding to a stationary background. FIG. 6B illustrates a model corresponding to an image obtained by capturing a object corresponding to a moving foreground and a object corresponding to a stationary background.

FIG. 6A illustrates an image obtained by capturing a object corresponding to a moving foreground and a object corresponding to a stationary background. In the example shown in FIG. 6A, the object corresponding to the foreground is moving horizontally from the left to the right with respect to the screen.

FIG. 6B illustrates a model obtained by expanding pixel values corresponding to one line of the image shown in FIG. 6A in the time direction. The horizontal direction shown in FIG. 6B corresponds to the spatial direction X in FIG. 6A.

The values of the pixels in the background area are formed only from the background components, that is, the image components corresponding to the background object. The values of the pixels in the foreground area are formed only from the foreground components, that is, the image components corresponding to the foreground object.

The values of the pixels of the mixed area are formed from the background components and the foreground components. Since the values of the pixels in the mixed area are formed from the background components and the foreground components, it may be referred to as a "distortion area". The mixed area is further classified into a covered background area and an uncovered background area.

The covered background area is a mixed area at a position corresponding to the leading end in the direction in which the foreground object is moving, where the background components are gradually covered with the foreground over time.

In contrast, the uncovered background area is a mixed area corresponding to the trailing end in the direction in which the foreground object is moving, where the background components gradually appear over time.

As discussed above, the image containing the foreground area, the background area, or the covered background area or the uncovered background area is input into the area specifying unit 103, the mixture-ratio calculator 104, and the foreground/background separator 105 as the input image.

Figures 7, 8:
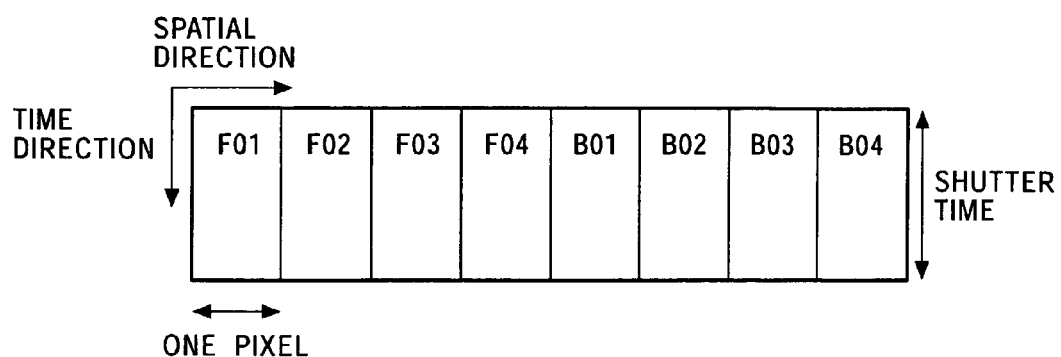
FIG. 7 illustrates a background area, a foreground area, a mixed area, a covered background area, and an uncovered background area.
FIG. 8 illustrates a model obtained by expanding in the time direction the pixel values of pixels aligned side-by-side in an image obtained by image-capturing an object corresponding to a stationary foreground and an the object corresponding to a stationary background.

FIG. 7 illustrates the background area, the foreground area, the mixed area, the covered background area, and the uncovered background area discussed above. In the areas corresponding to the image shown in FIG. 6A, the background area is a stationary portion, the foreground area is a moving portion, the covered background area of the mixed area is a portion that changes from the background to the foreground, and the uncovered background area of the mixed area is a portion that changes from the foreground to the background.

FIG. 8 illustrates a model obtained by expanding in the time direction the pixel values of the pixels aligned side-by-side in the image obtained by capturing the image of the object corresponding to the stationary foreground and the image of the object corresponding to the stationary background. For example, as the pixels aligned side-by-side, pixels arranged in one line on the screen can be selected.

The pixel values indicated by F01 through F04 shown in FIG. 8 are values of the pixels corresponding to the object of the stationary foreground. The pixel values indicated by B01 through B04 shown in FIG. 8 are values of the pixels corresponding to the object of the stationary background.

Time elapses from the top to the bottom in FIG. 8 in the vertical direction in FIG. 8. The position at the top side of the rectangle in FIG. 8 corresponds to the time at which the sensor starts converting input light into electrical charge, and the position at the bottom side of the rectangle in FIG. 8 corresponds to the time at which the conversion from the input light into the electrical charge is finished. That is, the distance from the top side to the bottom side of the rectangle in FIG. 8 corresponds to the shutter time.

The pixels shown in FIG. 8 are described below assuming that, for example, the shutter time is equal to the frame size.

The horizontal direction in FIG. 8 corresponds to the spatial direction X in FIG. 6A. More specifically, in the example shown in FIG. 8, the distance from the left side of the rectangle indicated by "F01" in FIG. 8 to the right side of the rectangle indicated by "B04" is eight times the pixel pitch, i.e., eight consecutive pixels.

When the foreground object and the background object are stationary, the light input into the sensor does not change during the period corresponding to the shutter time.

The period corresponding to the shutter time is divided into two or more portions of equal periods. For example, if the number of virtual divided portions is 4, the model shown in FIG. 8 can be represented by the model shown in FIG. 9. The number of virtual divided portions can be set according to the amount of movement v of the object corresponding to the foreground within the shutter time. For example, the number of virtual divided portions is set to 4 when the amount of movement v is 4, and the period corresponding to the shutter time is divided into four portions.

The uppermost line in FIG. 9 corresponds to the first divided period from when the shutter has opened. The second line in FIG. 9 corresponds to the second divided period from when the shutter has opened. The third line in FIG. 9 corresponds to the third divided period from when the shutter has opened. The fourth line in FIG. 9 corresponds to the fourth divided period from when the shutter has opened.

The shutter time divided in accordance with the amount of movement v is also hereinafter referred to as the "shutter time/v".

When the object corresponding to the foreground is stationary, the light input into the sensor does not change, and thus, the foreground component F01/v is equal to the value obtained by dividing the pixel value F01 by the number of virtual divided portions. Similarly, when the object corresponding to the foreground is stationary, the foreground component F02/v is equal to the value obtained by dividing the pixel value F02 by the number of virtual divided portions, the foreground component F03/v is equal to the value obtained by dividing the pixel value F03 by the number of virtual divided portions, and the foreground component F04/v is equal to the value obtained by dividing the pixel value F04 by the number of virtual divided portions.

When the object corresponding to the background is stationary, the light input into the sensor does not change, and thus, the background component B01/v is equal to the value obtained by dividing the pixel value B01 by the number of virtual divided portions. Similarly, when the object corresponding to the background is stationary, the background component B02/v is equal to the value obtained by dividing the pixel value B02 by the number of virtual divided portions, the background component B03/v is equal to the value obtained by dividing the pixel value B03 by the number of virtual divided portions, and the background component B04/v is equal to the value obtained by dividing the pixel value B04 by the number of virtual divided portions.

More specifically, when the object corresponding to the foreground is stationary, the light corresponding to the foreground object input into the sensor does not change during the period corresponding to the shutter time. Accordingly, the foreground component F01/v corresponding to the first portion of the shutter time/v from when the shutter has opened, the foreground component F01/v corresponding to the second portion of the shutter time/v from when the shutter has opened, the foreground component F01/v corresponding to the third portion of the shutter time/v from when the shutter has opened, and the foreground component F01/v corresponding to the fourth portion of the shutter time/v from when the shutter has opened become the same value. The same applies to F02/v through F04/v, as in the case of F01/v.

When the object corresponding to the background is stationary, the light corresponding to the background object input into the sensor does not change during the period corresponding to the shutter time. Accordingly, the background component B01/v corresponding to the first portion of the shutter time/v from when the shutter has opened, the background component B01/v corresponding to the second portion of the shutter time/v from when the shutter has opened, the background component B01/v corresponding to the third portion of the shutter time/v from when the shutter has opened, and the background component B01/v corresponding to the fourth portion of the shutter time/v from when the shutter has opened become the same value. The same applies to B02/v through B04/v.

A description is given of the case in which the object corresponding to the foreground is moving and the object corresponding to the background is stationary.

FIG. 10 illustrates a model obtained by expanding in the time direction the pixel values of the pixels in one line, including a covered background area, when the object corresponding to the foreground is moving to the right in FIG. 10. In FIG. 10, the amount of movement v is 4. Since one frame is a short period, it can be assumed that the object corresponding to the foreground is a rigid body moving with constant velocity. In FIG. 10, the object image corresponding to the foreground is moving such that it is positioned four pixels to the right with respect to a reference frame when it is displayed in the subsequent frame.

In FIG. 10, the pixels from the leftmost pixel to the fourth pixel belong to the foreground area. In FIG. 10, the pixels from the fifth pixel to the seventh pixel from the left belong to the mixed area, which is the covered background area. In FIG. 10, the rightmost pixel belongs to the background area.

The object corresponding to the foreground is moving such that it gradually covers the object corresponding to the background over time. Accordingly, the components contained in the pixel values of the pixels belonging to the covered background area change from the background components to the foreground components at a certain time during the period corresponding to the shutter time.

For example, the pixel value M surrounded by the thick frame in FIG. 10 is expressed by equation (1) below.

$$M = B02/v + B02/v + F07/v + F06/v \qquad (1)$$

For example, the fifth pixel from the left contains a background component corresponding to one portion of the shutter time/v and foreground components corresponding to three portions of the shutter time/v, and thus, the mixture ratio α of the fifth pixel from the left is 1/4. The sixth pixel from the left contains background components corresponding to two portions of the shutter time/v and foreground components corresponding to two portions of the shutter time/v, and thus, the mixture ratio α of the sixth pixel from the left is 1/2. The seventh pixel from the left contains background components corresponding to three portions of the shutter time/v and a foreground component corresponding to one portion of the shutter time/v, and thus, the mixture ratio α of the fifth pixel from the left is 3/4.

It can be assumed that the object corresponding to the foreground is a rigid body, and the foreground object is moving with constant velocity such that it is displayed four pixels to the right in the subsequent frame. Accordingly, for example, the foreground component F07/v of the fourth pixel from the left in FIG. 10 corresponding to the first portion of the shutter time/v from when the shutter has opened is equal to the foreground component of the fifth pixel from the left in FIG. 10 corresponding to the second portion of the shutter time/v from when the shutter has opened. Similarly, the foreground component F07/v is equal to the foreground component of the sixth pixel from the left in FIG. 10 corresponding to the third portion of the shutter time/v from when the shutter has opened, and the foreground component of the seventh pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F06/v of the third pixel from the left in FIG. 10 corresponding to the first portion of the shutter time/v from when the shutter has opened is equal to the foreground component of the fourth pixel from the left in FIG. 10 corresponding to the second portion of the shutter time/v from when the shutter has opened. Similarly, the foreground component F06/v is equal to the foreground component of the fifth pixel from the left in FIG. 10 corresponding to the third portion of the shutter time/v from when the shutter has opened, and the foreground component of the sixth pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F05/v of the second pixel from the left in FIG. 10 corresponding to the first portion of the shutter time/v from when the shutter has opened is equal to the foreground component of the third pixel from the left in FIG. 10 corresponding to the second portion of the shutter time/v from when the shutter has opened. Similarly, the foreground component F05/v is equal to the foreground component of the fourth pixel from the left in FIG. 10 corresponding to the third portion of the shutter time/v from when the shutter has opened, and the foreground component of the fifth pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F04/v of the left most pixel in FIG. 10 corresponding to the first portion of the shutter time/v from when the shutter has opened is equal to the foreground component of the second pixel from the left in FIG. 10 corresponding to the second portion of the shutter time/v from when the shutter has opened. Similarly, the foreground component F04/v is equal to the foreground component of the third pixel from the left in FIG. 10 corresponding to the third portion of the shutter time/v from when the shutter has opened, and the foreground component of the fourth pixel from the left in FIG. 10 corresponding to the fourth portion of the shutter time/v from when the shutter has opened.

Since the foreground area corresponding to the moving object contains motion blur as discussed above, it can also be referred to as a "distortion area".

Figure 11:
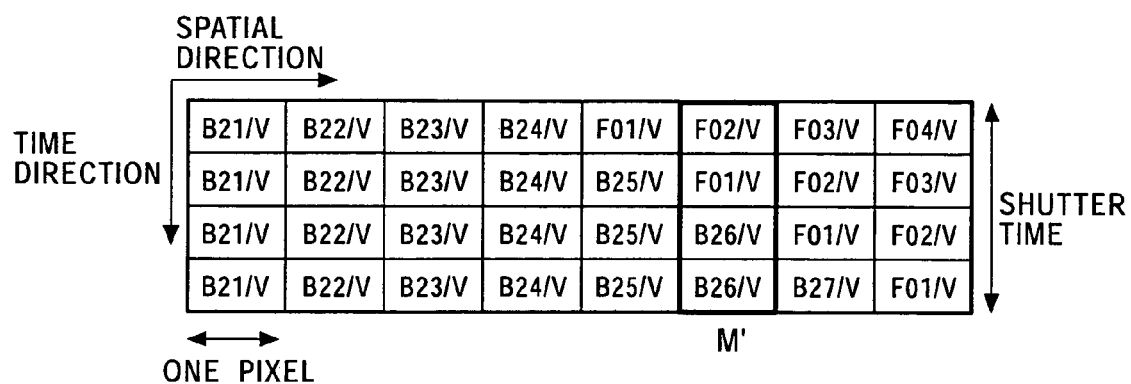
FIG. 11 illustrates a model in which pixel values are expanded in the time direction and the period corresponding to the shutter time is divided.

FIG. 11 illustrates a model obtained by expanding in the time direction the pixel values of the pixels in one line including an uncovered background area when the object corresponding to the foreground is moving to the right in FIG. 11. In FIG. 11, the amount of movement v is 4. Since one frame is a short period, it can be assumed that the object corresponding to the foreground is a rigid body moving with constant velocity. In FIG. 11, the object image corresponding to the foreground is moving to the right such that it is positioned four pixels to the right with respect to a reference frame when it is displayed in the subsequent frame.

In FIG. 11, the pixels from the leftmost pixel to the fourth pixel belong to the background area. In FIG. 11, the pixels from the fifth pixel to the seventh pixels from the left belong to the mixed area, which is an uncovered background area. In FIG. 11, the rightmost pixel belongs to the foreground area.

The object corresponding to the foreground which covers the object corresponding to the background is moving such that it is gradually removed from the object corresponding to the background over time. Accordingly, the components contained in the pixel values of the pixels belonging to the uncovered background area change from the foreground components to the background components at a certain time of the period corresponding to the shutter time.

For example, the pixel value M' surrounded by the thick frame in FIG. 11 is expressed by equation (2).

$$M' = F02/v + F01/v + B26/v + B26/v \qquad (2)$$

For example, the fifth pixel from the left contains background components corresponding to three portions of the shutter time/v and a foreground component corresponding to one shutter portion of the shutter time/v, and thus, the mixture ratio α of the fifth pixel from the left is 3/4. The sixth pixel from the left contains background components corresponding to two portions of the shutter time/v and foreground components corresponding to two portions of the shutter time/v, and thus, the mixture ratio α of the sixth pixel from the left is 1/2. The seventh pixel from the left contains a background component corresponding to one portion of the shutter time/v and foreground components corresponding to three portions of the shutter time/v, and thus, the mixture ratio α of the seventh pixel from the left is 1/4.

When equations (1) and (2) are generalized, the pixel value M can be expressed by equation (3):

$$M = \alpha \cdot B + \sum_i Fi/v \qquad (3)$$

where α is the mixture ratio, B indicates a pixel value of the background, and Fi/v designates a foreground component.

It can be assumed that the object corresponding to the foreground is a rigid body, which is moving with constant velocity, and the amount of movement is 4. Accordingly, for example, the foreground component F01/v of the fifth pixel from the left in FIG. 11 corresponding to the first portion of the shutter time/v from when the shutter has opened is equal to the foreground component of the sixth pixel from the left in FIG. 11 corresponding to the second portion of the shutter time/v from when the shutter has opened. Similarly, the foreground component F01/v is equal to the foreground component of the seventh pixel from the left in FIG. 11 corresponding to the third portion of the shutter time/v from when the shutter has opened, and the foreground component of the eighth pixel from the left in FIG. 11 corresponding to the fourth portion of the shutter time/v from when the shutter has opened.

It can be assumed that the object corresponding to the foreground is a rigid body, which is moving with constant velocity, and the amount of movement v is 4. Accordingly, for example, the foreground component F02/v of the sixth pixel from the left in FIG. 11 corresponding to the first portion of the shutter time/v from when the shutter has opened is equal to the foreground component of the seventh pixel from the left in FIG. 11 corresponding to the second portion of the shutter time/v from when the shutter has opened. Similarly, the foreground component F02/v is equal to the foreground component of the eighth pixel from the left in FIG. 11 corresponding to the third portion of the shutter time/v from when the shutter has opened.

It can be assumed that the object corresponding to the foreground is a rigid body, which is moving with constant velocity, and the amount of movement v is 4. Accordingly, for example, the foreground component F03/v of the seventh pixel from the left in FIG. 11 corresponding to the first portion of the shutter time/v from when the shutter has opened is equal to the foreground component of the eighth pixel from the left in FIG. 11 corresponding to the second portion of the shutter time/v from when the shutter has opened.

It has been described with reference to FIGS. 9 through 11 that the number of virtual divided portions is 4. The number of virtual divided portions corresponds to the amount of movement v. Generally, the amount of movement v corresponds to the moving speed of the object corresponding to the foreground. For example, if the object corresponding to the foreground is moving such that it is displayed four pixels to the right with respect to a certain frame when it is positioned in the subsequent frame, the amount of movement v is set to 4. The number of virtual divided portions is set to 4 in accordance with the amount of movement v. Similarly, when the object corresponding to the foreground is moving such that it is displayed six pixels to the left with respect to a certain frame when it is positioned in the subsequent frame, the amount of movement v is set to 6, and the number of virtual divided portions is set to 6.

Figure 12:
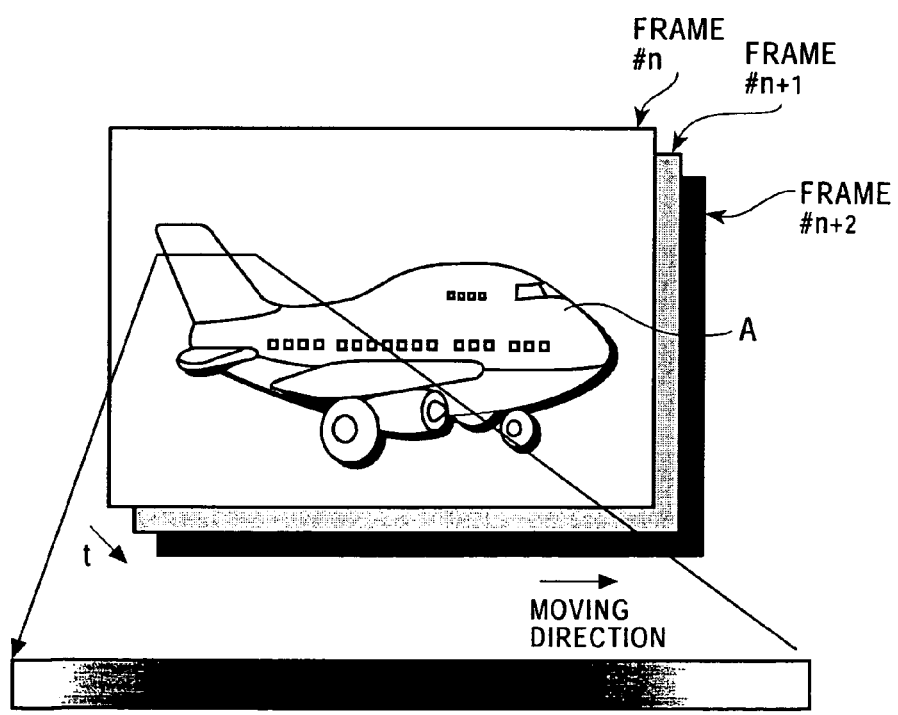
FIG. 12 illustrates an example in which pixels in a foreground area, a background area, and a mixed area are extracted.
Figure 13:
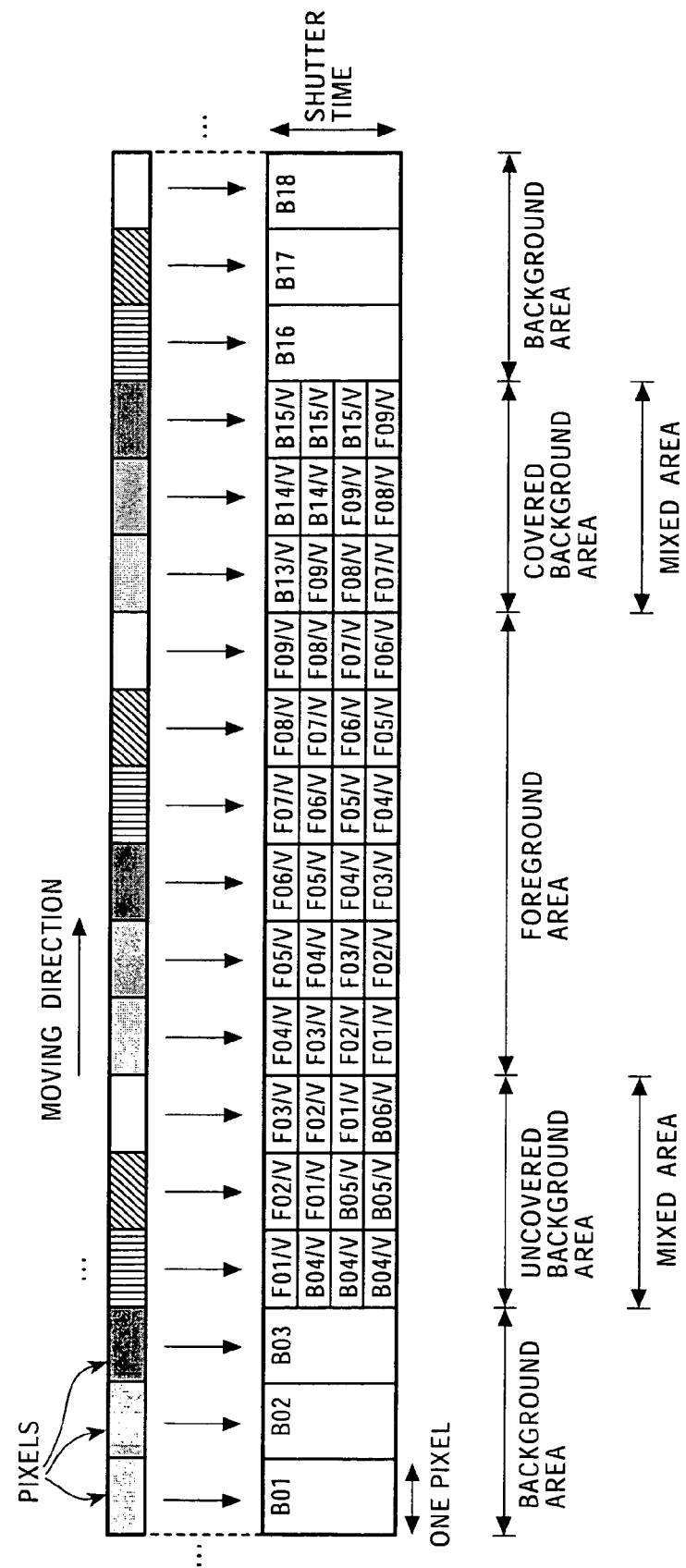
FIG. 13 illustrates the relationships between pixels and a model obtained by expanding the pixel values in the time direction.

FIGS. 12 and 13 illustrate the relationship of the foreground area, the background area, and the mixed area which consists of a covered background or an uncovered background, which are discussed above, to the foreground components and the background components corresponding to the divided periods of the shutter time.

FIG. 12 illustrates an example in which pixels in the foreground area, the background area, and the mixed area are extracted from an image containing a foreground corresponding to an object moving in front of a stationary background. In the example shown in FIG. 12, the object indicated by "A" corresponding to the foreground is horizontally moving with respect to the screen.

Frame #n+1 is a frame subsequent to frame #n, and frame #n+2 is a frame subsequent to frame #n+1.

Pixels in the foreground area, the background area, and the mixed area are extracted from one of frames #n through #n+2, and the amount of movement v is set to 4. A model obtained by expanding the pixel values of the extracted pixels in the time direction is shown in FIG. 13.

Since the object corresponding to the foreground is moving, the pixel values in the foreground area are formed of four different foreground components corresponding to the shutter time/v. For example, the leftmost pixel of the pixels in the foreground area shown in FIG. 13 consists of F01/v, F02/v, F03/v, and F04/v. That is, the pixels in the foreground contain motion blur.

Since the object corresponding to the background is stationary, light input into the sensor corresponding to the background during the shutter time does not change. In this case, the pixel values in the background area do not contain motion blur.

The pixel values in the mixed area consisting of a covered background area or an uncovered background area are formed of foreground components and background components.

A description is given below of a model obtained by expanding in the time direction the pixel values of the pixels which are aligned side-by-side in a plurality of frames and which are located at the same positions when the frames are overlapped when the image corresponding to the object is moving. For example, when the image corresponding to the object is moving horizontally with respect to the screen, pixels aligned on the screen can be selected as the pixels aligned side-by-side.

Figure 14:
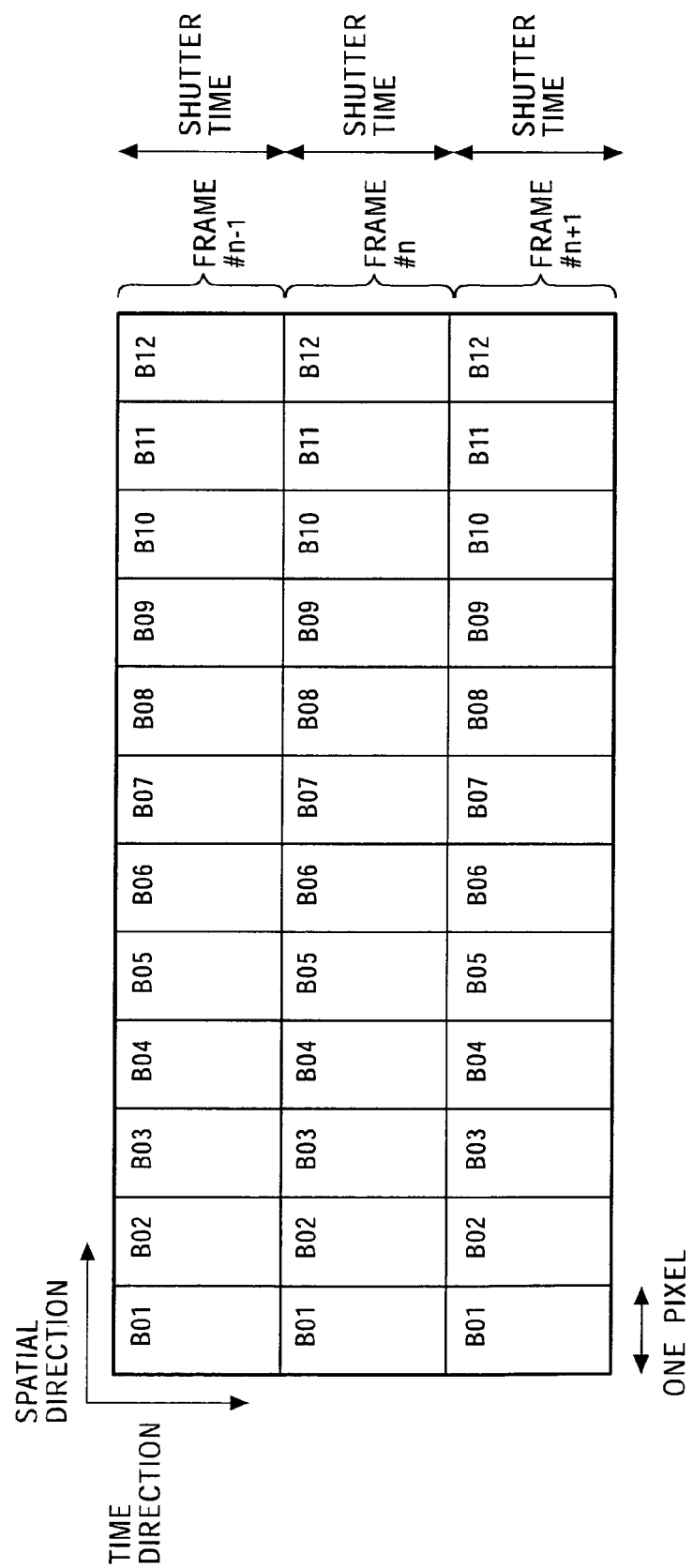
FIG. 14 illustrates a model in which pixel values are expanded in the time direction and the period corresponding to the shutter time is divided.

FIG. 14 illustrates a model obtained by expanding in the time direction the pixels which are aligned side-by-side in three frames of an image obtained by capturing an object corresponding to a stationary background and which are located at the same positions when the frames are overlapped. Frame #n is the frame subsequent to frame #n−1, and frame #n+1 is the frame subsequent to frame #n. The same applies to the other frames.

The pixel values B01 through B12 shown in FIG. 14 are pixel values corresponding to the stationary background object. Since the object corresponding to the background is stationary, the pixel values of the corresponding pixels in frame #n−1 through frame #n+1 do not change. For example, the pixel in frame #n and the pixel in frame #n+1 located at the corresponding position of the pixel having the pixel value B05 in frame #n−1 have the pixel value B05.

Figure 15:
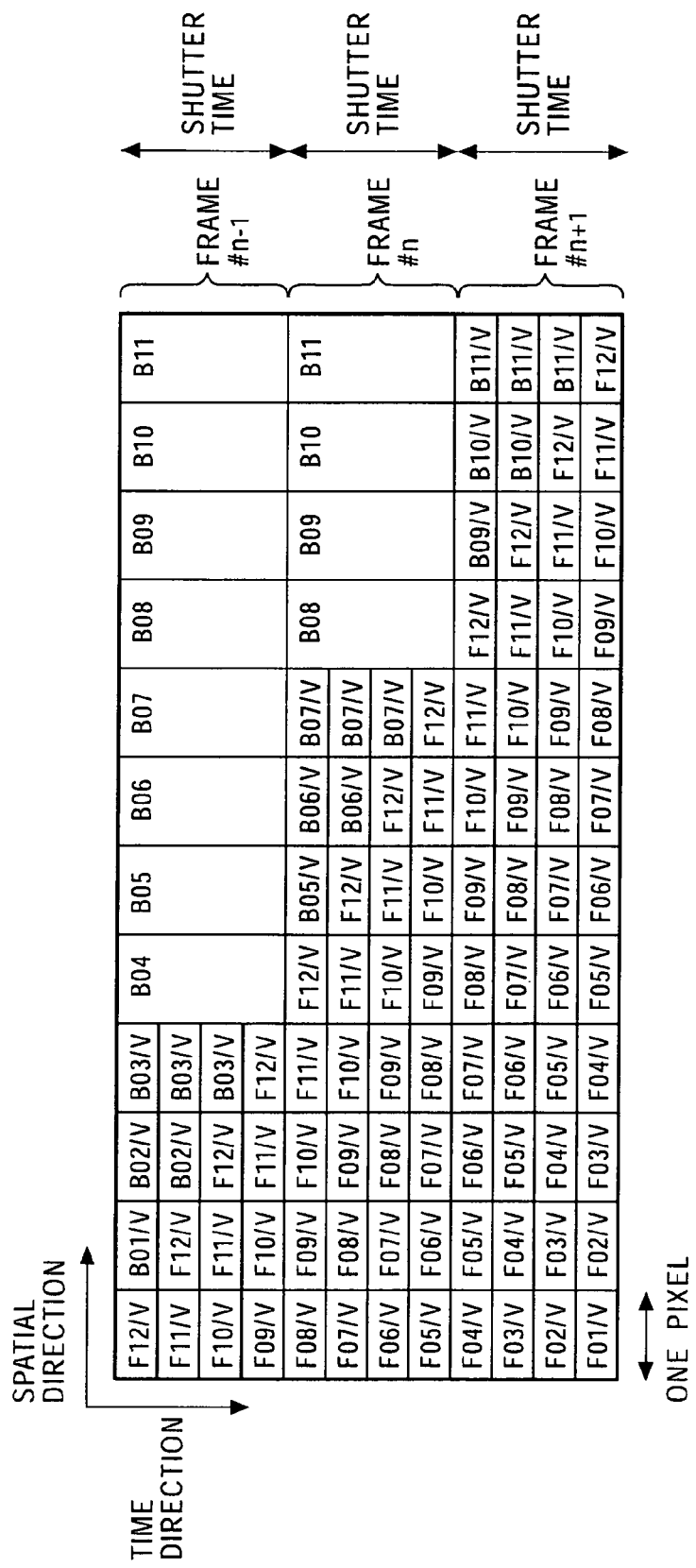
FIG. 15 illustrates a model in which pixel values are expanded in the time direction and the period corresponding to the shutter time is divided.

FIG. 15 illustrates a model obtained by expanding in the time direction the pixels which are aligned side-by-side in three frames of an image obtained by capturing an object corresponding to a foreground that is moving to the right in FIG. 15 together with an object corresponding to a stationary background and which are located at the same positions when the frames are overlapped. The model shown in FIG. 15 contains a covered background area.

In FIG. 15, it can be assumed that the object corresponding to the foreground is a rigid body moving with constant velocity, and that it is moving such that it is displayed four pixels to the right in the subsequent frame. Accordingly, the amount of movement v is 4, and the number of virtual divided portions is 4.

For example, the foreground component of the leftmost pixel in frame #n−1 in FIG. 15 corresponding to the first portion of the shutter time/v from when the shutter has opened is F12/v, and the foreground component of the second pixel from the left in FIG. 15 corresponding to the second portion of the shutter time/v from when the shutter has opened is also F12/v. The foreground component of the third pixel from the left in FIG. 15 corresponding to the third portion of the shutter time/v from when the shutter has opened and the foreground component of the fourth pixel from the left in FIG. 15 corresponding to the fourth portion of the shutter time/v from when the shutter has opened are F12/v.

The foreground component of the leftmost pixel in frame #n−1 in FIG. 15 corresponding to the second portion of the shutter time/v from when the shutter has opened is F11/v. The foreground component of the second pixel from the left in FIG. 15 corresponding to the third portion of the shutter time/v from when the shutter has opened is also F11/v. The foreground component of the third pixel from the left in FIG. 15 corresponding to the fourth portion of the shutter time/v from when the shutter has opened is F11/v.

The foreground component of the leftmost pixel in frame #n−1 in FIG. 15 corresponding to the third portion of the shutter time/v from when the shutter has opened is F10/v. The foreground component of the second pixel from the left in FIG. 15 corresponding to the fourth portion of the shutter time/v from when the shutter has opened is also F10/v. The foreground component of the leftmost pixel in frame #n−1 in FIG. 15 corresponding to the fourth portion of the shutter time/v from when the shutter has opened is F09/v.

In frame #n−1 in FIG. 15, the leftmost pixel from the left belongs to the foreground area, and the second through fourth pixels from the left belong to the mixed area, which is a covered background area.

The fifth through twelfth pixels from the left of frame #n−1 in FIG. 15 belong to the background area, and the pixel values thereof are B04 through B11, respectively.

The first through fifth pixels from the left in frame #n in FIG. 15 belong to the foreground area. The foreground component in the shutter time/v in the foreground area of frame #n is any one of F05/v through F12/v.

It can be assumed that the object corresponding to the foreground is a rigid body moving with constant velocity, and that it is moving such that the foreground image is displayed four pixels to the right in the subsequent frame. Accordingly, the foreground component of the fifth pixel from the left of frame #n in FIG. 15 corresponding to the first portion of the shutter time/v from when the shutter has opened is F12/v, and the foreground component of the sixth pixel from the left in FIG. 15 corresponding to the second portion of the shutter time/v from when the shutter has opened is also F12/v. The foreground component of the seventh pixel from the left in FIG. 15 corresponding to the third portion of the shutter time/v from when the shutter has opened and the foreground component of the eighth pixel from the left in FIG. 15 corresponding to the fourth portion of the shutter time/v from when the shutter has opened are F12/v.

The foreground component of the fifth pixel from the left of frame #n in FIG. 15 corresponding to the second portion of the shutter time/v from when the shutter has opened is F11/v. The foreground component of the sixth pixel from the left in FIG. 15 corresponding to the third portion of the shutter time/v from when the shutter has opened is also F11/v. The foreground component of the seventh pixel from the left in FIG. 15 corresponding to the fourth portion of the shutter time/v from when the shutter has opened is F11/v.

The foreground component of the fifth pixel from the left of frame #n in FIG. 15 corresponding to the third portion of the shutter time/v from when the shutter has opened is F10/v. The foreground component of the sixth pixel from the left in FIG. 15 corresponding to the fourth portion of the shutter time/v from when the shutter has opened is also F10/v. The foreground component of the fifth pixel from the left of frame #n in FIG. 15 corresponding to the fourth portion of the shutter time/v from when the shutter has opened is F09/v.

Since the object corresponding to the background is stationary, the background component of the sixth pixel from the left of frame #n in FIG. 15 corresponding to the first portion of the shutter time/v from when the shutter has opened is B05/v. The background components of the seventh pixel from the left of frame #n in FIG. 15 corresponding to the first and second portions of the shutter time/v from when the shutter has opened are B06/v. The background components of the eighth pixel from the left of frame #n in FIG. 15 corresponding to the first through third portion of the shutter time/v from when the shutter has opened are B07/v.

In frame #n in FIG. 15, the sixth through eighth pixels from the left belong to the mixed area, which is a covered background area.

The ninth through twelfth pixels from the left of frame #n in FIG. 15 belong to the background area, and the pixel values thereof are B08 through B11, respectively.

The first through ninth pixels from the left in frame #n+1 in FIG. 15 belong to the foreground area. The foreground component in the shutter time/v in the foreground area of frame #n+1 is any one of F01/v through F12/v.

It can be assumed that the object corresponding to the foreground is a rigid body moving with constant velocity, and that it is moving such that the foreground image is displayed four pixels to the right in the subsequent frame. Accordingly, the foreground component of the ninth pixel from the left of frame #n+1 in FIG. 15 corresponding to the first portion of the shutter time/v from when the shutter has opened is F12/v, and the foreground component of the tenth pixel from the left in FIG. 15 corresponding to the second portion of the shutter time/v from when the shutter has opened is also F12/v. The foreground component of the eleventh pixel from the left in FIG. 15 corresponding to the third portion of the shutter time/v from when the shutter has opened and the foreground component of the twelfth pixel from the left in FIG. 15 corresponding to the fourth portion of the shutter time/v from when the shutter has opened are F12/v.

The foreground component of the ninth pixel from the left of frame #n+1 in FIG. 15 corresponding to the second portion of the shutter time/v from when the shutter has opened is F11/v. The foreground component of the tenth pixel from the left in FIG. 15 corresponding to the third portion of the shutter time/v from when the shutter has opened is also F11/v. The foreground component of the eleventh pixel from the left in FIG. 15 corresponding to the fourth portion of the shutter time/v from when the shutter has opened is F11/v.

The foreground component of the ninth pixel from the left of frame #n+1 in FIG. 15 corresponding to the third portion of the shutter time/v from when the shutter has opened is F10/v. The foreground component of the tenth pixel from the left in FIG. 15 corresponding to the fourth portion of the shutter time/v from when the shutter has opened is also F10/v. The foreground component of the ninth pixel from the left of frame #n+1 in FIG. 15 corresponding to the fourth portion of the shutter time/v from when the shutter has opened is F09/v.

Since the object corresponding to the background is stationary, the background component of the tenth pixel from the left of frame #n+1 in FIG. 15 corresponding to the first portion of the shutter time/v from when the shutter has opened is B09/v. The background components of the eleventh pixel from the left of frame #n+1 in FIG. 15 corresponding to the first and second portions of the shutter time/v from when the shutter has opened are B10/v. The background components of the twelfth pixel from the left of frame #n+1 in FIG. 15 corresponding to the first through third portion of the shutter time/v from when the shutter has opened are B11/v.

In frame #n+1 in FIG. 15, the tenth through twelfth pixels from the left belong to the mixed area, which is a covered background area.

Figure 16:
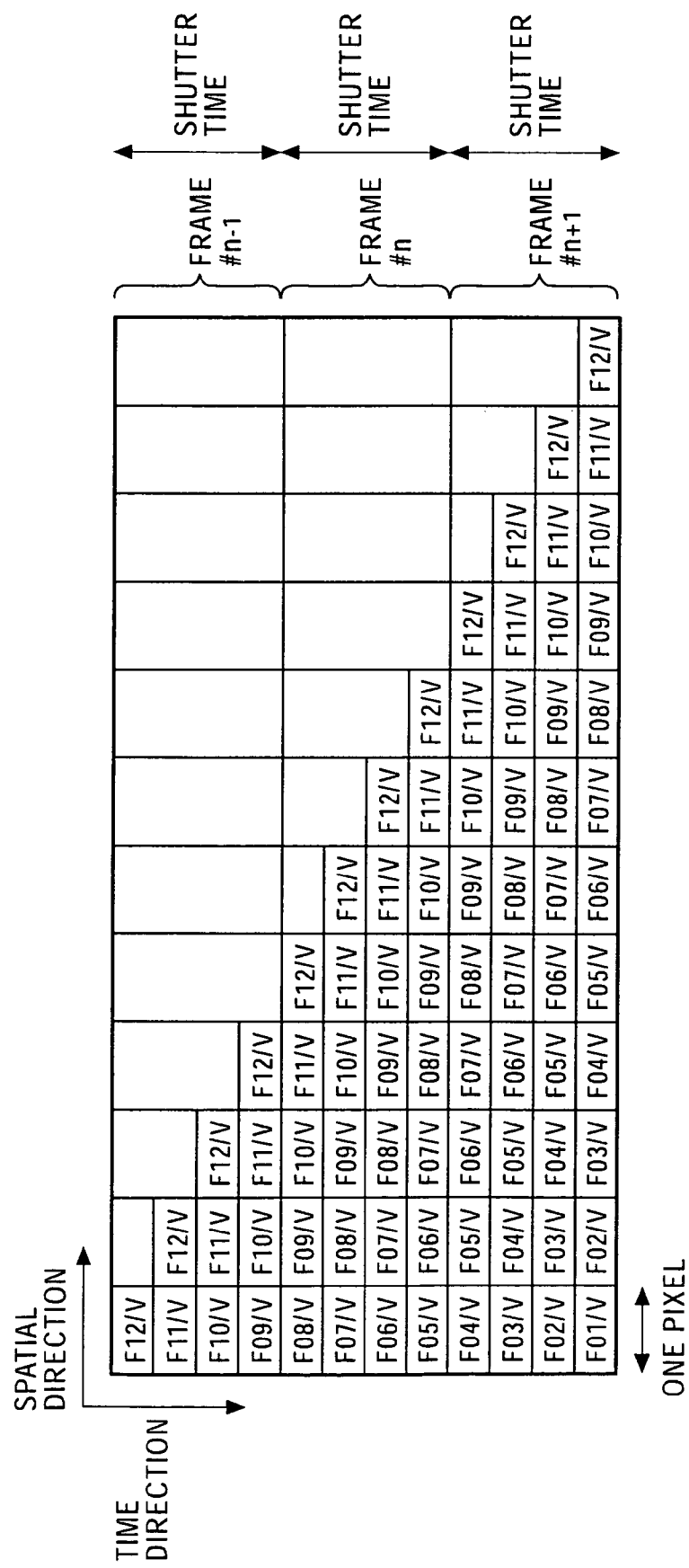
FIG. 16 illustrates a model in which pixel values are expanded in the time direction and the period corresponding to the shutter time is divided.

FIG. 16 illustrates a model of an image obtained by extracting the foreground components from the pixel values shown in FIG. 15.

Figure 17:
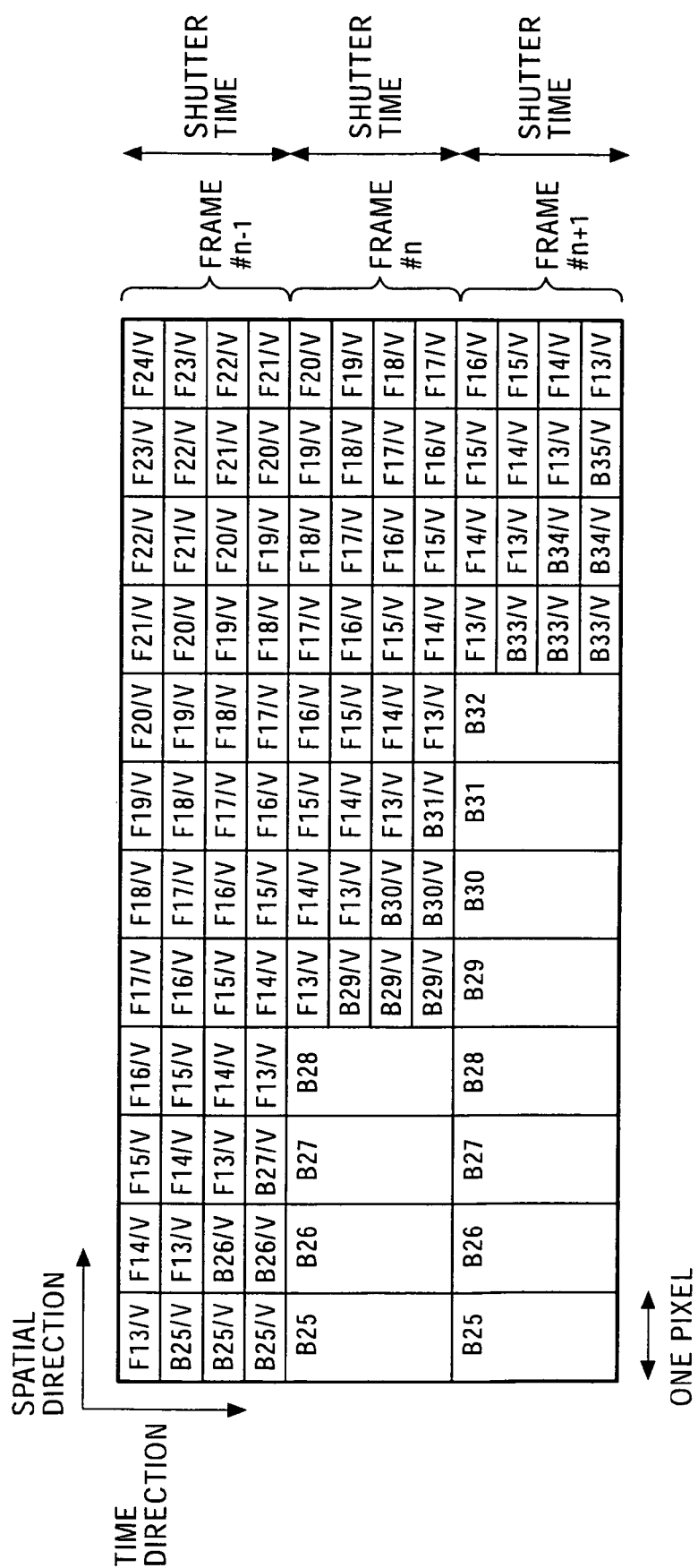
FIG. 17 illustrates a model in which pixel values are expanded in the time direction and the period corresponding to the shutter time is divided.

FIG. 17 illustrates a model obtained by expanding in the time direction the pixels which are aligned side-by-side in three frames of an image obtained by capturing an object corresponding to a foreground that is moving to the right in FIG. 17 together with an object corresponding to a stationary background and which are located at the same positions when the frames are overlapped. The model shown in FIG. 17 contains an uncovered background area.

In FIG. 17, it can be assumed that the object corresponding to the foreground is a rigid body moving with constant velocity, and that it is moving such that it is displayed four pixels to the right in the subsequent frame. Accordingly, the amount of movement v is 4.

For example, the foreground component of the leftmost pixel in frame #n−1 in FIG. 17 corresponding to the first portion of the shutter time/v from when the shutter has opened is F13/v, and the foreground component of the second pixel from the left in FIG. 17 corresponding to the second portion of the shutter time/v from when the shutter has opened is also F13/v. The foreground component of the third pixel from the left in FIG. 19 corresponding to the third portion of the shutter time/v from when the shutter has opened and the foreground component of the fourth pixel from the left in FIG. 17 corresponding to the fourth portion of the shutter time/v from when the shutter has opened are F13/v.

The foreground component of the second pixel from the left of frame #n−1 in FIG. 17 corresponding to the first portion of the shutter time/v from when the shutter has opened is F14/v. The foreground component of the third pixel from the left in FIG. 17 corresponding to the second portion of the shutter time/v from when the shutter has opened is also F14/v. The foreground component of the third pixel from the left in FIG. 17 corresponding to the first portion of the shutter time/v from when the shutter has opened is F15/v.

Since the object corresponding to the background is stationary, the background components of the leftmost pixel in frame #n−1 in FIG. 17 corresponding to the second through fourth portions of the shutter time/v from when the shutter has opened are B25/v. The background components of the second pixel from the left of frame #n−1 in FIG. 17 corresponding to the third and fourth portions of the shutter time/v from when the shutter has opened are B26/v. The background component of the third pixel from the left of frame #n−1 in FIG. 17 corresponding to the fourth portion of the shutter time/v from when the shutter has opened is B27/v.

In frame #n−1 in FIG. 17, the leftmost pixel through the third pixel belong to the mixed area, which is an uncovered background area.

The fourth through twelfth pixels from the left of frame #n−1 in FIG. 17 belong to the foreground area. The foreground component of the frame is any one of F13/v through F24/v.

The leftmost pixel through the fourth pixel from the left of frame #n in FIG. 17 belong to the background area, and the pixel values thereof are B25 through B28, respectively.

It can be assumed that the object corresponding to the foreground is a rigid body moving with constant velocity, and that it is moving such that it is displayed four pixels to the right in the subsequent frame. Accordingly, the foreground component of the fifth pixel from the left of frame #n in FIG. 17 corresponding to the first portion of the shutter time/v from when the shutter has opened is F13/v, and the foreground component of the sixth pixel from the left in FIG. 17 corresponding to the second portion of the shutter time/v from when the shutter has opened is also F13/v. The foreground component of the seventh pixel from the left in FIG. 17 corresponding to the third portion of the shutter time/v from when the shutter has opened and the foreground component of the eighth pixel from the left in FIG. 17 corresponding to the fourth portion of the shutter time/v from when the shutter has opened are F13/v.

The foreground component of the sixth pixel from the left of frame #n in FIG. 17 corresponding to the first portion of the shutter time/v from when the shutter has opened is F14/v. The foreground component of the seventh pixel from the left in FIG. 17 corresponding to the second portion of the shutter time/v from when the shutter has opened is also F14/v. The foreground component of the eighth pixel from the left in FIG. 17 corresponding to the first portion of the shutter time/v from when the shutter has opened is F15/v.

Since the object corresponding to the background is stationary, the background components of the fifth pixel from the left of frame #n in FIG. 17 corresponding to the second through fourth portions of the shutter time/v from when the shutter has opened are B29/v. The background components of the sixth pixel from the left of frame #n in FIG. 17 corresponding to the third and fourth portions of the shutter time/v from when the shutter has opened are B30/v. The background component of the seventh pixel from the left of frame #n in FIG. 17 corresponding to the fourth portion of the shutter time/v from when the shutter has opened is B31/v.

In frame #n in FIG. 17, the fifth pixel through the seventh pixel from the left belong to the mixed area, which is an uncovered background area.

The eighth through twelfth pixels from the left of frame #n in FIG. 17 belong to the foreground area. The value in the foreground area of frame #n corresponding to the period of the shutter time/v is any one of F13/v through F20/v.

The leftmost pixel through the eighth pixel from the left of frame #n+1 in FIG. 17 belong to the background area, and the pixel values thereof are B25 through B32, respectively.

It can be assumed that the object corresponding to the foreground is a rigid body moving with constant velocity, and that it is moving such that it is displayed four pixels to the right in the subsequent frame. Accordingly, the foreground component of the ninth pixel from the left of frame #n+1 in FIG. 17 corresponding to the first portion of the shutter time/v from when the shutter has opened is F13/v, and the foreground component of the tenth pixel from the left in FIG. 17 corresponding to the second portion of the shutter time/v from when the shutter has opened is also F13/v. The foreground component of the eleventh pixel from the left in FIG. 17 corresponding to the third portion of the shutter time/v from when the shutter has opened and the foreground component of the twelfth pixel from the left in FIG. 17 corresponding to the fourth portion of the shutter time/v from when the shutter has opened are F13/v.

The foreground component of the tenth pixel from the left of frame #n+1 in FIG. 17 corresponding to the first portion of the shutter time/v from when the shutter has opened is F14/v. The foreground component of the eleventh pixel from the left in FIG. 17 corresponding to the second portion of the shutter time/v from when the shutter has opened is also F14/v. The foreground component of the twelfth pixel from the left in FIG. 17 corresponding to the first portion of the shutter time/v from when the shutter has opened is F15/v.

Since the object corresponding to the background is stationary, the background components of the ninth pixel from the left of frame #n+1 in FIG. 17 corresponding to the second through fourth portions of the shutter time/v from when the shutter has opened are B33/v. The background components of the tenth pixel from the left of frame #n+1 in FIG. 17 corresponding to the third and fourth portions of the shutter time/v from when the shutter has opened are B34/v. The background component of the eleventh pixel from the left of frame #n+1 in FIG. 17 corresponding to the fourth portion of the shutter time/v from when the shutter has opened is B35/v.

In frame #n+1 in FIG. 17, the ninth through eleventh pixels from the left in FIG. 17 belong to the mixed area, which is an uncovered background area.

The twelfth pixel from the left of frame #n+1 in FIG. 17 belongs to the foreground area. The foreground component in the shutter time/v in the foreground area of frame #n+1 is any one of F13/v through F16/v, respectively.

Figure 18:
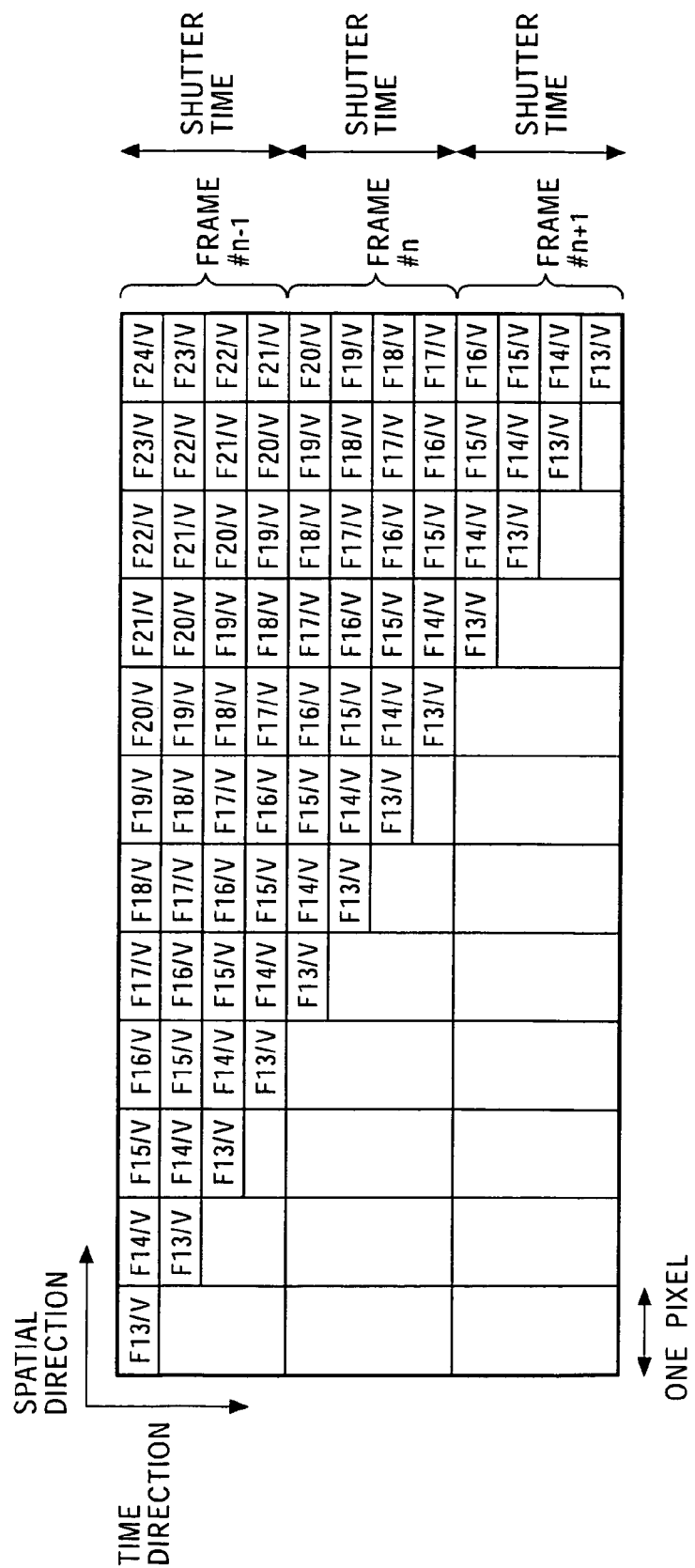
FIG. 18 illustrates a model in which pixel values are expanded in the time direction and the period corresponding to the shutter time is divided.

FIG. 18 illustrates a model of an image obtained by extracting the foreground components from the pixel values shown in FIG. 17.

Referring back to FIG. 2, the area specifying unit 103 specifies flags indicating to which of a foreground area, a background area, a covered background area, or an uncovered background area the individual pixels of the input image belong by using the pixel values of a plurality of frames, and supplies the flags to the mixture ratio calculator 104 and the motion-blur adjusting unit 106 as the area information.

The mixture-ratio calculator 104 calculates the mixture ratio α for each pixel contained in the mixed area based on the pixel values of a plurality of frames and the area information, and supplies the calculated mixture-ratio α to the foreground/background separator 105.

The foreground/background separator 105 extracts the foreground component image consisting of only the foreground components based on the pixel values of a plurality of frames, the area information, and the mixture ratio α, and supplies the foreground component image to the motion-blur adjusting unit 106.

The motion-blur adjusting unit 106 adjusts the amount of motion blur contained in the foreground component image based on the foreground component image supplied from the foreground/background separator 105, the motion vector supplied from the motion detector 102, and the area information supplied from the area specifying unit 103, and then outputs the foreground component image in which motion blur is adjusted.

Figure 19:
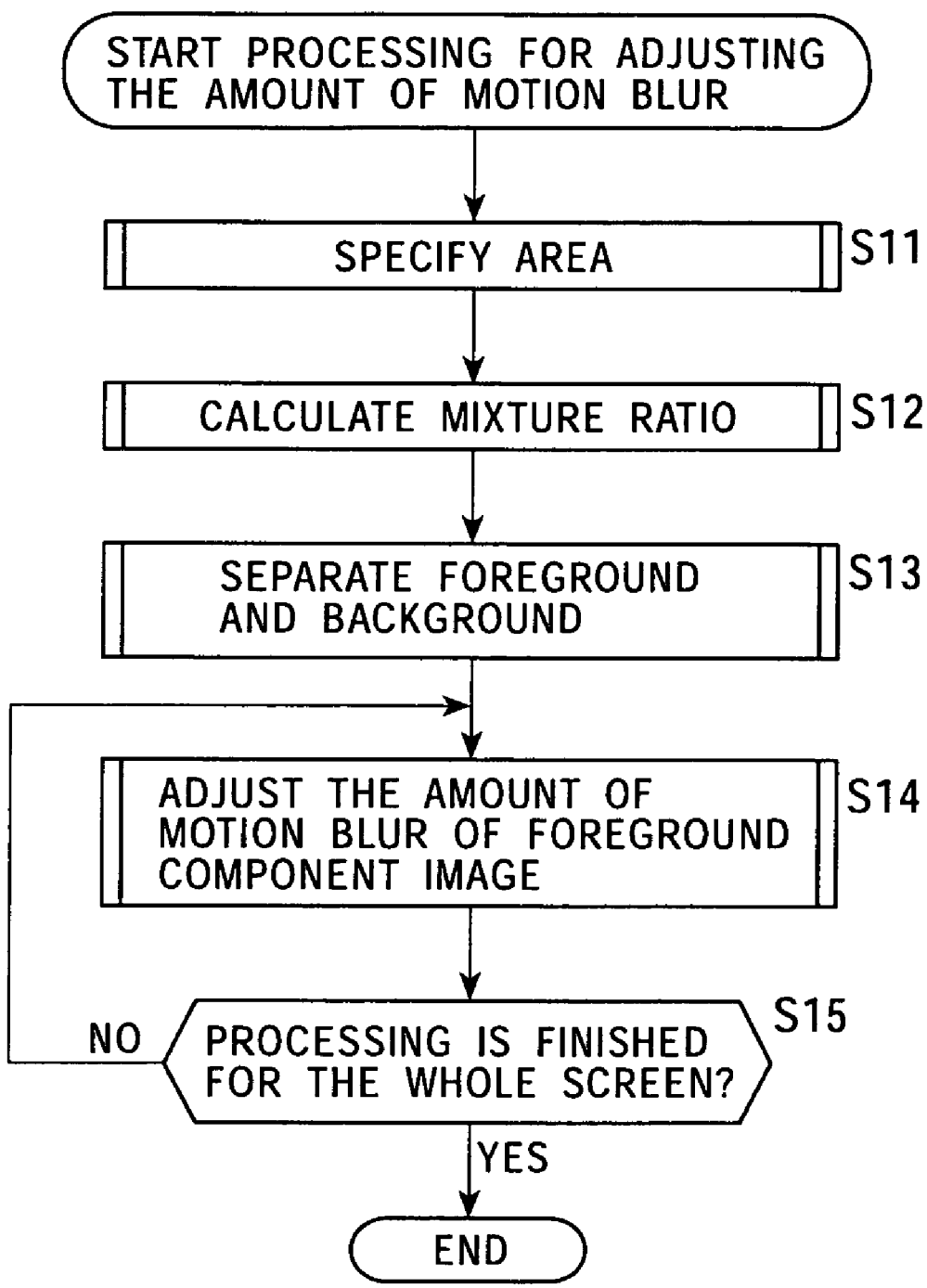
FIG. 19 is a flowchart illustrating the processing for adjusting the amount of motion blur.

The processing for adjusting the amount of motion blur performed by the image processing apparatus is described below with reference to the flowchart of FIG. 19. In step S11, the area specifying unit 103 executes area specifying processing, based on an input image, for generating area information indicating to which of a foreground area, a background area, a covered background area, or an uncovered background area each pixel of the input image belongs. Details of the area specifying processing are given below. The area specifying unit 103 supplies the generated area information to the mixture-ratio calculator 104.

In step S11, the area specifying unit 103 may generate, based on the input image, area information indicating to which of the foreground area, the background area, or the mixed area (regardless of whether each pixel belongs to a covered background area or an uncovered background area) each pixel of the input image belongs. In this case, the foreground/background separator 105 and the motion-blur adjusting unit 106 determine based on the direction of the motion vector whether the mixed area is a covered background area or an uncovered background area. For example, if the input image is disposed in the order of the foreground area, the mixed area, and the background area in the direction of the motion vector, it is determined that the mixed area is a covered background area. If the input image is disposed in the order of the background area, the mixed area, and the foreground area in the direction of the motion vector, it is determined that the mixed area is an uncovered background area.

In step S12, the mixture-ratio calculator 104 calculates the mixture ratio α for each pixel contained in the mixed area based on the input image, and the area information. Details of the mixture-ratio calculating processing are given below. The mixture-ratio calculator 104 supplies the calculated mixture-ratio α to the foreground/background separator 105.

In step S13, the foreground/background separator 105 extracts the foreground components from the input image based on the area information and the mixture ratio α, and supplies the foreground components to the motion-blur adjusting unit 106 as the foreground component image.

In step S14, the motion-blur adjusting unit 106 generates, based on the motion vector and the area information, the unit of processing that indicates the positions of consecutive pixels disposed in the moving direction and belonging to any of the uncovered background area, the foreground area, and the covered background area, and adjusts the amount of motion blur contained in the foreground components corresponding to the unit of processing. Details of the processing for adjusting the amount of motion blur are given below.

In step S15, the image processing apparatus determines whether the processing is finished for the whole screen. If it is determined that the processing is not finished for the whole screen, the process proceeds to step S14, and the processing for adjusting the amount of motion blur for the foreground components corresponding to the unit of processing is repeated.

If it is determined in step S15 that the processing is finished for the whole screen, the processing is completed.

In this manner, the image processing apparatus is capable of adjusting the amount of motion blur contained in the foreground by separating the foreground and the background. That is, the image processing apparatus is capable of adjusting the amount of motion blur contained in sampled data indicating the pixel values of the foreground pixels.

The configuration of each of the area specifying unit 103, the mixture-ratio calculator 104, the foreground/background separator 105, and the motion-blur adjusting unit 106 is described below.

Figure 20:
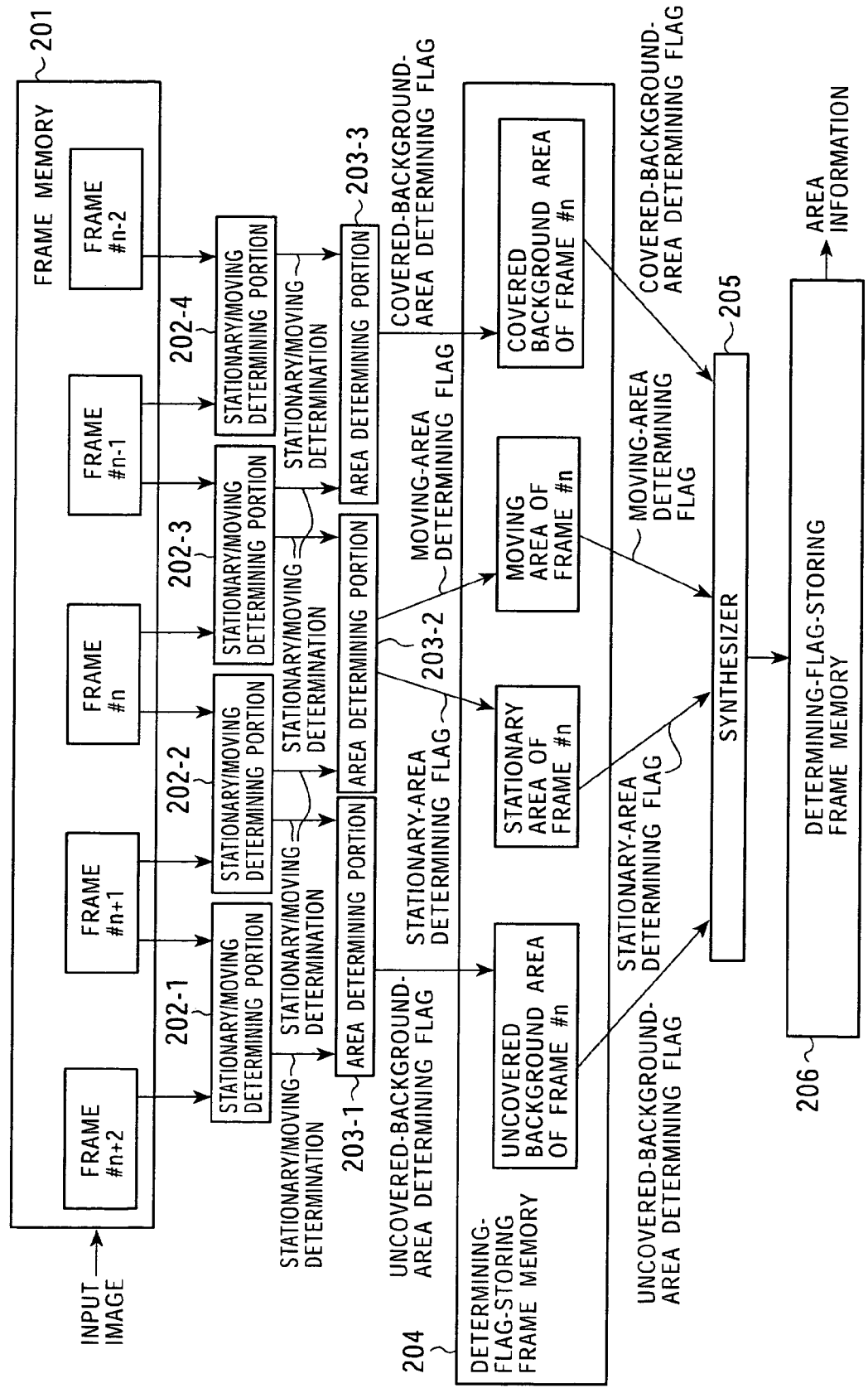
FIG. 20 is a block diagram illustrating an example of the configuration of the area specifying unit 103.

FIG. 20 is a block diagram illustrating an example of the configuration of the area specifying unit 103. The area specifying unit 103 configured as shown in FIG. 20 does not use a motion vector. A frame memory 201 stores an input image in units of frames. When the image to be processed is frame #n, the frame memory 201 stores frame #n−2, which is the frame two frames before frame #n, frame #n−1 which is the frame one frame before frame #n, frame #n, frame #n+1, which is the frame one frame after frame #n, frame #n+2, which is the frame two frames after frame #n.

A stationary/moving determining portion 202-1 reads the pixel value of the pixel in frame #n+2 located at the same position as a designated pixel in frame #n in which the area to which the pixel belongs is determined, and reads the pixel value of the pixel in frame #n+1 located at the same position of the designated pixel in frame #n from the frame memory 201, and calculates the absolute value of the difference between the read pixel values. The stationary/moving determining portion 202-1 determines whether the absolute value of the difference between the pixel value of frame #n+2 and the pixel value of frame #n+1 is greater than a preset threshold Th. If it is determined that the difference is greater than the threshold Th, a stationary/moving determination indicating "moving" is supplied to an area determining portion 203-1. If it is determined that the absolute value of the difference between the pixel value of the pixel in frame #n+2 and the pixel value of the pixel in frame #n+1 is smaller than or equal to the threshold Th, the stationary/moving determining portion 202-1 supplies a stationary/moving determination indicating "stationary" to the area determining portion 203-1.

A stationary/moving determining portion 202-2 reads the pixel value of a designated pixel in frame #n in which the area to which the pixel belongs is determined, and reads the pixel value of the pixel in frame #n+1 located at the same position as the designated pixel in frame #n from the frame memory 201, and calculates the absolute value of the difference between the pixel values. The stationary/moving determining portion 202-2 determines whether the absolute value of the difference between the pixel value of frame #n+1 and the pixel value of frame #n is greater than a preset threshold Th. If it is determined that the absolute value of the difference between the pixel values is greater than the threshold Th, a stationary/moving determination indicating "moving" is supplied to the area determining portion 203-1 and an area determining portion 203-2. If it is determined that the absolute value of the difference between the pixel value of the pixel in frame #n+1 and the pixel value of the pixel in frame #n is smaller than or equal to the threshold Th, the stationary/moving determining portion 202-2 supplies a stationary/moving determination indicating "stationary" to the area determining portion 203-1 and the area determining portion 203-2.

A stationary/moving determining portion 202-3 reads the pixel value of a designated pixel in frame #n in which the area to which the pixel belongs is determined, and reads the pixel value of the pixel in frame #n−1 located at the same position as the designated pixel in frame #n from the frame memory 201, and calculates the absolute value of the difference between the pixel values. The stationary/moving determining portion 202-3 determines whether the absolute value of the difference between the pixel value of frame #n and the pixel value of frame #n−1 is greater than a preset threshold Th. If it is determined that the absolute value of the difference between the pixel values is greater than the threshold Th, a stationary/moving determination indicating "moving" is supplied to the area determining portion 203-2 and an area determining portion 203-3. If it is determined that the absolute value of the difference between the pixel value of the pixel in frame #n and the pixel value of the pixel in frame #n−1 is smaller than or equal to the threshold Th, the stationary/moving determining portion 202-3 supplies a stationary/moving determination indicating "stationary" to the area determining portion 203-2 and the area determining portion 203-3.

A stationary/moving determining portion 202-4 reads the pixel value of the pixel in frame #n−1 located at the same position as a designated pixel in frame #n in which the area to which the pixel belongs is determined, and reads the pixel value of the pixel in frame #n−2 located at the same position as the designated pixel in frame #n from the frame memory 201, and calculates the absolute value of the difference between the pixel values. The stationary/moving determining portion 202-4 determines whether the absolute value of the difference between the pixel value of frame #n−1 and the pixel value of frame #n−2 is greater than a preset threshold Th. If it is determined that the absolute value of the difference between the pixel values is greater than the threshold Th, a stationary/moving determination indicating "moving" is supplied to the area determining portion 203-3. If it is determined that the absolute value of the difference between the pixel value of the pixel in frame #n−1 and the pixel value of the pixel in frame #n−2 is smaller than or equal to the threshold Th, the stationary/moving determining portion 202-4 supplies a stationary/moving determination indicating "stationary" to the area determining portion 203-3.

When the stationary/moving determination supplied from the stationary/moving determining portion 202-1 indicates "stationary" and when the stationary/moving determination supplied from the stationary/moving determining portion 202-2 indicates "moving", the area determining portion 203-1 determines that the designated pixel in frame #n belongs to an uncovered background area, and sets "1", which indicates that the designated pixel belongs to an uncovered background area, in an uncovered-background-area determining flag associated with the designated pixel.

When the stationary/moving determination supplied from the stationary/moving determining portion 202-1 indicates "moving" or when the stationary/moving determination supplied from the stationary/moving determining portion 202-2 indicates "stationary", the area specifying unit 203-1 determines that the designated pixel in frame #n does not belong to an uncovered background area, and sets "0", which indicates that the designated pixel does not belong to an uncovered background area, in the uncovered-background-area determining flag associated with the designated pixel.

The area determining portion 203-1 supplies the uncovered-background-area determining flag in which "1" or "0" is set as discussed above to a determining-flag-storing frame memory 204.

When the stationary/moving determination supplied from the stationary/moving determining portion 202-2 indicates "stationary" and when the stationary/moving determination supplied from the stationary/moving determining portion 202-3 indicate "stationary", the area determining portion 203-2 determines that the designated pixel in frame #n belongs to the stationary area, and sets "1", which indicates that the pixel belongs to the stationary area, in a stationary-area determining flag associated with the designated pixel.

When the stationary/moving determination supplied from the stationary/moving determining portion 202-2 indicates "moving" or when the stationary/moving determination supplied from the stationary/moving determining portion 202-3 indicate "moving", the area determining portion 203-2 determines that the designated pixel in frame #n does not belong to the stationary area, and sets "0", which indicates that the pixel does not belong to the stationary area, in the stationary-area determining flag associated with the designated pixel.

The area determining portion 203-2 supplies the stationary-area determining flag in which "1" or "0" is set as discussed above to the determining-flag-storing frame memory 204.

When the stationary/moving determination supplied from the stationary/moving determining portion 202-2 indicates "moving" and when the stationary/moving determination supplied from the stationary/moving determining portion 202-3 indicate "moving", the area determining portion 203-2 determines that the designated pixel in frame #n belongs to the moving area, and sets "1", which indicates that the designated pixel belongs to the moving area, in a moving-area determining flag associated with the designated pixel.

When the stationary/moving determination supplied from the stationary/moving determining portion 202-2 indicates "stationary" or when the stationary/moving determination supplied from the stationary/moving determining portion 202-3 indicate "stationary", the area determining portion 203-2 determines that the designated pixel in frame #n does not belong to the moving area, and sets "0", which indicates that the pixel does not belong to the moving area, in the moving-area determining flag associated with the designated pixel.

The area determining portion 203-2 supplies the moving-area determining flag in which "1" or "0" is set as discussed above to the determining-flag-storing frame memory 204.

When the stationary/moving determination supplied from the stationary/moving determining portion 202-3 indicates "moving" and when the stationary/moving determination supplied from the stationary/moving determining portion 202-4 indicate "stationary", the area determining portion 203-3 determines that the designated pixel in frame #n belongs to a covered background area, and sets "1", which indicates that the designated pixel belongs to the covered background area, in a covered-background-area determining flag associated with the designated pixel.

When the stationary/moving determination supplied from the stationary/moving determining portion 202-3 indicates "stationary" or when the stationary/moving determination supplied from the stationary/moving determining portion 202-4 indicate "moving", the area determining portion 203-3 determines that the designated pixel in frame #n does not belong to a covered background area, and sets "0", which indicates that the designated pixel does not belong to a covered background area, in the covered-background-area determining flag associated with the designated pixel.

The area determining portion 203-3 supplies the covered-background-area determining flag in which "1" or "0" is set as discussed above to the determining-flag-storing frame memory 204.

The determining-flag-storing frame memory 204 thus stores the uncovered-background-area determining flag supplied from the area determining portion 203-1, the stationary-area determining flag supplied from the area determining portion 203-2, the moving-area determining flag supplied from the area determining portion 203-2, and the covered-background-area determining flag supplied from the area determining portion 203-3.

The determining-flag-storing frame memory 204 supplies the uncovered-background-area determining flag, the stationary-area determining flag, the moving-area determining flag, and the covered-background-area determining flag stored therein to a synthesizer 205. The synthesizer 205 generates area information indicating to which of the uncovered background area, the stationary area, the moving area, or the covered background area each pixel belongs based on the uncovered-background-area determining flag, the stationary-area determining flag, the moving-area determining flag, and the covered-background-area determining flag supplied from the determining-flag-storing frame memory 204, and supplies the area information to a determining-flag-storing frame memory 206.

The determining-flag-storing frame memory 206 stores the area information supplied from the synthesizer 205, and also outputs the area information stored therein.

An example of the processing performed by the area specifying unit 103 is described below with reference to FIGS. 21 through 25.

Figure 21:
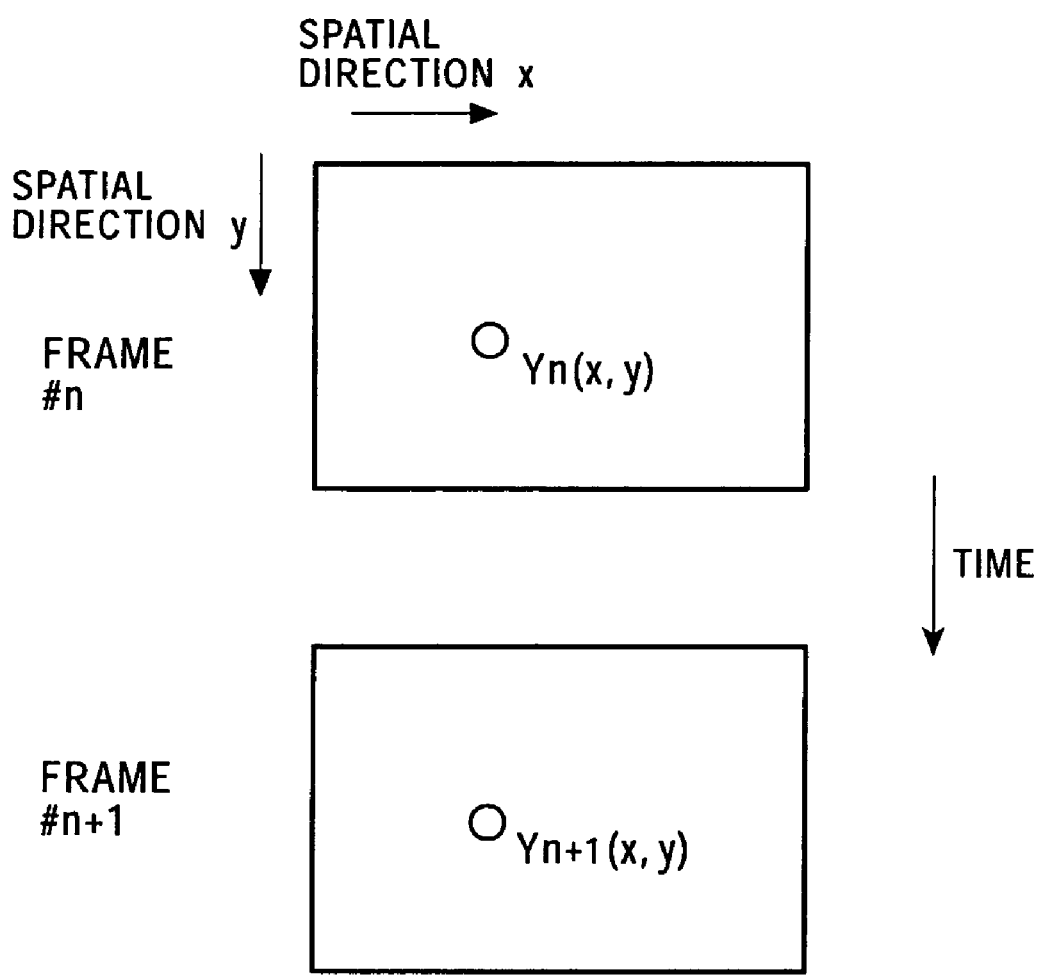
FIG. 21 illustrates an image when an object corresponding to a foreground is moving.

When the object corresponding to the foreground is moving, the position of the image corresponding to the object on the screen changes in every frame. As shown in FIG. 21, the image corresponding to the object located at the position indicated by Yn(x, y) in frame #n is positioned at Yn+1(x, y) in frame #n+1, which is subsequent to frame #n.

Figure 22:
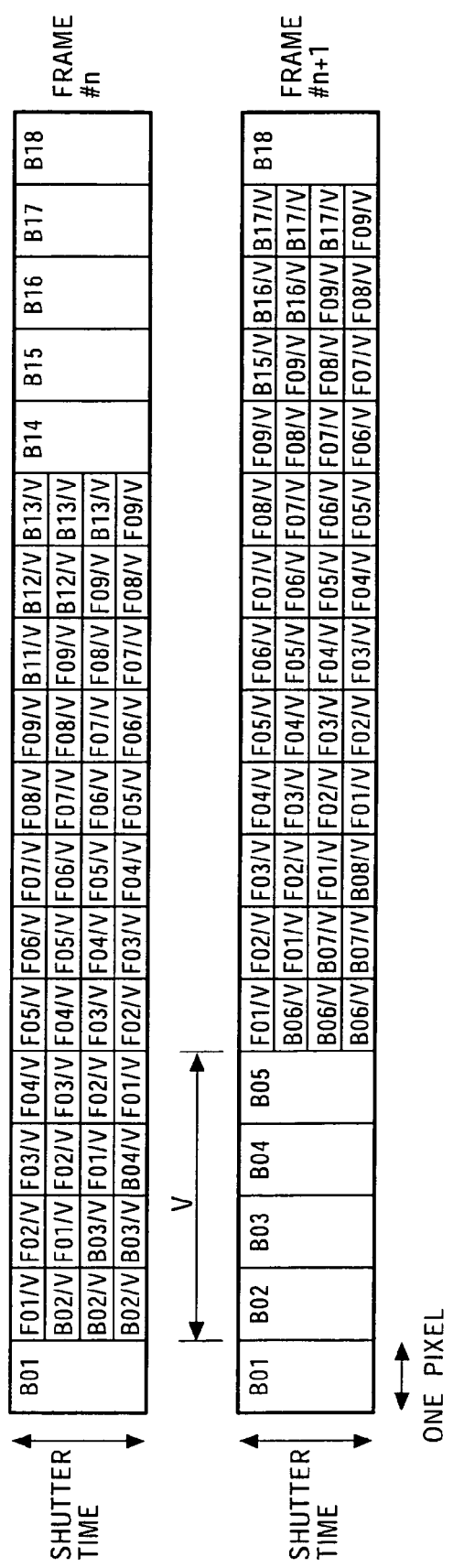
FIG. 22 illustrates a model in which pixel values are expanded in the time direction and the period corresponding to the shutter time is divided.

A model obtained by expanding in the time direction the pixel values of the pixels aligned side-by-side in the moving direction of the image corresponding to the foreground object is shown in FIG. 22. For example, if the moving direction of the image corresponding to the foreground object is horizontal with respect to the screen, the model shown in FIG. 22 is a model obtained by expanding in the time direction the pixel values of the pixels disposed on a line side-by-side.

In FIG. 22, the line in frame #n is equal to the line in frame #n+1.

The foreground components corresponding to the object contained in the second pixel to the thirteenth pixel from the left in frame #n are contained in the sixth pixel through the seventeenth pixel from the left in frame #n+1.

In frame #n, the pixels belonging to the covered background area are the eleventh through thirteenth pixels from the left, and the pixels belonging to the uncovered background area are the second through fourth pixels from the left. In frame #n+1, the pixels belonging to the covered background area are the fifteenth through seventeenth pixels from the left, and the pixels belonging to the uncovered background area are the sixth through eighth pixels from the left.

In the example shown in FIG. 22, since the foreground components contained in frame #n are moved by four pixels in frame #n+1, the amount of movement v is 4. The number of virtual divided portions is 4 in accordance with the amount of movement v.

A description is now given of a change in pixel values of the pixels belonging to the mixed area in the frames before and after a designated frame.

Figure 23:
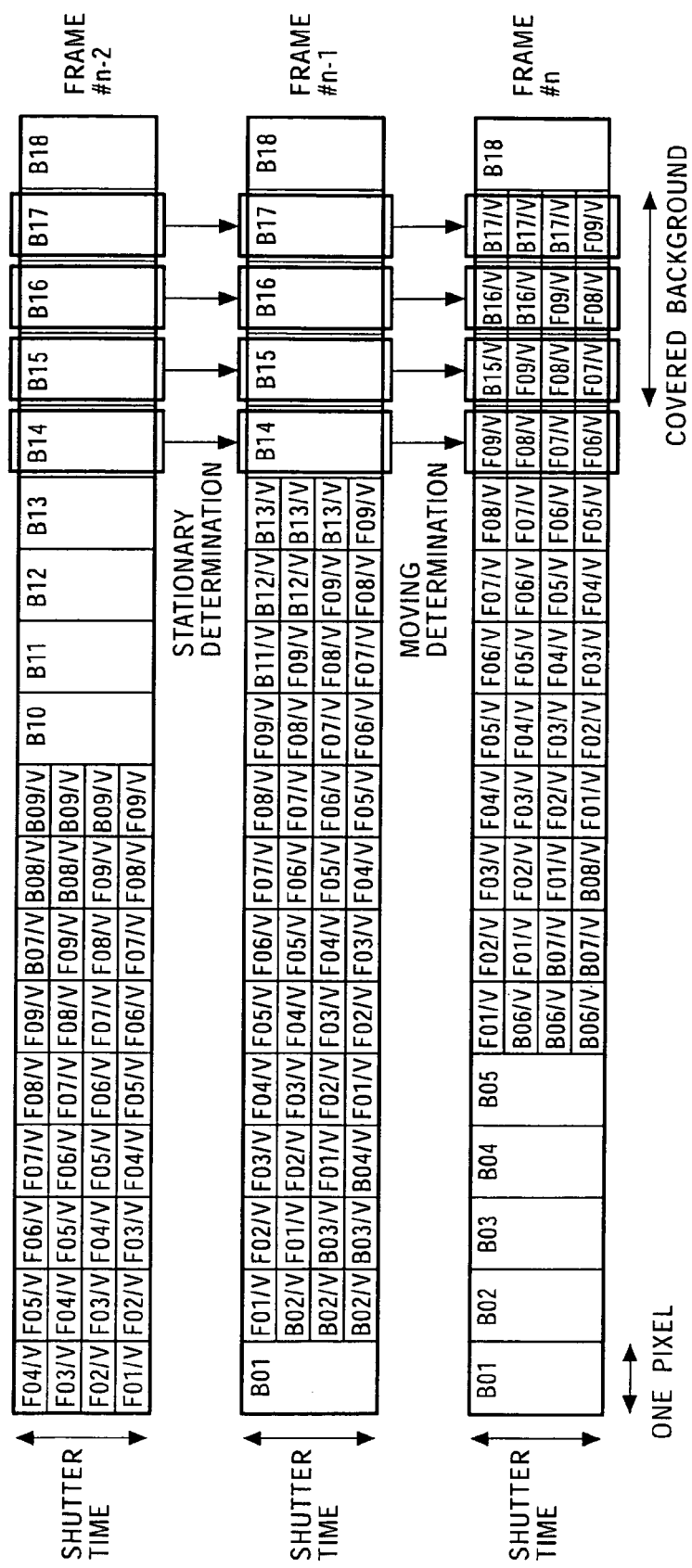
FIG. 23 illustrates a model in which pixel values are expanded in the time direction and the period corresponding to the shutter time is divided.

In FIG. 23, the pixels belonging to a covered background area in frame #n in which the background is stationary and the amount of movement v in the foreground is 4 are the fifteenth through seventeenth pixels from the left. Since the amount of movement v is 4, the fifteenth through seventeenth frames from the left in the previous frame #n−1 contain only background components and belong to the background area. The fifteenth through seventeenth pixels from the left in frame #n−2, which is one before frame #n−1, contain only background components and belong to the background area.

Since the object corresponding to the background is stationary, the pixel value of the fifteenth pixel from the left in frame #n−1 does not change from the pixel value of the fifteenth pixel from the left in frame #n−2. Similarly, the pixel value of the sixteenth pixel from the left in frame #n−1 does not change from the pixel value of the sixteenth pixel from the left in frame #n−2, and the pixel value of the seventeenth pixel from the left in frame #n−1 does not change from the pixel value of the seventeenth pixel from the left in frame #n−2.

That is, the pixels in frame #n−1 and frame #n−2 corresponding to the pixels belonging to the covered background area in frame #n consist of only background components, and the pixel values thereof do not change. Accordingly, the absolute value of the difference between the pixel values is almost 0. Thus, the stationary/moving determination made for the pixels in frame #n−1 and frame #n−2 corresponding to the pixels belonging to the mixed area in frame #n by the stationary/moving determining portion 202-4 is "stationary".

Since the pixels belonging to the covered background area in frame #n contain foreground components, the pixel values thereof are different from those of frame #n−1 consisting of only background components. Accordingly, the stationary/moving determination made for the pixels belonging to the mixed area in frame #n and the corresponding pixels in frame #n−1 by the stationary/moving determining portion 202-3 is "moving".

When the stationary/moving determination result indicating "moving" is supplied from the stationary/moving determining portion 202-3, and when the stationary/moving determination result indicating "stationary" is supplied from the stationary/moving determining portion 202-4, as discussed above, the area determining portion 203-3 determines that the corresponding pixels belong to a covered background area.

Figure 24:
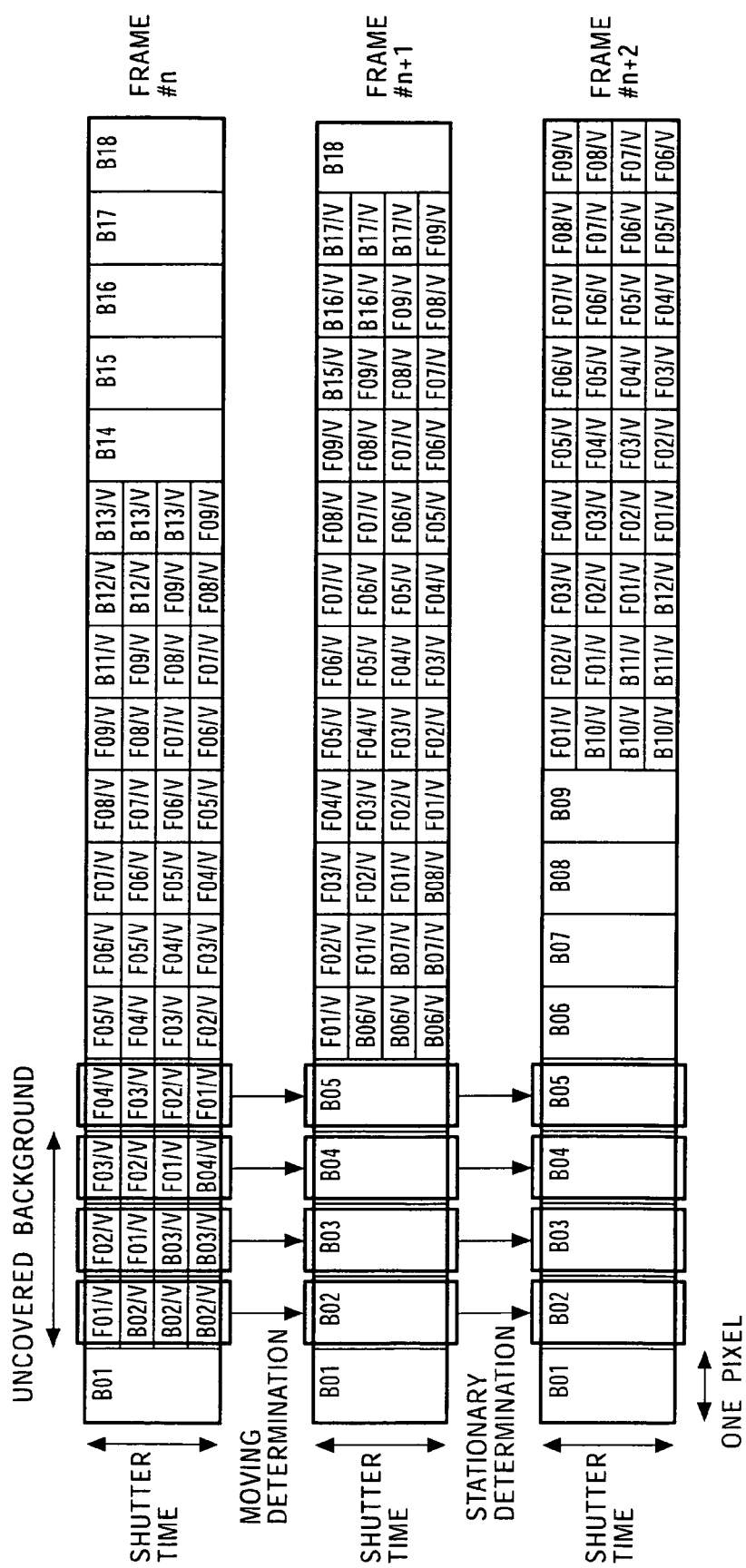
FIG. 24 illustrates a model in which pixel values are expanded in the time direction and the period corresponding to the shutter time is divided.

In FIG. 24, in frame #n in which the background is stationary and the amount of movement v in the foreground is 4, the pixels contained in an uncovered background area are the second through fourth pixels from the left. Since the amount of movement v is 4, the second through fourth pixels from the left in the subsequent frame #n+1 contain only background components and belong to the background area. In frame #n+2, which is subsequent to frame #n+1, the second through fourth pixels from the left contain only background components and belong to the background area.

Since the object corresponding to the background is stationary, the pixel value of the second pixel from the left in frame #n+2 does not change from the pixel value of the second pixel from the left in frame #n+1. Similarly, the pixel value of the third pixel from the left in frame #n+2 does not change from the pixel value of the third pixel from the left in frame #n+1, and the pixel value of the fourth pixel from the left in frame #n+2 does not change from the pixel value of the fourth pixel from the left in frame #n+1.

That is, the pixels in frame #n+1 and frame #n+2 corresponding to the pixels belonging to the uncovered background area in frame #n consist of only background components, and the pixel values thereof do not change. Accordingly, the absolute value of the difference between the pixel values is almost 0. Thus, the stationary/moving determination made for the pixels in frame #n+1 and frame n+2 corresponding to the pixels belonging to the mixed area in frame #n by the stationary/moving determining portion 202-1 is "stationary".

Since the pixels belonging to the uncovered background area in frame #n contain foreground components, the pixel values thereof are different from those of frame #n+1 consisting of only background components. Accordingly, the stationary/moving determination made for the pixels belonging to the mixed area in frame #n and the corresponding pixels in frame #n+1 by the stationary/moving determining portion 202-2 is "moving".

When the stationary/moving determination result indicating "moving" is supplied from the stationary/moving determining portion 202-2, and when the stationary/moving determination result indicating "stationary" is supplied from the stationary/moving determining portion 202-1, as discussed above, the area determining portion 203-1 determines that the corresponding pixels belong to an uncovered background area.

FIG. 25 illustrates determination conditions for frame #n made by the area specifying unit 103. When the determination result for the pixel in frame #n−2 located at the same image position as a pixel in frame #n to be processed and for the pixel in frame #n−1 located at the same position as the pixel in frame #n is stationary, and when the determination result for the pixel in frame #n and the pixel in frame #n−1 located at the same image position as the pixel in frame #n is moving, the area specifying unit 103 determines that the pixel in frame #n belongs to a covered background area.

When the determination result for the pixel in frame #n and the pixel in frame #n−1 located at the same image position as the pixel in frame #n is stationary, and when the determination result for the pixel in frame #n and the pixel in frame #n+1 located at the same image position as the pixel in frame #n is stationary, the area specifying unit 103 determines that the pixel in frame #n belongs to the stationary area.

When the determination result for the pixel in frame #n and the pixel in frame #n−1 located at the same image position as the pixel in frame #n is moving, and when the determination result for the pixel in frame #n and the pixel in frame #n+1 located at the same image position as the pixel in frame #n is moving, the area specifying unit 103 determines that the pixel in frame #n belongs to the moving area.

When the determination result for the pixel in frame #n and the pixel in frame #n+1 located at the same image position as the pixel in frame #n is moving, and when the determination result for the pixel in frame #n+1 located at the same image position as the pixel in frame #n and the pixel in frame #n+2 located at the same image position as the pixel in frame #n is stationary, the area specifying unit 103 determines that the pixel in frame #n belongs to an uncovered background area.

Figure 26A:
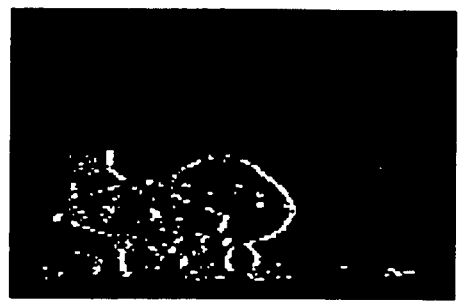
FIG. 26A illustrates an example of the result obtained by specifying the area by the area specifying unit 103.
Figure 26B:
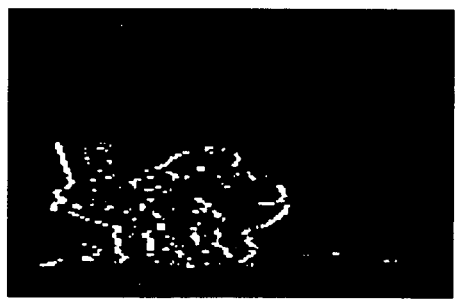
FIG. 26B illustrates an example of the result obtained by specifying the area by the area specifying unit 103.

FIGS. 26A through 26D illustrate examples of the area determination results obtained by the area specifying unit 103. In FIG. 26A, the pixels which are determined to belong to a covered background area are indicated in white. In FIG. 26B, the pixels which are determined to belong to an uncovered background area are indicated in white.

Figure 26C:
FIG. 26C illustrates an example of the result obtained by specifying the area by the area specifying unit 103.
Figure 26D:
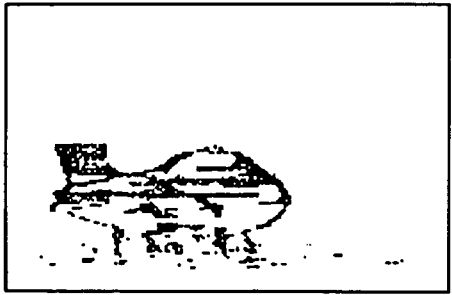
FIG. 26D illustrates an example of the result obtained by specifying the area by the area specifying unit 103.

In FIG. 26C, the pixels which are determined to belong to a moving area are indicated in white. In FIG. 26D, the pixels which are determined to belong to a stationary area are indicated in white.

Figure 27:
FIG. 27 illustrates an example of the result obtained by specifying the area by the area specifying unit 103.

FIG. 27 illustrates the area information indicating the mixed area, in the form of an image, selected from the area information output from the determining-flag-storing frame memory 206. In FIG. 27, the pixels which are determined to belong to the covered background area or the uncovered background area, i.e., the pixels which are determined to belong to the mixed area, are indicated in white. The area information indicating the mixed area output from the determining-flag-storing frame memory 206 designates the mixed area and the portions having a texture surrounded by the portions without a texture in the foreground area.

Figure 28:
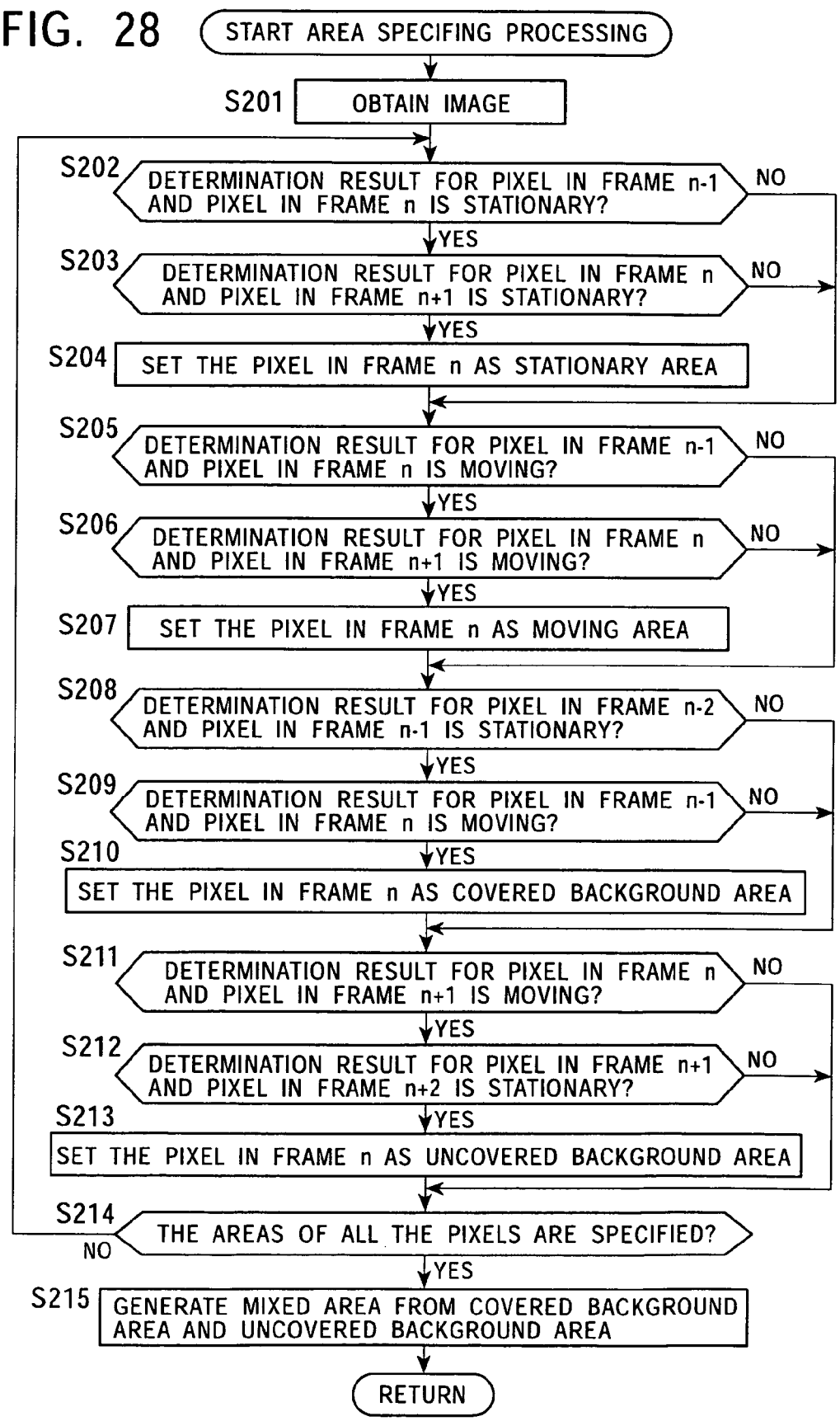
FIG. 28 is a flowchart illustrating the area specifying processing.

The area specifying processing performed by the area specifying unit 103 is described below with reference to the flowchart of FIG. 28. In step S201, the frame memory 201 obtains an image of frame #n−2 through frame #n+2 including frame #n, for which a determination is to be made.

In step S202, the stationary/moving determining portion 202-3 determines whether the determination result for the pixel in frame #n−1 and the pixel in frame #n located at the same position is stationary. If it is determined that the determination result is stationary, the process proceeds to step S203 in which the stationary/moving determining portion 202-2 determines whether the determination result for the pixel in frame #n and the pixel in frame #n+1 located at the same position is stationary.

If it is determined in step S203 that the determination result for the pixel in frame #n and the pixel in frame #n+1 located at the same position is stationary, the process proceeds to step S204. In step S204, the area determining portion 203-2 sets "1", which indicates that the pixel to be processed belongs to the stationary area, in the stationary-area determining flag associated with the pixel to be processed. The area determining portion 203-2 supplies the stationary-area determining flag to the determining-flag-storing frame memory 204, and the process proceeds to step S205.

If it is determined in step S202 that the determination result for the pixel in frame #n−1 and the pixel in frame #n located at the same position is moving, or if it is determined in step S203 that the determination result for the pixel in frame #n and the pixel in frame #n+1 located at the same position is moving, the pixel to be processed does not belong to a stationary area. Accordingly, the processing of step S204 is skipped, and the process proceeds to step S205.

In step S205, the stationary/moving determining portion 202-3 determines whether the determination result for the pixel in frame #n−1 and the pixel in frame #n located at the same position is moving. If it is determined that the determination result is moving, the process proceeds to step S206 in which the stationary/moving determining portion 202-2 determines whether the determination result for the pixel in frame #n and the pixel in frame #n+1 located at the same position is moving.

If it is determined in step S206 that the determination result for the pixel in frame #n and the pixel in frame #n+1 located at the same position is moving, the process proceeds to step S207. In step S207, the area determining portion 203-2 sets "1", which indicates that the pixel to be processed belongs to a moving area, in the moving-area determining flag associated with the pixel to be processed. The area determining area 203-2 supplies the moving-area determining flag to the determining-flag-storing frame memory 204, and the process proceeds to step S208.

If it is determined in step S205 that the determination result for the pixel in frame #n−1 and the pixel in frame #n located at the same position is stationary, or if it is determined in step S206 that the determination result for the pixel in frame #n and the pixel in frame #n+1 located at the same position is stationary, the pixel in frame #n does not belong to a moving area. Accordingly, the processing of step S207 is skipped, and the process proceeds to step S208.

In step S208, the stationary/moving determining portion 202-4 determines whether the determination result for the pixel in frame #n−2 and the pixel in frame #n−1 located at the same position is stationary. If it is determined that the determination result is stationary, the process proceeds to step S209 in which the stationary/moving determining portion 202-3 determines whether the determination result for the pixel in frame #n−1 and the pixel in frame #n located at the same position is moving.

If it is determined in step S209 that the determination result for the pixel in frame #n−1 and the pixel in frame #n located at the same position is moving, the process proceeds to step S210. In step S210, the area determining portion 203-3 sets "1", which indicates that the pixel to be processed belongs to a covered background area, in the covered-background-area determining flag associated with the pixel to be processed. The area determining portion 203-3 supplies the covered-background-area determining flag to the determining-flag-storing frame memory 204, and the process proceeds to step S211. The area determining portion 203-3 supplies the covered-background-area determining flag to the determining-flag-storing frame memory 204, and the process proceeds to step S211.

If it is determined in step S208 that the determination result for the pixel in frame #n−2 and the pixel in frame #n−1 located at the same position is moving, or if it is determined in step S209 that the pixel in frame #n−1 and the pixel in frame #n located at the same position is stationary, the pixel in frame #n does not belong to a covered background area. Accordingly, the processing of step S210 is skipped, and the process proceeds to step S211.

In step S211, the stationary/moving determining portion 202-2 determines whether the determination result for the pixel in frame #n and the pixel in frame #n+1 located at the same position is moving. If it is determined in step S211 that the determination result is moving, the process proceeds to step S212 in which the stationary/moving determining portion 202-1 determines whether the determination result for the pixel in frame #n+1 and the pixel in frame #n+2 located at the same position is stationary.

If it is determined in step S212 that the determination result for the pixel in frame #n+1 and the pixel in frame #n+2 located at the same position is stationary, the process proceeds to step S213. In step S213, the area determining portion 203-1 sets "1", which indicates that the pixel to be processed belongs to an uncovered background area, in the uncovered-background-area determining flag associated with the pixel to be processed. The area determining portion 203-1 supplies the uncovered-background-flag determining flag to the determining-flag-storing frame memory 204, and the process proceeds to step S214.

If it is determined in step S211 that the determination result for the pixel in frame #n and the pixel in frame #n+1 located at the same position is stationary, or if it is determined in step S212 that the determination result for the pixel in frame #n+1 and the pixel in frame #n+2 is moving, the pixel in frame #n does not belong to an uncovered background area. Accordingly, the processing of step S213 is skipped, and the process proceeds to step S214.

In step S214, the area specifying unit 103 determines whether the areas of all the pixels in frame #n are specified. If it is determined that the areas of all the pixels in frame #n are not yet specified, the process returns to step S202, and the area specifying processing is repeated for the remaining pixels.

If it is determined in step S214 that the areas of all the pixels in frame #n are specified, the process proceeds to step S215. In step S215, the synthesizer 215 generates area information indicating the mixed area based on the uncovered-background-area determining flag and the covered-background-area determining flag stored in the determining-flag-storing frame memory 204, and also generates area information indicating to which of the uncovered background area, the stationary area, the moving area, or the covered background area each pixel belongs, and sets the generated area information in the determining-flag-storing frame memory 206. The processing is then completed.

As discussed above, the area specifying unit 103 is capable of generating area information indicating to which of the moving area, the stationary area, the uncovered background area, or the covered background area each of the pixels contained in a frame belongs.

The area specifying unit 103 may apply logical OR to the area information corresponding to the uncovered background area and the area information corresponding to the covered background area so as to generate area information corresponding to the mixed area, and then may generate area information consisting of flags indicating to which of the moving area, the stationary area, or the mixed area the individual pixels contained in the frame belong.

When the object corresponding to the foreground has a texture, the area specifying unit 103 is able to specify the moving area more precisely.

The area specifying unit 103 is able to output the area information indicating the moving area as the area information indicating the foreground area, and outputs the area information indicating the stationary area as the area information indicating the background area.

The embodiment has been described, assuming that the object corresponding to the background is stationary. However, the above-described area specifying processing can be applied even if the image corresponding to the background area contains motion. For example, if the image corresponding to the background area is uniformly moving, the area specifying unit 103 shifts the overall image in accordance with this motion, and performs processing in a manner similar to the case in which the object corresponding to the background is stationary. If the image corresponding to the background area contains locally different motions, the area specifying unit 103 selects the pixels corresponding to the motions, and executes the above-described processing.

Figure 29:
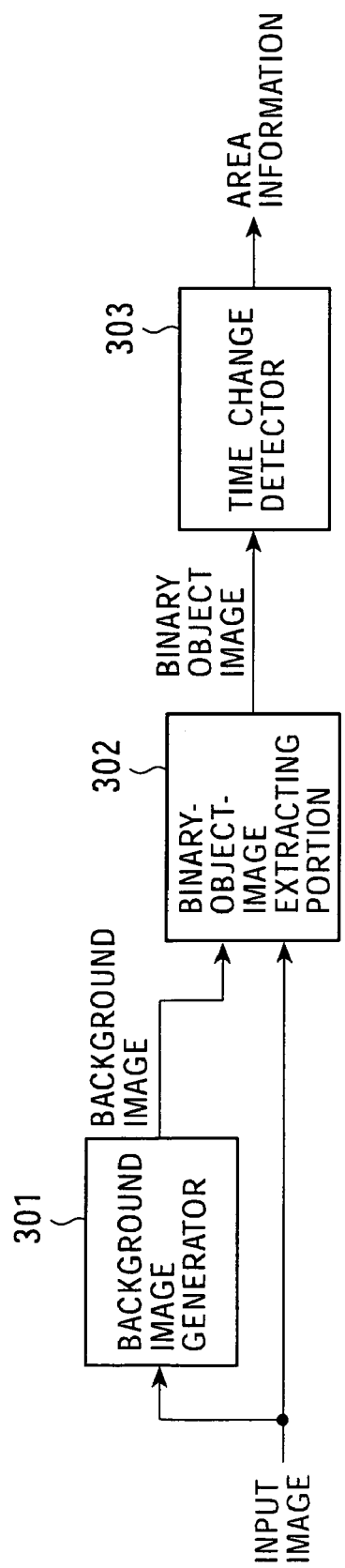
FIG. 29 is a block diagram illustrating an example of the configuration of the area specifying unit 103.

FIG. 29 is a block diagram illustrating another example of the configuration of the area specifying unit 103. The area specifying unit 103 shown in FIG. 29 does not use a motion vector. A background image generator 301 generates a background image corresponding to an input image, and supplies the generated background image to a binary-object-image extracting portion 302. The background image generator 301 extracts, for example, an image object corresponding to a background object contained in the input image, and generates the background image.

Figure 30:
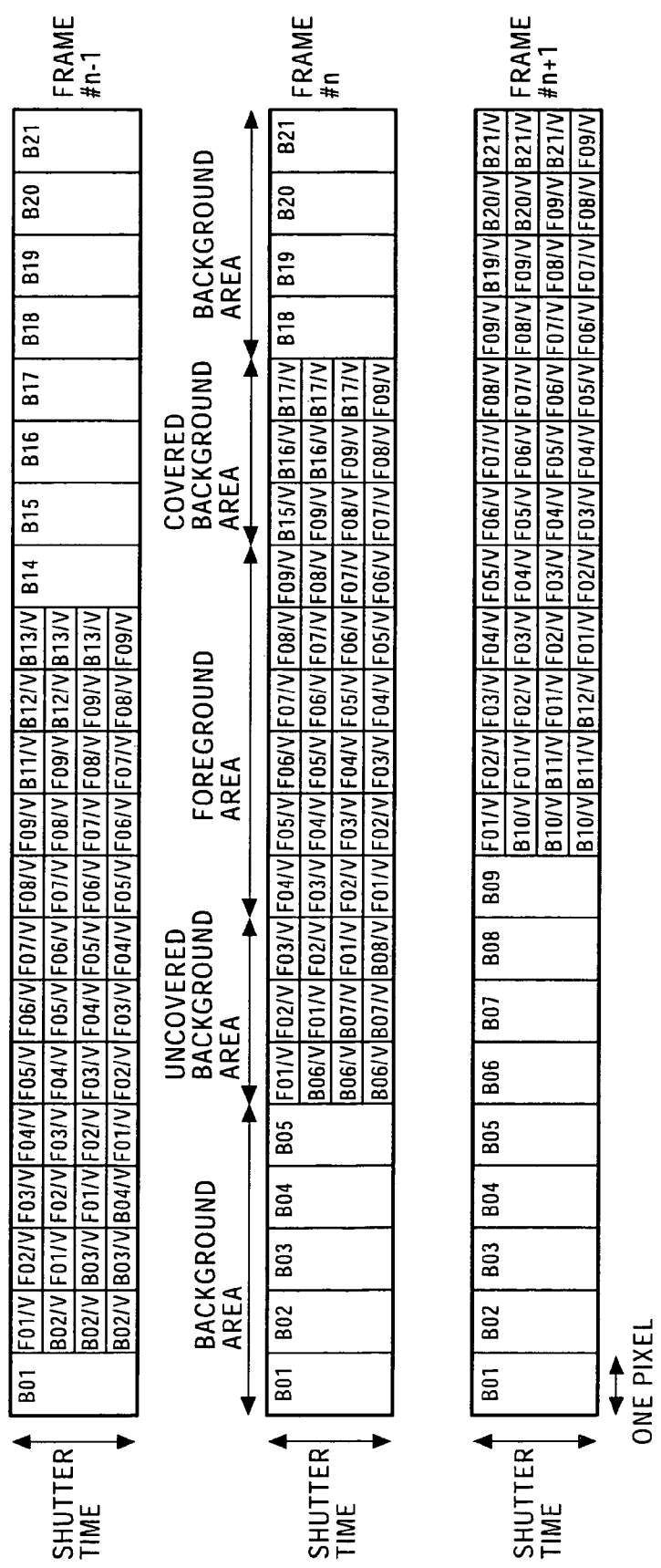
FIG. 30 illustrates a model in which pixel values are expanded in the time direction and the period corresponding to the shutter time is divided.

An example of a model obtained by expanding in the time direction the pixel values of pixels aligned side-by-side in the moving direction of an image corresponding to a foreground object is shown in FIG. 30. For example, if the moving direction of the image corresponding to the foreground object is horizontal with respect to the screen, the model shown in FIG. 30 is a model obtained by expanding the pixel values of pixels disposed side-by-side on a single line in the time direction.

In FIG. 30, the line in frame #n is the same as the line in frame #n−1 and the line in frame #n+1.

In frame #n, the foreground components corresponding to the object contained in the sixth through seventeenth pixels from the left are contained in the second through thirteenth pixels from the left in frame #n−1 and are also contained in the tenth through twenty-first pixel from the left in frame #n+1.

In frame #n−1, the pixels belonging to the covered background area are the eleventh through thirteenth pixels from the left, and the pixels belonging to the uncovered background area are the second through fourth pixels from the left. In frame #n, the pixels belonging to the covered background area are the fifteenth through seventeenth pixels from the left, and the pixels belonging to the uncovered background area are the sixth through eighth pixels from the left. In frame #n+1, the pixels belonging to the covered background area are the nineteenth through twenty-first pixels from the left, and the pixels belonging to the uncovered background area are the tenth through twelfth pixels from the left.

In frame #n−1, the pixels belonging to the background area are the first pixel from the left, and the fourteenth through twenty-first pixels from the left. In frame #n, the pixels belonging to the background area are the first through fifth pixels from the left, and the eighteenth through twenty-first pixels from the left. In frame #n+1, the pixels belonging to the background area are the first through ninth pixels from the left.

Figure 31:
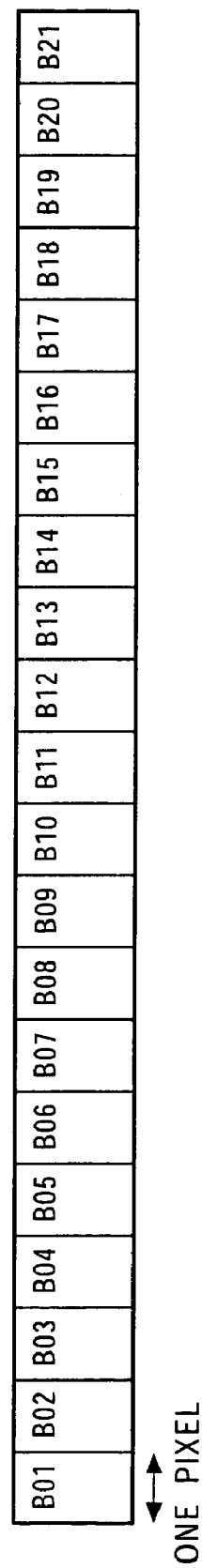
FIG. 31 illustrates an example of a background image.

An example of the background image corresponding to the example shown in FIG. 30 generated by the background image generator 301 is shown in FIG. 31. The background image consists of the pixels corresponding to the background object, and does not contain image components corresponding to the foreground object.

The binary-object-image extracting portion 302 generates a binary object image based on the correlation between the background image and the input image, and supplies the generated binary object image to a time change detector 303.

Figure 32:
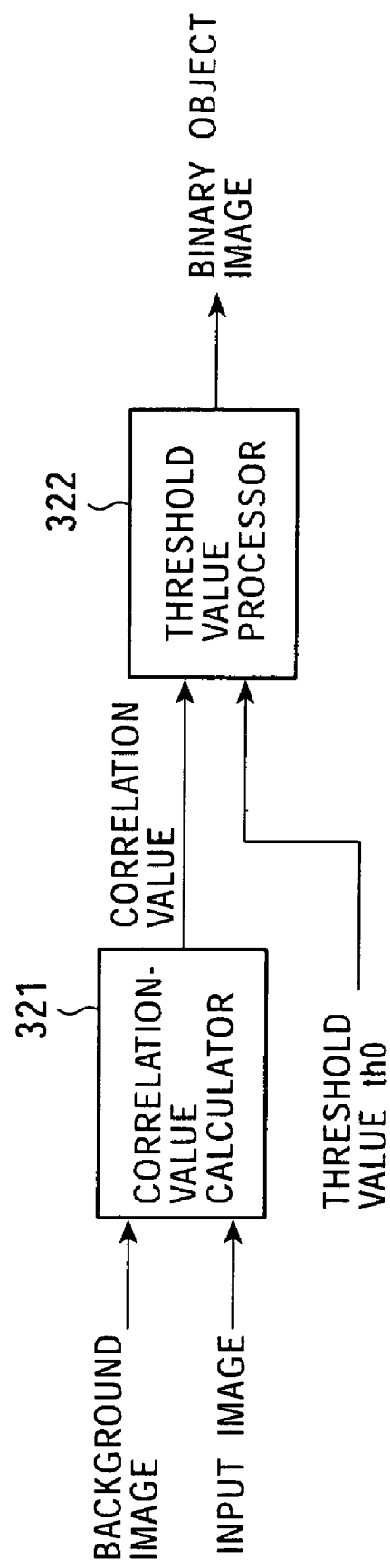
FIG. 32 is a block diagram illustrating the configuration of a binary-object-image extracting portion 302.

FIG. 32 is a block diagram illustrating the configuration of the binary-object-image extracting portion 302. A correlation-value calculator 321 calculates the correlation between the background image supplied from the background image generator 301 and the input image so as to generate a correlation value, and supplies the generated correlation value to a threshold-value processor 322.

The correlation-value calculator 321 applies equation (4) to, for example, 3×3-background image blocks having $X_4$ at the center, as shown in FIG. 33A, and to, for example, 3×3-background image blocks having $Y_4$ at the center which corresponds to the background image blocks, as shown in FIG. 33B, thereby calculating a correlation value corresponding to $Y_4$.

$$\text{Correlation value} = \frac{\sum_{i=0}^{8}(Xi-\overline{X})\sum_{i=0}^{8}(Yi-\overline{Y})}{\sqrt{\sum_{i=0}^{8}(Xi-\overline{X})^2 \cdot \sum_{i=0}^{8}(Yi-\overline{Y})^2}} \quad (4)$$

$$\overline{X} = \frac{\sum_{i=0}^{8} Xi}{9} \quad (5)$$

$$\overline{Y} = \frac{\sum_{i=0}^{8} Yi}{9} \quad (6)$$

The correlation-value calculator 321 supplies the correlation value calculated for each pixel as discussed above to the threshold-value processor 322.

Alternatively, the correlation-value calculator 321 may apply equation (7) to, for example, 3×3-background image blocks having $X_4$ at the center, as shown in FIG. 34A, and to, for example, 3×3-background image blocks having $Y_4$ at the center which corresponds to the background image blocks, as shown in FIG. 34B, thereby calculating the sum of absolute values of differences corresponding to $Y_4$.

$$\text{Sum of absolute values of differences} = \sum_{i=0}^{8} |(Xi-Yi)| \quad (7)$$

The correlation-value calculator 321 supplies the absolute values of the differences calculated as described above to the threshold-value processor 322 as the correlation value.

The threshold-value processor 322 compares the pixel value of the correlation image with a threshold value th0. If the correlation value is smaller than or equal to the threshold value th0, 1 is set in the pixel value of the binary object image. If the correlation value is greater than the threshold value th0, 0 is set in the pixel value of the binary object image. The threshold-value processor 322 then outputs the binary object image whose pixel value is set to 0 or 1. The threshold-value processor 322 may store the threshold value th0 therein in advance, or may use the threshold value th0 input from an external source.

Figure 35:
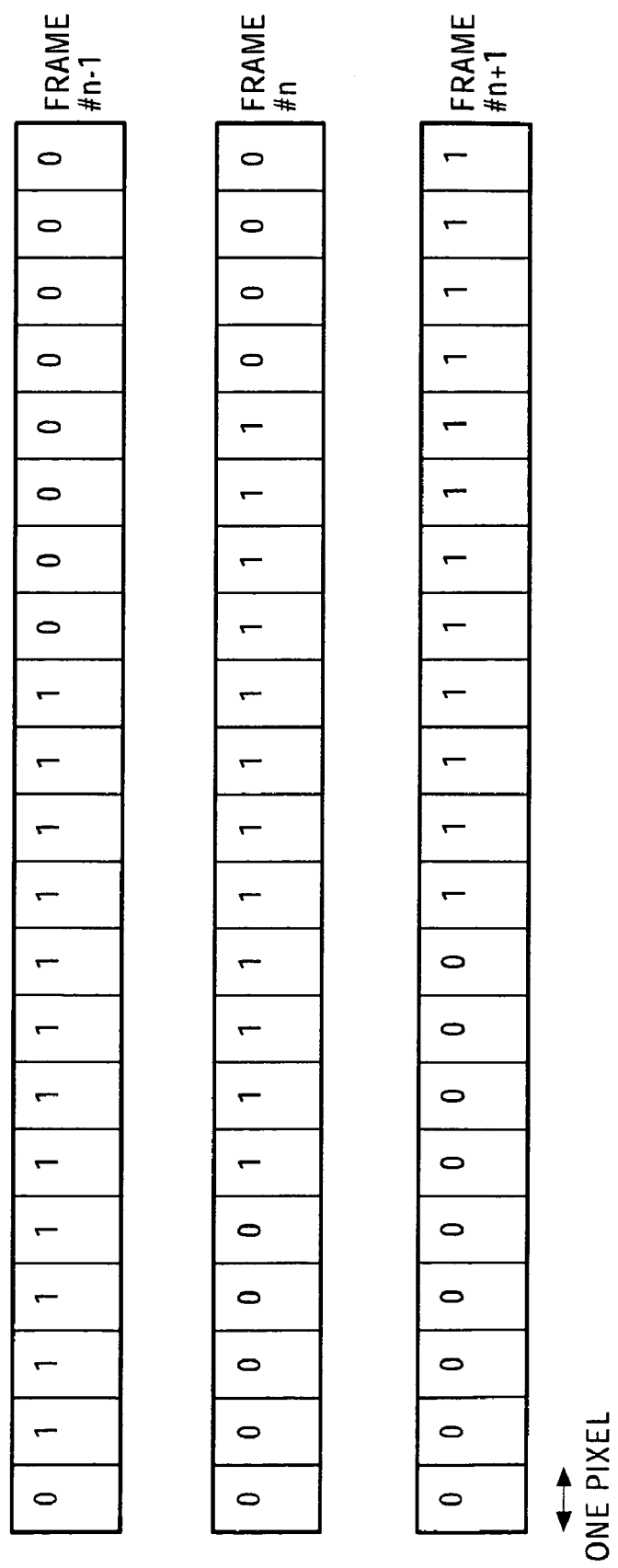
FIG. 35 illustrates an example of the binary object image.

FIG. 35 illustrates the binary object image corresponding to the model of the input image shown in FIG. 30. In the binary object image, 0 is set in the pixel values of the pixels having a higher correlation with the background image.

Figure 36:
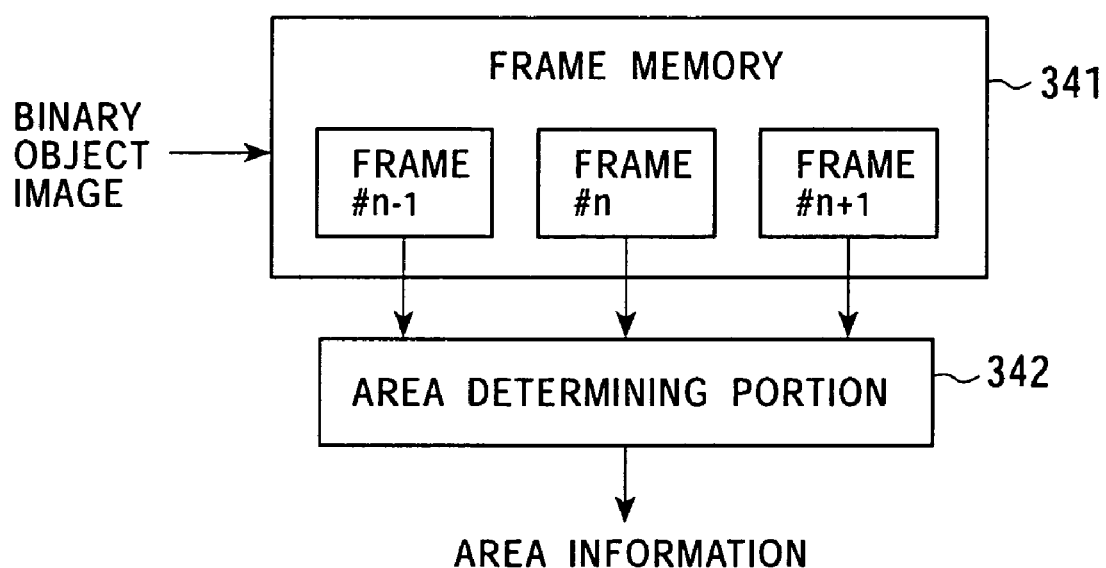
FIG. 36 is a block diagram illustrating the configuration of a time change detector 303.

FIG. 36 is a block diagram illustrating the configuration of the time change detector 303. When determining the area of a pixel in frame #n, a frame memory 341 stores a binary object image of frame #n−1, frame #n, and frame #n+1 supplied from the binary-object-image extracting portion 302.

An area determining portion 342 determines the area of each pixel in frame #n based on the binary object image of frame #n−1, frame #n, and frame #n+1 so as to generate area information, and outputs the generated area information.

FIG. 37 illustrates the determinations made by the area determining portion 342. When the designated pixel of the binary object image in frame #n is 0, the area determining portion 342 determines that the designated pixel in frame #n belongs to the background area.

When the designated pixel of the binary object image in frame #n is 1, and when the corresponding pixel of the binary object image in frame #n−1 is 1, and when the corresponding pixel of the binary object image in frame #n+1 is 1, the area determining portion 342 determines that the designated pixel in frame #n belongs to the foreground area.

When the designated pixel of the binary object image in frame #n is 1, and when the corresponding pixel of the binary object image in frame #n−1 is 0, the area determining portion 342 determines that the designated pixel in frame #n belongs to a covered background area.

When the designated pixel of the binary object image in frame #n is 1, and when the corresponding pixel of the binary object image in frame #n+1 is 0, the area determining portion 342 determines that the designated pixel in frame #n belongs to an uncovered background area.

Figure 38:
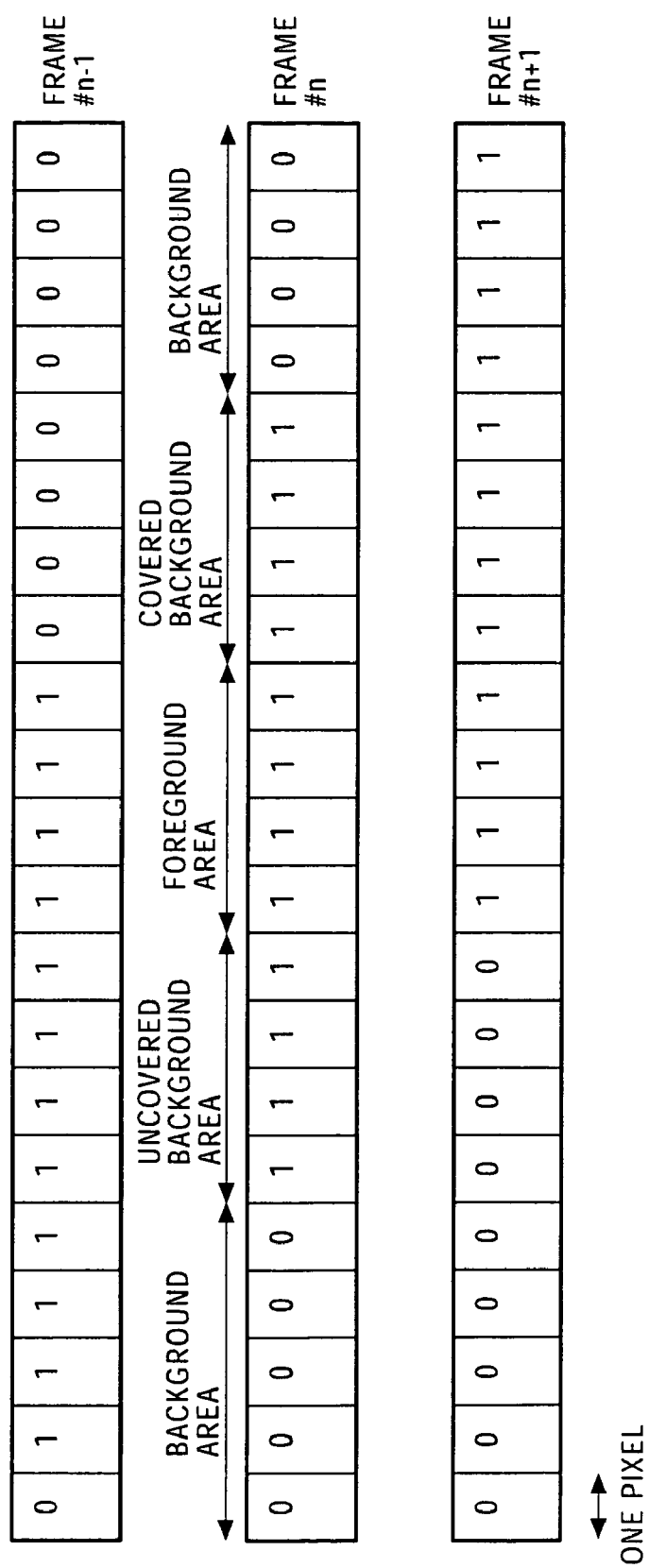
FIG. 38 illustrates an example of determinations made by the time change detector 303.

FIG. 38 illustrates an example of the determinations made by the time change detector 303 on the binary object image corresponding to the model of the input image shown in FIG. 30. The time change detector 303 determines that the first through fifth pixels from the left in frame #n belong to the background area since the corresponding pixels of the binary object image in frame #n are 0.

The time change detector 303 determines that the sixth through ninth pixels from the left belong to the uncovered background area since the pixels of the binary object image in frame #n are 1, and the corresponding pixels in frame #n+1 are 0.

The time change detector 303 determines that the tenth through thirteenth pixels from the left belong to the foreground area since the pixels of the binary object image in frame #n are 1, the corresponding pixels in frame #n−1 are 1, and the corresponding pixels in frame #n+1 are 1.

The time change detector 303 determines that the fourteenth through seventeenth pixels from the left belong to the covered background area since the pixels of the binary object image in frame #n are 1, and the corresponding pixels in frame #n−1 are 0.

The time change detector 303 determines that the eighteenth through twenty-first pixels from the left belong to the background area since the corresponding pixels of the binary object image in frame #n are 0.

Figure 39:
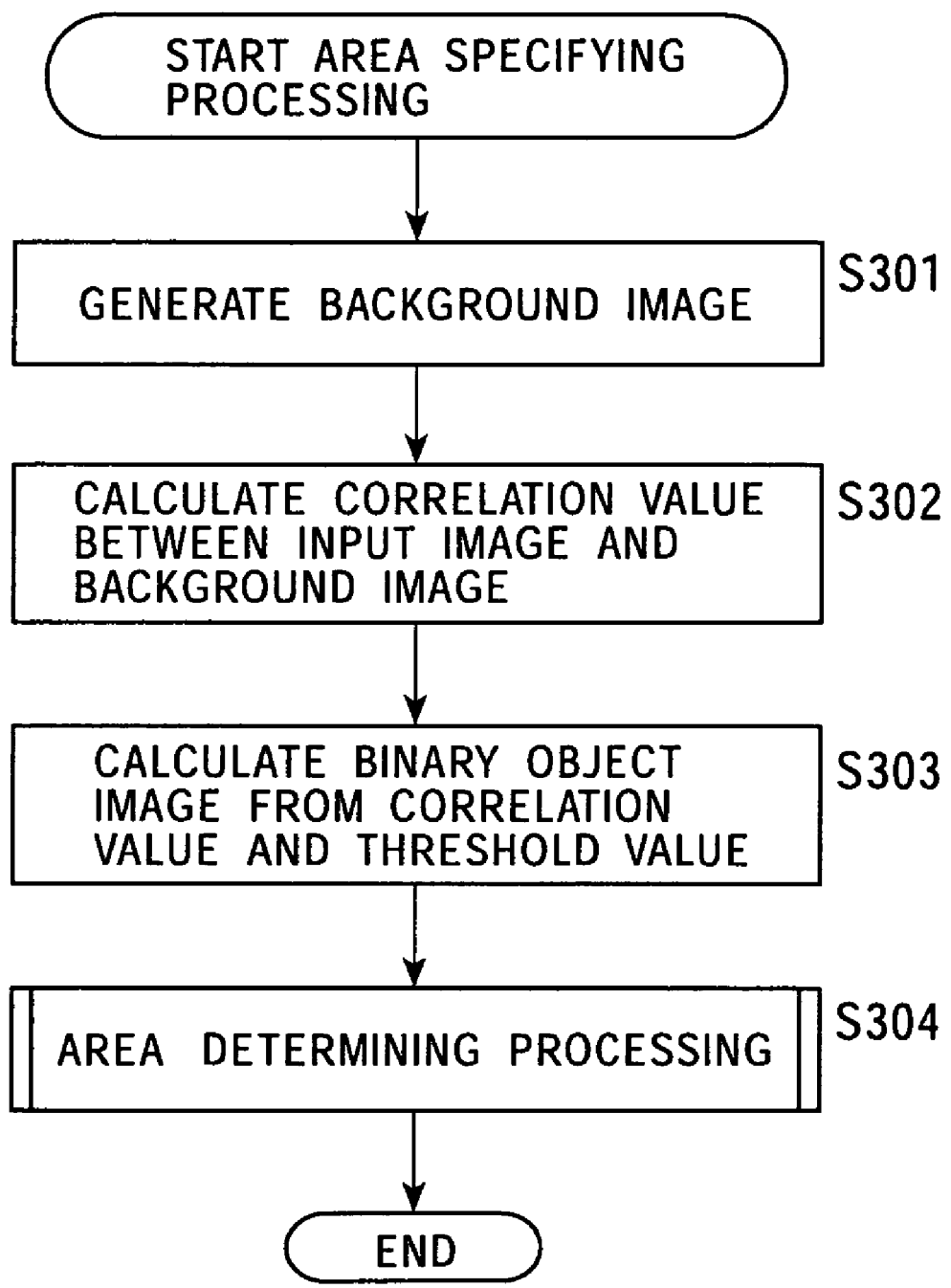
FIG. 39 is a flowchart illustrating the area specifying processing performed by the area specifying unit 103.

The area specifying processing performed by the area specifying unit 103 is described below with reference to the flowchart of FIG. 39. In step S301, the background image generator 301 of the area specifying unit 103 extracts, for example, an image object corresponding to a background object contained in an input image based on the input image so as to generate a background image, and supplies the generated background image to the binary-object-image extracting portion 302.

In step S302, the binary-object-image extracting portion 302 calculates a correlation value between the input image and the background image supplied from the background image generator 301 according to, for example, calculation discussed with reference to FIGS. 33A and 33B. In step S303, the binary-object-image extracting portion 302 computes a binary object image from the correlation value and the threshold value th0 by, for example, comparing the correlation value with the threshold value th0.

In step S304, the time change detector 303 executes the area determining processing, and the processing is completed.

Figure 40:
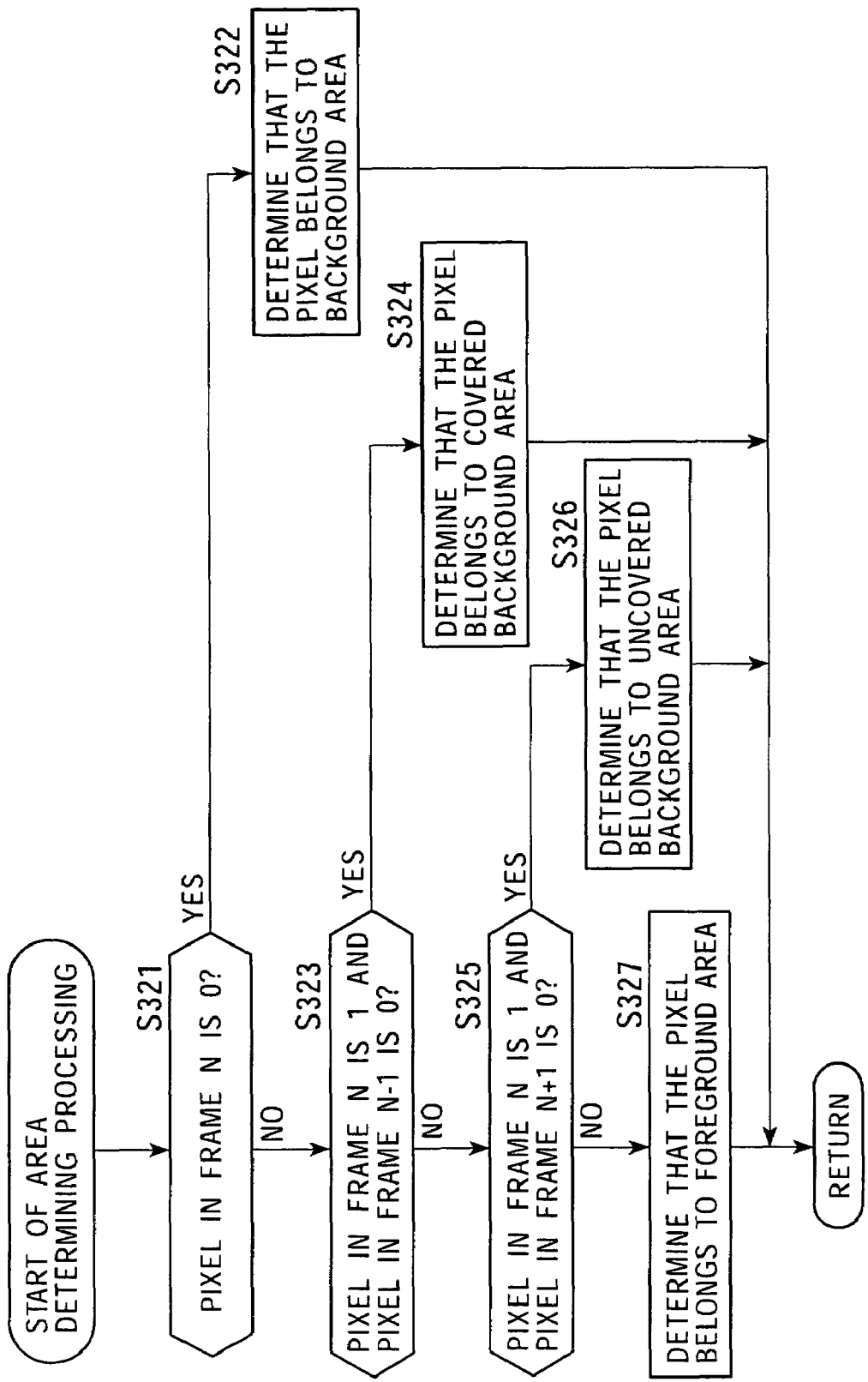
FIG. 40 is a flowchart illustrating details of the area specifying processing.

Details of the area determining processing in step S304 are described below with reference to the flowchart of FIG. 40. In step S321, the area determining portion 342 of the time change detector 303 determines whether the designated pixel in frame #n stored in the frame memory 341 is 0. If it is determined that the designated pixel in frame #n is 0, the process proceeds to step S322. In step S322, it is determined that the designated pixel in frame #n belongs to the background area, and the processing is completed.

If it is determined in step S321 that the designated pixel in frame #n is 1, the process proceeds to step S323. In step S323, the area determining portion 342 of the time change detector 303 determines whether the designated pixel in frame #n stored in the frame memory 341 is 1, and whether the corresponding pixel in frame #n−1 is 0. If it is determined that the designated pixel in frame #n is 1 and the corresponding pixel in frame #n−1 is 0, the process proceeds to step S324. In step S324, it is determined that the designated pixel in frame #n belongs to the covered background area, and the processing is completed.

If it is determined in step S323 that the designated pixel in frame #n is 0, or that the corresponding pixel in frame #n−1 is 1, the process proceeds to step S325. In step S325, the area determining portion 342 of the time change detector 303 determines whether the designated pixel in frame #n stored in the frame memory 341 is 1, and whether the corresponding pixel in frame #n+1 is 0. If it is determined that the designated pixel in frame #n is 1 and the corresponding pixel in frame #n+1 is 0, the process proceeds to step S326. In step S326, it is determined that the designated pixel in frame #n belongs to the uncovered background area, and the processing is completed.

If it is determined in step S325 that the designated pixel in frame #n is 0, or that the corresponding pixel in frame #n+1 is 1, the process proceeds to step S327. In step S327, the area determining portion 342 of the time change detector 303 determines that the designated pixel in frame #n belongs to the foreground area, and the processing is completed.

As discussed above, the area specifying unit 103 is able to specify, based on the correlation value between the input image and the corresponding background image, to which of the foreground area, the background area, the covered background area, or the uncovered background area each pixel of the input image belongs, and generates area information corresponding to the specified result.

Figure 41:
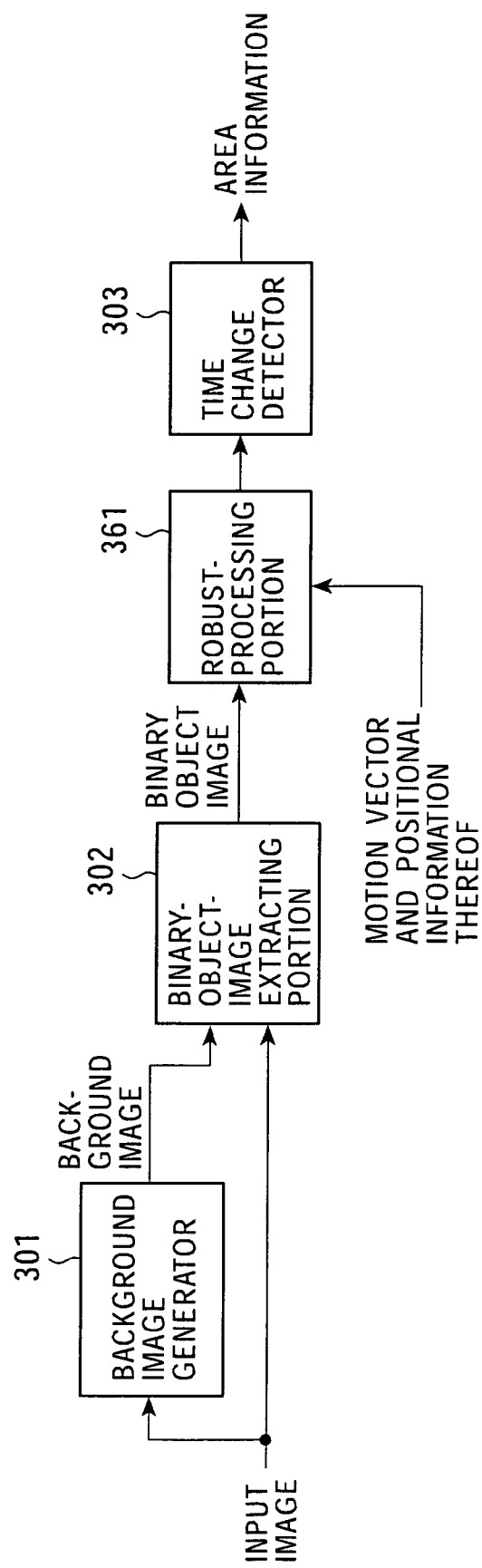
FIG. 41 is a block diagram illustrating still another configuration of the area specifying unit 103.

FIG. 41 is a block diagram illustrating another configuration of the area specifying unit 103. The area specifying unit 103 shown in FIG. 41 uses a motion vector and positional information thereof supplied from the motion detector 102. The same elements as those shown in FIG. 29 are designated with like reference numerals, and an explanation thereof is thus omitted.

A robust-processing portion 361 generates a robust binary object image based on binary object images of N frames supplied from the binary-object-image extracting portion 302, and outputs the robust binary object image to the time change detector 303.

Figure 42:
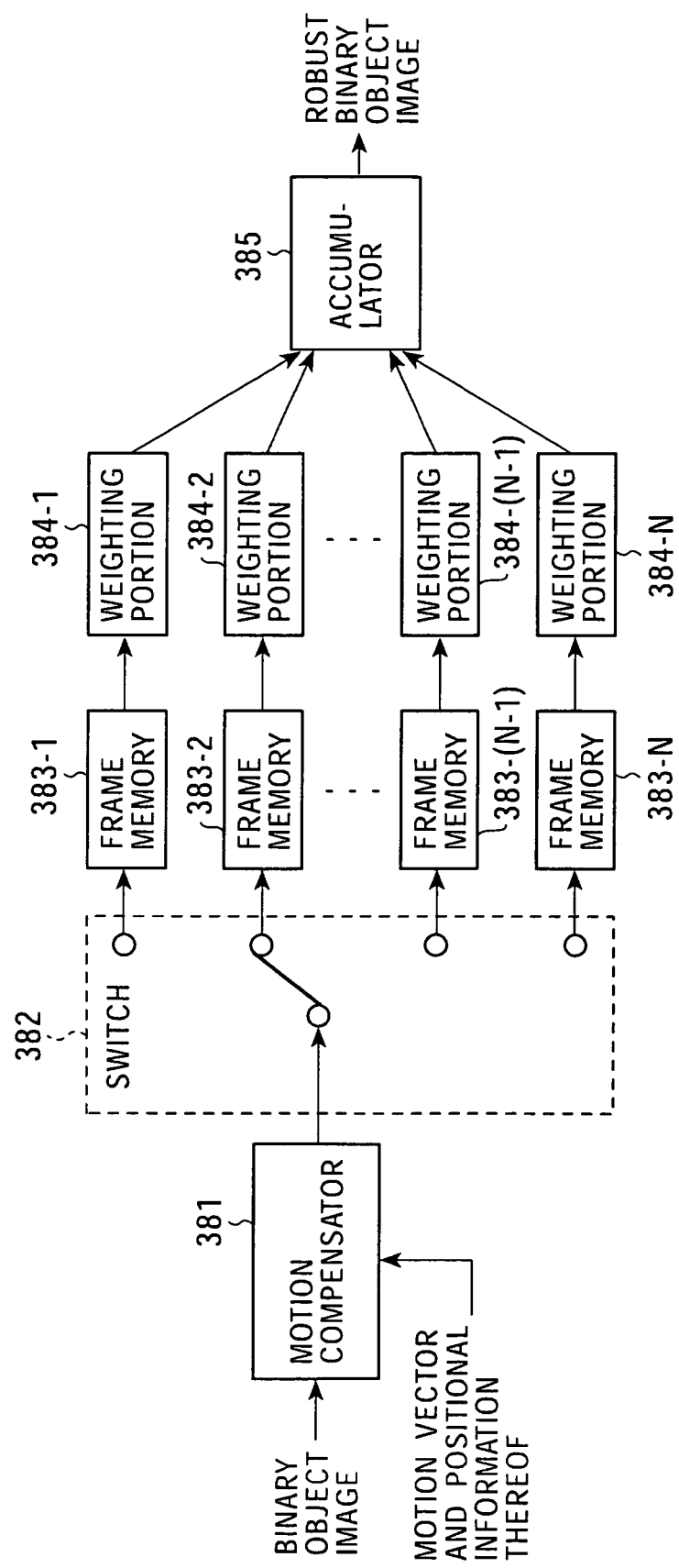
FIG. 42 is a block diagram illustrating the configuration of a robust-processing portion 361.

FIG. 42 is a block diagram illustrating the configuration of the robust-processing portion 361. A motion compensator 381 compensates for the motion of the binary object images of N frames based on the motion vector and the positional information thereof supplied from the motion detector 102, and outputs a motion-compensated binary object image to a switch 382.

Figure 44:
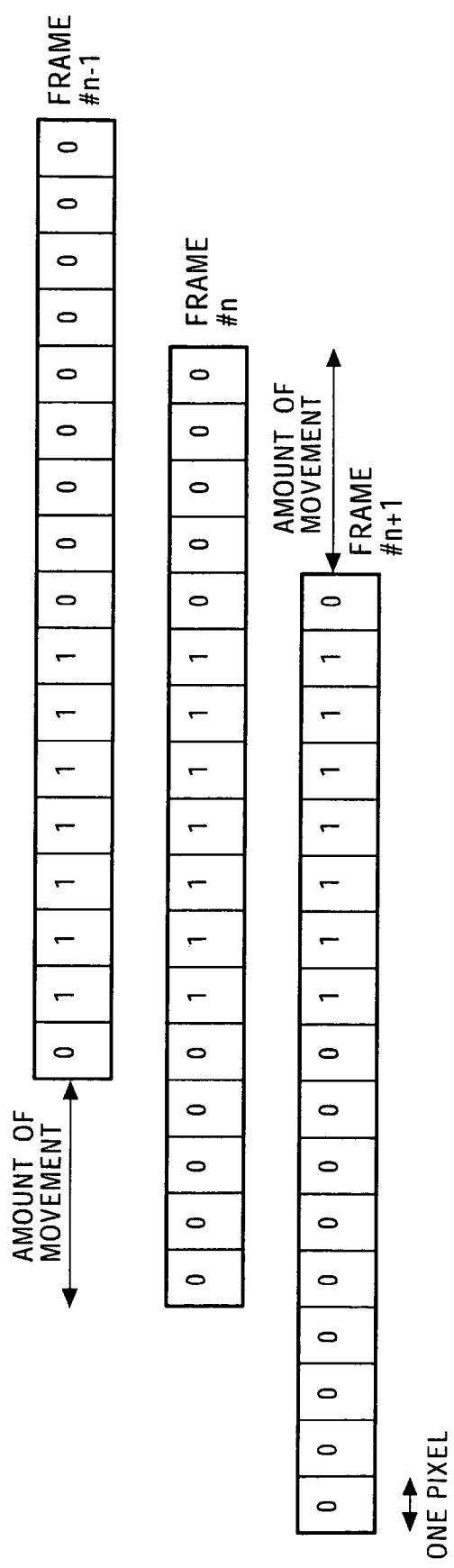
FIG. 44 illustrates motion compensation performed by the motion compensator 381.

The motion compensation performed by the motion compensator 381 is discussed below with reference to examples shown in FIGS. 43 and 44. It is now assumed, for example, that the area in frame #n is to be processed. When binary object images of frame #n−1, frame #n, and frame #n+1 shown in FIG. 43 are input, the motion compensator 381 compensates for the motion of the binary object image of frame #n−1 and the binary object image of frame #n+1, as indicated by the example shown in FIG. 44, based on the motion vector supplied from the motion detector 102, and supplies the motion-compensated binary object images to the switch 382.

The switch 382 outputs the motion-compensated binary object image of the first frame to a frame memory 383-1, and outputs the motion-compensated binary object image of the second frame to a frame memory 383-2. Similarly, the switch 382 outputs the motion-compensated binary object images of the third through (N−1)-th frame to frame memories 383-3 through 383-(N−1), and outputs the motion-compensated binary object image of the N-th frame to a frame memory 383-N.

The frame memory 383-1 stores the motion-compensated binary object image of the first frame, and outputs the stored binary object image to a weighting portion 384-1. The frame memory 383-2 stores the motion-compensated binary object image of the second frame, and outputs the stored binary object image to a weighting portion 384-2.

Similarly, the frame memories 383-3 through 383-(N−1) stores the motion-compensated binary object images of the third through (N−1)-th frames, and outputs the stored binary object images to weighting portions 384-3 through 384-(N−1). The frame memory 383-N stores the motion-compensated binary object image of the N-th frame, and outputs the stored binary object image to a weighting portion 384-N.

The weighting portion 384-1 multiplies the pixel value of the motion-compensated binary object image of the first frame supplied from the frame memory 383-1 by a predetermined weight w1, and supplies a weighted binary object image to an accumulator 385. The weighting portion 384-2 multiplies the pixel value of the motion-compensated binary object image of the second frame supplied from the frame memory 383-2 by a predetermined weight w2, and supplies the weighted binary object image to the accumulator 385.

Likewise, the weighting portions 384-3 through 384-(N−1) multiply the pixel values of the motion-compensated binary object images of the third through (N−1)-th frames supplied from the frame memories 383-3 through 383-(N−1) by predetermined weights w3 through w(N−1), and supplies the weighted binary object images to the accumulator 385. The weighting portion 384-N multiplies the pixel value of the motion-compensated binary object image of the N-th frame supplied from the frame memory 383-N by a predetermined weight wN, and supplies the weighted binary object image to the accumulator 385.

The accumulator 385 accumulates the pixel values of the motion-compensated binary object images multiplied by the weights w1 through wN of the first through N-th frames, and compares the accumulated pixel value with the predetermined threshold value th0, thereby generating the binary object image.

As discussed above, the robust-processing portion 361 generates a robust binary object image from N binary object images, and supplies it to the time change detector 303. Accordingly, the area specifying unit 103 configured as shown in FIG. 41 is able to specify the area more precisely than that shown in FIG. 29 even if noise is contained in the input image.

The area specifying processing performed by the area specifying unit 103 configured as shown in FIG. 41 is described below with reference to the flowchart of FIG. 45. The processings of step S341 through step S343 are similar to those of step S301 through step S303 discussed with reference to the flowchart of FIG. 39, and an explanation thereof is thus omitted.

In step S344, the robust-processing portion 361 performs the robust processing.

In step S345, the time change detector 303 performs the area determining processing, and the processing is completed. Details of the processing of step S345 are similar to the processing discussed with reference to the flowchart of FIG. 40, and an explanation thereof is thus omitted.

Figure 45:
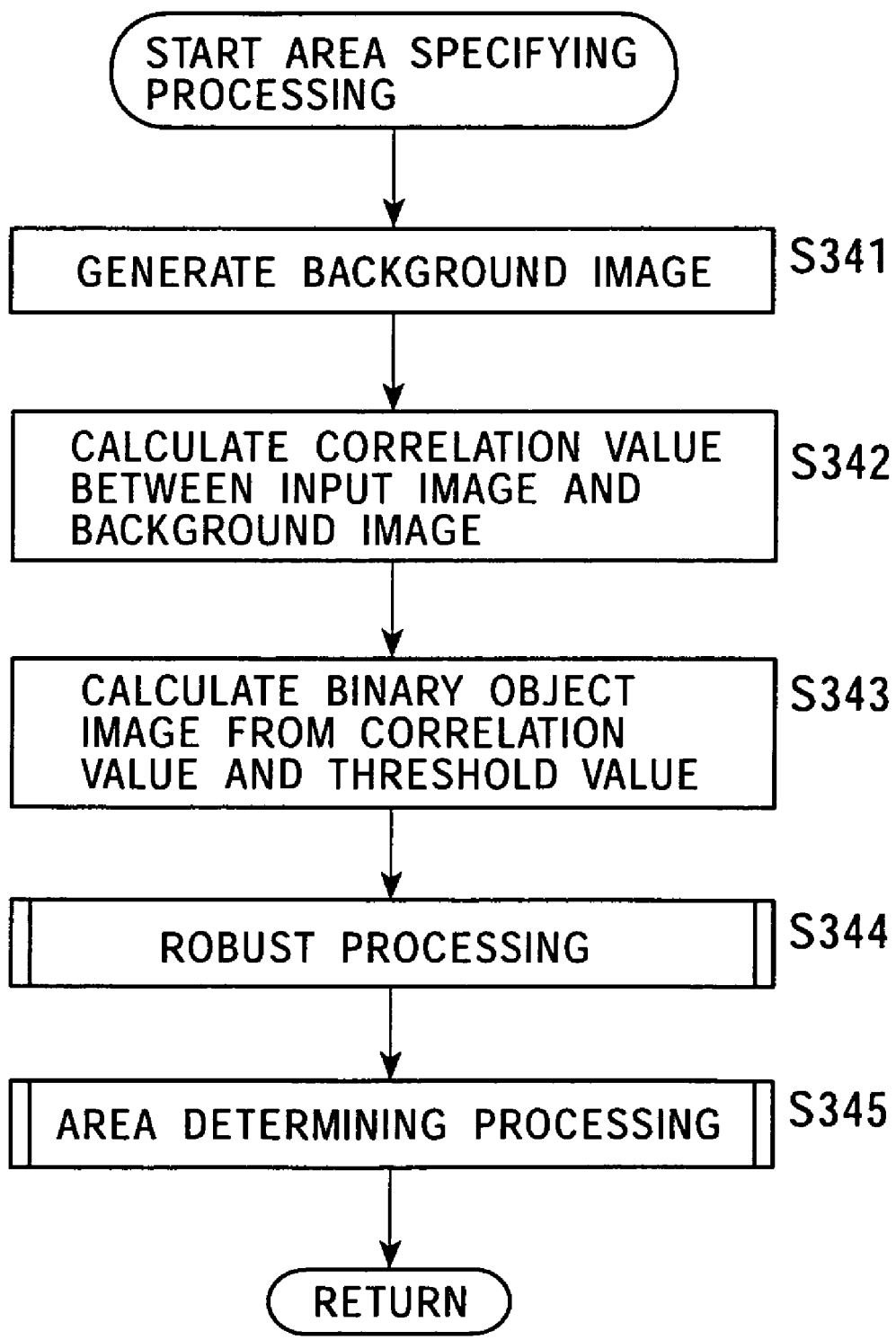
FIG. 45 is a flowchart illustrating the area specifying processing.
Figure 46:
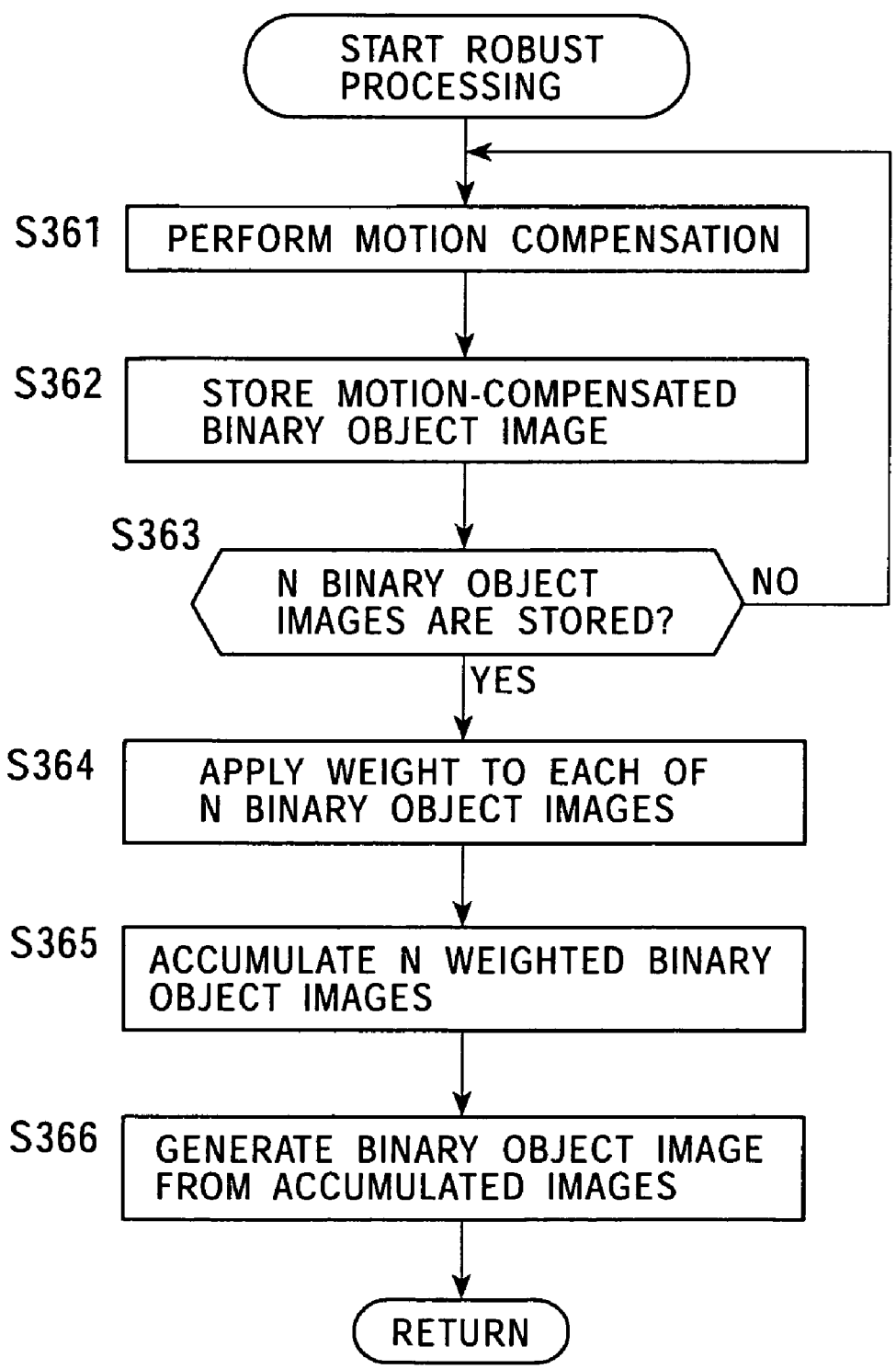
FIG. 46 is a flowchart illustrating details of the robust processing.

Details of the robust processing corresponding to the processing of step S344 in FIG. 45 are given below with reference to the flowchart of FIG. 46. In step S361, the motion compensator 381 performs the motion compensation of an input binary object image based on the motion vector and the positional information thereof supplied from the motion detector 102. In step S362, one of the frame memories 383-1 through 383-N stores the corresponding motion-compensated binary object image supplied via the switch 382.

In step S363, the robust-processing portion 361 determines whether N binary object images are stored. If it is determined that N binary object images are not stored, the process returns to step S361, and the processing for compensating for the motion of the binary object image and the processing for storing the binary object image are repeated.

If it is determined in step S363 that N binary object images are stored, the process proceeds to step S364 in which weighting is performed. In step S364, the weighting portions 384-1 through 384-N multiply the corresponding N binary object images by the weights w1 through wN.

In step S365, the accumulator 385 accumulates the N weighted binary object images.

In step S366, the accumulator 385 generates a binary object image from the accumulated images by, for example, comparing the accumulated value with a predetermined threshold value th1, and the processing is completed.

As discussed above, the area specifying unit 103 configured as shown in FIG. 41 is able to generate area information based on the robust binary object image.

As is seen from the foregoing description, the area specifying unit 103 is able to generate area information indicating to which of the moving area, the stationary area, the uncovered background area, or the covered background area each pixel contained in a frame belongs.

Figure 47:
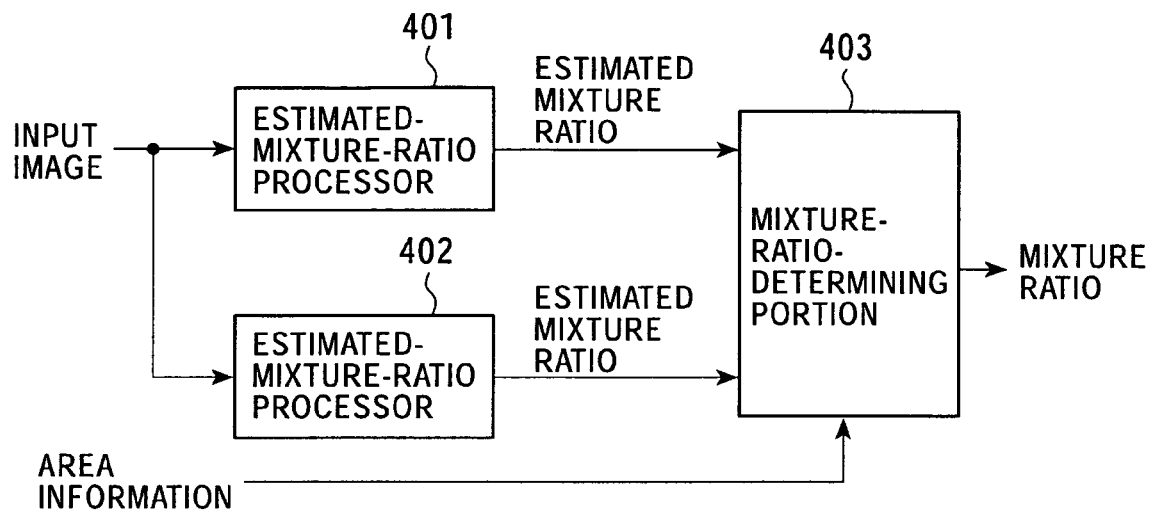
FIG. 47 is a block diagram illustrating an example of the configuration of a mixture-ratio calculator 104.

FIG. 47 is a block diagram illustrating an example of the configuration of the mixture-ratio calculator 104. An estimated-mixture-ratio processor 401 calculates an estimated mixture ratio for each pixel by calculations corresponding to a model of a covered background area based on the input image, and supplies the calculated estimated mixture ratio to a mixture-ratio determining portion 403.

An estimated-mixture-ratio processor 402 calculates an estimated mixture ratio for each pixel by calculations corresponding to a model of an uncovered background area based on the input image, and supplies the calculated estimated mixture ratio to the mixture-ratio determining portion 403.

Since it can be assumed that the object corresponding to the foreground is moving with constant velocity within the shutter time, the mixture ratio $\alpha$ of the pixels belonging to a mixed area exhibits the following characteristics. That is, the mixture ratio $\alpha$ linearly changes according to the positional change in the pixels. If the positional change in the pixels is one-dimensional, a change in the mixture ratio $\alpha$ can be represented linearly. If the positional change in the pixels is two-dimensional, a change in the mixture ratio $\alpha$ can be represented on a plane.

Since the period of one frame is short, it can be assumed that the object corresponding to the foreground is a rigid body moving with constant velocity.

The gradient of the mixture ratio $\alpha$ is inversely proportional to the amount of movement v within the shutter time of the foreground.

Figure 48:
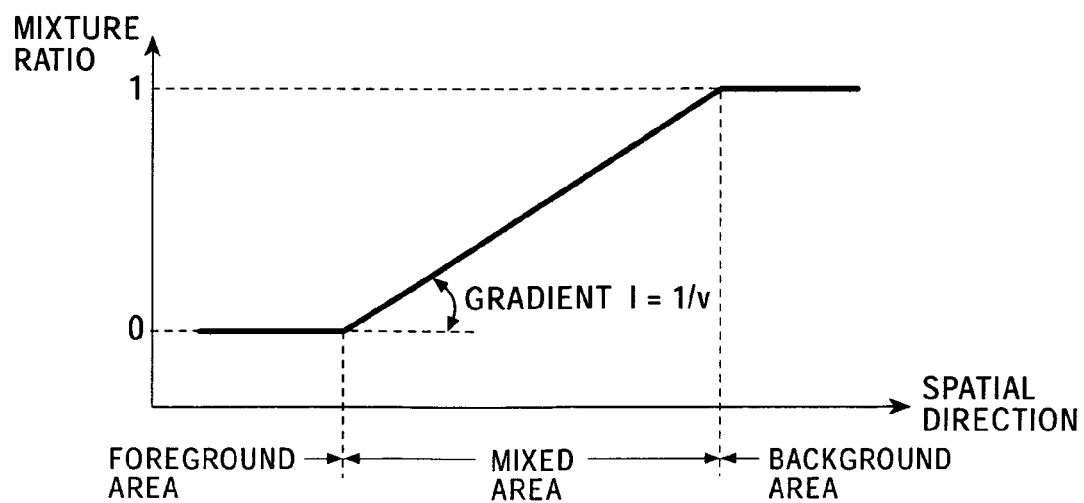
FIG. 48 illustrates an example of the ideal mixture-ratio $\alpha$.

An example of the ideal mixture-ratio $\alpha$ is shown in FIG. 48. The gradient l of the ideal mixture-ratio $\alpha$ in the mixed area can be represented by the reciprocal of the amount of movement v.

As shown in FIG. 48, the ideal mixture-ratio α has the value of 1 in the background area, the value of 0 in the foreground area, and the value of greater than 0 and smaller than 1 in the mixed area.

Figure 49:
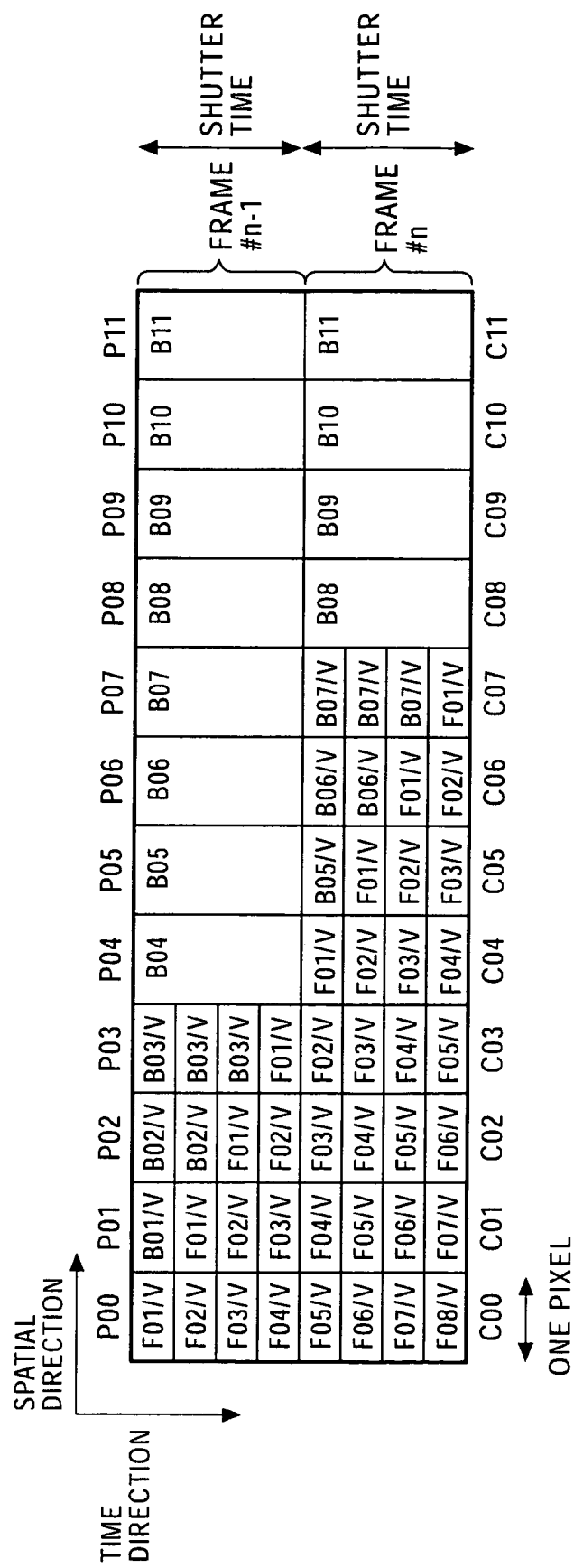
FIG. 49 illustrates a model in which pixel values are expanded in the time direction and the period corresponding to the shutter time is divided.

In the example shown in FIG. 49, the pixel value C06 of the seventh pixel from the left in frame #n can be indicated by equation (8) by using the pixel value P06 of the seventh pixel from the left in frame #n−1.

$$C06 = B06/v + B06/v + F01/v + F02/v \qquad (8)$$
$$= P06/v + P06/v + F01/v + F02/v$$
$$= 2/v \cdot P06 + \sum_{i=1}^{2} Fi/v$$

In equation (8), the pixel value C06 is indicated by a pixel value M of the pixel in the mixed area, while the pixel value P06 is indicated by a pixel value B of the pixel in the background area. That is, the pixel value M of the pixel in the mixed area and the pixel value B of the pixel in the background area can be represented by equations (9) and (10), respectively.

$$M=C06 \qquad (9)$$

$$B=P06 \qquad (10)$$

In equation (8), 2/v corresponds to the mixture ratio α. Since the amount of movement v is 4, the mixture ratio α of the seventh pixel from the left in frame #n is 0.5.

As discussed above, the pixel value C in the designated frame #n is considered as the pixel value in the mixed area, while the pixel value P of frame #n−1 prior to frame #n is considered as the pixel value in the background area. Accordingly, equation (3) indicating the mixture ratio α can be represented by equation (11):

$$C=\alpha \cdot P + f \qquad (11)$$

where f in equation (11) indicates the sum of the foreground components $\Sigma_i Fi/v$ contained in the designated pixel. The variables contained in equation (11) are two factors, i.e., the mixture ratio α and the sum f of the foreground components.

Figure 50:
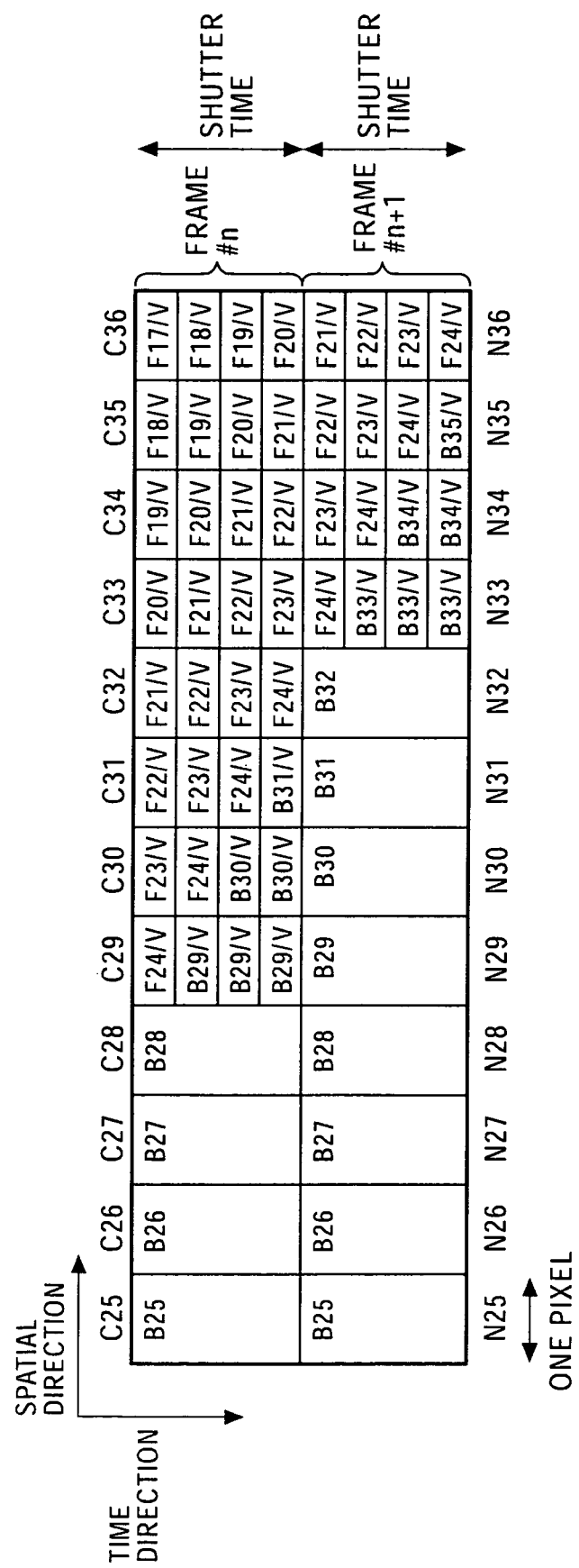
FIG. 50 illustrates a model in which pixel values are expanded in the time direction and the period corresponding to the shutter time is divided.

Similarly, a model obtained by expanding in the time direction the pixel values in which the amount of movement is 4 and the number of virtual divided portions is 4 in an uncovered background area is shown in FIG. 50.

As in the representation of the covered background area, in the uncovered background area, the pixel value C of the designated frame #n is considered as the pixel value in the mixed area, while the pixel value N of frame #n+1 subsequent to frame #n is considered as the background area. Accordingly, equation (3) indicating the mixture ratio α can be represented by equation (12).

$$C=\alpha \cdot N + f \qquad (12)$$

The embodiment has been described, assuming that the background object is stationary. However, equations (8) through (12) can be applied to the case in which the background object is moving by using the pixel value of a pixel located corresponding to the amount of movement v of the background. It is now assumed, for example, in FIG. 49, that the amount of movement v of the object corresponding to the background is 2, and the number of virtual divided portions is 2. In this case, when the object corresponding to the background is moving to the right in FIG. 49, the pixel value B of the pixel in the background area in equation (10) is represented by a pixel value P04.

Since equations (11) and (12) each contain two variables, the mixture ratio α cannot be determined without modifying the equations. Here, generally, since an image has a strong correlation in relation to space, pixels in proximity to each other have approximately the same pixel values.

Accordingly, since the foreground components have a strong correlation in relation to space, the equation is modified so that the sum f of the foreground components can be derived from the previous or subsequent frame, and the mixture ratio α is determined.

Figure 51:
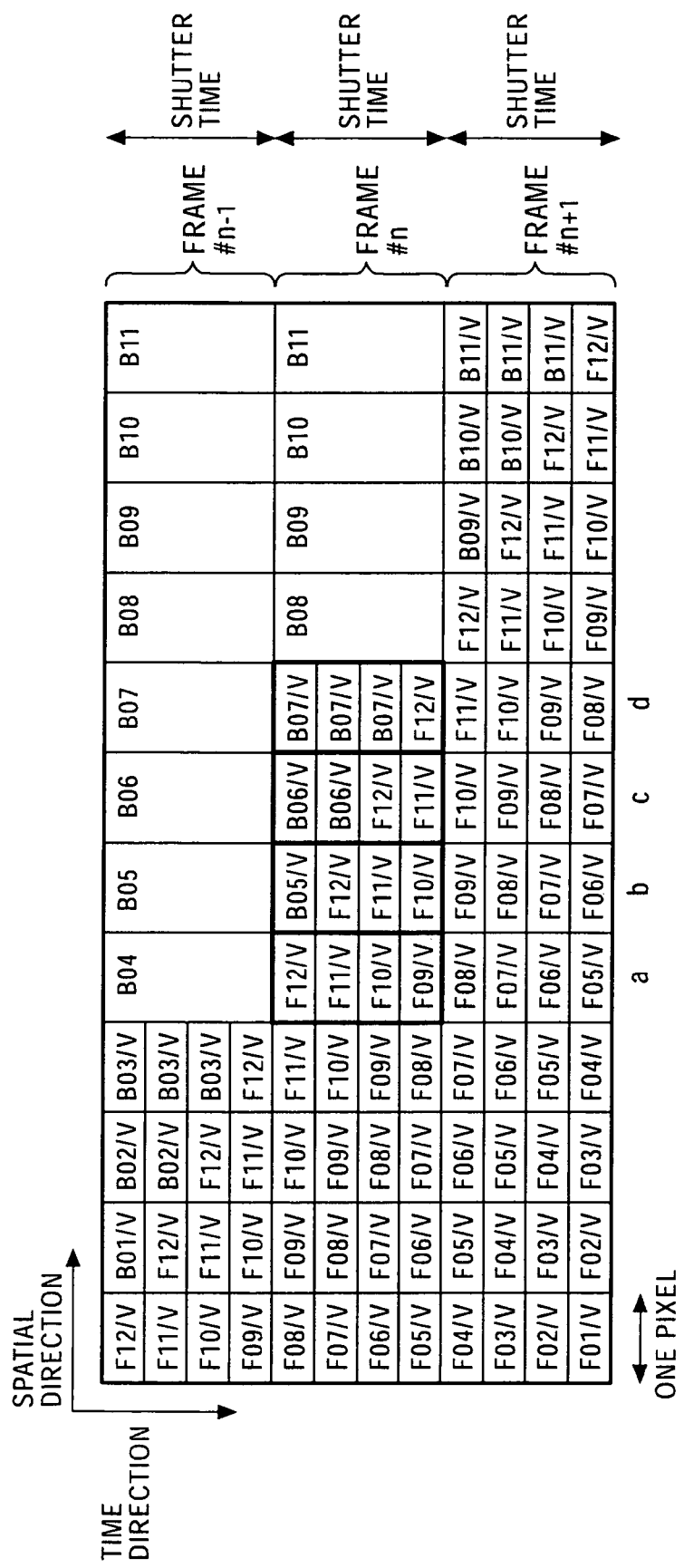
FIG. 51 illustrates approximation using a correlation of foreground components.

The pixel value Mc of the seventh pixel from the left in frame #n in FIG. 51 can be expressed by equation (13):

$$Mc = \frac{2}{v} \cdot B06 + \sum_{i=11}^{12} Fi/v \qquad (13)$$

In equation (13), 2/v of the first term of the right side corresponds to the mixture ratio α. The second term of the right side in equation (13) is shown as in equation (14):

$$\sum_{i=11}^{12} Fi/v = \beta \cdot \sum_{i=7}^{10} Fi/v \qquad (14)$$

Here, by using the space correlation of the foreground components, it is assumed that equation (15) holds:

$$F=F05=F06=F07=F08=F09=F10=F11=F12 \qquad (15)$$

Equation (14) can be replaced as shown in equation (16) by using equation (15):

$$\sum_{i=11}^{12} Fi/v = \frac{2}{v} \cdot F \qquad (16)$$
$$= \beta \cdot \frac{4}{v} \cdot F$$

As a result, β can be expressed by equation (17):

$$\beta=2/4 \qquad (17)$$

In general, if it is assumed that, as shown in equation (15), the foreground components related to the mixed area are equal, equation (18) holds for all the pixels of the mixed area on the basis of the relation of the internal ratio:

$$\beta=1-\alpha \qquad (18)$$

If it is assumed that equation (18) holds, equation (11) can be expanded as shown in equation (19):

$$C = \alpha \cdot P + f \qquad (19)$$
$$= \alpha \cdot P + (1-\alpha) \cdot \sum_{i=\gamma}^{\gamma+V-1} Fi/v$$
$$= \alpha \cdot P + (1-\alpha) \cdot N$$

Similarly, if it is assumed that equation (18) holds, equation (12) can be expanded as shown in equation (20):

$$C = \alpha \cdot N + f \quad (20)$$
$$= \alpha \cdot N + (1-\alpha) \cdot \sum_{i=\gamma}^{\gamma+V-1} Fi/v$$
$$= \alpha \cdot N + (1-\alpha) \cdot P$$

Figure 52:
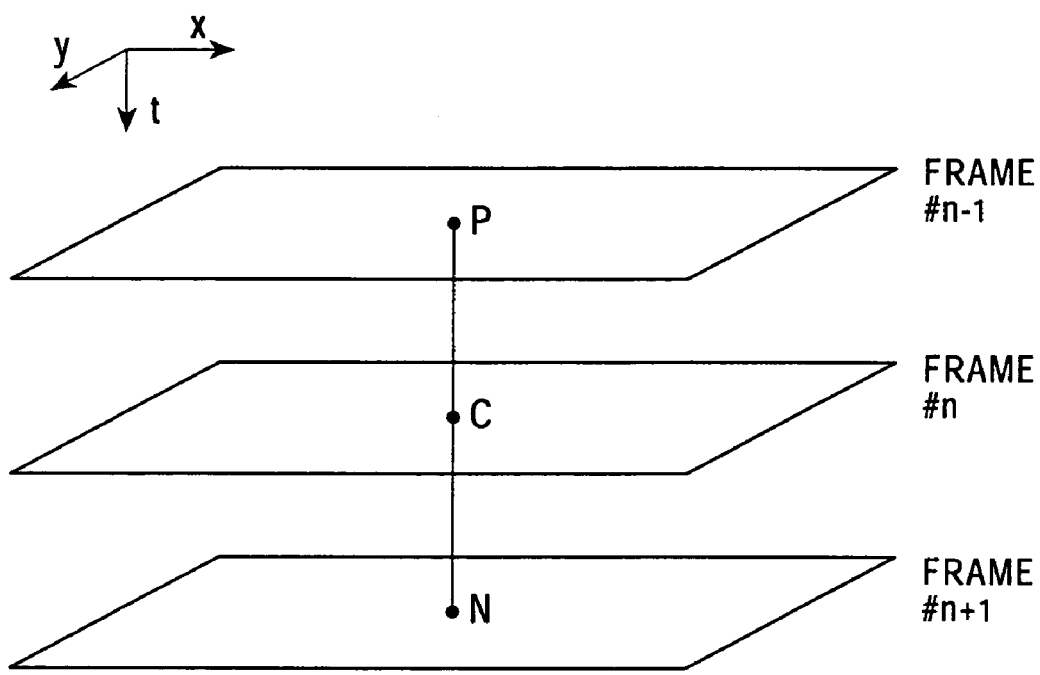
FIG. 52 illustrates the relationship among C, N, and P.

In equations (19) and (20), since C, N, and P are known pixel values, the variables contained in equations (19) and (20) are only the mixture ratio α. The relationship among C, N, and P in equations (19) and (20) is shown in FIG. 52. C indicates the pixel value of the designated pixel in frame #n. N indicates the pixel value of the pixel in frame #n+1, whose position in the spatial direction corresponds to the designated pixel. P indicates the pixel value of the pixel in frame #n−1, whose position in the spatial direction corresponds to the designated pixel.

Therefore, since equations (19) and (20) each contain a single variable, the mixture ratio α can be calculated using the pixel values of the pixels of three frames. By solving equations (19) and (20), it is shown that the condition under which the correct mixture ratio α is calculated is that the foreground components related to the mixed area are equal, that is, the pixel values of the successive pixels of a number twice the amount of movement v, which are the pixels positioned at the boundary of the image object, corresponding to the moving direction of the object of the foreground, in the image object of the foreground, which is captured when the foreground object is stationary, are fixed.

As discussed above, the mixture ratio α of the pixels belonging to the covered background area is calculated on the basis of equation (21), and the mixture ratio α of the pixels belonging to the uncovered background area is calculated on the basis of equation (22).

$$\alpha = (C-N)/(P-N) \quad (21)$$

$$\alpha = (C-P)/(N-P) \quad (22)$$

Figure 53:
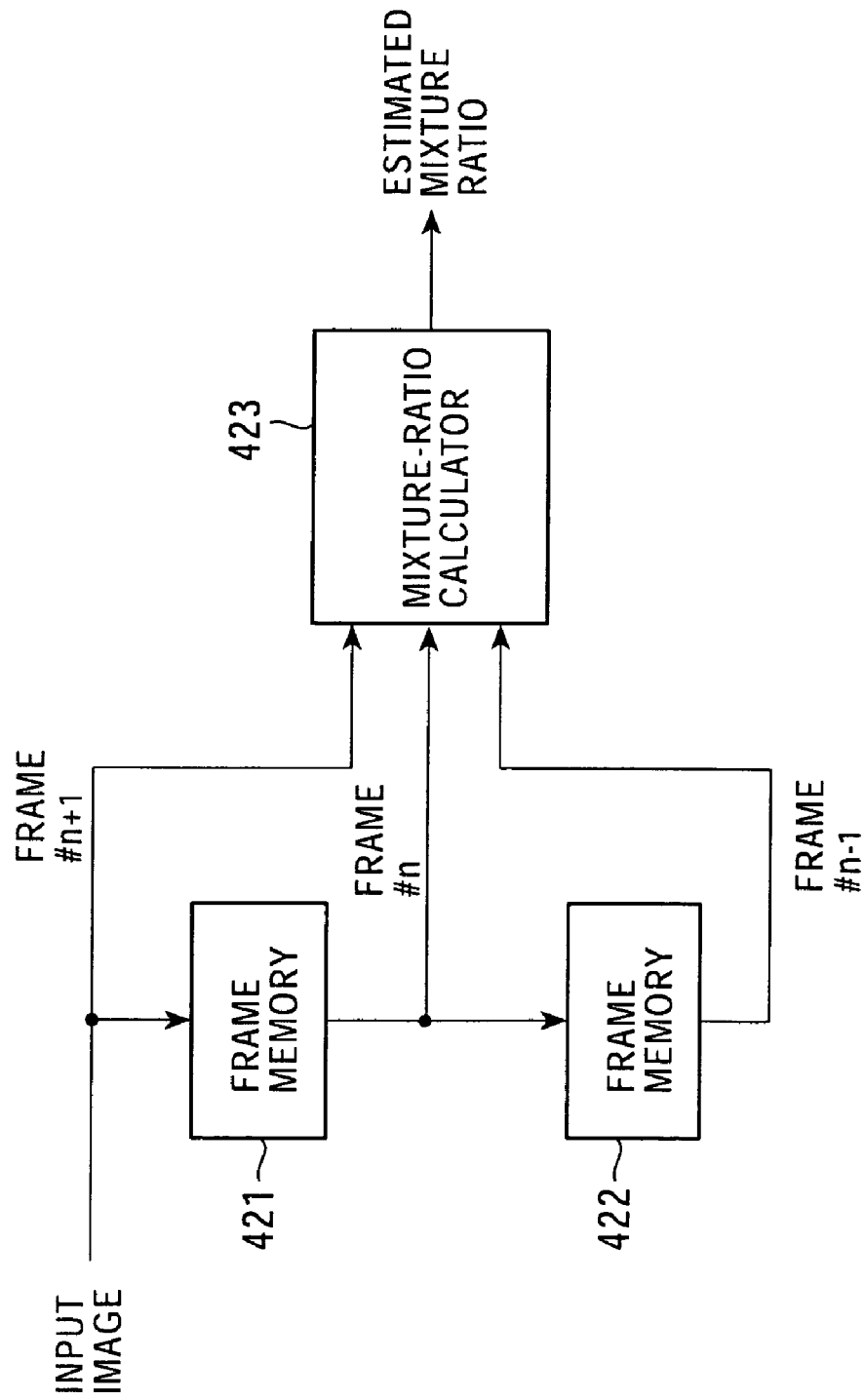
FIG. 53 is a block diagram illustrating the configuration of the mixture-ratio estimation processor 401.

FIG. 53 is a block diagram illustrating the configuration of the mixture ratio estimation processor 401. A frame memory 421 stores input images in units of frames, and supplies the frame which is one frame after the frame input as the input image to a frame memory 422 and a mixture-ratio calculator 423.

The frame memory 422 stores input images in units of frames, and supplies the frame which is one frame after the frame supplied from the frame memory 421 to the mixture-ratio calculator 423.

Therefore, when the frame #n+1 has been input as an input image to the mixture-ratio calculator 423, the frame memory 421 supplies frame #n to the mixture-ratio calculator 423, and the frame memory 422 supplies the frame #n−1 to the mixture-ratio calculator 423.

Based on the calculation shown in equation (21), the mixture-ratio calculator 423 calculates the estimated mixture ratio of the designated pixel, on the basis of the pixel value C of the designated pixel in frame #n, the pixel value N of the pixel in frame #n+1, whose spatial position corresponds to the designated pixel, and the pixel value P of the pixel in frame #n−1, whose spatial position corresponds to the designated pixel, and outputs the calculated estimated mixture ratio. For example, when the background is stationary, the mixture-ratio calculator 423 calculates the estimated mixture ratio of the designated pixel on the basis of the pixel value C of the designated pixel in frame #n, the pixel value N of the pixel in frame #n+1, whose position within the frame is the same as that of the designated pixel, and the pixel value P of the pixel in frame #n−1, whose position within the frame is the same as that of the designated pixel, and outputs the calculated estimated mixture ratio.

In this manner, the estimated-mixture-ratio processor 401 is able to calculate the estimated mixture ratio based on the input image, and supplies it to the mixture-ratio determining portion 403.

The estimated-mixture-ratio processor 402 is configured the same as the estimated-mixture-ratio processor 401 except that, whereas the estimated-mixture-ratio processor 401 calculates the estimated mixture ratio of the designated pixel on the basis of the calculation shown in equation (21), the estimated-mixture-ratio processor 402 calculates the estimated mixture ratio of the designated pixel on the basis of the calculation shown in equation (22), and an explanation thereof is thus omitted.

Figure 54:
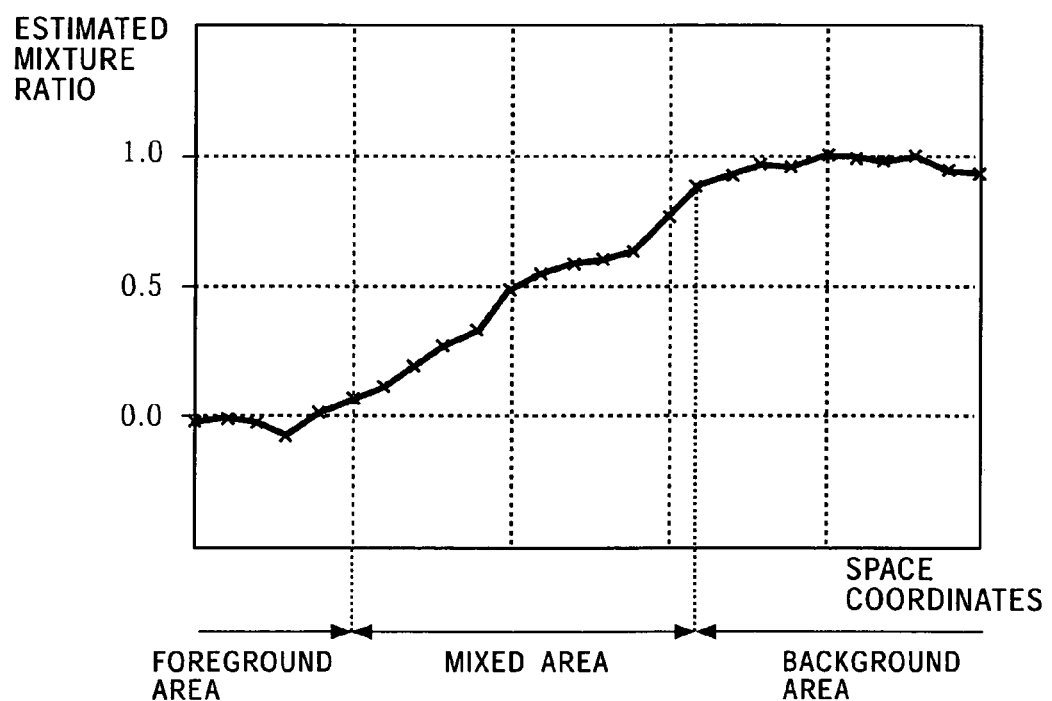
FIG. 54 illustrates an example of an estimated mixture ratio.

FIG. 54 shows an example of an estimated mixture ratio calculated by the estimated-mixture-ratio processor 401. The estimated mixture ratio shown in FIG. 54 shows, for one line, the result in a case where the amount of movement v of the foreground corresponding to an object moving with constant velocity is 11.

It can be seen that the estimated mixture ratio nearly changes linearly, as shown in FIG. 48.

Referring back to FIG. 47, a mixture-ratio determining portion 403 sets the mixture ratio α based on the area information supplied from the area specifying unit 103 and indicating to which of the foreground area, the background area, the covered background area, or the uncovered background area the pixel for which the mixture ratio α is to be calculated belongs. The mixture-ratio determining portion 403 sets the mixture ratio α to 0 when the corresponding pixel belongs to the foreground area, and sets the mixture ratio α to 1 when the corresponding pixel belongs to the background area. When the corresponding pixel belongs to the covered background area, the mixture-ratio determining portion 403 sets the estimated mixture ratio supplied from the estimated-mixture-ratio processor 401 as the mixture ratio α. When the corresponding pixel belongs to the uncovered background area, the mixture-ratio determining portion 403 sets the estimated mixture ratio supplied from the estimated-mixture-ratio processor 402 as the mixture ratio α. The mixture-ratio determining portion 403 outputs the mixture ratio α which has been set based on the area information.

Figure 55:
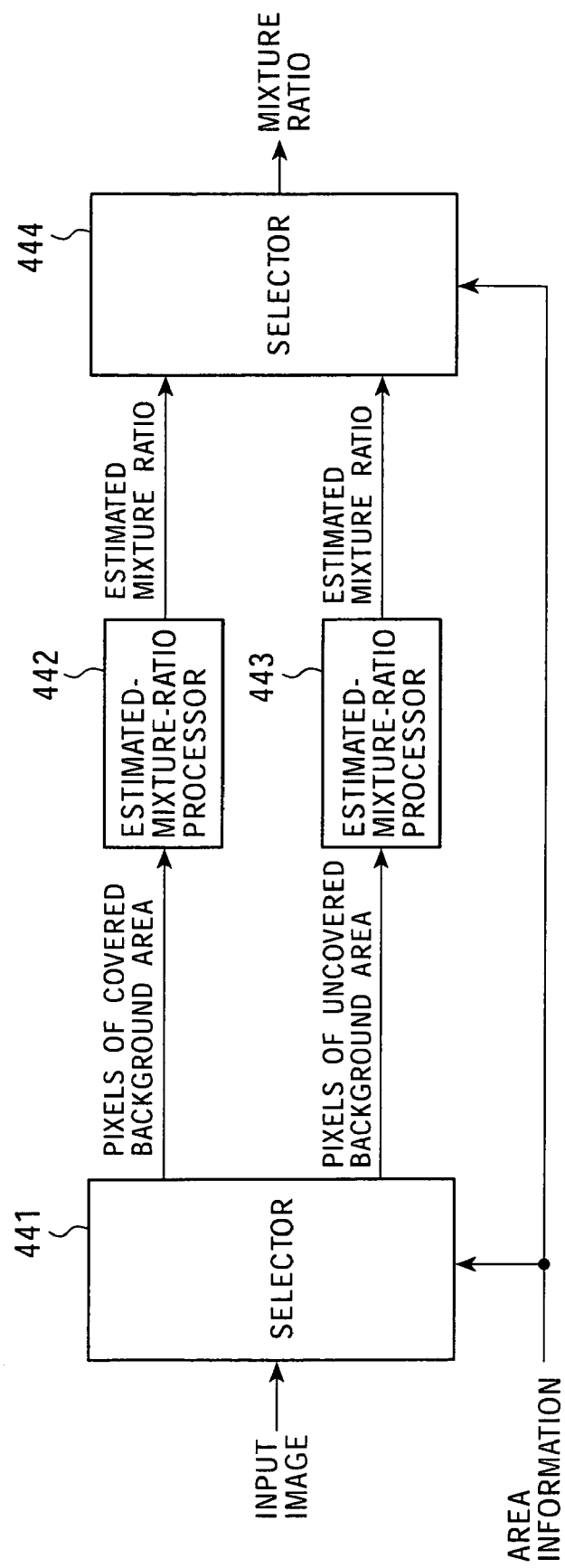
FIG. 55 is a block diagram illustrating the configuration of the mixture-ratio calculator 104.

FIG. 55 is a block diagram illustrating another configuration of the mixture-ratio calculator 104. A selector 441 supplies a pixel belonging to the covered background area and the corresponding pixel in the previous and subsequent frames to an estimated-mixture-ratio processor 442 based on the area information supplied from the area specifying unit 103. The selector 441 supplies a pixel belonging to the uncovered background area and the corresponding pixel in the previous and subsequent frames to an estimated-mixture-ratio processor 443 based on the area information supplied from the area specifying unit 103.

Based on the pixel values input from the selector 441, the estimated-mixture-ratio processor 442 calculates the estimated mixture ratio of the designated pixel belonging to the covered background area by the calculation shown in equation (21), and supplies the calculated estimated mixture ratio to a selector 444.

Based on the pixel values input from the selector 441, the estimated-mixture-ratio processor 443 calculates the estimated mixture ratio of the designated pixel belonging to the uncovered background area by the calculation shown in equation (22), and supplies the calculated estimated mixture ratio to the selector 444.

Based on the area information supplied from the area specifying unit 103, the selector 444 sets the mixture ratio α to 0 when the designated pixel belongs to the foreground area, and sets the mixture ratio α to 1 when the designated pixel belongs to the background area. When the designated pixel belongs to the covered background area, the selector 444 selects the estimated mixture ratio supplied from the estimated-mixture-ratio processor 442 and sets it as the mixture ratio α. When the designated pixel belongs to the uncovered background area, the selector 444 selects the estimated mixture ratio supplied from the estimated-mixture-ratio processor 443 and sets it as the mixture ratio α. The selector 444 then outputs the mixture ratio α which has been selected and set based on the area information.

As discussed above, the mixture-ratio calculator 104 configured as shown in FIG. 55 is able to calculate the mixture ratio α for each pixel contained in the image, and outputs the calculated mixture ratio α.

The calculation processing for the mixture ratio α performed by the mixture-ratio calculator 104 configured as shown in FIG. 47 is discussed below with reference to the flowchart of FIG. 56. In step S401, the mixture-ratio calculator 104 obtains area information supplied from the area specifying unit 103. In step S402, the estimated-mixture-ratio processor 401 executes the processing for estimating the mixture ratio by using a model corresponding to a covered background area, and supplies the estimated mixture ratio to the mixture-ratio determining portion 403. Details of the processing for estimating the mixture ratio are discussed below with reference to the flowchart of FIG. 57.

In step S403, the estimated-mixture-ratio processor 402 executes the processing for estimating the mixture ratio by using a model corresponding to an uncovered background area, and supplies the estimated mixture ratio to the mixture-ratio determining portion 403.

In step S404, the mixture-ratio calculator 104 determines whether the mixture ratios have been estimated for the whole frame. If it is determined that the mixture ratios have not yet been estimated for the whole frame, the process returns to step S402, and the processing for estimating the mixture ratio α for the subsequent pixel is executed.

If it is determined in step S404 that the mixture ratios have been estimated for the whole frame, the process proceeds to step S405. In step S405, the mixture-ratio determining portion 403 sets the mixture ratio based on the area information supplied from the area specifying unit 103 and indicating to which of the foreground area, the background area, the covered background area, or the uncovered background area the pixel for which the mixture ratio α is to be calculated belongs. The mixture-ratio determining portion 403 sets the mixture ratio α to 0 when the corresponding pixel belongs to the foreground area, and sets the mixture ratio α to 1 when the corresponding pixel belongs to the background area. When the corresponding pixel belongs to the covered background area, the mixture-ratio determining portion 403 sets the estimated mixture ratio supplied from the estimated-mixture-ratio processor 401 as the mixture ratio α. When the corresponding pixel belongs to the uncovered background area, the mixture-ratio determining portion 403 sets the estimated mixture ratio supplied from the estimated-mixture-ratio processor 402 as the mixture ratio α. The processing is then completed.

As discussed above, the mixture-ratio calculator 104 is able to calculate the mixture ratio α, which indicates a feature quantity corresponding to each pixel, based on the area information supplied from the area specifying unit 103, and the input image.

The processing for calculating the mixture ratio α performed by the mixture-ratio calculator 104 configured as shown in FIG. 55 is similar to that discussed with reference to the flowchart of FIG. 56, and an explanation thereof is thus omitted.

Figure 56:
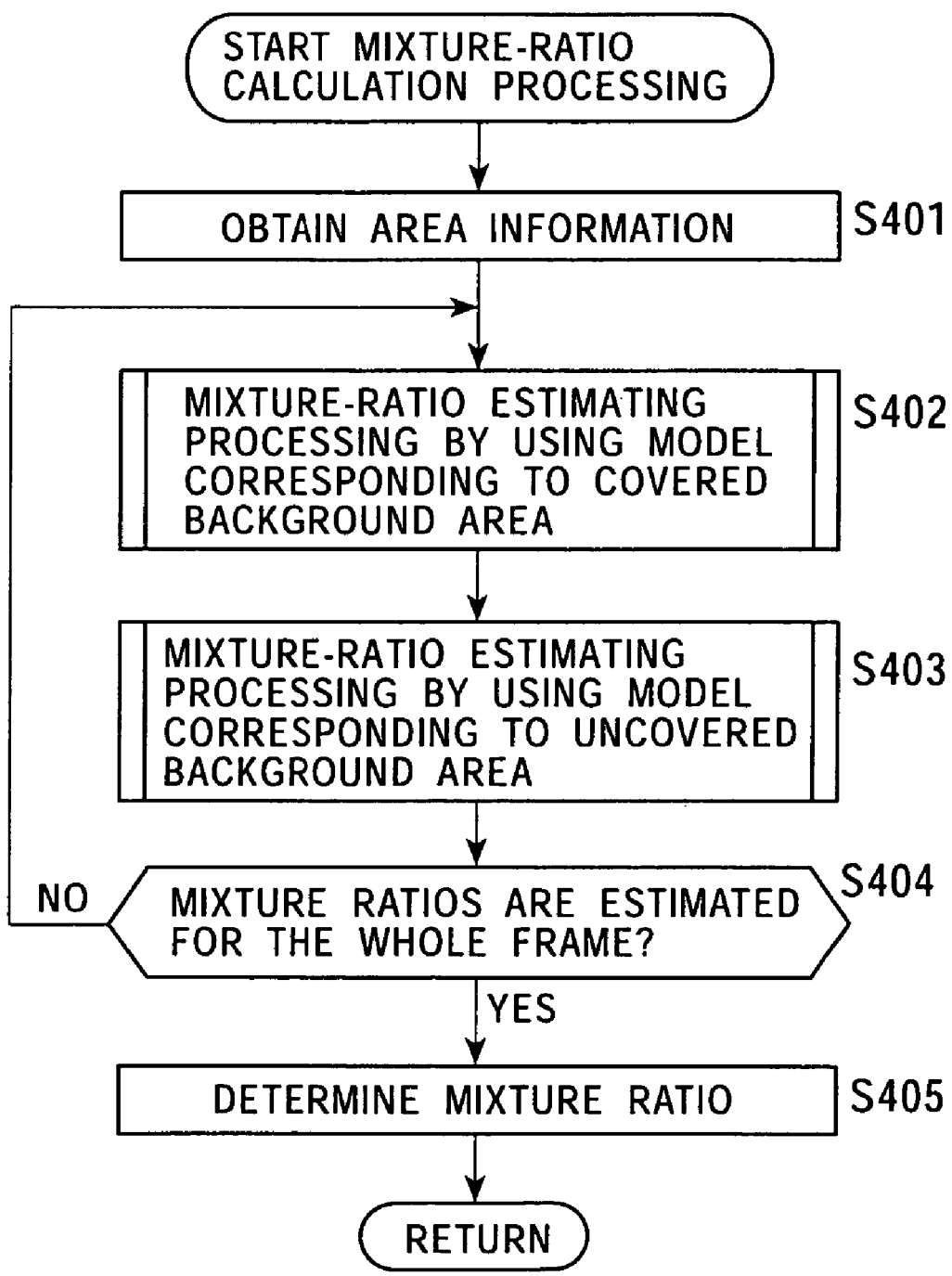
FIG. 56 is a flowchart illustrating the mixture-ratio calculation processing.
Figure 57:
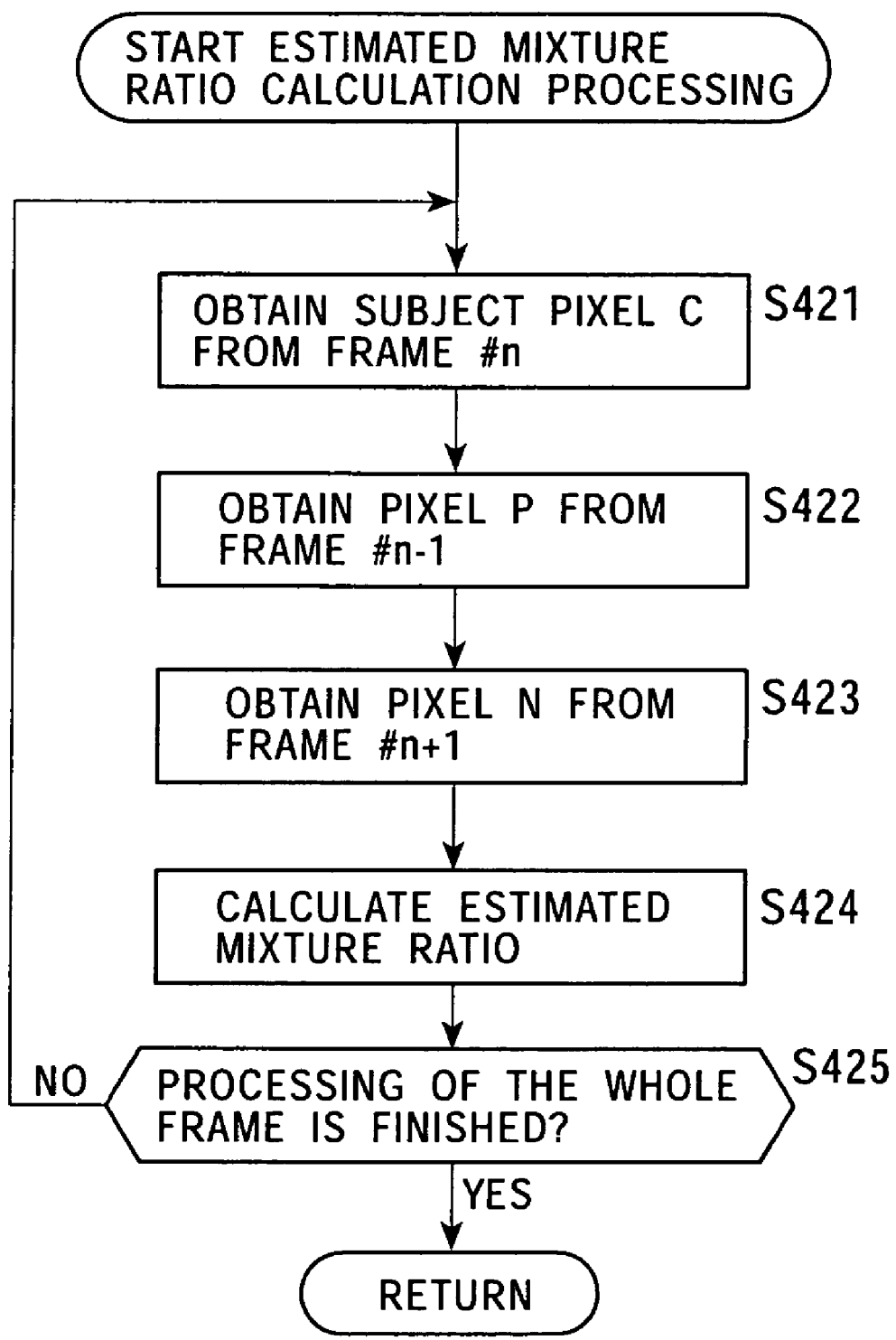
FIG. 57 is a flowchart illustrating the processing for calculating the estimated mixture ratio.

A description is now given, with reference to the flowchart of FIG. 57, of the mixture-ratio estimating processing by using a model of the covered background area in step S402 of FIG. 56.

In step S421, the mixture-ratio calculator 423 obtains the pixel value C of the designated pixel in frame #n from the frame memory 421.

In step S422, the mixture-ratio calculator 423 obtains the pixel value P of the pixel in frame #n−1, corresponding to the designated pixel, from the frame memory 422.

In step S423, the mixture-ratio calculator 423 obtains the pixel value N of the pixel in frame #n+1, corresponding to the designated pixel contained in the input image.

In step S424, the mixture-ratio calculator 423 calculates the estimated mixture ratio on the basis of the pixel value C of the designated pixel in frame #n, the pixel value P of the pixel in frame #n−1, and the pixel value N of the pixel in frame #n+1.

In step S425, the mixture-ratio calculator 423 determines whether or not processing for calculating the estimated mixture ratio is terminated for the whole frame. When it is determined that processing for calculating the estimated mixture ratio is not terminated for the whole frame, the process returns to step S421, and the processing for calculating the estimated mixture ratio for the next pixel is repeated.

When it is determined in step S425 that processing for calculating the estimated mixture ratio is terminated for the whole frame, the processing is terminated.

As discussed above, the estimated-mixture-ratio processor 401 is able to calculate the estimated mixture ratio based on the input image.

The mixture-ratio estimating processing by using a model corresponding to the uncovered background area in step S403 of FIG. 56 is similar to the processing indicated by the flowchart of FIG. 57 by using the equations corresponding to a model of the uncovered background area, and an explanation thereof is thus omitted.

The estimated-mixture-ratio processor 442 and the estimated-mixture-ratio processor 443 shown in FIG. 55 perform processing similar to that of the flowchart shown in FIG. 57 in order to calculate the estimated mixture ratio, and an explanation thereof is thus omitted.

The embodiment has been described, assuming that the object corresponding to the background is stationary. However, processing for determining the above-described mixture-ratio α can be applied even if the image corresponding to the background area contains motion. For example, if the image corresponding to the background area is uniformly moving, the estimated-mixture-ratio processor 401 shifts the overall image in accordance with the motion of the background, and performs processing in a manner similar to the case in which the object corresponding to the background is stationary. If the image corresponding to the background area contains locally different motions of the background, the estimated-mixture-ratio processor 401 selects the pixels corresponding to the motions of the background as the pixels belonging to the mixed area, and executes the above-described processing.

The mixture-ratio calculator 104 may execute the mixture-ratio estimating processing on all the pixels only by using a model corresponding to the covered background area, and outputs the calculated estimated mixture ratio as the mixture ratio α. In this case, the mixture ratio α indicates the ratio of the background components for the pixels belonging to the covered background area, and indicates the ratio of the foreground components for the pixels belonging to the uncovered background area. Concerning the pixels belonging to the uncovered background area, the absolute value of the difference between the calculated mixture-ratio α and 1 is determined, and the calculated absolute value is set as the mixture ratio α. Then, the image processing apparatus is able to determine the mixture ratio α indicating the ratio of the background components for the pixels belonging to the uncovered background area.

Similarly, the mixture-ratio processor 104 may execute the mixture-ratio estimating processing on all the pixels only by using a model corresponding to the uncovered background area, and outputs the calculated estimated mixture ratio as the mixture ratio α.

Next, a description is given of the estimated-mixture-ratio calculator 104 for calculating the mixture ratio α by using characteristics in which the mixture ratio α changes linearly.

As discussed above, since equations (11) and (12) each contain two variables, the mixture ratio α cannot be determined without modifying the equations.

By utilizing the characteristics in which the mixture ratio α linearly changes in accordance with a change in the position of the pixels because the object corresponding to the foreground is moving with constant velocity, an equation in which the mixture ratio α and the sum f of the foreground components are approximated in the spatial direction is established. By utilizing a plurality of sets of the pixel values of the pixels belonging to the mixed area and the pixel values of the pixels belonging to the background area, the equations in which the mixture ratio α and the sum f of the foreground components are approximated are solved.

When a change in the mixture ratio α is approximated as a straight line, the mixture ratio α can be expressed by equation (23).

$$\alpha = il + p \qquad (23)$$

In equation (23), i indicates the spatial index when the position of the designated pixel is set to 0, l designates the gradient of the straight line of the mixture ratio α, and p designates the intercept of the straight line of the mixture ratio α and also indicates the mixture ratio α of the designated pixel. In equation (23), the index i is known, and the gradient l and the intercept p are unknown.

Figure 58:
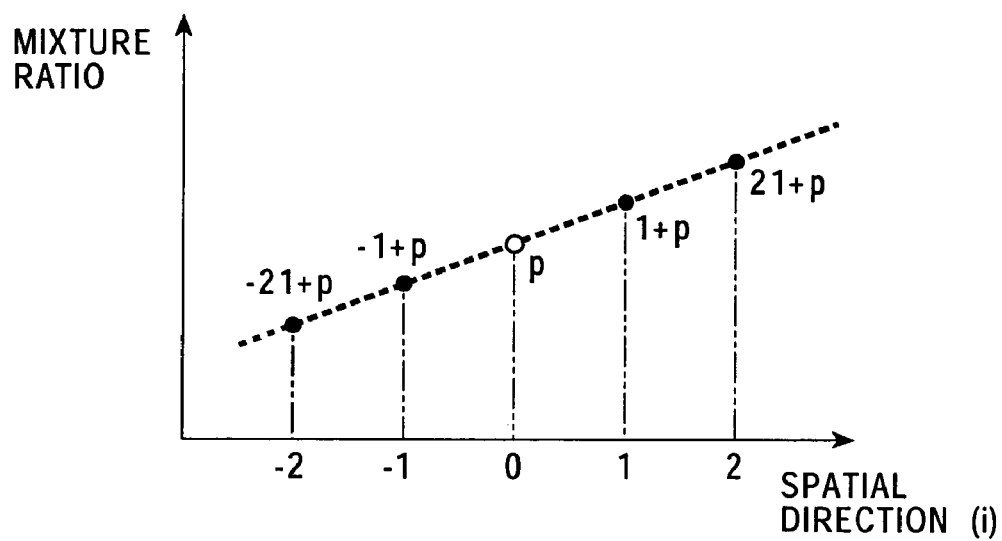
FIG. 58 illustrates a straight line for approximating the mixture ratio $\alpha$.

The relationship among the index i, the gradient l, and the intercept p is shown in FIG. 58. In FIG. 58, the while dot indicates the designated pixel, and the black dots indicate the pixels located in close proximity with the designated pixel.

By approximating the mixture ratio α as equation (23), a plurality of different mixture-ratios α for a plurality of pixels can be expressed by two variables. In the example shown in FIG. 58, the five mixture-ratios for five pixels are expressed by the two variables, i.e., the gradient l and the intercept p.

Figure 59:
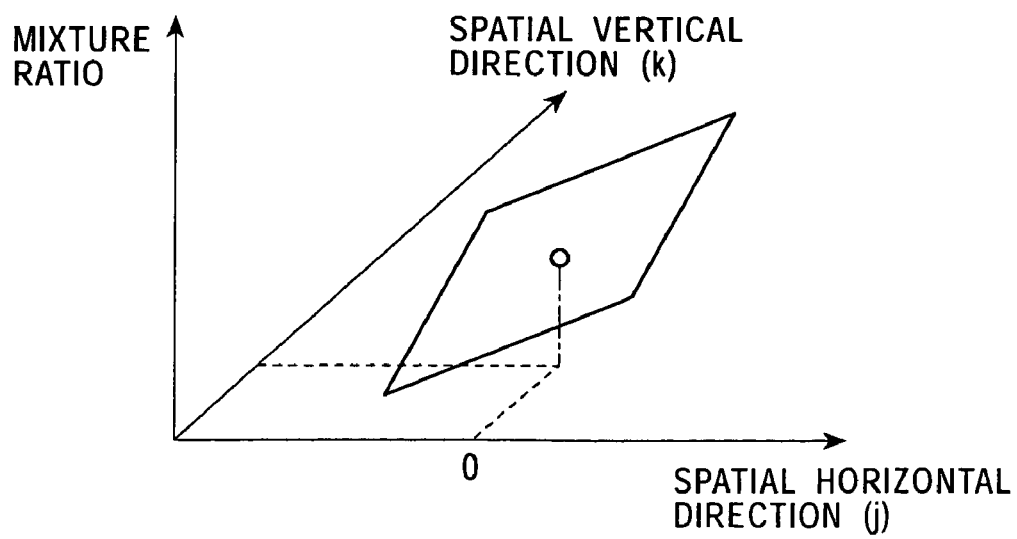
FIG. 59 illustrates a plane for approximating the mixture ratio $\alpha$.

When the mixture ratio α is approximated in the plane shown in FIG. 59, equation (23) is expanded into the plane by considering the movement v corresponding to the two directions, i.e., the horizontal direction and the vertical direction of the image, and the mixture ratio α can be expressed by equation (24). In FIG. 59, the white dot indicates the designated pixel.

$$\alpha = jm + kq + p \qquad (24)$$

In equation (24), j is the index in the horizontal direction and k is the index in the vertical direction when the position of the designated pixel is 0. m designates the horizontal gradient of the mixture ratio α in the plane, and q indicates the vertical gradient of the mixture ratio α in the plane. p indicates the intercept of the mixture ratio α in the plane.

For example, in frame #n shown in FIG. 49, equations (25) through (27) can hold true for C05 through C07, respectively.

$$C05 = \alpha 05 \cdot B05/v + f05 \qquad (25)$$

$$C06 = \alpha 06 \cdot B06/v + f06 \qquad (26)$$

$$C07 = \alpha 07 \cdot B07/v + f07 \qquad (27)$$

Assuming that the foreground components positioned in close proximity with each other are equal to each other, i.e., that F01 through F03 are equal, equation (28) holds true by replacing F01 through F03 by fc.

$$f(x) = (1 - \alpha(x)) \cdot Fc \qquad (28)$$

In equation (28), x indicates the position in the spatial direction.

When α(x) is replaced by equation (24), equation (28) can be expressed by equation (29).

$$\begin{aligned} f(x) &= (1 - (jm + kq + p)) \cdot Fc \\ &= j \cdot (-m \cdot Fc) + k \cdot (-q \cdot Fc) + ((1 - p) \cdot Fc) \\ &= js + kt + u \end{aligned} \qquad (29)$$

In equation (29), (−m·Fc), (−q·Fc), and (1−p)·Fc are replaced, as expressed by equations (30) through (32), respectively.

$$s = -m \cdot Fc \qquad (30)$$

$$t = -q \cdot Fc \qquad (31)$$

$$u = (1-p) \cdot Fc \qquad (32)$$

In equation (29), j is the index in the horizontal direction and k is the index in the vertical direction when the position of the designated pixel is 0.

As discussed above, since it can be assumed that the object corresponding to the foreground is moving with constant velocity within the shutter time, and that the foreground components positioned in close proximity with each other are uniform, the sum of the foreground components can be approximated by equation (29).

When the mixture ratio α is approximated by a straight line, the sum of the foreground components can be expressed by equation (33).

$$f(x) = is + u \qquad (33)$$

By replacing the mixture ratio α and the sum of the foreground components in equation (92) by using equations (24) and (29), the pixel value M can be expressed by equation (34).

$$M = (jm + kq + p) \cdot B + js + kt + u \tag{34}$$
$$= jB \cdot m + kB \cdot q + B \cdot p + j \cdot s + k \cdot t + u$$

In equation (34), unknown variables are six factors, such as the horizontal gradient m of the mixture ratio α in the plane, the vertical gradient q of the mixture ratio α in the plane, and the intercepts of the mixture ratio α in the plane, p, s, t, and u.

According to the pixels in close proximity with the designated pixel, the pixel value M or the pixel value B is set in the normal equation shown in equation (34). Then, a plurality of normal equations in which the pixel value M or the pixel value B is set are solved by the method of least squares, thereby calculating the mixture ratio α.

For example, the horizontal index j of the designated pixel is set to 0, and the vertical index k is set to 0. Then, the pixel value M or the pixel value B is set in normal equation (34) for 3×3 pixels located close to the designated pixel, thereby obtaining equations (35) through (43).

$$M_{-1,-1} = (-1) \cdot B_{-1,-1} \cdot m + (-1) \cdot B_{-1,-1} \cdot q + B_{-1,-1} \cdot p + (-1) \cdot s + (-1) \cdot t + u \tag{35}$$

$$M_{0,-1} = (0) \cdot B_{0,-1} \cdot m + (-1) \cdot B_{0,-1} \cdot q + B_{0,-1} \cdot p + (0) \cdot s + (-1) \cdot t + u \tag{36}$$

$$M_{+1,-1} = (+1) \cdot B_{+1,-1} \cdot m + (-1) \cdot B_{+1,-1} \cdot q + B_{+1,-1} \cdot p + (+1) \cdot s + (-1) \cdot t + u \tag{37}$$

$$M_{-1,0} = (-1) \cdot B_{-1,0} \cdot m + (0) \cdot B_{-1,0} \cdot q + B_{1,0} \cdot p + (-1) \cdot s + (0) \cdot t + u \tag{38}$$

$$M_{0,0} = (0) \cdot B_{0,0} \cdot m + (0) \cdot B_{0,0} \cdot q + B_{0,0} \cdot p + (0) \cdot s + (0) \cdot t + u \tag{39}$$

$$M_{+1,0} = (+1) \cdot B_{+1,0} \cdot m + (0) \cdot B_{+1,0} \cdot q + B_{+1,0} \cdot p + (+1) \cdot s + (0) \cdot t + u \tag{40}$$

$$M_{-1,+1} = (-1) \cdot B_{-,+1} \cdot m + (+1) \cdot B_{-1,+1} \cdot q + B_{-1,+1} \cdot p + (-1) \cdot s + (+1) \cdot t + u \tag{41}$$

$$M_{0,+1} = (0) \cdot B_{0,+1} \cdot m + (+1) \cdot B_{0,+1} \cdot q + B_{0,+1} \cdot p + (0) \cdot s + (+1) \cdot t + u \tag{42}$$

$$M_{+1,+1} = (+1) \cdot B_{+1,+1} \cdot m + (+1) \cdot B_{+1,+1} \cdot q + B_{+1,+1} \cdot p + (+1) \cdot s + (+1) \cdot t + u \tag{43}$$

Since the horizontal index j of the designated pixel is 0, and the vertical index k of the designated pixel is 0, the mixture ratio α of the designated pixel is equal to the value when j is 0 and k is 0 in equation (24), i.e., the mixture ratio α is equal to the intercept p in equation (24).

Accordingly, based on nine equations, i.e., equations (35) through (43), the horizontal gradient m, the vertical gradient q, and the intercepts p, s, t, and u are calculated by the method of least squares, and the intercept p is output as the mixture ratio α.

A specific process for calculating the mixture ratio α by applying the method of least squares is as follows.

When the index i and the index k are indicated by a single index x, the relationship among the index i, the index k, and the index x is expressed by equation (44).

$$x = (j+1) \cdot 3 + (k+1) \tag{44}$$

It is now assumed that the horizontal gradient m, the vertical gradient q, and the intercepts p, s, t, and u are expressed by variables w0, w1, w2, w3, w4, and w5, respectively, and jB, kB, B, j, k and l are expressed by a0, a1, a2, a3, a4, and a5, respectively. In consideration of the error ex, equations (35) through (43) can be modified into equation (45).

$$Mx = \sum_{y=0}^{5} ay \cdot wy + ex \tag{45}$$

In equation (45), x is any one of the integers from 0 to 8.

Equation (46) can be found from equation (45).

$$ex = Mx - \sum_{y=0}^{5} ay \cdot wy \tag{46}$$

Since the method of least squares is applied, the square sum E of the error is defined as follows, as expressed by equation (47).

$$E = \sum_{x=0}^{8} ex^2 \tag{47}$$

In order to minimize the error, the partial differential value of the variable Wv with respect to the square sum E of the error should be 0. v is any one of the integers from 0 to 5. Thus, wy is determined so that equation (48) is satisfied.

$$\frac{\partial E}{\partial Wv} = 2 \cdot \sum_{x=0}^{8} ex \cdot \frac{\partial ex}{\partial Wv} \tag{48}$$
$$= 2 \cdot \sum_{x=0}^{8} ex \cdot av = 0$$

By substituting equation (46) into equation (48), equation (49) is obtained.

$$\sum_{x=0}^{8} \left( av \cdot \sum_{y=0}^{5} ay \cdot Wy \right) = \sum_{x=0}^{8} av \cdot Mx \tag{49}$$

For example, the sweep-out method (Gauss-Jordan elimination) is applied to the normal equations of six normal equations obtained by substituting one of the integers from 0 to 5 into v in equation (49), thereby obtaining wy. As stated above, w0 is the horizontal gradient m, w1 is the vertical gradient q, w2 is the intercept p, w3 is s, w4 is t, and w5 is u.

As discussed above, by applying the method of least squares to the equations in which the pixel value M and the pixel value B are set, the horizontal gradient m, the vertical gradient q, and the intercepts p, s, t, and u can be determined.

A description has been given with reference to equations (35) through (43), by assuming that the pixel value of the pixel contained in the mixed area is M, and the pixel value of the pixel contained in the background area is B. In this case, it is necessary to set normal equations for each of the cases where the designated pixel is contained in the covered background area, or the designated pixel is contained in the uncovered background area.

For example, when the mixture ratio α of the pixel contained in the covered background area in frame #n shown in FIG. 49 is determined, C04 through C08 of the pixels in frame #n and the pixel values P04 through P08 of the pixels in frame #n−1 are set in the normal equations.

For determining the mixture ratio α of the pixel contained in the uncovered background area in frame #n shown in FIG. 50, the pixels C28 through C32 of frame #n and the pixel values N28 through N32 of the pixels in frame #n+1 are set in the normal equations.

Figure 60:
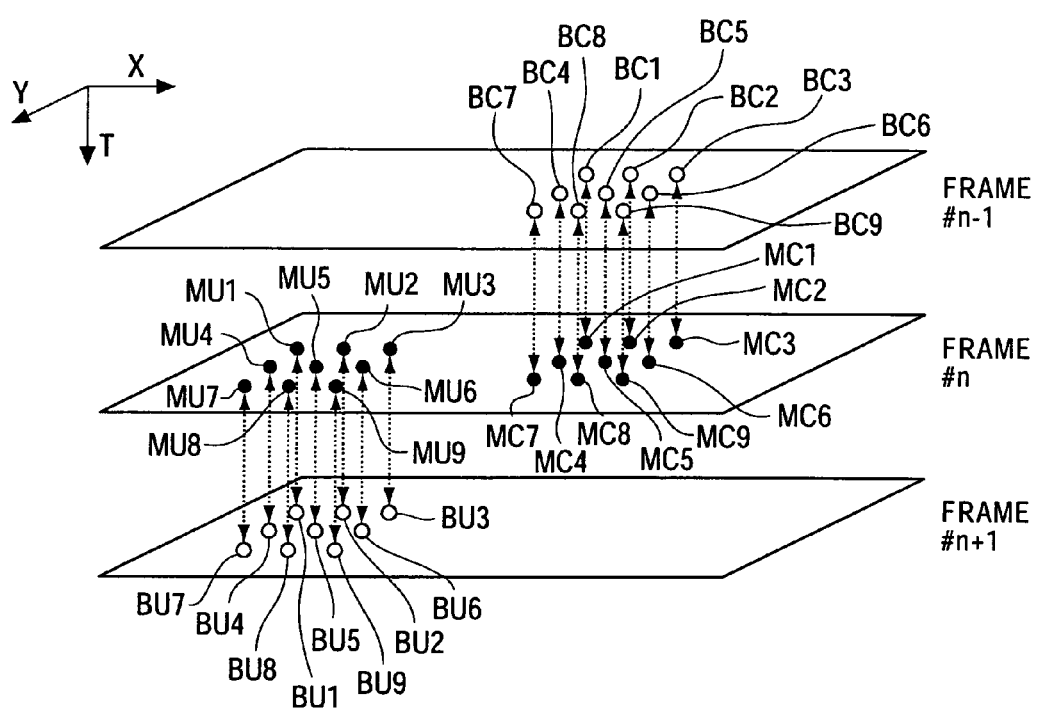
FIG. 60 illustrates the relationships of the pixels in a plurality of frames when the mixture ratio $\alpha$ is calculated.

Moreover, if, for example, the mixture ratio α of the pixel contained in the covered background area shown in FIG. 60 is calculated, the following equations (50) through (58) are set. In FIG. 60, the white dots indicate pixels to belong to the background, and the black dots indicate pixels to belong to the mixed area. The pixel value of the pixel $$Mc1=(-1)\cdot Bc1\cdot m+(-1)\cdot Bc1\cdot q+Bc1\cdot p+(-1)\cdot s+(-1)\cdot t+u \quad (50)$$

$$Mc2=(0)\cdot Bc2\cdot m+(-1)\cdot Bc2\cdot q+Bc2\cdot p+(0)\cdot s+(-1)\cdot t+u \quad (51)$$

$$Mc3=(+1)\cdot Bc3\cdot m+(-1)\cdot Bc3\cdot q+Bc3\cdot p+(+1)\cdot s+(-1)\cdot t+u \quad (52)$$

$$Mc4=(-1)\cdot Bc4\cdot m+(0)\cdot Bc4\cdot q+Bc4\cdot p+(-1)\cdot s+(0)\cdot t+u \quad (53)$$

$$Mc5=(0)\cdot Bc5\cdot m+(0)\cdot Bc5\cdot q+Bc5\cdot p+(0)\cdot s+(0)\cdot t+u \quad (54)$$

$$Mc6=(+1)\cdot Bc6\cdot m+(0)\cdot Bc6\cdot q+Bc6\cdot p+(+1)\cdot s+(0)\cdot t+u \quad (55)$$

$$Mc7=(-1)\cdot Bc7\cdot m+(+1)\cdot Bc7\cdot q+Bc7\cdot p+(-1)\cdot s+(+1)\cdot t+u \quad (56)$$

$$Mc8=(0)\cdot Bc8\cdot m+(+1)\cdot Bc8\cdot q+Bc8\cdot p+(0)\cdot s+(+1)\cdot t+u \quad (57)$$

$$Mc9=(+1)\cdot Bc9\cdot m+(+1)\cdot Bc9\cdot q+Bc9\cdot p+(+1)\cdot s+(+1)\cdot t+u \quad (58)$$

For calculating the mixture ratio α of the pixel contained in the covered background area in frame #n, the pixel values Bc1 through Bc9 of the pixels of the background area in frame #n−1 corresponding to the pixels in frame #n in equations (50) through (58), respectively, are used.

When the mixture ratio α of the pixel contained in the uncovered background area shown in FIG. 60 is calculated, the following equations (59) through (77) are set. The pixel value of the pixel for which the mixture ratio α is calculated is Mu5.

$$Mu1=(-1)\cdot Bu1\cdot m+(-1)\cdot Bu1\cdot q+Bu1\cdot p+(-1)\cdot s+(-1)\cdot t+u \quad (59)$$

$$Mu2=(0)\cdot Bu2\cdot m+(-1)\cdot Bu2\cdot q+Bu2\cdot p+(0)\cdot s+(-1)\cdot t+u \quad (60)$$

$$Mu3=(+1)\cdot Bu3\cdot m+(-1)\cdot Bu3\cdot q+Bu3\cdot p+(+1)\cdot s+(-1)\cdot t+u \quad (61)$$

$$Mu4=(-1)\cdot Bu4\cdot m+(0)\cdot Bu4\cdot q+Bu4\cdot p+(-1)\cdot s+(0)\cdot t+u \quad (62)$$

$$Mu5=(0)\cdot Bu5\cdot m+(0)\cdot Bu5\cdot q+Bu5\cdot p+(0)\cdot s+(0)\cdot t+u \quad (63)$$

$$Mu6=(+1)\cdot Bu6\cdot m+(0)\cdot Bu6\cdot q+Bu6\cdot p+(+1)\cdot s+(0)\cdot t+u \quad (64)$$

$$Mu7=(-1)\cdot Bu7\cdot m+(+1)\cdot Bu7\cdot q+Bu7\cdot p+(-1)\cdot s+(+1)\cdot t+u \quad (65)$$

$$Mu8=(0)\cdot Bu8\cdot m+(+1)\cdot Bu8\cdot q+Bu8\cdot p+(0)\cdot s+(+1)\cdot t+u \quad (66)$$

$$Mu9=(+1)\cdot Bu9\cdot m+(+1)\cdot Bu9\cdot q+Bu9\cdot p+(+1)\cdot s+(+1)\cdot t+u \quad (67)$$

For calculating the mixture ratio α of the pixel contained in the uncovered background area in frame #n, the pixel values Bu1 through Bu9 of the pixels of the background area in frame #n+1 corresponding to the pixels in frame #n in equations (59) through (67), respectively, are used.

Figure 61:
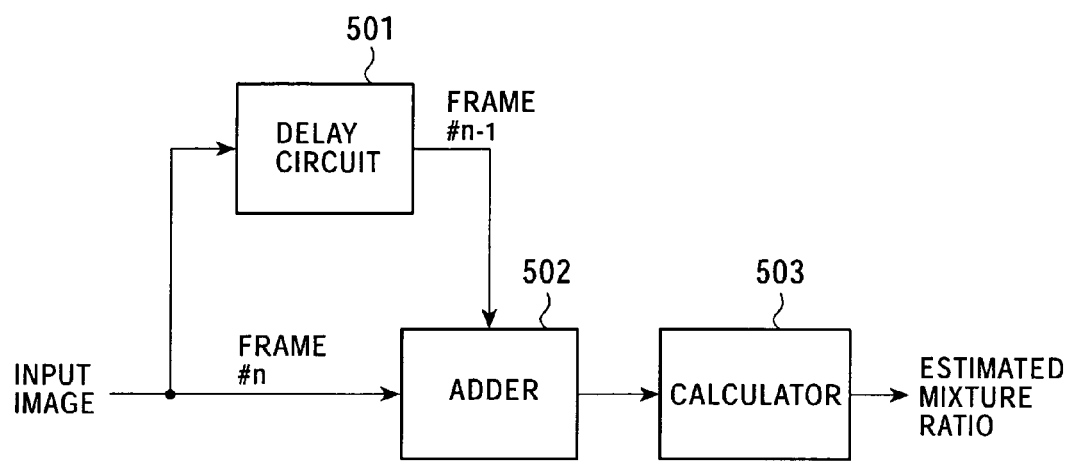
FIG. 61 is a block diagram illustrating another configuration of the estimated-mixture-ratio processor 401.

FIG. 61 is a block diagram illustrating the configuration of the estimated-mixture-ratio processor 401. An image input into the estimated-mixture-ratio processor 401 is supplied to a delay circuit 501 and an adder 502.

The delay circuit 501 delays the input image for one frame, and supplies the image to the adder 502. When frame #n is supplied as the input image to the adder 502, the delay circuit 501 supplies frame #n−1 to the adder 502.

The adder 502 sets the pixel value of the pixel adjacent to the pixel for which the mixture ratio α is calculated, and the pixel value of frame #n−1 in the normal equation. For example, the adder 502 sets the pixel values Mc1 through Mc9 and the pixel values Bc1 through Bc9 in the normal equations based on equations (50) through (58), respectively. The adder 502 supplies the normal equations in which the pixel values are set to a calculator 503.

The calculator 423 determines the estimated mixture ratio by solving the normal equations supplied from the adder 502 by using the sweep-out method, and outputs the determined estimated mixture ratio.

In this manner, the estimated-mixture-ratio processor 401 is able to calculate the estimated mixture ratio based on the input image, and supplies it to the mixture ratio determining portion 403.

The estimated-mixture-ratio processor 402 is configured similar to the estimated-mixture-ratio processor 401, and an explanation thereof is thus omitted.

Figure 62:
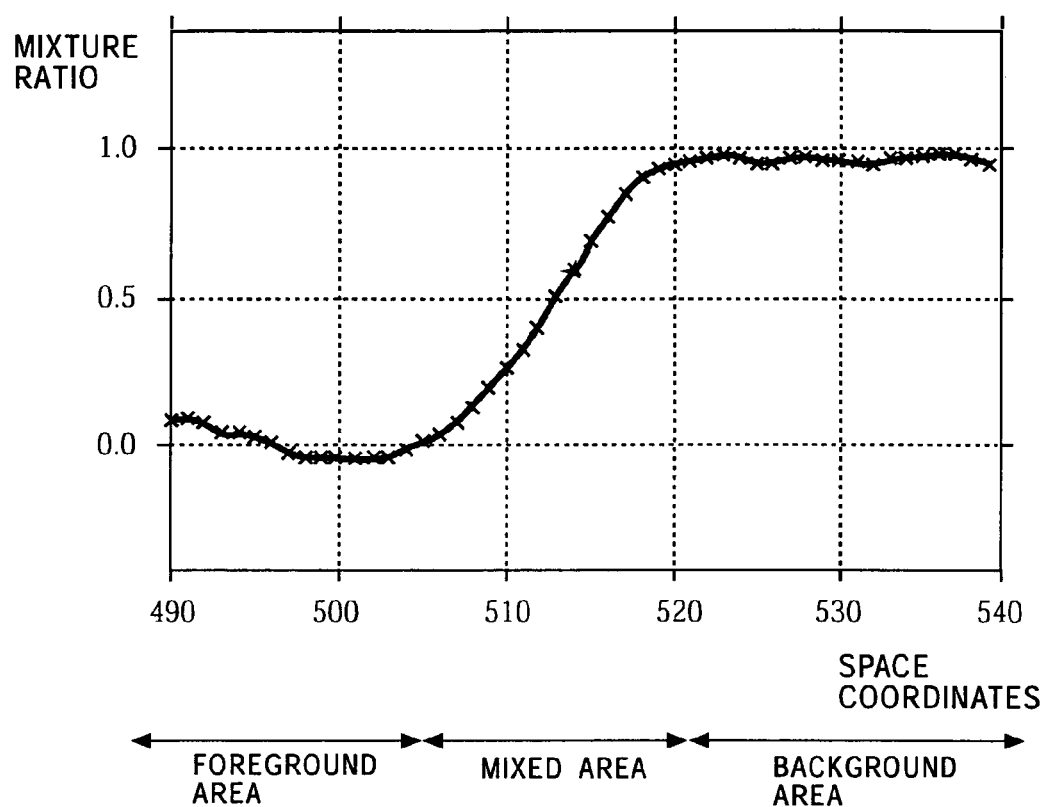
FIG. 62 illustrates an example of an estimated mixture ratio.

FIG. 62 shows an example of the estimated mixture ratio calculated by the estimated-mixture-ratio processor 401. For the estimated mixture ratio shown in FIG. 62, the motion v of the foreground corresponding to an object moving with constant velocity is 11, and the results calculated by generating an equation using blocks of 7×7 pixels as units are shown for one line.

It can be seen from FIG. 61 that the estimated mixture ratio changes approximately linearly in the mixed area.

Figure 63:
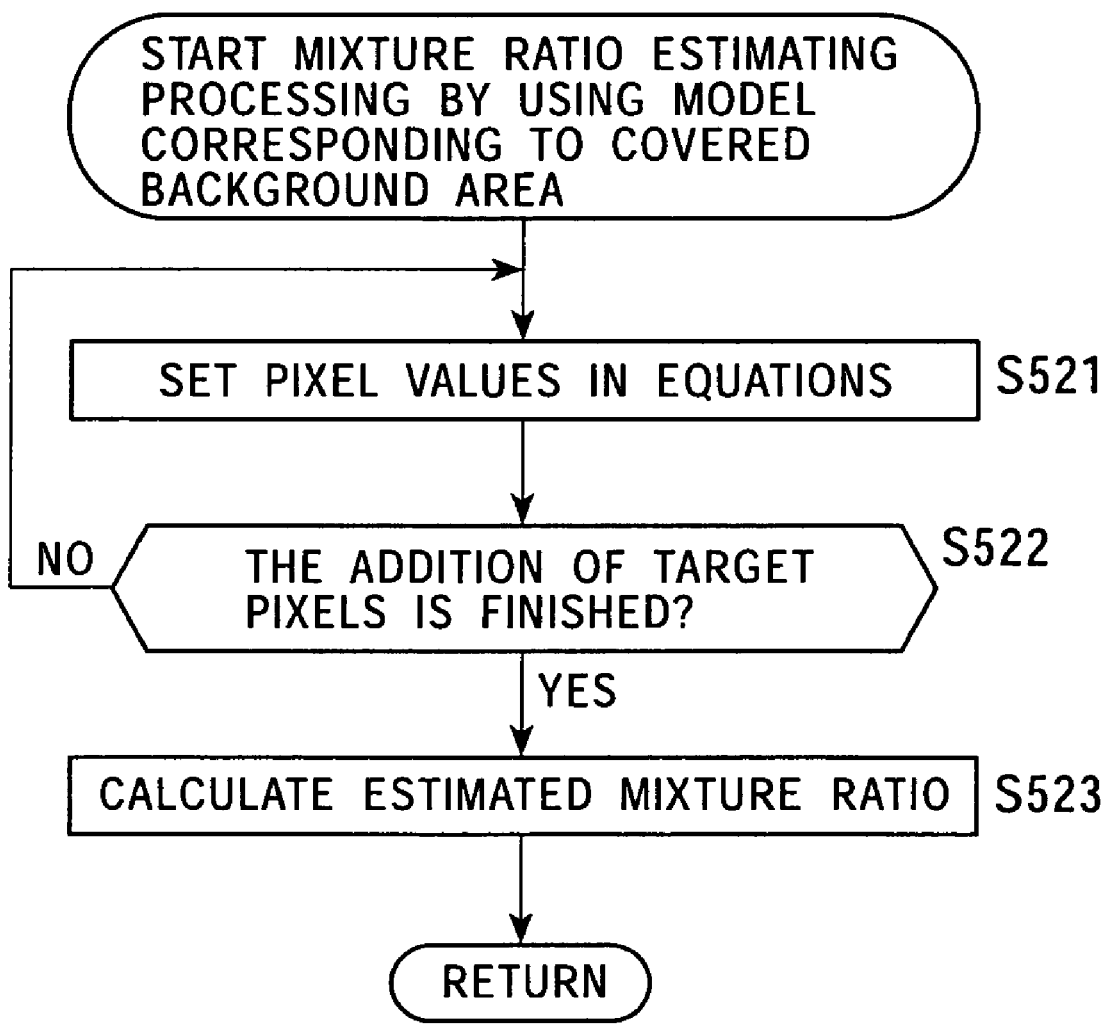
FIG. 63 is a flowchart illustrating the mixture-ratio estimating processing by using a model corresponding to a covered background area.

A description is now given, with reference to the flowchart of FIG. 63, of the mixture ratio estimating processing by the estimated-mixture-ratio processor 401 having the configuration shown in FIG. 61 by using a model of the covered background area.

In step S521, the adder 502 sets the pixel value contained in the input image and the pixel value contained in the image supplied from the delay circuit 501 in a normal equation corresponding to a model of the covered background area.

In step S522, the estimated-mixture-ratio processor 401 determines whether the setting of the target pixels is finished. If it is determined that the setting of the target pixels is not finished, the process returns to step S521, and the processing for setting the pixel values in the normal equation is repeated.

If it is determined in step S522 that the setting for the target pixels is finished, the process proceeds to step S523. In step S523, a calculator 503 calculates the estimated mixture ratio based on the normal equations in which the pixels values are set, and outputs the calculated mixture-ratio.

As discussed above, the estimated-mixture-ratio processor 401 having the configuration shown in FIG. 61 is able to calculate the estimated mixture ratio based on the input image.

The mixture-ratio estimating processing by using a model corresponding to the uncovered background area is similar to the processing indicated by the flowchart of FIG. 63 by using the normal equations corresponding to a model of the uncovered background area, and an explanation thereof is thus omitted.

The embodiment has been described, assuming that the object corresponding to the background is stationary. However, the above-described mixture-ratio calculation processing can be applied even if the image corresponding to the background area contains motion. For example, if the image corresponding to the background area is uniformly moving, the estimated-mixture-ratio processor 401 shifts the overall image in accordance with this motion, and performs processing in a manner similar to the case in which the object corresponding to the background is stationary. If the image corresponding to the background area contains locally different motions, the estimated-mixture-ratio processor 401 selects the pixels corresponding to the motions as the pixels belonging to the mixed area, and executes the above-described processing.

As described above, the mixture-ratio calculator 102 is able to calculate the mixture ratio $\alpha$, which is a feature quantity corresponding to each pixel, based on the input image and the area information supplied from the area specifying unit 101.

By utilizing the mixture ratio $\alpha$, it is possible to separate the foreground components and the background components contained in the pixel values while maintaining the information of motion blur contained in the image corresponding to the moving object.

By combining the images based on the mixture ratio $\alpha$, it is also possible to generate an image which contains correct motion blur that coincides with the speed of a moving object and which faithfully reflects the real world.

Figure 64:
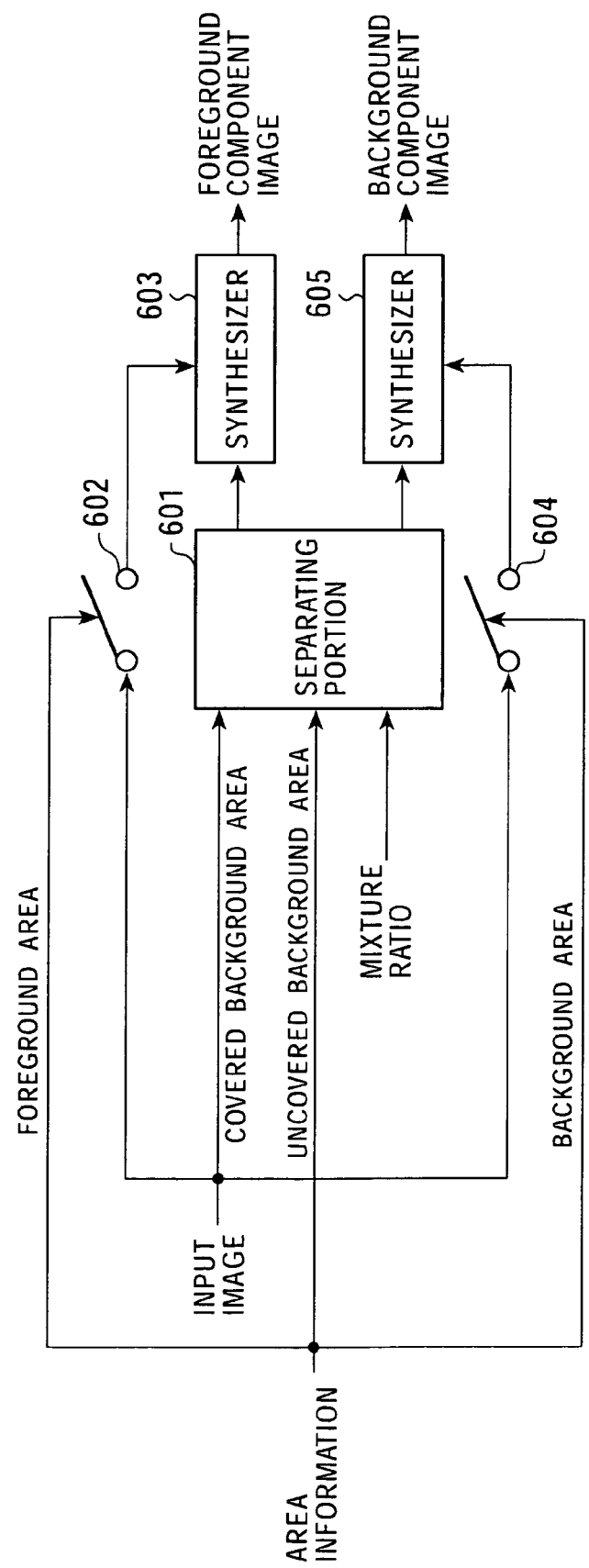
FIG. 64 is a block diagram illustrating an example of the configuration of a foreground/background separator 105.

The foreground/background separator 105 is discussed below. FIG. 64 is a block diagram illustrating an example of the configuration of the foreground/background separator 105. The input image supplied to the foreground/background separator 105 is supplied to a separating portion 601, a switch 602, and a switch 604. The area information supplied from the area specifying unit 103 and indicating the information of the covered background area and the uncovered background area is supplied to the separating portion 601. The area information indicating the foreground area is supplied to the switch 602. The area information indicating the background area supplied to the switch 604.

The mixture ratio $\alpha$ supplied from the mixture-ratio calculator 104 is supplied to the separating portion 601.

The separating portion 601 separates the foreground components from the input image based on the area information indicating the covered background area, the area information indicating the uncovered background area, and the mixture ratio $\alpha$, and supplies the separated foreground components to a synthesizer 603. The separating portion 601 also separates the background components from the input image, and supplies the separated background components to a synthesizer 605.

The switch 602 is closed when a pixel corresponding to the foreground is input based on the area information indicating the foreground area, and supplies only the pixels corresponding to the foreground contained in the input image to the synthesizer 603.

The switch 604 is closed when a pixel corresponding to the background is input based on the area information indicating the background area, and supplies only the pixels corresponding to the background contained in the input image to the synthesizer 605.

The synthesizer 603 synthesizes a foreground component image based on the foreground components supplied from the separating portion 601 and the pixels corresponding to the foreground supplied from the switch 602, and outputs the synthesized foreground component image. Since the foreground area and the mixed area do not overlap, the synthesizer 603 applies, for example, logical OR to the foreground components and the foreground pixels, thereby synthesizing the foreground component image.

In the initializing processing executed at the start of the synthesizing processing for the foreground component image, the synthesizer 603 stores an image whose pixel values are all 0 in a built-in frame memory. Then, in the synthesizing processing for the foreground component image, the synthesizer 603 stores the foreground component image (overwrites the previous image by the foreground component image). Accordingly, 0 is stored in the pixels corresponding to the background area in the foreground component image output from the synthesizer 603.

The synthesizer 605 synthesizes a background component image based on the background components supplied from the separating portion 601 and the pixels corresponding to the background supplied from the switch 604, and outputs the synthesized background component image. Since the background area and the mixed area do not overlap, the synthesizer 605 applies, for example, logical OR to the background components and the background pixels, thereby synthesizing the background component image.

In the initializing processing executed at the start of the synthesizing processing for the background component image, the synthesizer 605 stores an image whose pixel values are all 0 in a built-in frame memory. Then, in the synthesizing processing for the background component image, the synthesizer 605 stores the background component image (overwrites the previous image by the background component image). Accordingly, 0 is stored in the pixels corresponding to the foreground area in the background component image output from the synthesizer 605.

Figure 65B:
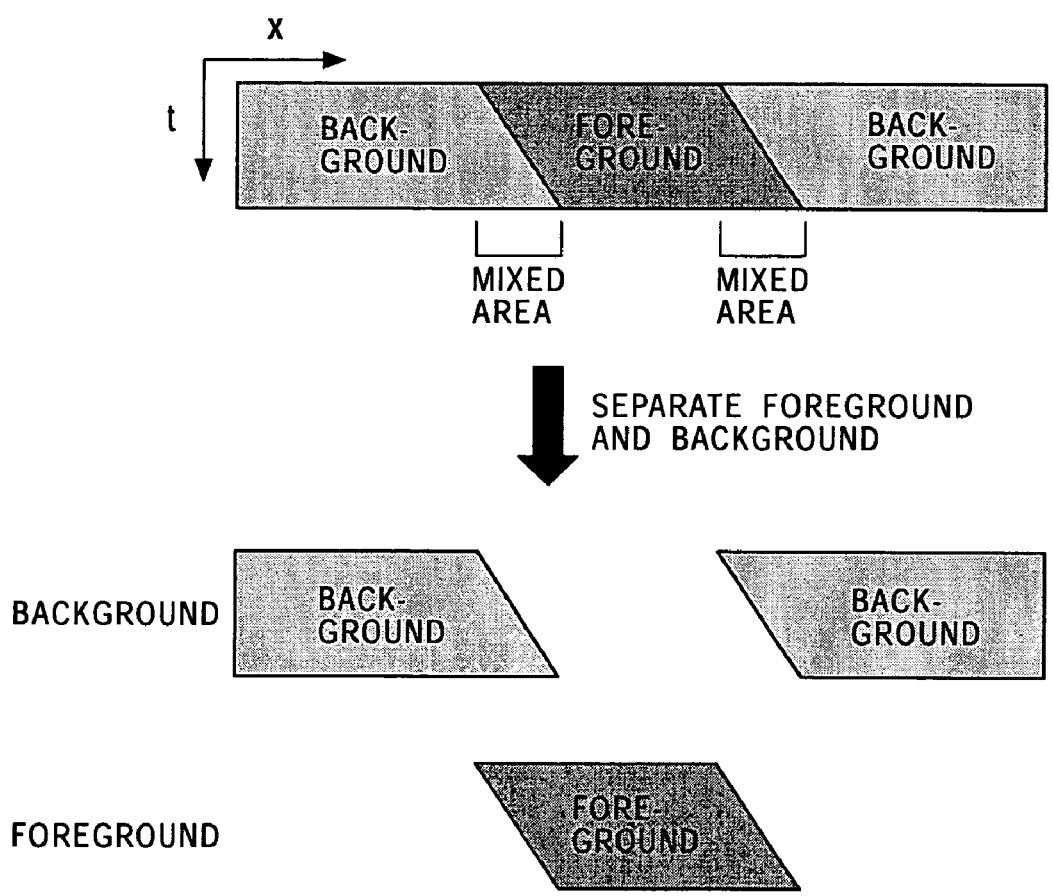
FIG. 65B illustrates a model of an input image, a foreground component image, and a background component image.

FIG. 65A illustrates the input image input into the foreground/background separator 105 and the foreground component image and the background component image output from the foreground/background separator 105. FIG. 65B illustrates a model corresponding to the input image input into the foreground/background separator 105 and the foreground component image and the background component image output from the foreground/background separator 105.

FIG. 65A is a schematic diagram illustrating the image to be displayed, and FIG. 65B is a model obtained by expanding in the time direction the pixels disposed in one line including the pixels belonging to the foreground area, the pixels belonging to the background area, and the pixels belonging to the mixed area corresponding to FIG. 65A.

As shown in FIGS. 65A and 65B, the background component image output from the foreground/background separator 105 consists of the pixels belonging to the background area and the background components contained in the pixels of the mixed area.

As shown in FIGS. 65A and 65B, the foreground component image output from the foreground/background separator 105 consists of the pixel belonging to the foreground area and the foreground components contained in the pixels of the mixed area.

The pixel values of the pixels in the mixed area are separated into the background components and the foreground components by the foreground/background separator 105. The separated background components form the background component image together with the pixels belonging to the background area. The separated foreground components form the foreground component image together with the pixels belonging to the foreground area.

As discussed above, in the foreground component image, the pixel values of the pixels corresponding to the background area are set to 0, and significant pixel values are set in the pixels corresponding to the foreground area and the pixels corresponding to the mixed area. Similarly, in the background component image, the pixel values of the pixels corresponding to the foreground area are set to 0, and significant pixel values are set in the pixels corresponding to the background area and the pixels corresponding to the mixed area.

A description is given below of the processing executed by the separating portion 601 for separating the foreground components and the background components from the pixels belonging to the mixed area.

Figure 66:
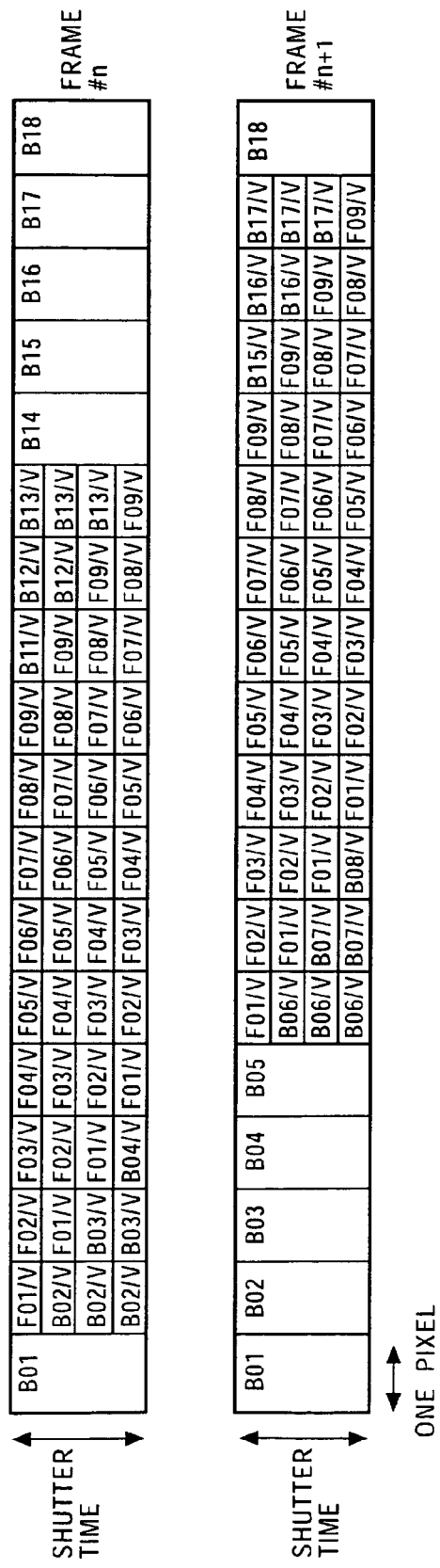
FIG. 66 illustrates a model in which pixel values are expanded in the time direction and the period corresponding to the shutter time is divided.

FIG. 66 illustrates a model of an image indicating foreground components and background components in two frames including a foreground object moving from the left to the right in FIG. 66. In the model of the image shown in FIG. 66, the amount of movement v is 4, and the number of virtual divided portions is 4.

In frame #n, the leftmost pixel and the fourteenth through eighteenth pixels from the left consist of only the background components and belong to the background area. In frame #n, the second through fourth pixels from the left contain the background components and the foreground components, and belong to the uncovered background area. In frame #n, the eleventh through thirteenth pixels from the left contain background components and foreground components, and belong to the covered background area. In frame #n, the fifth through tenth pixels from the left consist of only the foreground components, and belong to the foreground area.

In frame #n+1, the first through fifth pixels from the left and the eighteenth pixel from the left consist of only the background components, and belong to the background area. In frame #n+1, the sixth through eighth pixels from the left contain background components and foreground components, and belong to the uncovered background area. In frame #n+1, the fifteenth through seventeenth pixels from the left contain background components and foreground components, and belong to the covered background area. In frame #n+1, the ninth through fourteenth pixels from the left consist of only the foreground components, and belong to the foreground area.

Figure 67:
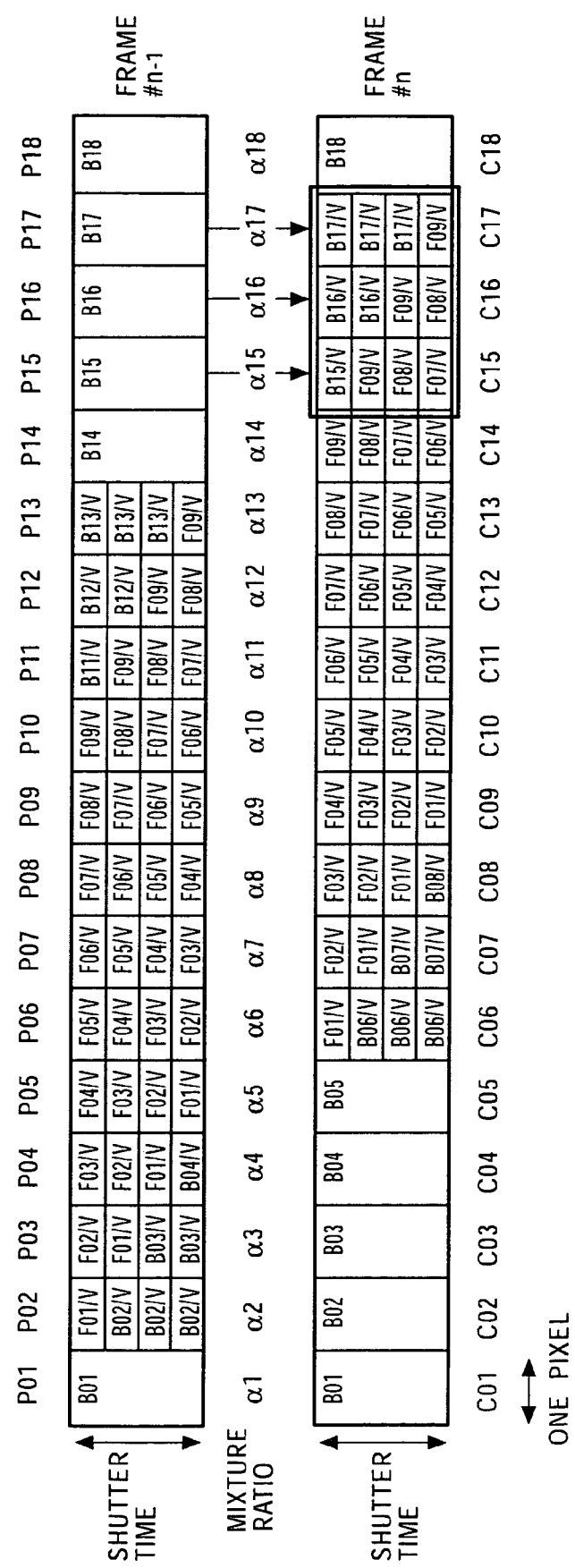
FIG. 67 illustrates a model in which pixel values are expanded in the time direction and the period corresponding to the shutter time is divided.

FIG. 67 illustrates the processing for separating the foreground components from the pixels belonging to the covered background area. In FIG. 67, $\alpha 1$ through $\alpha 18$ indicate mixture-ratios of the individual pixels of frame #n. In FIG. 67, the fifteenth through seventeenth pixels from the left belong to the covered background area.

The pixel value C15 of the fifteenth pixel from the left in frame #n can be expressed by equation (68):

$$C15 = B15/v + F09/v + F08/v + F07/v \quad (68)$$
$$= \alpha 15 \cdot B15 + F09/v + F08/v + F07/v$$
$$= \alpha 15 \cdot P15 + F09/v + F08/v + F07/v$$

where $\alpha 15$ indicates the mixture ratio of the fifteenth pixel from the left in frame #n, and P15 designates the pixel value of the fifteenth pixel from the left in frame #n−1.

The sum f15 of the foreground components of the fifteenth pixel from the left in frame #n can be expressed by equation (69) based on equation (68).

$$f15 = F09/v + F08/v + F07/v \quad (69)$$
$$= C15 - \alpha 15 \cdot P15$$

Similarly, the sum f16 of the foreground components of the sixteenth pixel from the left in frame #n can be expressed by equation (70), and the sum f17 of the foreground components of the seventeenth pixel from the left in frame #n can be expressed by equation (71).

$$f16 = C16 - \alpha 16 \cdot P16 \quad (70)$$

$$f17 = C17 - \alpha 17 \cdot P17 \quad (71)$$

In this manner, the foreground components fc contained in the pixel value C of the pixel belonging to the covered background area can be expressed by equation (72):

$$fc = C - \alpha \cdot P \quad (72)$$

where P designates the pixel value of the corresponding pixel in the previous frame.

Figure 68:
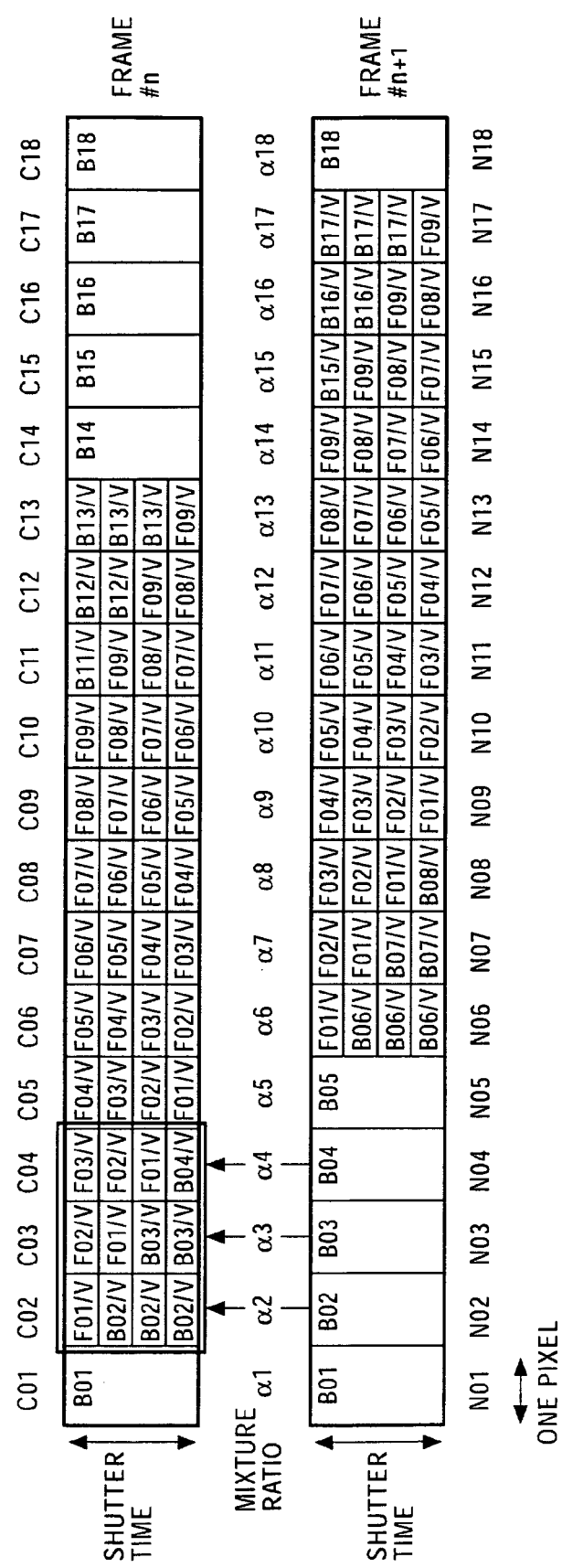
FIG. 68 illustrates a model in which pixel values are expanded in the time direction and the period corresponding to the shutter time is divided.

FIG. 68 illustrates the processing for separating the foreground components from the pixels belonging to the uncovered background area. In FIG. 68, $\alpha 1$ through $\alpha 18$ indicate mixture-ratios of the individual pixels of frame #n. In FIG. 68, the second through fourth pixels from the left belong to the uncovered background area.

The pixel value C02 of the second pixel from the left in frame #n can be expressed by equation (73):

$$C02 = B02/v + B02/v + B02/v + F01/v \quad (73)$$
$$= \alpha 2 \cdot B02 + F01/v$$
$$= \alpha 2 \cdot N02 + F01/v$$

where $\alpha 2$ indicates the mixture ratio of the second pixel from the left in frame #n, and N02 designates the pixel value of the second pixel from the left in frame #n+1.

The sum f02 of the foreground components of the second pixel from the left in frame #n can be expressed by equation (74) based on equation (73).

$$f02 = F01/v \quad (74)$$
$$= C02 - \alpha 2 \cdot N02$$

Similarly, the sum f03 of the foreground components of the third pixel from the left in frame #n can be expressed by equation (75), and the sum f04 of the foreground components of the fourth pixel from the left in frame #n can be expressed by equation (76).

$$f03 = C03 - \alpha 3 \cdot N03 \quad (75)$$

$$f04 = C04 - \alpha 4 \cdot N04 \quad (76)$$

In this manner, the foreground components fu contained in the pixel value C of the pixel belonging to the uncovered background area can be expressed by equation (77):

$$fu = C - \alpha \cdot N \quad (77)$$

where N designates the pixel value of the corresponding pixel in the subsequent frame.

As discussed above, the separating portion 601 is able to separate the foreground components from the pixels belonging to the mixed area and the background components from the pixels belonging to the mixed area based on the information indicating the covered background area and the information indicating the uncovered background area contained in the area information, and the mixture ratio α for each pixel.

FIG. 69 is a block diagram illustrating an example of the configuration of the separating portion 601 for executing the above-described processing. An image input into the separating portion 601 is supplied to a frame memory 621, and the area information indicating the covered background area and the uncovered background area supplied from the mixture-ratio calculator 104 and the mixture ratio α are supplied to a separation processing block 622.

The frame memory 621 stores the input images in units of frames. When a frame to be processed is frame #n, the frame memory 621 stores frame #n−1, which is the frame one frame before frame #n, frame #n, and frame #n+1, which is the frame one frame after frame #n.

The frame memory 621 supplies the corresponding pixels in frame #n−1, frame #n, and frame #n+1 to the separation processing block 622.

The separation processing block 622 applies the calculations discussed with reference to FIGS. 67 and 68 to the pixel values of the corresponding pixels in frame #n−1, frame #n, and frame #n+1 supplied from the frame memory 621 based on the area information indicating the covered background area and the uncovered background area and the mixture ratio α so as to separate the foreground components and the background components from the pixels belonging to the mixed area in frame #n, and supplies them to a frame memory 623.

The separation processing block 622 is formed of an uncovered area processor 631, a covered area processor 632, a synthesizer 633, and a synthesizer 634.

A multiplier 641 of the uncovered area processor 631 multiplies the pixel value of the pixel in frame #n+1 supplied from the frame memory 621 by the mixture ratio α, and outputs the resulting pixel value to a switch 642. The switch 642 is closed when the pixel in frame #n (corresponding to the pixel in frame #n+1) supplied from the frame memory 621 belongs to the uncovered background area, and supplies the pixel value multiplied by the mixture ratio α supplied from the multiplier 641 to a calculator 643 and the synthesizer 634. The value obtained by multiplying the pixel value of the pixel in frame #n+1 by the mixture ratio α output from the switch 642 is equivalent to the background components of the pixel value of the corresponding pixel in frame #n.

The calculator 643 subtracts the background components supplied from the switch 642 from the pixel value of the pixel in frame #n supplied from the frame memory 621 so as to obtain the foreground components. The calculator 643 supplies the foreground components of the pixel in frame #n belonging to the uncovered background area to the synthesizer 633.

A multiplier 651 of the covered area processor 632 multiplies the pixel value of the pixel in frame #n−1 supplied from the frame memory 621 by the mixture ratio α, and outputs the resulting pixel value to a switch 652. The switch 652 is closed when the pixel in frame #n (corresponding to the pixel in frame #n−1) supplied from the frame memory 621 belongs to the covered background area, and supplies the pixel value multiplied by the mixture ratio α supplied from the multiplier 651 to a calculator 653 and the synthesizer 634. The value obtained by multiplying the pixel value of the pixel in frame #n−1 by the mixture ratio α output from the switch 652 is equivalent to the background components of the pixel value of the corresponding pixel in frame #n.

The calculator 653 subtracts the background components supplied from the switch 652 from the pixel value of the pixel in frame #n supplied from the frame memory 621 so as to obtain the foreground components. The calculator 653 supplies the foreground components of the pixel in frame #n belonging to the covered background area to the synthesizer 633.

The synthesizer 633 combines the foreground components of the pixels belonging to the uncovered background area and supplied from the calculator 643 with the foreground components of the pixels belonging to the covered background area and supplied from the calculator 653, and supplies the synthesized foreground components to the frame memory 623.

The synthesizer 634 combines the background components of the pixels belonging to the uncovered background area and supplied from the switch 642 with the background components of the pixels belonging to the covered background area and supplied from the switch 652, and supplies the synthesized background components to the frame memory 623.

The frame memory 623 stores the foreground components and the background components of the pixels in the mixed area of frame #n supplied from the separation processing block 622.

The frame memory 623 outputs the stored foreground components of the pixels in the mixed area in frame #n and the stored background components of the pixels in the mixed area in frame #n.

By utilizing the mixture ratio α, which indicates the feature quantity, the foreground components and the background components contained in the pixel values can be completely separated.

The synthesizer 603 combines the foreground components of the pixels in the mixed area in frame #n output from the separating portion 601 with the pixels belonging to the foreground area so as to generate a foreground component image. The synthesizer 605 combines the background components of the pixels in the mixed area in frame #n output from the separating portion 601 with the pixels belonging to the background area so as to generate a background component image.

Figure 70A:
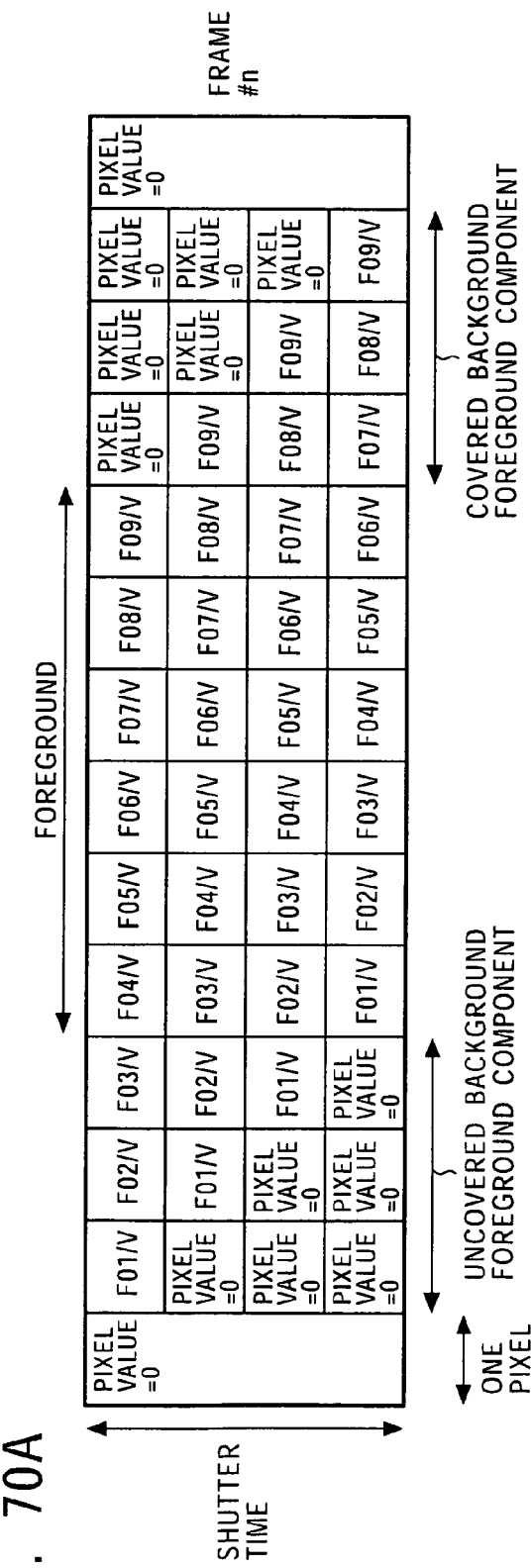
FIG. 70A illustrates an example of a separated foreground component image.

FIG. 70A illustrates an example of the foreground component image corresponding to frame #n in FIG. 66. The leftmost pixel and the fourteenth pixel from the left consist of only the background components before the foreground and the background are separated, and thus, the pixel values are set to 0.

The second and fourth pixels from the left belong to the uncovered background area before the foreground and the background are separated. Accordingly, the background components are set to 0, and the foreground components are maintained. The eleventh through thirteenth pixels from the left belong to the covered background area before the foreground and the background are separated. Accordingly, the background components are set to 0, and the foreground components are maintained. The fifth through tenth pixels from the left consist of only the foreground components, which are thus maintained.

Figure 70B:
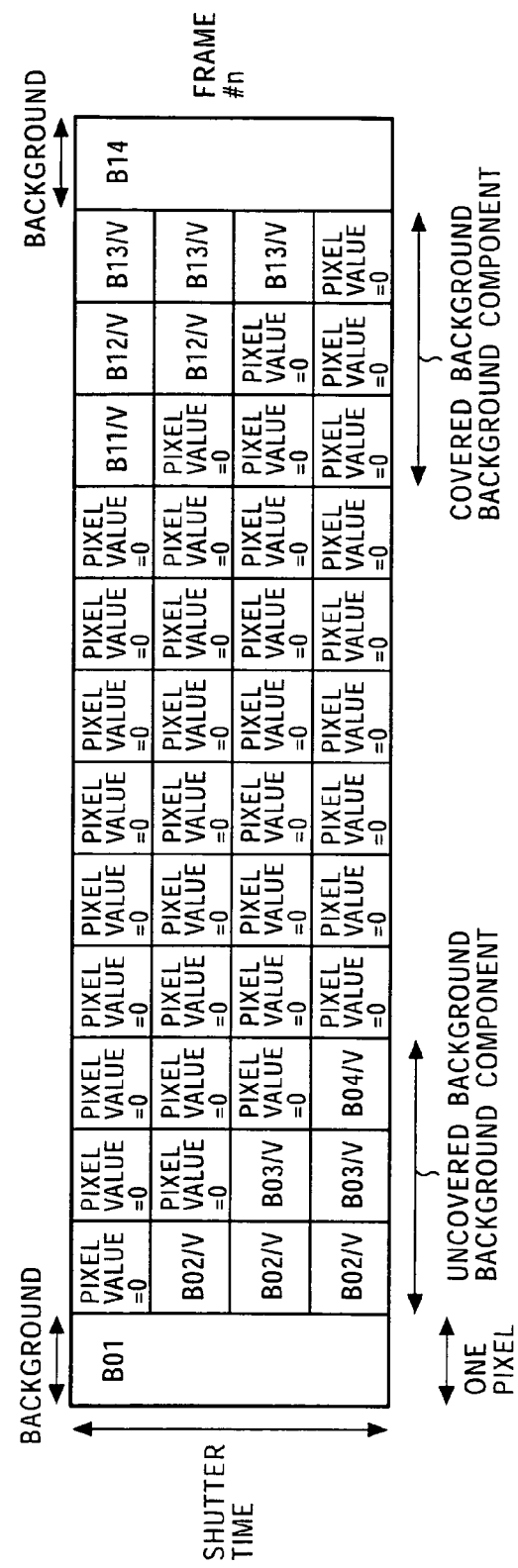
FIG. 70B illustrates an example of a separated background component image.

FIG. 70B illustrates an example of the background component image corresponding to frame #n in FIG. 66. The leftmost pixel and the fourteenth pixel from the left consist of only the background components before the foreground and the background are separated, and thus, the background components are maintained.

The second through fourth pixels from the left belong to the uncovered background area before the foreground and the background are separated. Accordingly, the foreground components are set to 0, and the background components are maintained. The eleventh through thirteenth pixels from the left belong to the covered background area before the foreground and the background are separated. Accordingly, the foreground components are set to 0, and the background components are maintained. The fifth through tenth pixels from the left consist of only the foreground components, and thus, the pixel values are set to 0.

Figure 71:
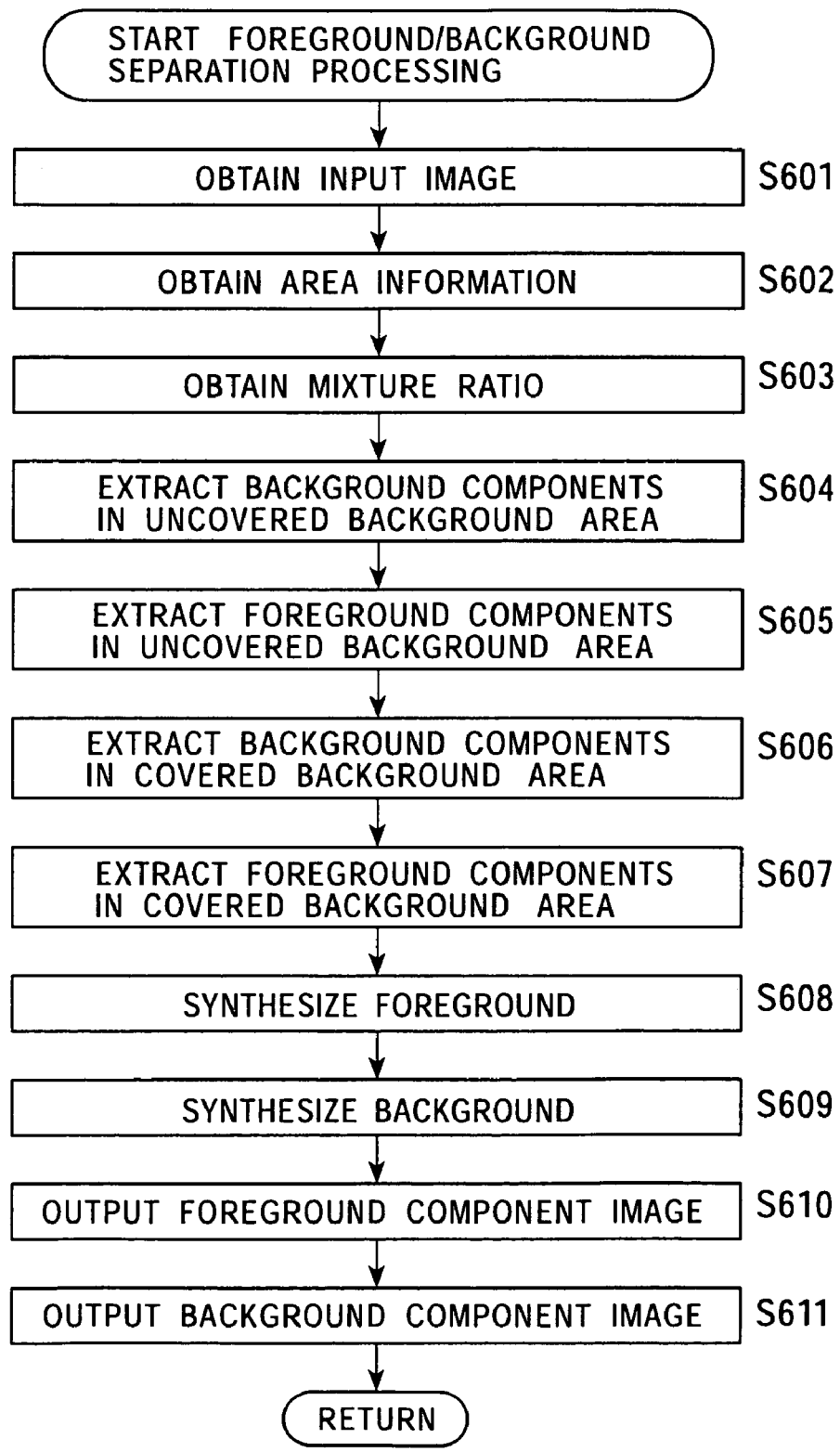
FIG. 71 is a flowchart illustrating the processing for separating a foreground and a background.

The processing for separating the foreground and the background executed by the foreground/background separator 105 is described below with reference to the flowchart of FIG. 71. In step S601, the frame memory 621 of the separating portion 601 obtains an input image, and stores frame #n for which the foreground and the background are separated together with the previous frame #n−1 and the subsequent frame #n+1.

In step S602, the separation processing block 622 of the separating portion 601 obtains area information supplied from the mixture-ratio calculator 104. In step S603, the separation processing block 622 of the separating portion 601 obtains the mixture ratio α supplied from the mixture-ratio calculator 104.

In step S604, the uncovered area processor 631 extracts the background components from the pixel values of the pixels belonging to the uncovered background area supplied from the frame memory 621 based on the area information and the mixture ratio α.

In step S605, the uncovered area processor 631 extracts the foreground components from the pixel values of the pixels belonging to the uncovered background area supplied from the frame memory 621 based on the area information and the mixture ratio α.

In step S606, the covered area processor 632 extracts the background components from the pixel values of the pixels belonging to the covered background area supplied from the frame memory 621 based on the area information and the mixture ratio α.

In step S607, the covered area processor 632 extracts the foreground components from the pixel values of the pixels belonging to the covered background area supplied from the frame memory 621 based on the area information and the mixture ratio α.

In step S608, the synthesizer 633 combines the foreground components of the pixels belonging to the uncovered background area extracted in the processing of step S605 with the foreground components of the pixels belonging to the covered background area extracted in the processing of step S607. The synthesized foreground components are supplied to the synthesizer 603. The synthesizer 603 further combines the pixels belonging to the foreground area supplied via the switch 602 with the foreground components supplied from the separating portion 601 so as to generate a foreground component image.

In step S609, the synthesizer 634 combines the background components of the pixels belonging to the uncovered background area extracted in the processing of step S604 with the background components of the pixels belonging to the covered background area extracted in the processing of step S606. The synthesized background components are supplied to the synthesizer 605. The synthesizer 605 further combines the pixels belonging to the background area supplied via the switch 604 with the background components supplied from the separating portion 601 so as to generate a background component image.

In step S610, the synthesizer 603 outputs the foreground component image. In step S611, the synthesizer 605 outputs the background component image. The processing is then completed.

As discussed above, the foreground/background separator 105 is able to separate the foreground components and the background components from the input image based on the area information and the mixture ratio α, and outputs the foreground component image consisting of only the foreground components and the background component image consisting of only the background components.

Adjustments of the amount of motion blur from a foreground component image are described below.

Figure 72:
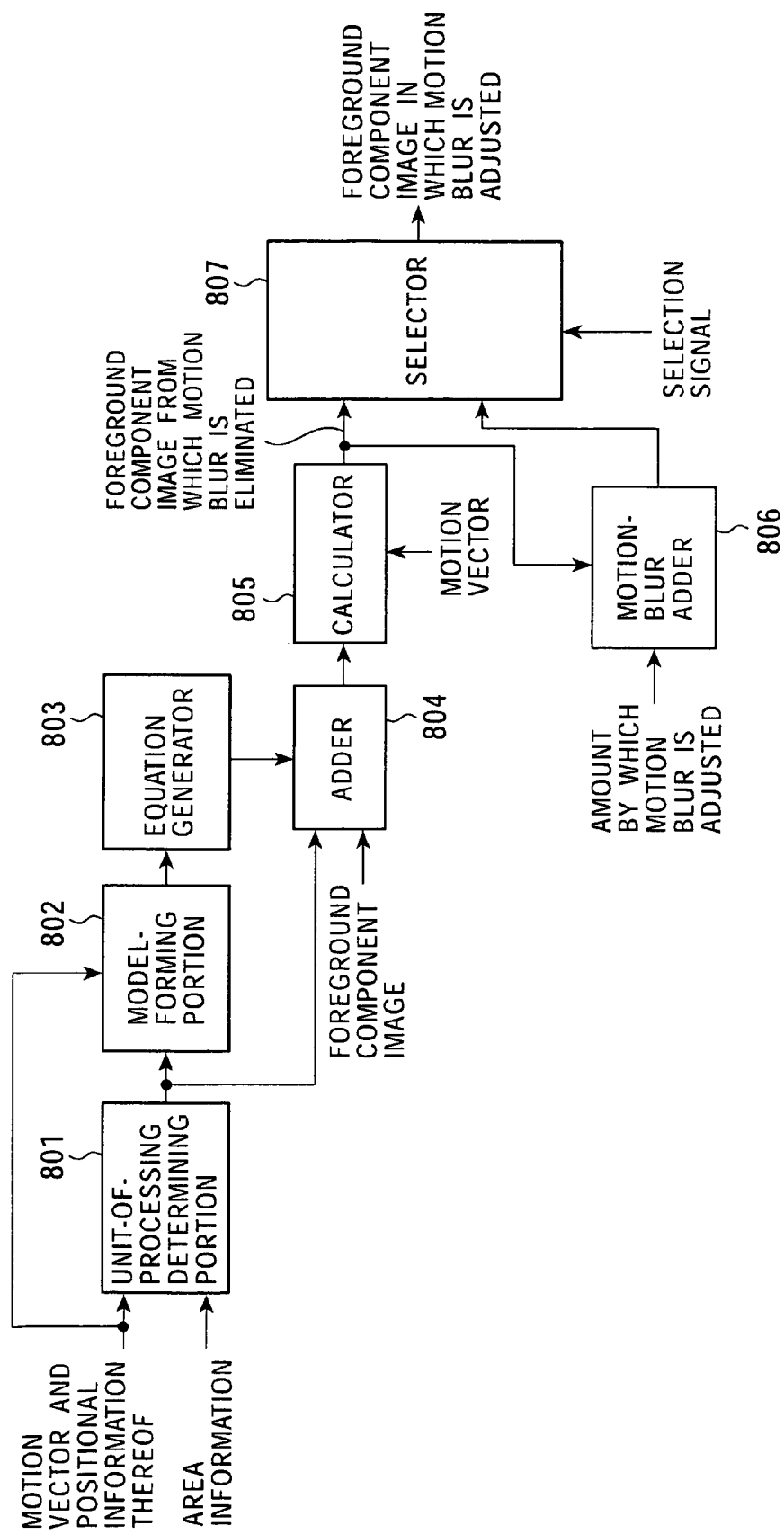
FIG. 72 is a block diagram illustrating an example of the configuration of a motion-blur adjusting unit 106.

FIG. 72 is a block diagram illustrating an example of the configuration of the motion-blur adjusting unit 106. The motion vector and the positional information thereof supplied from the motion detector 102 and the area information supplied from the area specifying unit 103 are supplied to a unit-of-processing determining portion 801 and a model-forming portion 802. The area information supplied from the foreground/background separator 105 is supplied to the adder 804.

The unit-of-processing determining portion 801 supplies, together with the motion vector, the unit of processing that is generated based on the motion vector and the positional information thereof and the area information to the model-forming portion 802. The unit-of-processing determining portion 801 supplies the generated unit of processing to the adder 804.

Figure 73:
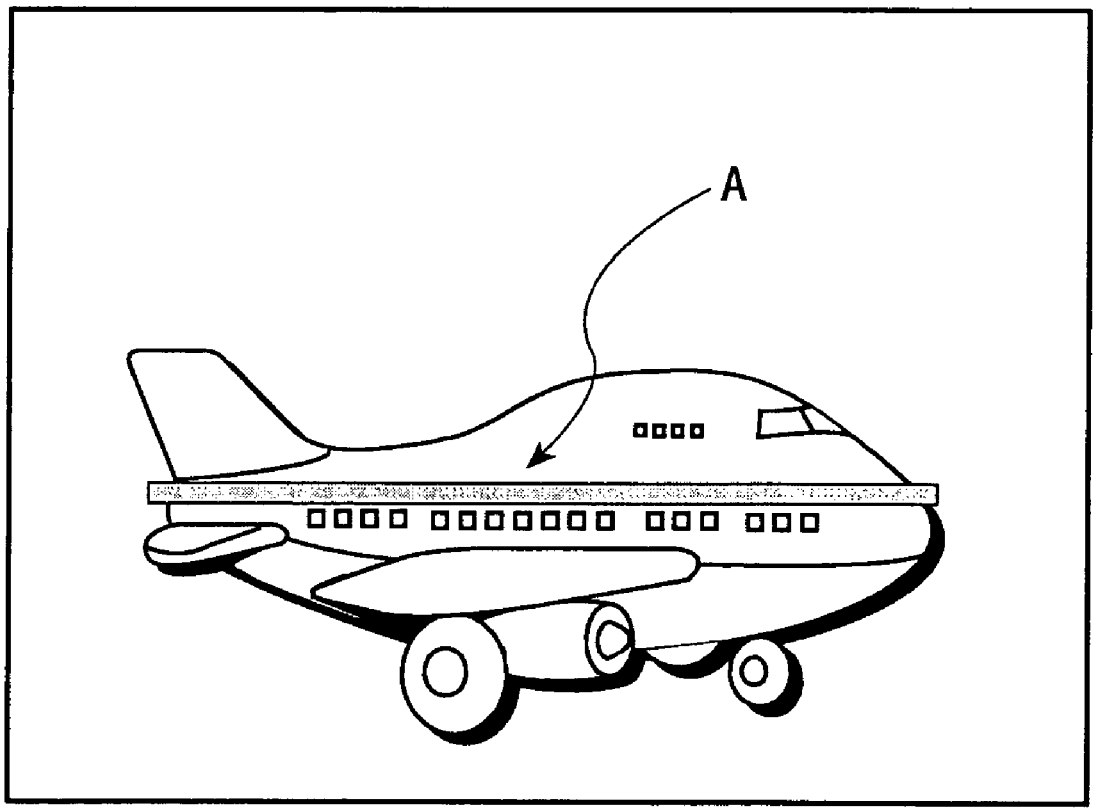
FIG. 73 illustrates the unit of processing.

As an example indicated by "A" is shown in FIG. 73, the unit of processing generated by the unit-of-processing determining portion 801 indicates consecutive pixels disposed in the moving direction starting from the pixel corresponding to the covered background area of the foreground component image until the pixel corresponding to the uncovered background area, or indicates consecutive pixels disposed in the moving direction starting from the pixel corresponding to the uncovered background area until the pixel corresponding to the covered background area. The unit of processing is formed of two pieces of data which indicate, for example, the upper left point (which is the position of the leftmost or the topmost pixel in the image designated by the unit of processing) and the lower right point.

The model-forming portion 802 forms a model based on the motion vector and the input unit of processing. More specifically, for example, the model-forming portion 802 may store in advance a plurality of models in accordance with the number of pixels contained in the unit of processing, the number of virtual divided portions of the pixel value in the time direction, and the number of foreground components for each pixel. The model-forming portion 902 then may select the model in which the correlation between the pixel values and the foreground components is designated, such as that in FIG. 74, based on the unit of processing and the number of virtual divided portions of the pixel value in the time direction.

It is now assumed, for example, that the number of pixels corresponding to the unit of processing is 12, and that the amount of movement v within the shutter time is 5. Then, the model-forming portion 802 sets the number of virtual divided portions to 5, and selects a model formed of eight types of foreground components so that the leftmost pixel contains one foreground component, the second pixel from the left contains two foreground components, the third pixel from the left contains three foreground components, the fourth pixel from the left contains four pixel components, the fifth pixel from the left contains five foreground components, the sixth pixel from the left contains five foreground components, the seventh pixel from the left contains five foreground components, the eighth pixel from the left contains five foreground components, the ninth pixel from the left contains four foreground components, the tenth pixel from the left contains three foreground components, the eleventh pixel from the left contains two foreground components, and the twelfth pixel from the left contains one foreground component.

Instead of selecting a model from the prestored models, the model-forming portion 802 may generate a model based on the motion vector and the unit of processing when the motion vector and the unit of processing are supplied.

The model-forming portion 802 supplies the selected model to an equation generator 803.

The equation generator 803 generates an equation based on the model supplied from the model-forming portion 802.

Figure 74:
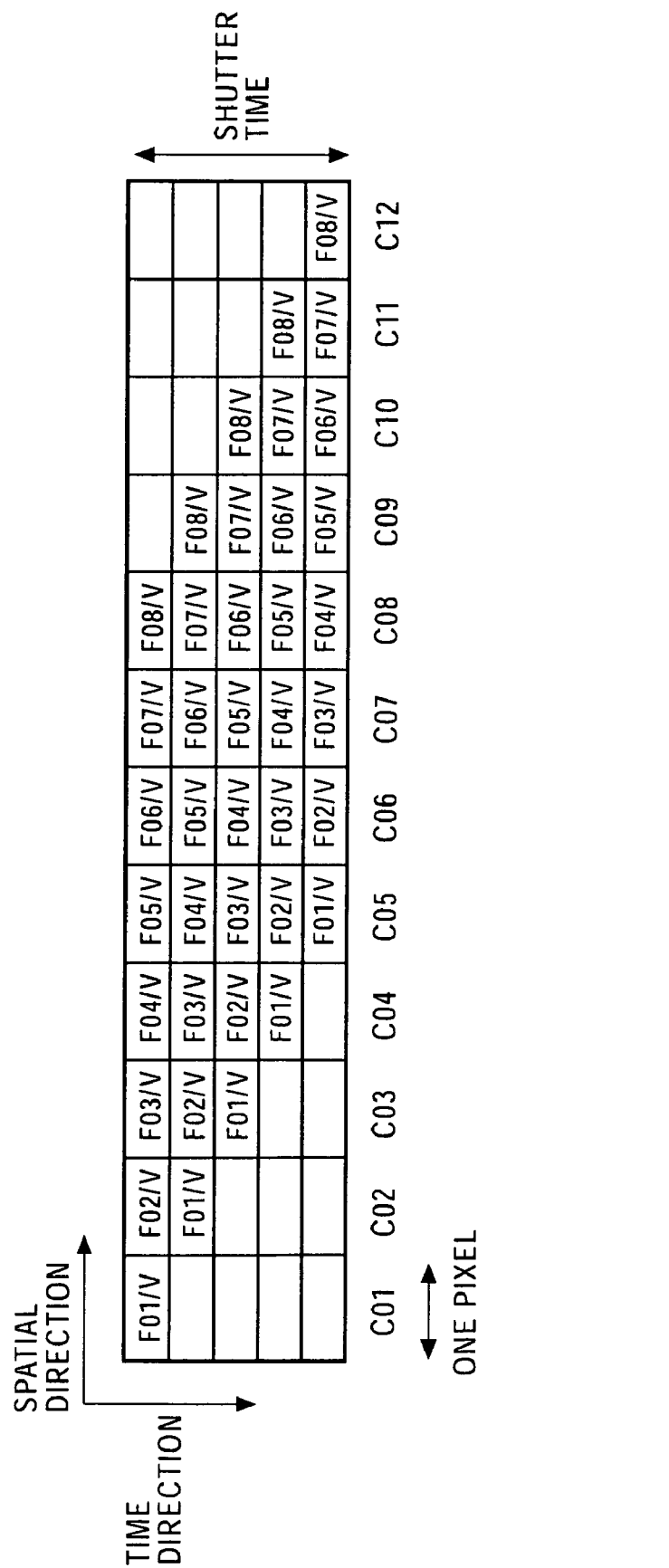
FIG. 74 illustrates a model in which the pixel values of a foreground component image are expanded in the time direction and the period corresponding to the shutter time is divided.

A description is given below, with reference to the model of the foreground component image shown in FIG. 74, of equations generated by the equation generator 803 when the number of foreground components is 8, the number of pixels corresponding to the unit of processing is 12, and the amount of movement v is 5.

When the foreground components contained in the foreground component image corresponding to the shutter time/v are F01/v through F08/v, the relationships between F01/v through F08/v and the pixel values C01 through C12 can be expressed by equations (78) through (89).

$$C01 = F01/v \tag{78}$$

$$C02 = F02/v + F01/v \tag{79}$$

$$C03 = F03/v + F02/v + F01v \tag{80}$$

$$C04 = F04/v + F03/v + F02/v + F01v \tag{81}$$

$$C05 = F05/v + F04/v + F03/v + F02/v + F01v \tag{82}$$

$$C06 = F06/v + F05/v + F04/v + F03/v + F02/v \tag{83}$$

$$C07 = F07/v + F06/v + F05/v + F04/v + F03/v \tag{84}$$

$$C08 = F08/v + F07/v + F06/v + F05/v + F04/v \tag{85}$$

$$C09 = F08/v + F07/v + F06/v + F05/v \tag{86}$$

$$C10 = F08/v + F07/v + F06/v \tag{87}$$

$$C11 = F08/v + F07/v \tag{88}$$

$$C12 = F08/v \tag{89}$$

The equation generator 803 generates an equation by modifying the generated equations. The equations generated by the equation generator 803 are indicated by equations (90) though (101).

$$C01 = 1 \cdot F01/v + 0 \cdot F02/v + 0 \cdot F03/v + 0 \cdot F04/v + 0 \cdot F05/v + 0 \cdot F06/v + 0 \cdot F07/v + 0 \cdot F08/v \tag{90}$$

$$C02 = 1 \cdot F01/v + 1 \cdot F02/v + 0 \cdot F03/v + 0 \cdot F04/v + 0 \cdot F05/v + 0 \cdot F06/v + 0 \cdot F07/v + 0 \cdot F08/v \tag{91}$$

$$C03 = 1 \cdot F01/v + 1 \cdot F02/v + 1 \cdot F03/v + 0 \cdot F04/v + 0 \cdot F05/v + 0 \cdot F06/v + 0 \cdot F07/v + 0 \cdot F08/v \tag{92}$$

$$C04 = 1 \cdot F01/v + 1 \cdot F02/v + 1 \cdot F03/v + 1 \cdot F04/v + 0 \cdot F05/v + 0 \cdot F06/v + 0 \cdot F07/v + 0 \cdot F08/v \tag{93}$$

$$C05 = 1 \cdot F01/v + 1 \cdot F02/v + 1 \cdot F03/v + 1 \cdot F04/v + 1 \cdot F05/v + 0 \cdot F06/v + 0 \cdot F07/v + 0 \cdot F08/v \tag{94}$$

$$C06 = 0 \cdot F01/v + 1 \cdot F02/v + 1 \cdot F03/v + 1 \cdot F04/v + 1 \cdot F05/v + 1 \cdot F06/v + 0 \cdot F07/v + 0 \cdot F08/v \tag{95}$$

$$C07 = 0 \cdot F01/v + 0 \cdot F02/v + 1 \cdot F03/v + 1 \cdot F04/v + 1 \cdot F05/v + 1 \cdot F06/v + 1 \cdot F07/v + 0 \cdot F08/v \tag{96}$$

$$C08 = 0 \cdot F01/v + 0 \cdot F02/v + 0 \cdot F03/v + 1 \cdot F04/v + 1 \cdot F05/v + 1 \cdot F06/v + 1 \cdot F07/v + 1 \cdot F08/v \tag{97}$$

$$C09 = 0 \cdot F01/v + 0 \cdot F02/v + 0 \cdot F03/v + 0 \cdot F04/v + 1 \cdot F05/v + 1 \cdot F06/v + 1 \cdot F07/v + 1 \cdot F08/v \tag{98}$$

$$C10 = 0 \cdot F01/v + 0 \cdot F02/v + 0 \cdot F03/v + 0 \cdot F04/v + 0 \cdot F05/v + 1 \cdot F06/v + 1 \cdot F07/v + 1 \cdot F08/v \tag{99}$$

$$C11 = 0 \cdot F01/v + 0 \cdot F02/v + 0 \cdot F03/v + 0 \cdot F04/v + 0 \cdot F05/v + 0 \cdot F06/v + 1 \cdot F07/v + 1 \cdot F08/v \tag{100}$$

$$C12 = 0 \cdot F01/v + 0 \cdot F02/v + 0 \cdot F03/v + 0 \cdot F04/v + 0 \cdot F05/v + 0 \cdot F06/v + 0 \cdot F07/v + 1 \cdot F08/v \tag{101}$$

Equations (90) through (101) can be expressed by equation (102).

$$Cj = \sum_{i=01}^{08} aij \cdot Fi/v \tag{102}$$

In equation (102), j designates the position of the pixel. In this example, j has one of the values from 1 to 12. In equation (102), i designates the position of the foreground value. In this example, i has one of the values from 1 to 8. In equation (102), aij has the value 0 or 1 according to the values of i and j.

Equation (102) can be expressed by equation (103) in consideration of the error.

$$Cj = \sum_{i=01}^{08} aij \cdot Fi/v + ej \tag{103}$$

In equation (103), ej designates the error contained in the designated pixel Cj.

Equation (103) can be modified into equation (104).

$$ej = Cj - \sum_{i=01}^{08} aij \cdot Fi/v \tag{104}$$

In order to apply the method of least squares, the square sum E of the error is defined as equation (105).

$$E = \sum_{j=01}^{12} ej^2 \tag{105}$$

In order to minimize the error, the partial differential value using the variable Fk with respect to the square sum E of the error should be 0. Fk is determined so that equation (106) is satisfied.

$$\frac{\partial E}{\partial Fk} = 2 \cdot \sum_{j=01}^{12} ej \cdot \frac{\partial ej}{\partial Fk} \quad (106)$$

$$= 2 \cdot \sum_{j=01}^{12} \left\{ \left( Cj - \sum_{i=01}^{08} aij \cdot Fi/v \right) \cdot (-akj/v) \right\} = 0$$

In equation (106), since the amount of movement v is a fixed value, equation (107) can be deduced.

$$\sum_{j=01}^{12} akj \cdot \left( Cj - \sum_{i=01}^{08} aij \cdot Fi/v \right) = 0 \quad (107)$$

To expand equation (107) and transpose the terms, equation (108) can be obtained.

$$\sum_{j=01}^{12} \left( akj \cdot \sum_{i=01}^{08} aij \cdot Fi \right) = v \sum_{j=01}^{12} akj \cdot Cj \quad (108)$$

Equation (108) is expanded into eight equations by substituting the individual integers from 1 to 8 into k in equation (108). The obtained eight equations can be expressed by one matrix equation. This equation is referred to as a "normal equation".

An example of the normal equation generated by the equation generator 803 based on the method of least squares is indicated by equation (109).

$$\begin{bmatrix} 5 & 4 & 3 & 2 & 1 & 0 & 0 & 0 \\ 4 & 5 & 4 & 3 & 2 & 1 & 0 & 0 \\ 3 & 4 & 5 & 4 & 3 & 2 & 1 & 0 \\ 2 & 3 & 4 & 5 & 4 & 3 & 2 & 1 \\ 1 & 2 & 3 & 4 & 5 & 4 & 3 & 2 \\ 0 & 1 & 2 & 3 & 4 & 5 & 4 & 3 \\ 0 & 0 & 1 & 2 & 3 & 4 & 5 & 4 \\ 0 & 0 & 0 & 1 & 2 & 3 & 4 & 5 \end{bmatrix} \begin{bmatrix} F01 \\ F02 \\ F03 \\ F04 \\ F05 \\ F06 \\ F07 \\ F08 \end{bmatrix} = v \cdot \begin{bmatrix} \sum_{i=08}^{12} Ci \\ \sum_{i=07}^{11} Ci \\ \sum_{i=06}^{10} Ci \\ \sum_{i=05}^{09} Ci \\ \sum_{i=04}^{08} Ci \\ \sum_{i=03}^{07} Ci \\ \sum_{i=02}^{06} Ci \\ \sum_{i=01}^{05} Ci \end{bmatrix} \quad (109)$$

When equation (109) is expressed by $A \cdot F = v \cdot C$, C, A, And v are known, and F is unknown. A and v are known when The model is formed, while C becomes known when the pixel value is input in the addition processing.

By calculating the foreground components according to the normal equation based on the method of least squares, the error contained in the pixel C can be distributed.

The equation generator 803 supplies the normal equation generated as discussed above to the adder 804.

The adder 804 sets, based on the unit of processing supplied from the unit-of-processing determining portion 801, the pixel value C contained in the foreground component image in the matrix equation supplied from the equation generator 803. The adder 804 supplies the matrix in which the pixel value C is set to a calculator 805.

The calculator 805 calculates the foreground component Fi/v from which motion blur is eliminated by the processing based on a solution, such as a sweep-out method (Gauss-Jordan elimination), so as to obtain Fi corresponding to i indicating one of the integers from 1 to 8, which is the pixel value from which motion blur is eliminated. The calculator 805 then outputs the foreground component image consisting of the pixel values Fi without motion blur, such as that in FIG. 75, to a motion-blur adder 806 and a selector 807.

Figure 75:
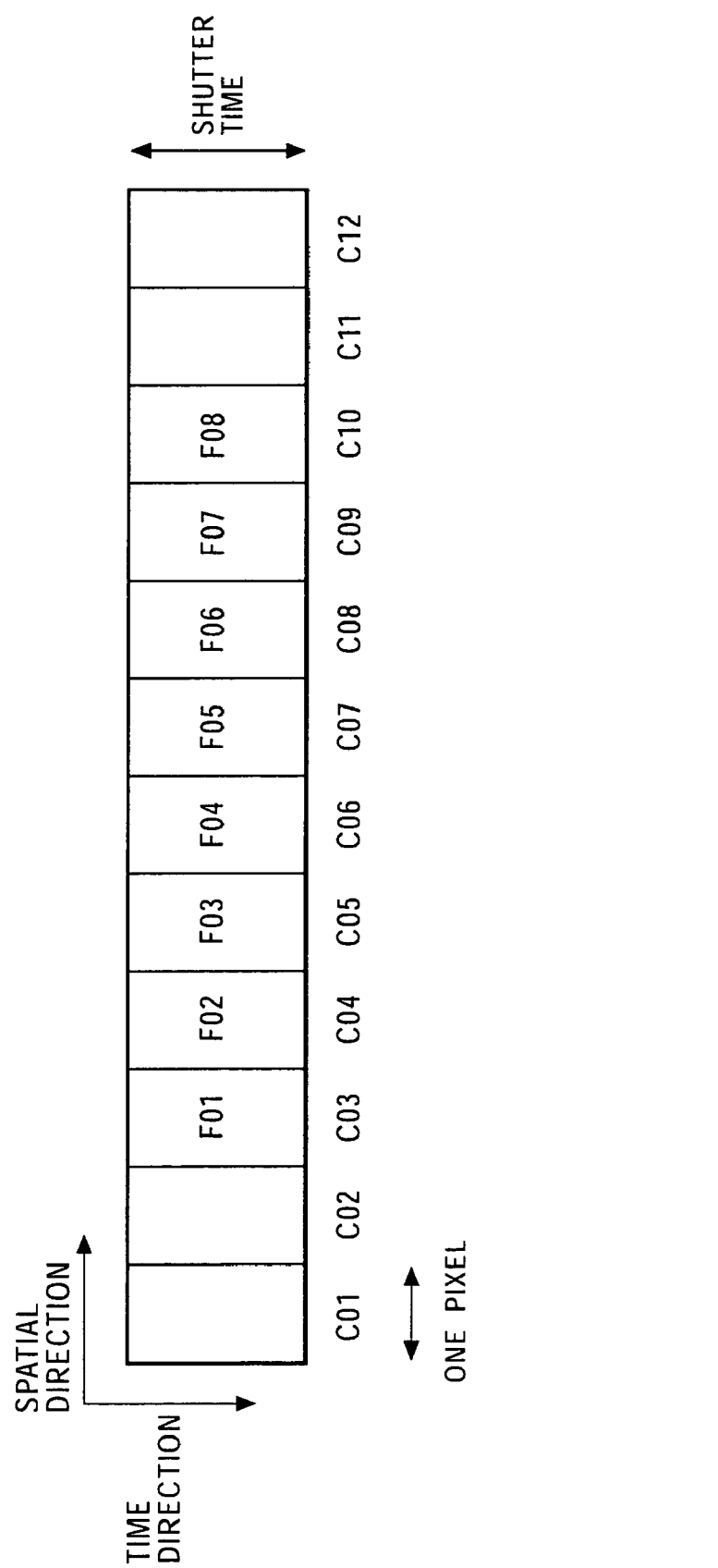
FIG. 75 illustrates a model in which the pixel values of a foreground component image are expanded in the time direction and the period corresponding to the shutter time is divided.

In the foreground component image without motion blur shown in FIG. 75, the reason for setting F01 through F08 in C03 through C10, respectively, is not to change the position of the foreground component image with respect to the screen. However, F01 through F08 may be set in any desired positions.

Figure 76:
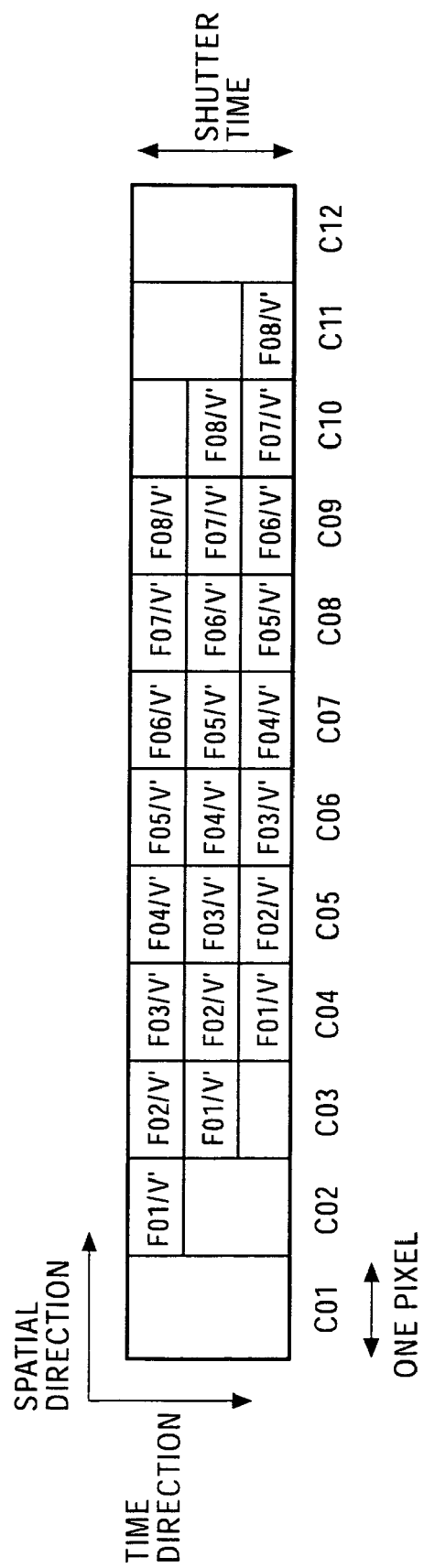
FIG. 76 illustrates a model in which the pixel values of a foreground component image are expanded in the time direction and the period corresponding to the shutter time is divided.

The motion-blur adder 806 is able to adjust the amount of motion blur by adding the amount v' by which motion blur is adjusted, which is different from the amount of movement v, for example, the amount v' by which motion blur is adjusted, which is one half the value of the amount of movement v, or the amount v' by which motion blur is adjusted, which is irrelevant to the amount of movement v. For example, as shown in FIG. 76, the motion-blur adder 806 divides the foreground pixel value Fi without motion blur by the amount v' by which motion blur is adjusted so as to obtain the foreground component Fi/v'. The motion-blur adder 806 then calculates the sum of the foreground components Fi/v', thereby generating the pixel value in which the amount of motion blur is adjusted. For example, when the amount v' by which motion blur is adjusted is 3, the pixel value C02 is set to (F01)/v', the pixel value C3 is set to (F01+F02)/v', the pixel value C04 is set to (F01+F02+F03)/v', and the pixel value C05 is set to (F02+F03+F04)/v'.

The motion-blur adder 806 supplies the foreground component image in which the amount of motion blur is adjusted to a selector 807.

The selector 807 selects one of the foreground component image without motion blur supplied from the calculator 805 and the foreground component image in which the amount of motion blur is adjusted supplied from the motion-blur adder 806 based on a selection signal reflecting a user's selection, and outputs the selected foreground component image.

As discussed above, the motion-blur adjusting unit 106 is able to adjust the amount of motion blur based on the selection signal and the amount v' by which motion blur is adjusted.

Figure 77:
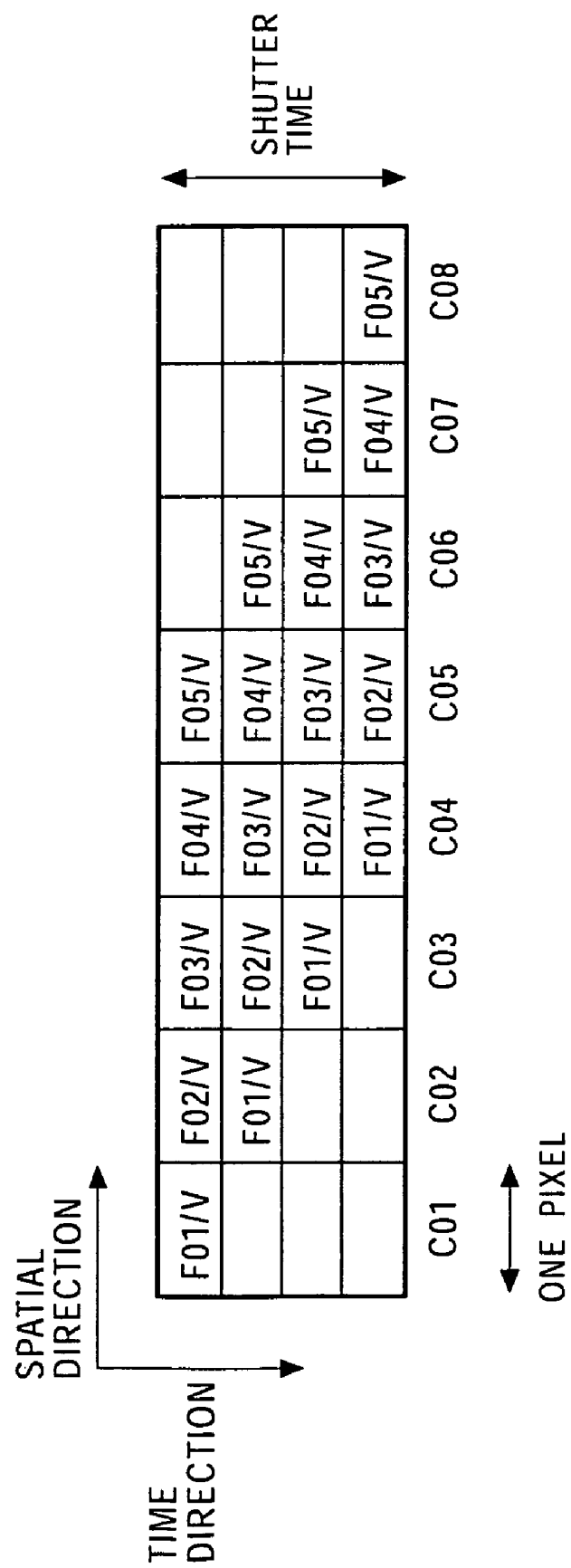
FIG. 77 illustrates a model in which the pixel values of a foreground component image are expanded in the time direction and the period corresponding to the shutter time is divided.

Also, for example, when the number of pixels corresponding to the unit of processing is 8, and the amount of movement v is 4, as shown in FIG. 77, the motion-blur adjusting unit 106 generates a matrix equation expressed by equation (110).

$$\begin{bmatrix} 4 & 3 & 2 & 1 & 0 \\ 3 & 4 & 3 & 2 & 1 \\ 2 & 3 & 4 & 3 & 2 \\ 1 & 2 & 3 & 4 & 3 \\ 0 & 1 & 2 & 3 & 4 \end{bmatrix} \begin{bmatrix} F01 \\ F02 \\ F03 \\ F04 \\ F05 \end{bmatrix} = v \cdot \begin{bmatrix} \sum_{i=05}^{08} Ci \\ \sum_{i=04}^{07} Ci \\ \sum_{i=03}^{06} Ci \\ \sum_{i=02}^{05} Ci \\ \sum_{i=01}^{04} Ci \end{bmatrix}$$ (110)

In this manner, the motion-blur adjusting unit 106 calculates Fi, which is the pixel value in which the amount of motion blur is adjusted, by setting up the equation in accordance with the length of the unit of processing. Similarly, for example, when the number of pixels contained in the unit of processing is 100, the equation corresponding to 100 pixels is generated so as to calculate Fi.

Figure 78:
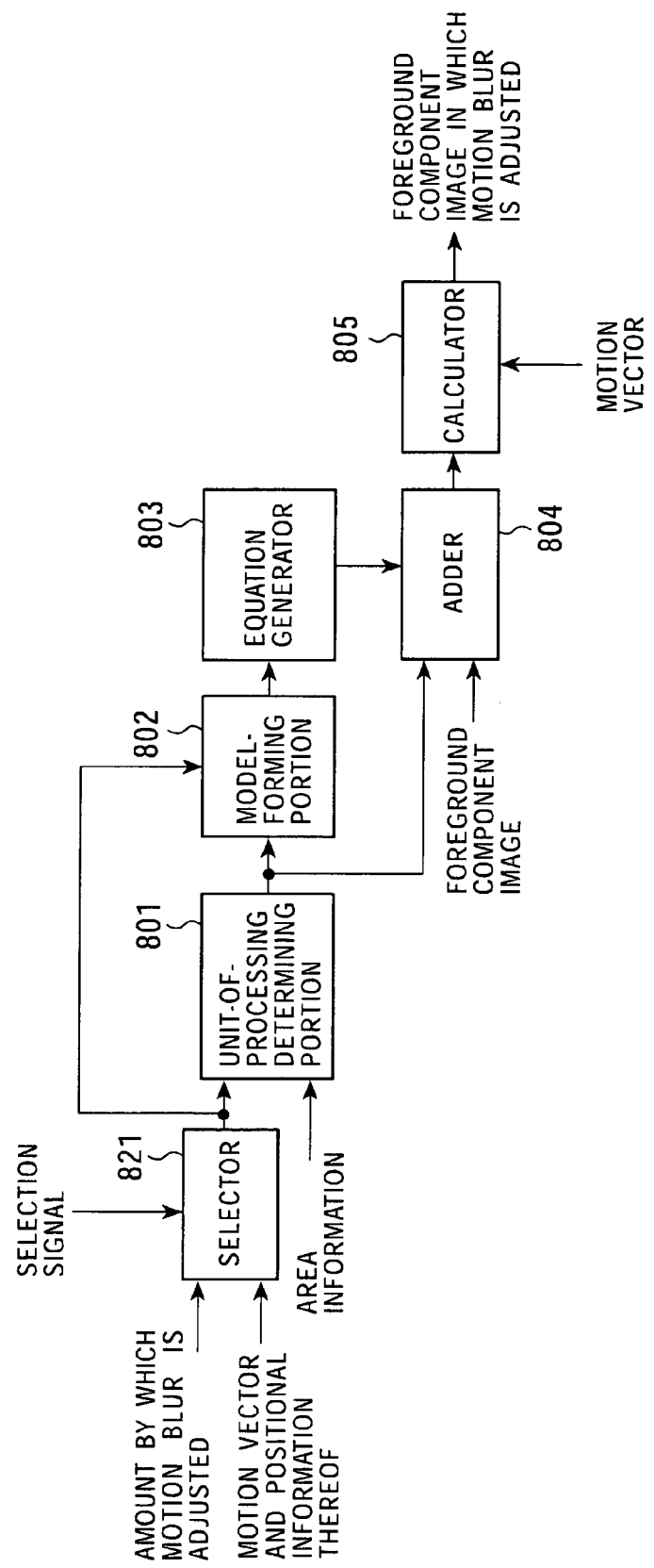
FIG. 78 illustrates an example of another configuration of the motion-blur adjusting unit 106.

FIG. 78 illustrates an example of another configuration of the motion-blur adjusting unit 106. The same elements as those shown in FIG. 72 are designated with like reference numerals, and an explanation thereof is thus omitted.

Based on a selection signal, a selector 821 directly supplies an input motion vector and a positional signal thereof to the unit-of-processing determining portion 801 and the model-forming portion 802. Alternatively, the selector 821 may substitute the magnitude of the motion vector by the amount v' by which motion blur is adjusted, and then supplies the motion vector and the positional signal thereof to the unit-of-processing determining portion 801 and the model-forming unit 802.

With this arrangement, the unit-of-processing determining portion 801 through the calculator 805 of the motion-blur adjusting unit 106 shown in FIG. 78 are able to adjust the amount of motion blur in accordance with the amount of movement v and the amount v' by which motion blur is adjusted. For example, when the amount of movement is 5, and the amount v' by which motion blur is adjusted is 3, the unit-of-processing determining portion 801 through the calculator 805 of the motion-blur adjusting unit 106 shown in FIG. 76 execute computation on the foreground component image in which the amount of movement v is 5 shown in FIG. 74 according to the model shown in FIG. 76 in which the amount v' by which motion blur is adjusted is 3. As a result, the image containing motion blur having the amount of movement v of (amount of movement v)/(amount v' by which motion blur is adjusted)=5/3, i.e., about 1.7 is obtained. In this case, the calculated image does not contain motion blur corresponding to the amount of movement v of 3. Accordingly, it should be noted that the relationship between the amount of movement v and the amount v' by which motion blur is adjusted is different from the result of the motion-blur adder 806.

As discussed above, the motion-blur adjusting unit 106 generates the equation in accordance with the amount of movement v and the unit of processing, and sets the pixel values of the foreground component image in the generated equation, thereby calculating the foreground component image in which the amount of motion blur is adjusted.

Figure 79:
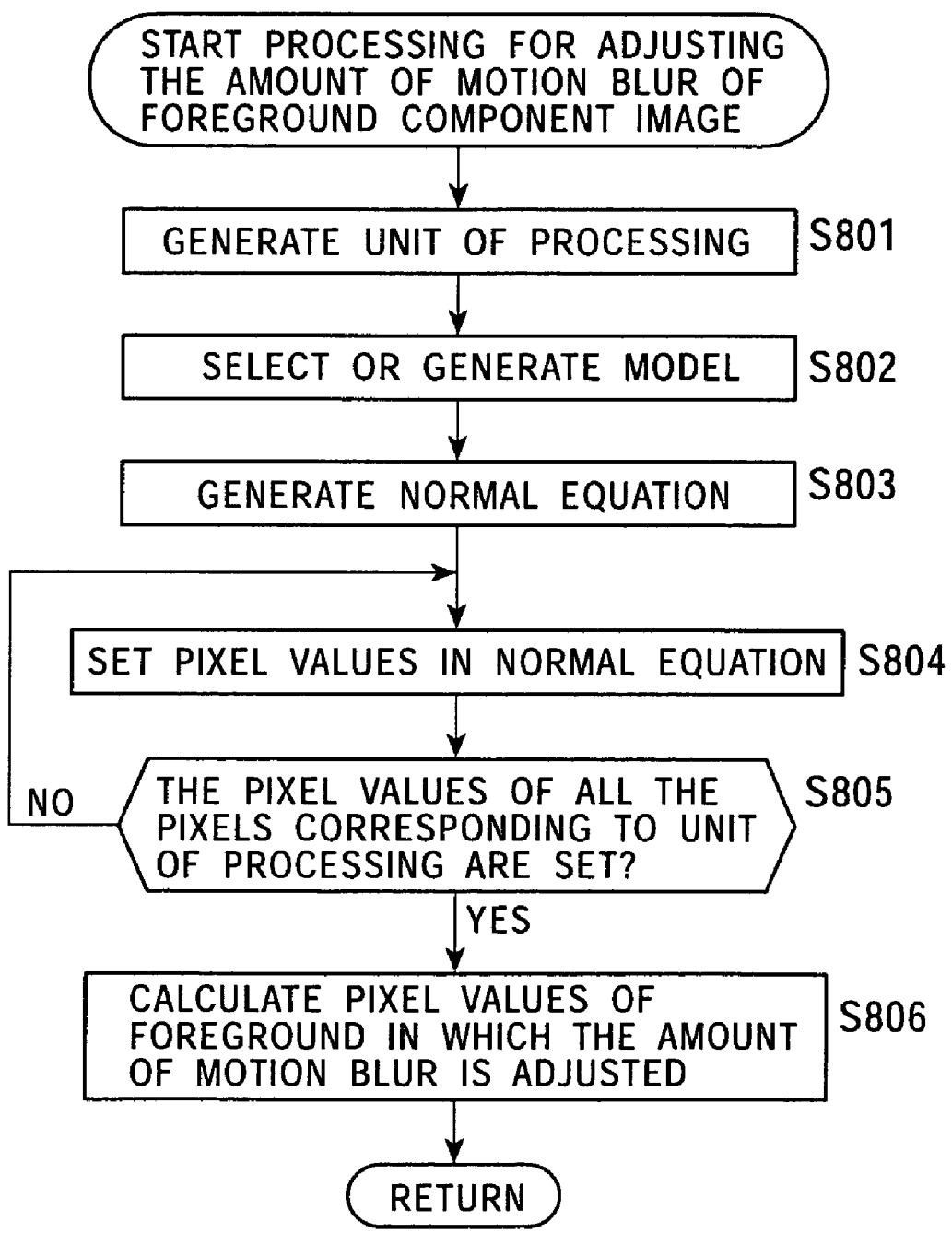
FIG. 79 is a flowchart illustrating the processing for adjusting the amount of motion blur contained in a foreground component image performed by the motion-blur adjusting unit 106.

The processing for adjusting the amount of motion blur contained in the foreground component image executed by the motion-blur adjusting unit 106 is described below with reference to the flowchart of FIG. 79.

In step S801, the unit-of-processing determining portion 801 of the motion-blur adjusting unit 106 generates the unit of processing based on the motion vector and the area information, and supplies the generated unit of processing to the model-forming portion 802.

In step S802, the model-forming portion 802 of the motion-blur adjusting unit 106 selects or generates the model in accordance with the amount of movement v and the unit of processing. In step S803, the equation generator 803 generates the normal equation based on the selected model.

In step S804, the adder 804 sets the pixel values of the foreground component image in the generated normal equation. In step S805, the adder 804 determines whether the pixel values of all the pixels corresponding to the unit of processing are set. If it is determined that the pixel values of all the pixels corresponding to the unit of processing are not yet set, the process returns to step S804, and the processing for setting the pixel values in the normal equation is repeated.

If it is determined in step S805 that the pixel values of all the pixels corresponding to the unit of processing are set, the process proceeds to step S806. In step S806, the calculator 805 calculates the pixel values of the foreground in which the amount of motion blur is adjusted based on the normal equation in which the pixel values are set supplied from the adder 804. The processing is then completed.

As discussed above, the motion-blur adjusting unit 106 is able to adjust the amount of motion blur of the foreground image containing motion blur based on the motion vector and the area information.

That is, it is possible to adjust the amount of motion blur contained in the pixel values, that is, contained in sampled data.

As is seen from the foregoing description, the image processing apparatus shown in FIG. 2 is able to adjust the amount of motion blur contained in the input image. The image processing apparatus configured as shown in FIG. 2 is able to calculate the mixture ratio α, which is embedded information, and outputs the calculated mixture-ratio α.

Figure 80:
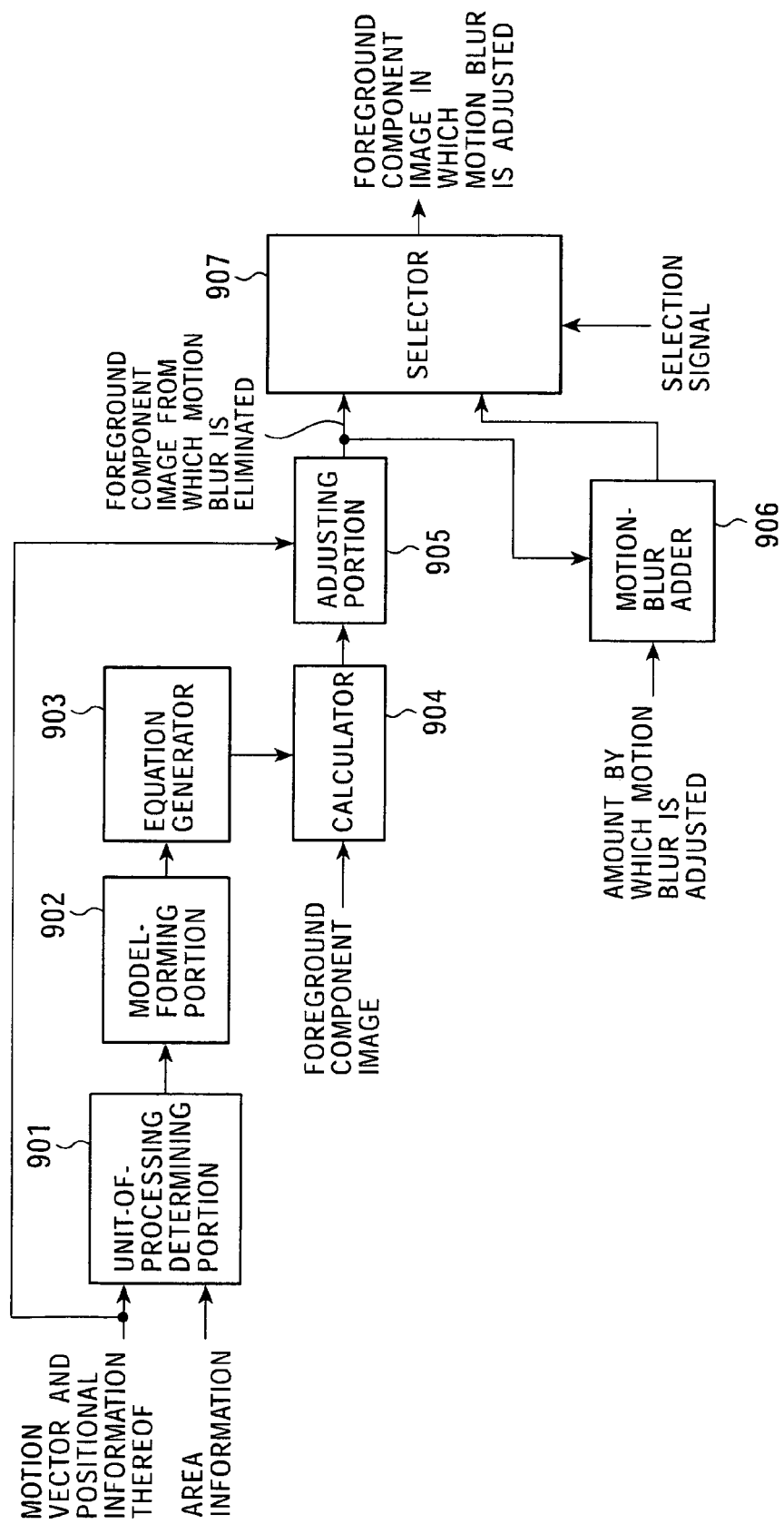
FIG. 80 is a block diagram illustrating an example of another configuration of the motion-blur adjusting unit 106.

FIG. 80 is a block diagram illustrating another example of the configuration of the motion-blur adjusting unit 106. The motion vector and the positional information thereof supplied from the motion detector 102 are supplied to a unit-of-processing determining portion 901 and an adjusting portion 905. The area information supplied from the area specifying unit 103 is supplied to the unit-of-processing determining portion 901. The foreground component image supplied from the foreground/background separator 105 is supplied to a calculator 904.

The unit-of-processing determining portion 901 supplies, together with the motion vector, the unit of processing generated based on the motion vector and the positional information thereof and the area information to a model-forming portion 902.

The model-forming portion 902 forms a model based on the motion vector and the input unit of processing. More specifically, for example, the model-forming portion 902 may store in advance a plurality of models in accordance with the number of pixels contained in the unit of processing, the number of virtual divided portions of the pixel value in the time direction, and the number of foreground components for each pixel. The model-forming portion 902 then may select the model in which the correlation between the pixel values and the foreground components is designated, such as that in FIG. 81, based on the unit of processing and the number of virtual divided portions of the pixel value in the time direction.

It is now assumed, for example, that the number of pixels corresponding to the unit of processing is 12, and that the amount of movement v within the shutter time is 5. Then, the model-forming portion 902 sets the number of virtual divided portions to 5, and selects a model formed of eight types of foreground components so that the leftmost pixel contains one foreground component, the second pixel from the left contains two foreground components, the third pixel from the left contains three foreground components, the fourth pixel from the left contains four pixel components, the fifth pixel from the left contains five foreground components, the sixth pixel from the left contains five foreground components, the seventh pixel from the left contains five foreground components, the eighth pixel from the left contains five foreground components, the ninth pixel from the left contains four foreground components, the tenth pixel from the left contains three foreground components, the eleventh pixel from the left contains two foreground components, and the twelfth pixel from the left contains one foreground component.

Instead of selecting a model from the prestored models, the model-forming portion 902 may generate a model based on the motion vector and the unit of processing when the motion vector and the unit of processing are supplied.

An equation generator 903 generates an equation based on the model supplied from the model-forming portion 902.

A description is now given, with reference to the models of foreground component images shown in FIGS. 81 through 83, of an example of the equation generated by the equation generator 903 when the number of foreground components is 8, the number of pixels corresponding to the unit of processing is 12, and the amount of movement v is 5.

When the foreground components contained in the foreground component image corresponding to the shutter time/v are F01/v through F08/v, the relationships between F01/v through F08/v and pixel values C01 through C12 can be expressed by equations (78) through (89), as stated above.

By considering the pixel values C12 and C11, the pixel value C12 contains only the foreground component F08/v, as expressed by equation (111), and the pixel value C11 consists of the product sum of the foreground component F08/v and the foreground component F07/v. Accordingly, the foreground component F07/v can be found by equation (112).

$$F08/v = C12 \tag{111}$$

$$F07/v = C11 - C12 \tag{112}$$

Similarly, by considering the foreground components contained in the pixel values C10 through C01, the foreground components F06/v through F01/v can be found by equations (113) through (118), respectively.

$$F06/v = C10 - C11 \tag{113}$$

$$F05/v = C09 - C10 \tag{114}$$

$$F04/v = C08 - C09 \tag{115}$$

$$F03/v = C07 - C08 + C12 \tag{116}$$

$$F02/v = C06 - C07 + C11 - C12 \tag{117}$$

$$F01/v = C05 - C06 + C10 - C11 \tag{118}$$

The equation generator 903 generates the equations for calculating the foreground components by the difference between the pixel values, as indicated by the examples of equations (111) through (118). The equation generator 903 supplies the generated equations to the calculator 904.

The calculator 904 sets the pixel values of the foreground component image in the equations supplied from the equation generator 903 so as to obtain the foreground components based on the equations in which the pixel values are set. For example, when equations (111) through (118) are supplied from the equation generator 903, the calculator 904 sets the pixel values C05 through C12 in equations (111) through (118).

The calculator 904 calculates the foreground components based on the equations in which the pixel values are set. For example, the calculator 904 calculates the foreground components F01/v through F08/v, as shown in FIG. 82, based on the calculations of equations (111) through (118) in which the pixel values C05 through C12 are set. The calculator 904 supplies the foreground components F01/v through F08/v to the adjusting portion 905.

The adjusting portion 905 multiplies the foreground components supplied from the calculator 904 by the amount of movement v contained in the motion vector supplied from the unit-of-processing determining portion 901 so as to obtain the foreground pixel values from which motion blur is eliminated. For example, when the foreground components F01/v through F08/v are supplied from the calculator 904, the adjusting portion 905 multiples each of the foreground components F01/v through F08/v by the amount of movement v, i.e., 5, so as to obtain the foreground pixel values F01 through F08 from which motion blur is eliminated, as shown in FIG. 83.

The adjusting portion 905 supplies the foreground component image consisting of the foreground pixel values without motion blur calculated as described above to a motion-blur adder 906 and a selector 907.

The motion-blur adder 906 is able to adjust the amount of motion blur by using the amount v' by which motion blur is adjusted, which is different from the amount of movement v, for example, the amount v' by which motion blur is adjusted, which is one half the value of the amount of movement v, or the amount v' by which motion blur is adjusted, which is irrelevant to the amount of movement v. For example, as shown in FIG. 76, the motion-blur adder 906 divides the foreground pixel value Fi without motion blur by the amount v' by which motion blur is adjusted so as to obtain the foreground component Fi/v'. The motion-blur adder 906 then calculates the sum of the foreground components Fi/v', thereby generating the pixel value in which the amount of motion blur is adjusted. For example, when the amount v' by which motion blur is adjusted is 3, the pixel value C02 is set to (F01)/v', the pixel value C3 is set to (F01+F02)/v', the pixel value C04 is set to (F01+F02+F03)/v', and the pixel value C05 is set to (F02+F03+F04)/v'.

The motion-blur adder 906 supplies the foreground component image in which the amount of motion blur is adjusted to the selector 907.

The selector 907 selects either the foreground component image without motion blur supplied from the adjusting portion 905 or the foreground component image in which the amount of motion blur is adjusted supplied from the motion-blur adder 906 based on a selection signal reflecting a user's selection, and outputs the selected foreground component image.

As discussed above, the motion-blur adjusting unit 106 is able to adjust the amount of motion blur based on the selection signal and the amount v' by which motion blur is adjusted.

Figure 84:
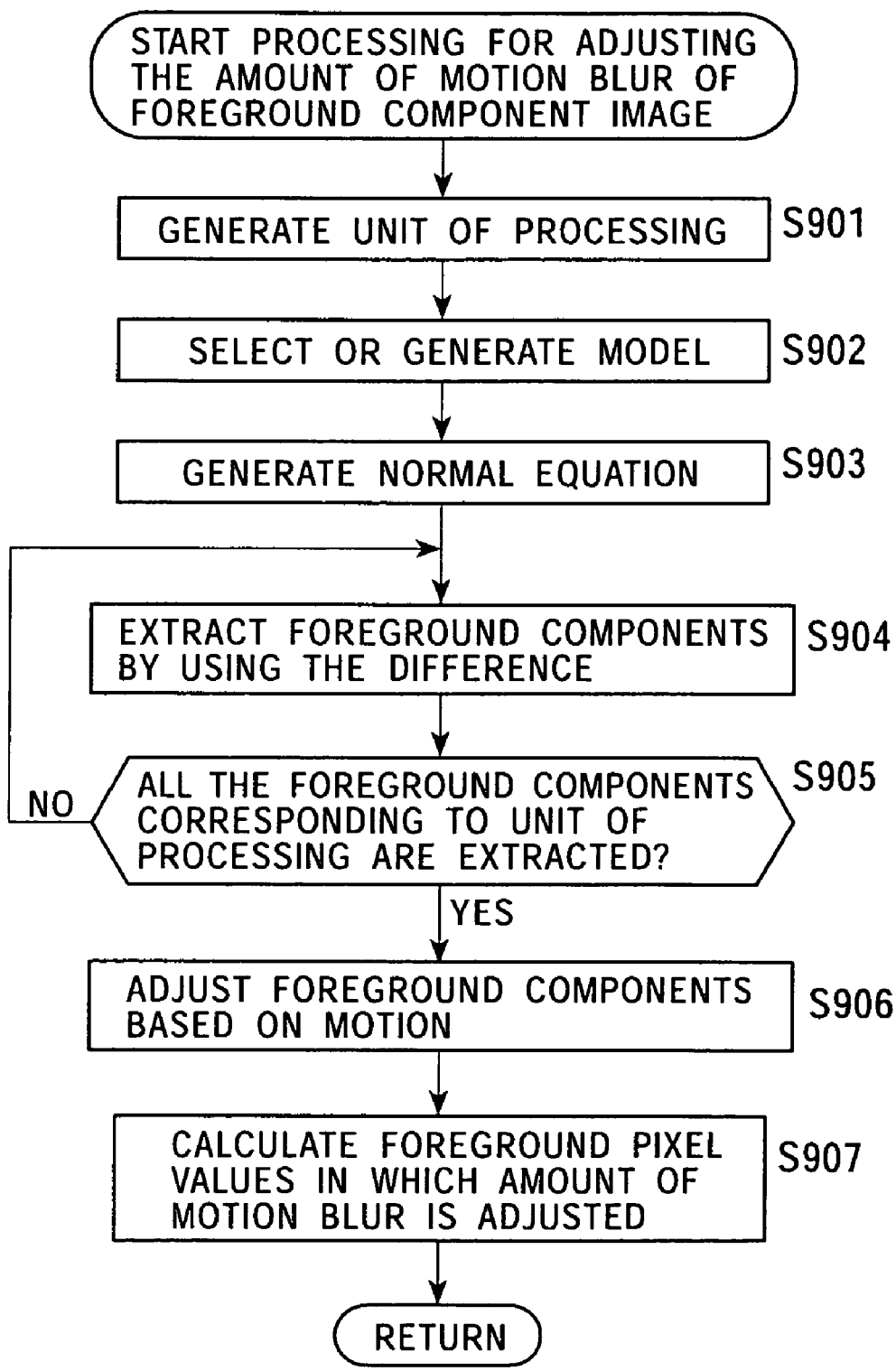
FIG. 84 is a flowchart illustrating the processing for eliminating motion blur contained in a foreground.

The processing for adjusting the amount of motion blur of the foreground executed by the motion-blur adjusting unit 106 configured as shown in FIG. 80 is described below with reference to the flowchart of FIG. 84.

In step S901, the unit-of-processing determining portion 901 of the motion-blur adjusting unit 106 generates the unit of processing based on the motion vector and the area information, and supplies the generated unit of processing to the model-forming portion 902 and the adjusting portion 905.

In step S902, the model-forming portion 902 of the motion-blur adjusting unit 106 selects or generates the model according to the amount of movement v and the unit of processing. In step S903, the equation generator 903 generates, based on the selected or generated model, the equations for calculating the foreground components by the difference between the pixel values of the foreground component image.

In step S904, the calculator 904 sets the pixel values of the foreground component image in the generated equations, and extracts the foreground components by using the difference between the pixel values based on the equations in which the pixel values are set. In step S905, the calculator 904 determines whether all the foreground components corresponding to the unit of processing have been extracted. If it is determined that all the foreground components corresponding to the unit of processing have not been extracted, the process returns to step S904, and the processing for extracting the foreground components is repeated.

If it is determined in step S905 that all the foreground components corresponding to the unit of processing have been extracted, the process proceeds to step S906. In step S906, the adjusting portion 905 adjusts each of the foreground components F01/v through F08/v supplied from the calculator 904 based on the amount of movement v so as to obtain the foreground pixel values F01/v through F08/v from which motion blur is eliminated.

In step S907, the motion-blur adder 906 calculates the foreground pixel values in which the amount of motion blur is adjusted, and the selector 907 selects the image without motion blur or the image in which the amount of motion blur is adjusted, and outputs the selected image. The processing is then completed.

As described above, the motion-blur adjusting unit 106 configured as shown in FIG. 80 is able to more speedily adjust motion blur of the foreground image containing motion blur according to simpler computations.

A known technique for partially eliminating motion blur, such as a Wiener filter, is effective when being used in the ideal state, but is not sufficient for an actual image quantized and containing noise. In contrast, it is proved that the motion-blur adjusting unit 106 configured as shown in FIG. 80 is sufficiently effective for an actual image quantized and containing noise. It is thus possible to eliminate motion blur with high precision.

Figure 85:
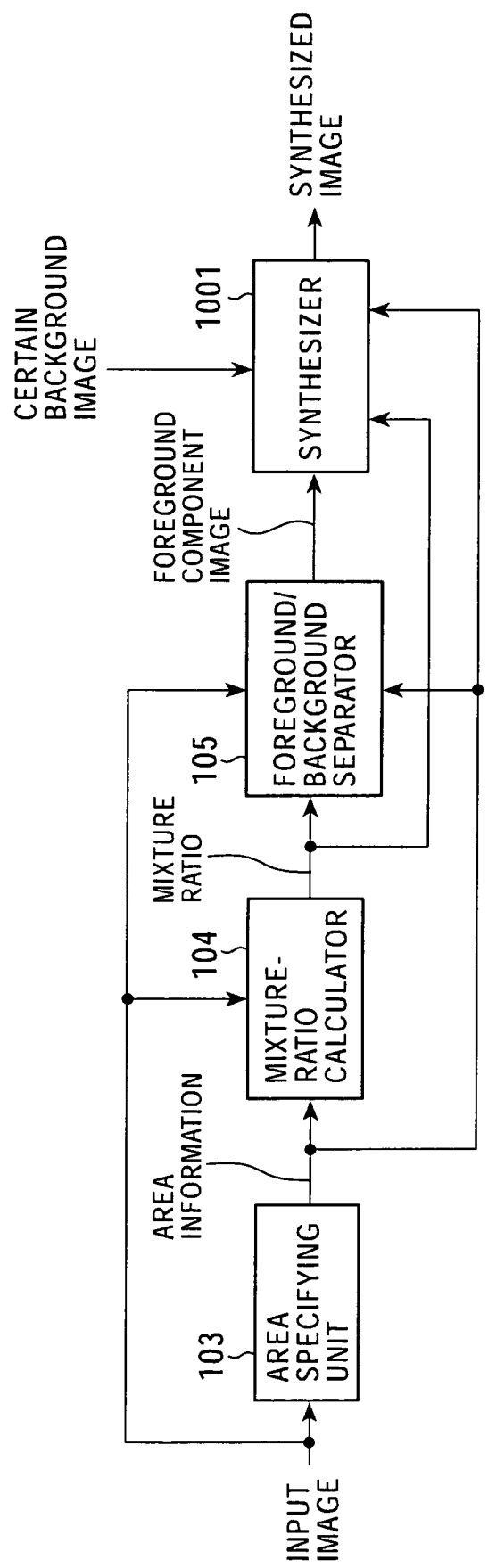
FIG. 85 is a block diagram illustrating another configuration of the function of the image processing apparatus.

FIG. 85 is a block diagram illustrating another configuration of the function of the image processing apparatus.

The elements similar to those shown in FIG. 2 are designated with like reference numerals, and an explanation thereof is thus omitted.

The area specifying unit 103 supplies area information to the mixture-ratio calculator 104 and a synthesizer 1001.

The mixture-ratio calculator 104 supplies the mixture ratio α to the foreground/background separator 105 and the synthesizer 1001.

The foreground/background separator 105 supplies the foreground component image to the synthesizer 1001.

The synthesizer 1001 combines a certain background image with the foreground component image supplied from the foreground/background separator 105 based on the mixture ratio α supplied from the mixture-ratio calculator 104 and the area information supplied from the area specifying unit 103, and outputs the synthesized image in which the certain background image and the foreground component image are combined.

Figure 86:
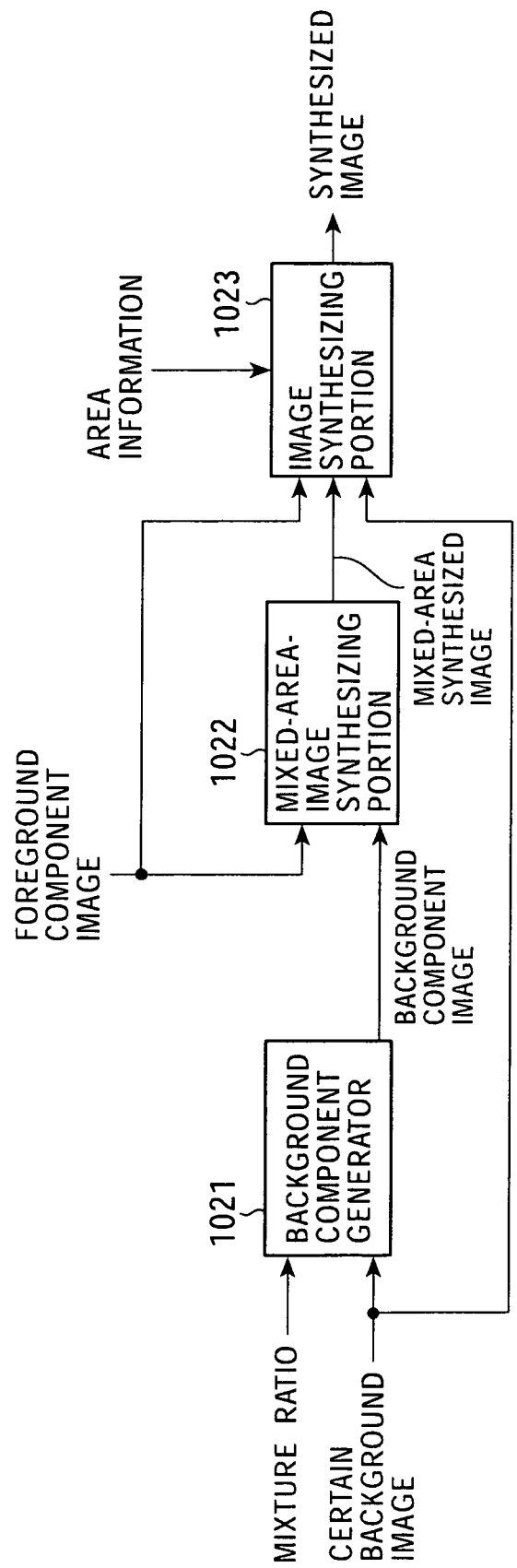
FIG. 86 illustrates the configuration of a synthesizer 1001.

FIG. 86 illustrates the configuration of the synthesizer 1001. A background component generator 1021 generates a background component image based on the mixture ratio α and a certain background image, and supplies the background component image to a mixed-area-image synthesizing portion 1022.

The mixed-area-image synthesizing portion 1022 combines the background component image supplied from the background component generator 1021 with the foreground component image so as to generate a mixed-area synthesized image, and supplies the generated mixture-area synthesized image to an image synthesizing portion 1023.

The image synthesizer 1023 combines the foreground component image, the mixed-area synthesized image supplied from the mixed-area-image synthesizing portion 1022, and the certain background image based on the area information so as to generate a synthesized image, and outputs it.

As discussed above, the synthesizer 1001 is able to combine the foreground component image with a certain background image.

The image obtained by combining a foreground component image with a certain background image based on the mixture ratio α, which is the feature quantity, appears more natural compared to an image obtained by simply combining pixels.

Figure 87:
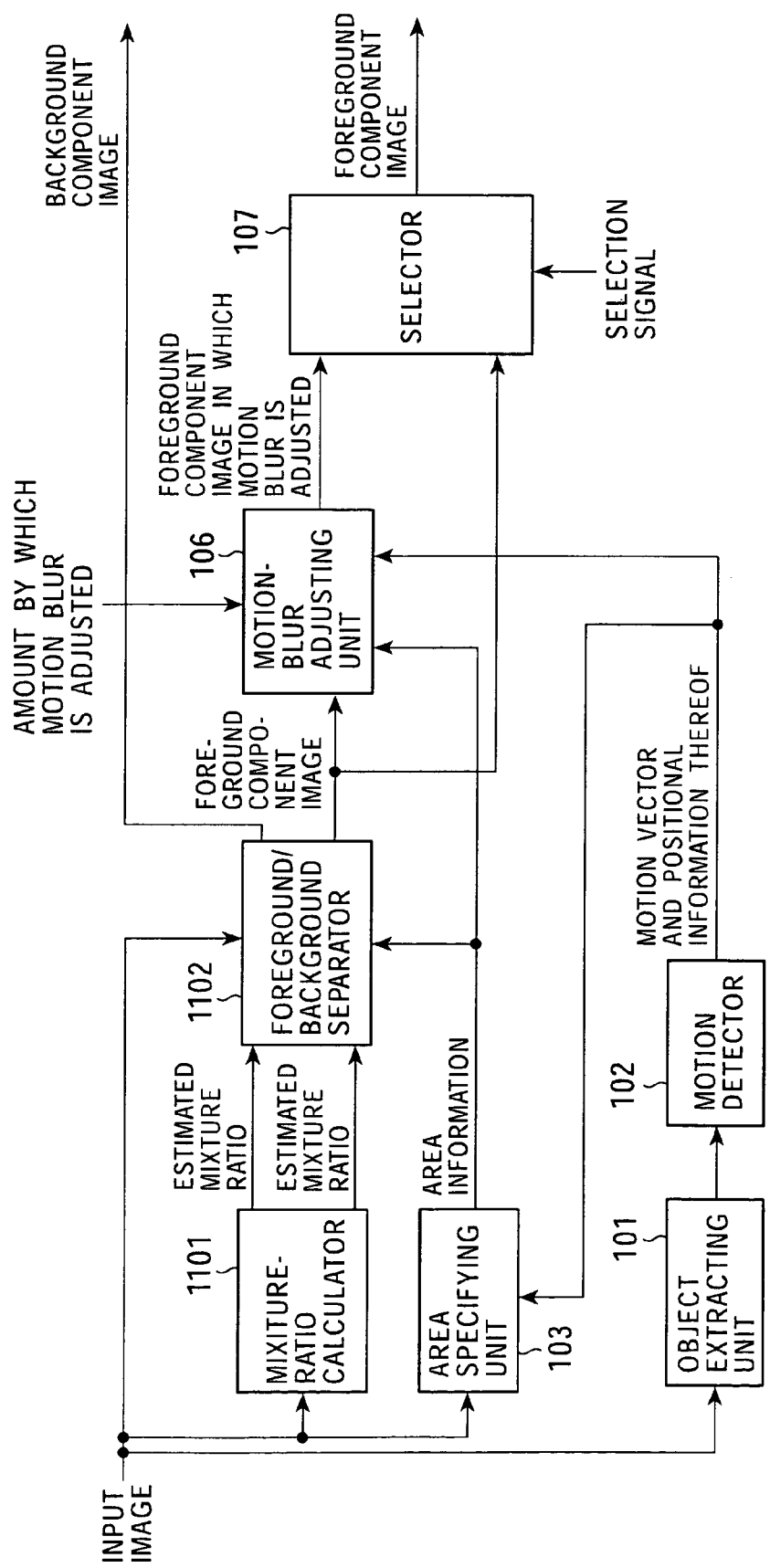
FIG. 87 is a block diagram illustrating still another configuration of the function of the image processing apparatus.

FIG. 87 is a block diagram illustrating still another configuration of the function of the image processing apparatus for adjusting the amount of motion blur. The image processing apparatus shown in FIG. 2 sequentially performs the area-specifying operation and the calculation for the mixture ratio α. In contrast, the image processing apparatus shown in FIG. 87 simultaneously performs the area-specifying operation and the calculation for the mixture ratio α.

The functional elements similar to those in the block diagram of FIG. 2 are designated with like reference numerals, and an explanation thereof is thus omitted.

An input image is supplied to a mixture-ratio calculator 1101, a foreground/background separator 1102, the area specifying unit 103, and the object extracting unit 101.

The mixture-ratio calculator 1101 calculates, based on the input image, the estimated mixture ratio when it is assumed that each pixel contained in the input image belongs to the covered background area, and the estimated mixture ratio when it is assumed that each pixel contained in the input image belongs to the uncovered background area, and supplies the estimated mixture ratios calculated as described above to the foreground/background separator 1102.

Figure 88:
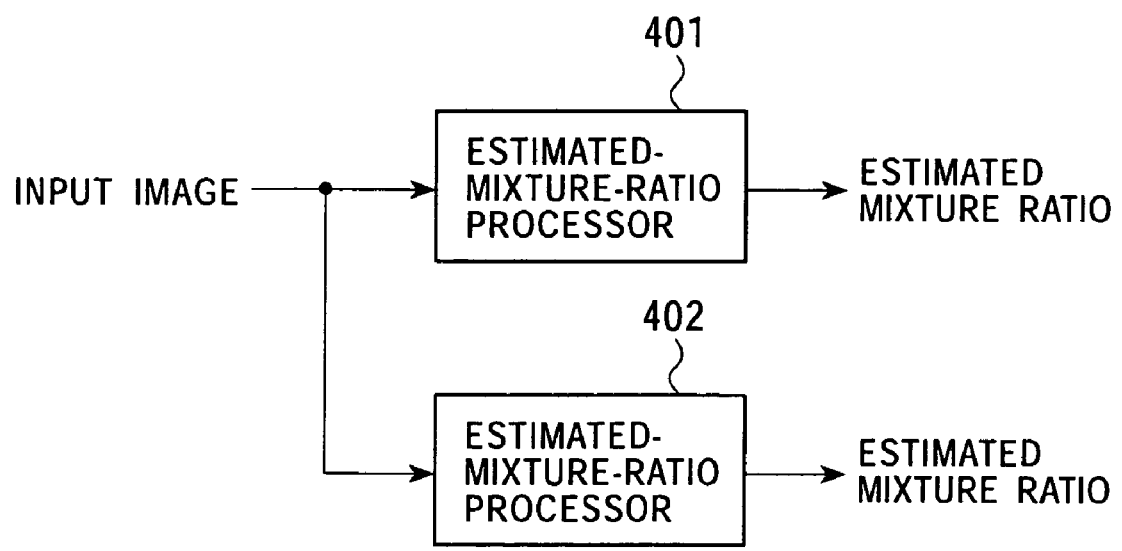
FIG. 88 is a block diagram illustrating the configuration of a mixture-ratio calculator 1101.

FIG. 88 is a block diagram illustrating the configuration of the mixture-ratio calculator 1101.

An estimated-mixture-ratio processor 401 shown in FIG. 88 is the same as the estimated-mixture-ratio processor 401 shown in FIG. 47. An estimated-mixture-ratio processor 402 shown in FIG. 88 is the same as the estimated-mixture-ratio processor 402 shown in FIG. 47.

The estimated-mixture-ratio processor 401 calculates the estimated mixture ratio for each pixel by the computation corresponding to a model of the covered background area based on the input image, and outputs the calculated estimated mixture ratio.

The estimated-mixture-ratio processor 402 calculates the estimated mixture ratio for each pixel by the computation corresponding to a model of the uncovered background area based on the input image, and outputs the calculated estimated mixture ratio.

The foreground/background separator 1102 generates the foreground component image from the input image based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and supplies the generated foreground component image to the motion-blur adjusting unit 106 and the selector 107.

Figure 89:
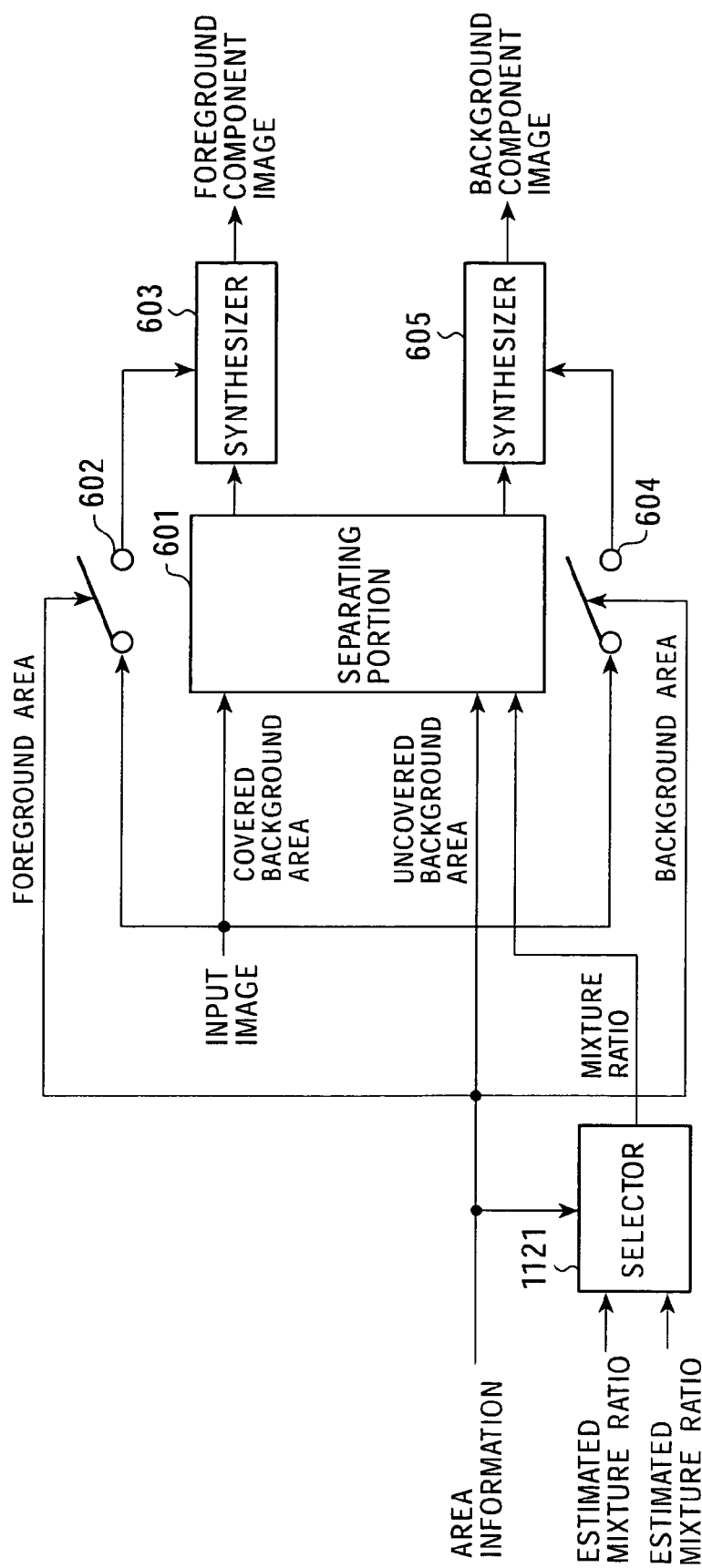
FIG. 89 is a block diagram illustrating the configuration of a foreground/background separator 1102.

FIG. 89 is a block diagram illustrating an example of the configuration of the foreground/background separator 1102.

The elements similar to those of the foreground/background separator 105 shown in FIG. 64 are designated with like reference numerals, and an explanation thereof is thus omitted.

A selector 1121 selects, based on the area information supplied from the area specifying unit 103, either the estimated mixture ratio calculated when it is assumed that the pixel belongs to the covered background area supplied from the mixture-ratio calculator 1101 or the estimated mixture ratio calculated when it is assumed that the pixel belongs to the uncovered background area supplied from the mixture-ratio calculator 1101, and supplies the selected estimated mixture ratio to the separating portion 601 as the mixture ratio α.

The separating portion 601 extracts the foreground components and the background components from the pixel values of the pixels belonging to the mixed area based on the mixture ratio α supplied from the selector 1121 and the area information, and supplies the extracted foreground components to the synthesizer 603 and also supplies the foreground components to the synthesizer 605.

The separating portion 601 can be configured similarly to the counterpart shown in FIG. 69.

The synthesizer 603 synthesizes the foreground component image and outputs it. The synthesizer 605 synthesizes the background component image and outputs it.

The motion-blur adjusting unit 106 shown in FIG. 87 can be configured similarly to the counterpart shown in FIG. 2. The motion-blur adjusting unit 106 adjusts the amount of motion blur contained in the foreground component image supplied from the foreground/background separator 1102 based on the area information and the motion vector, and outputs the foreground component image in which the amount of motion blur is adjusted.

The selector 107 shown in FIG. 87 selects the foreground component image supplied from the foreground/background separator 1102 or the foreground component image in which the amount of motion blur is adjusted supplied from the motion-blur adjusting unit 106 based on, for example, a selection signal reflecting a user's selection, and outputs the selected foreground component image.

As discussed above, the image processing apparatus shown in FIG. 87 is able to adjust the amount of motion blur contained in an image corresponding to a foreground object of the input image, and outputs the resulting foreground object image. The image processing apparatus having the configuration shown in FIG. 87 is able to calculate the mixture ratio α, which is embedded information, and outputs the calculated mixture-ratio α in the same manner as in the first embodiment.

Figure 90:
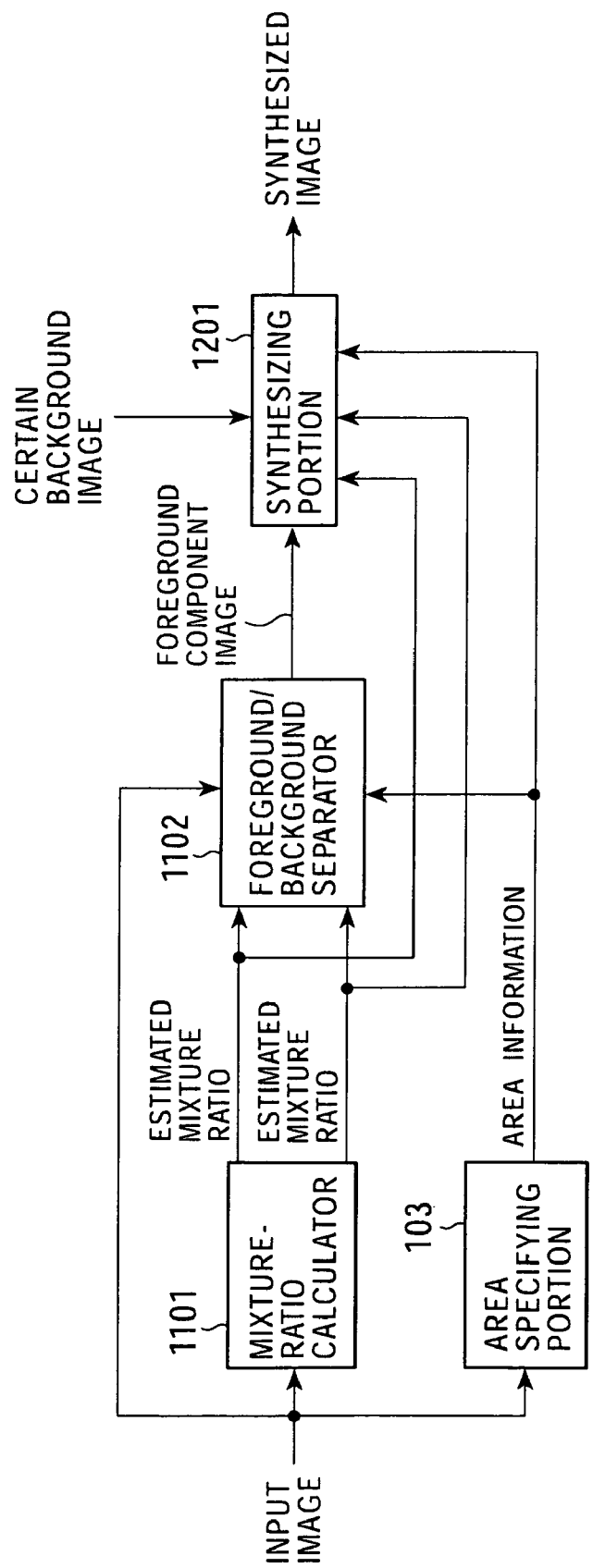
FIG. 90 is a block diagram illustrating still another configuration of the function of the image processing apparatus.

FIG. 90 is a block diagram illustrating still another configuration of the function of the image processing apparatus for adjusting the amount of motion blur. The image processing apparatus shown in FIG. 85 sequentially performs the area-specifying operation and the calculation for the mixture ratio α. In contrast, the image processing apparatus shown in FIG. 90 simultaneously performs the area-specifying operation and the calculation for the mixture ratio α.

The functional elements similar to those indicated by the block of FIG. 87 are designated with like reference numerals, and an explanation thereof is thus omitted.

The mixture-ratio calculator 1101 shown in FIG. 90 calculates, based on the input image, the estimated mixture ratio when it is assumed that each pixel contained in the input image belongs to the covered background area, and the estimated mixture ratio when it is assumed that each pixel contained in the input image belongs to the uncovered background area, and supplies the estimated mixture ratios calculated as described above to the foreground/background separator 1102 and a synthesizer 1201.

The foreground/background separator 1102 shown in FIG. 90 generates the foreground component image from the input image based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and supplies the generated foreground component image to the synthesizer 1201.

The synthesizer 1201 combines a certain background image with the foreground component image supplied from the foreground/background separator 1102 based on the estimated mixture ratio calculated when it is assumed that the pixel belongs to the covered background area supplied from the mixture-ratio calculator 1101, the estimated mixture ratio calculated when it is assumed that the pixel belongs to the uncovered background area supplied from the mixture-ratio calculator 1101, and the area information supplied from the area specifying unit 103, and outputs the synthesized image in which the background image and the foreground component image are combined.

Figure 91:
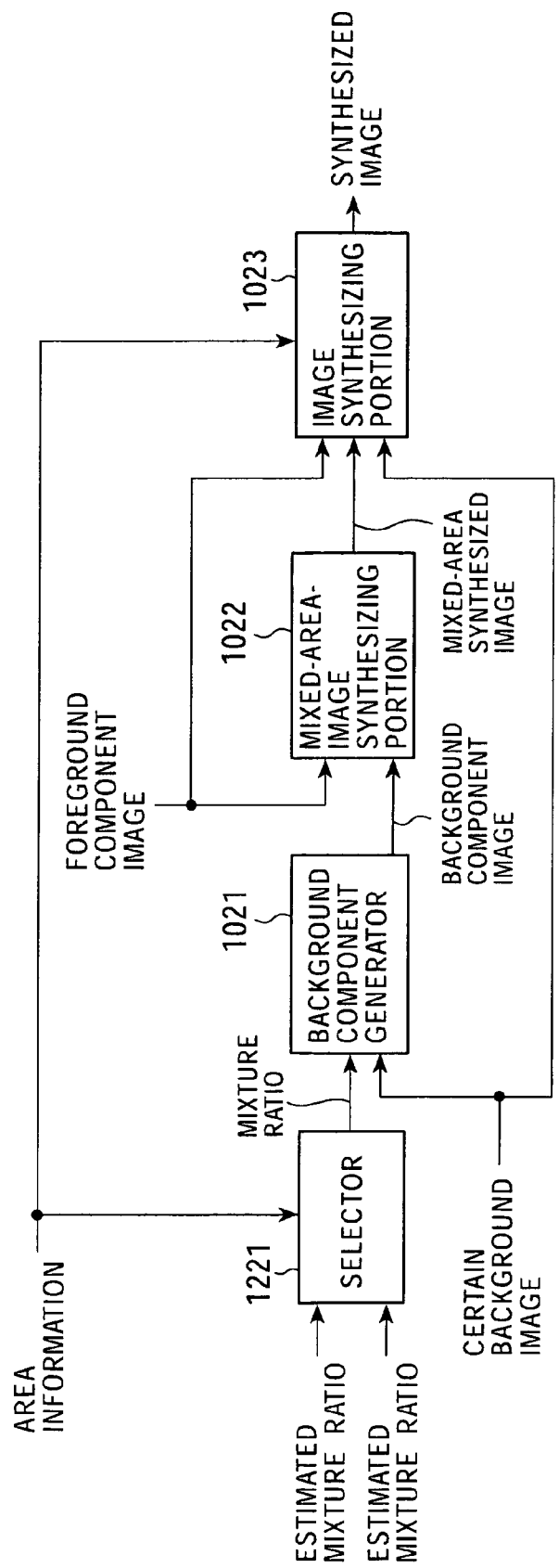
FIG. 91 illustrates the configuration of a synthesizer 1201.

FIG. 91 illustrates the configuration of the synthesizer 1201. The functional elements similar to those of the block diagram of FIG. 86 are designated with like reference numerals, and explanation thereof is thus omitted.

A selector 1221 selects, based on the area information supplied from the area specifying unit 103, either the estimated mixture ratio calculated when it is assumed that the pixel belongs to the covered background area supplied from the mixture-ratio calculator 1101 or the estimated mixture ratio calculated when it is assumed that the pixel belongs to the uncovered background area supplied from the mixture-ratio calculator 1101, and supplies the selected estimated mixture ratio to the background component generator 1021 as the mixture ratio α.

The background component generator 1021 shown in FIG. 91 generates a background component image based on the mixture ratio α supplied from the selector 1221 and a certain background image, and supplies the background component image to the mixed-area-image synthesizing portion 1022.

The mixed-area-image synthesizing portion 1022 shown in FIG. 91 combines the background component image supplied from the background component generator 1021 with the foreground component image so as to generate a mixed-area synthesized image, and supplies the generated mixed-area synthesized image to the image synthesizing portion 1023.

The image synthesizing portion 1023 combines the foreground component image, the mixed-area synthesized image supplied from the mixed-area-image synthesizing portion 1022, and the background image based on the area information so as to generate a synthesized image and outputs it.

In this manner, the synthesizer 1201 is able to combine the foreground component image with a certain background image.

A description is given of an image processing apparatus for processing an input image, which is input as component signals, according to the present invention.

In this specification, the component refers to an individual signal, such as a luminance signal, a color-difference signal, or an RGB signal in the component signal.

A description is given below based on an example in which component 1 is a luminance value Y, component 2 is a color difference U, and component 3 is a color difference V.

Figure 92:
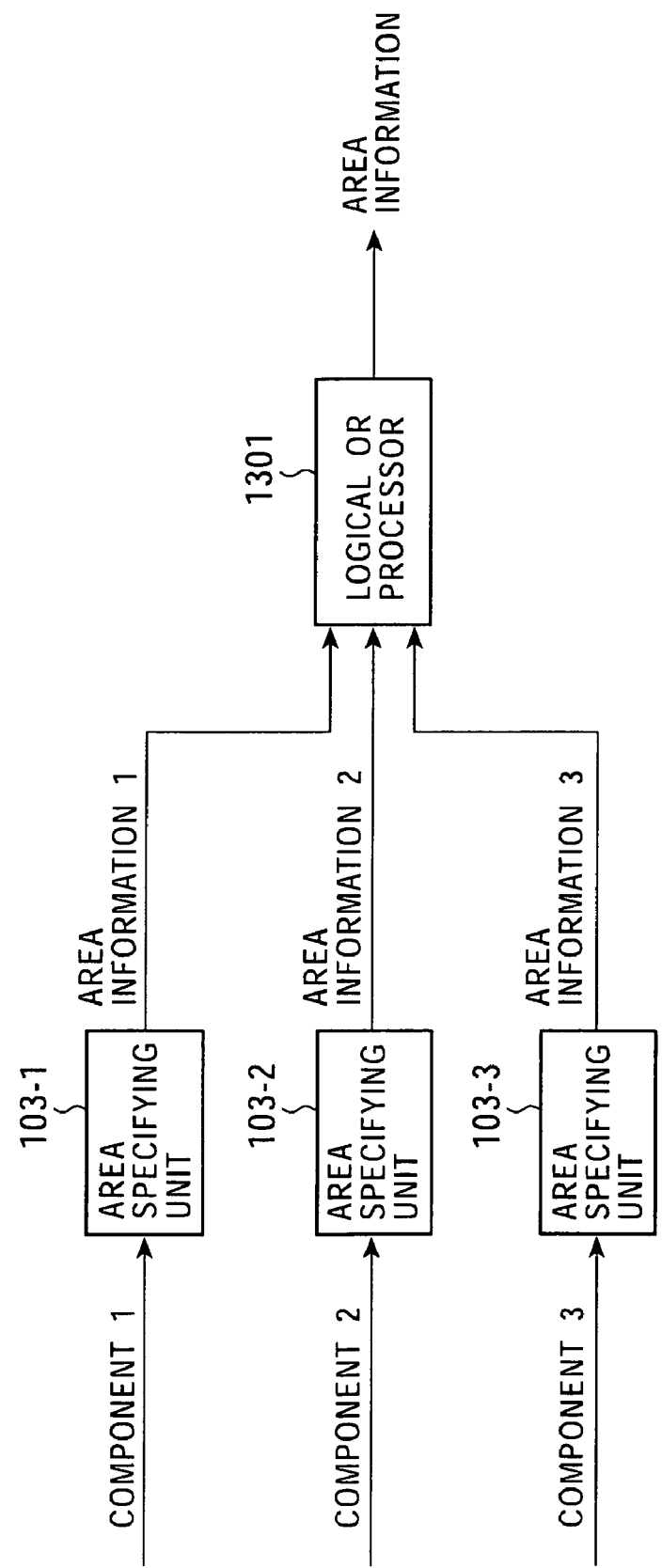
FIG. 92 shows an embodiment of an image processing apparatus for generating area information on the basis of input images which are input as component signals.

FIG. 92 shows an embodiment of an image processing apparatus for generating area information on the basis of an input image which is input as component signals.

The component 1, which is one of the component signals of the input image, is input to an area specifying unit 103-1. The component 2, which is another one of the component signals of the input image, is input to an area specifying unit 103-2. The component 3, which is still another one of the component signals of the input image, is input to an area specifying unit 103-3.

Based on the component 1, the area specifying unit 103-1 generates area information 1 and supplies the generated area information 1 to a logical OR processor 1301. The area specifying unit 103-1 has the same configuration as that of the area specifying unit 103, and an explanation thereof is thus omitted.

Based on the component 2, the area specifying unit 103-2 generates area information 2 and supplies the generated area information 2 to a logical OR processor 1302. The area specifying unit 103-2 has the same configuration as that of the area specifying unit 103, and an explanation thereof is thus omitted.

Based on the component 3, the area specifying unit 103-3 generates area information 3 and supplies the generated area information 3 to a logical OR processor 1303. The area specifying unit 103-3 has the same configuration as that of the area specifying unit 103, and an explanation thereof is thus omitted.

Based on the area information 1 supplied from the area specifying unit 103-1, the area information 2 supplied from the area specifying unit 103-2, and the area information 3 supplied from the area specifying unit 103-3, the logical OR processor 1301 calculates the logical OR of the foreground area indicated by the area information 1, the foreground area indicated by the area information 2, and the foreground area indicated by the area information 3, and generates area information in which the foreground area calculated by logical OR is set. Based on the area information 1 supplied from the area specifying unit 103-1, the area information 2 supplied from the area specifying unit 103-2, and the area information 3 supplied from the area specifying unit 103-3, the logical OR processor 1301 computes the logical OR of the background area indicated by the area information 1, the background area indicated by the area information 2, and the background area indicated by the area information 3, and generates area information in which the background area calculated by logical OR is set.

Based on the area information 1 supplied from the area specifying unit 103-1, the area information 2 supplied from the area specifying unit 103-2, and the area information 3 supplied from the area specifying unit 103-3, the logical OR processor 1301 computes the logical OR of the covered background area indicated by the area information 1, the covered background area indicated by the area information 2, and the covered background area indicated by the area information 3, and generates area information in which the covered background area calculated by logical OR is set. Based on the area information 1 supplied from the area specifying unit 103-1, the area information 2 supplied from the area specifying unit 103-2, and the area information 3 supplied from the area specifying unit 103-3, the logical OR processor 1301 computes the logical OR of the uncovered background area indicated by the area information 1, the uncovered background area indicated by the area information 2, and the uncovered background area indicated by the area information 3, and generates area information in which the uncovered background area calculated by logical OR is set.

The logical OR processor 1301 outputs the area information in which the foreground area, the background area, the covered background area, and the uncovered background area are set.

Figure 93:
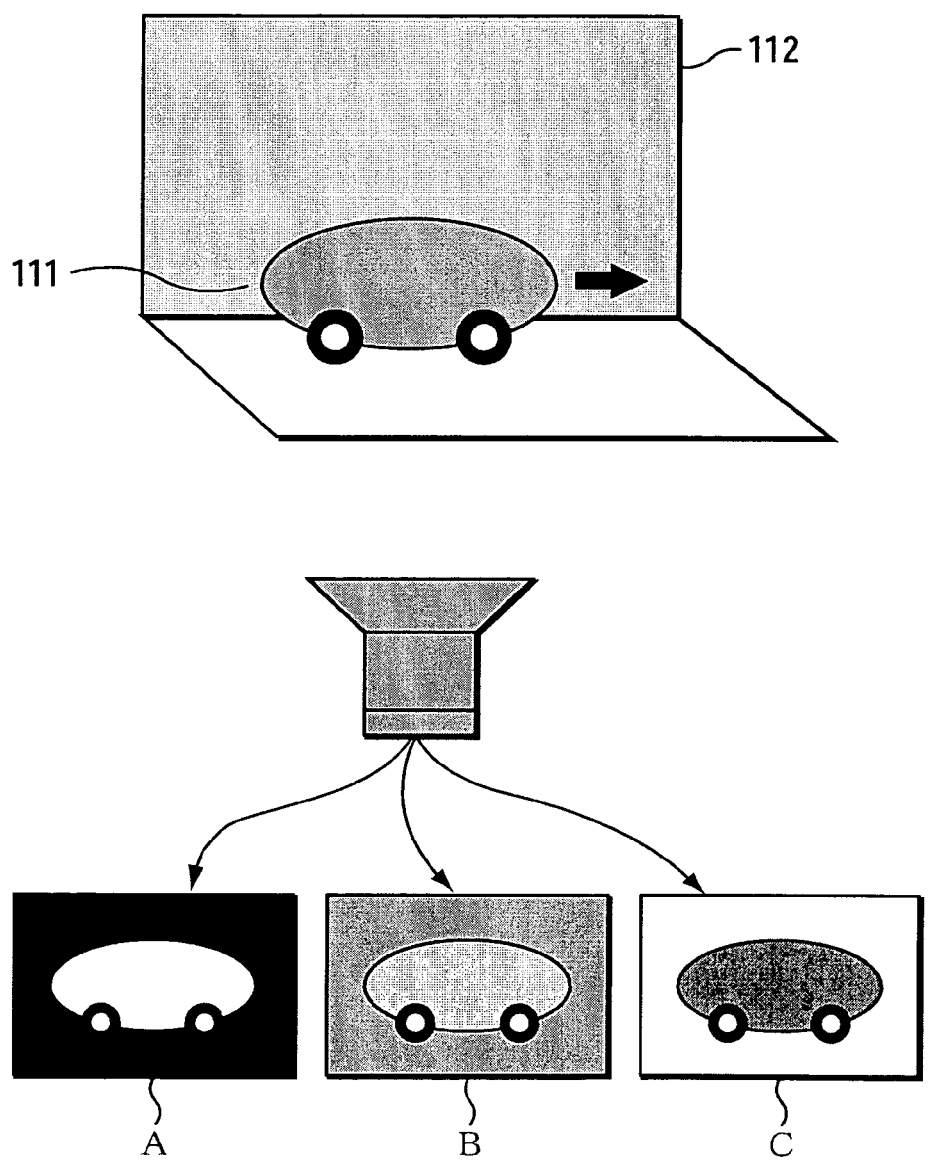
FIG. 93 illustrates the relationship among component 1, component 2, and component 3.

FIG. 93 illustrates the relationship among the component 1, the component 2, and the component 3, contained in the component signals. In FIG. 93, reference letter A denotes the component 1, reference letter B denotes the component 2, and reference letter C denotes the component 3.

A sensor has, for example, three CCD area sensors corresponding to the component 1, the component 2, and the component 3. The characteristics of the CCD area sensor corresponding to the component 1, the characteristics of the CCD area sensor corresponding to the component 2, and the characteristics of the CCD area sensor corresponding to the component 3 are the same, and distortions which occur in the component 1, the component 2, and the component 3 are the same.

The sensor captures the image of an object 111 corresponding to a single foreground and an object 112 corresponding to a single background, and outputs the component 1, the component 2, and the component 3.

The real world including the object 111 corresponding to a single foreground and the object 112 corresponding to a single background is one, and the phenomenon which occurs in the real world is one. That is, for example, the shape of the object 111 corresponding to a single foreground is one, and the motion of the object 111 corresponding to a foreground is one.

Therefore, when the image of the object 111 corresponding to a single foreground and the image of the object 112 corresponding to a single background are captured by the sensor, the foreground area, the background area, the mixed area, and the mixture ratio α of the component 1, the foreground area, the background area, the mixed area, and the mixture ratio α of the component 2, and the foreground area, the background area, the mixed area, and the mixture ratio α of the component 3 are the same as each other.

However, when the same processing is performed based on each of the component 1, the component 2, and the component 3, the same area information and the same mixture ratio $\alpha$ cannot always be calculated for each.

For example, when the image of the object 111 corresponding to a foreground and the image of the object 112 corresponding to a background, having chroma in which the color-difference signal corresponding to the component 3, which is a color-difference signal, is approximately 0 are captured, the component 1 which is a luminance signal and the component 2 which is a color-difference signal contain significant values, but the component 3 which is a color-difference signal scarcely contains significant values. In such a case, even if the area signal and the mixture ratio $\alpha$ are calculated based on the component 3, significant values cannot be determined.

Furthermore, for example, when the component 1 which is a luminance signal scarcely changes in the time direction and in the spatial direction and only the color-difference signal changes in the time direction or in the spatial direction, even if the area signal and the mixture ratio $\alpha$ are calculated based on the component 1, significant values cannot be determined, and if the area signal and the mixture ratio $\alpha$ are calculated based on the component 2 or 3, significant values can be determined.

Furthermore, there are cases in which the CCD area sensor corresponding to a specific component may cause an error to occur.

As discussed above, as a result of performing processing using a plurality of components corresponding to single area information and a single mixture ratio $\alpha$ to be calculated, results with a higher accuracy compared to processing using, for example, a single component signal or a single composite signal are obtained.

When a statistical process is performed using a plurality of components, since the amount of data is increased, the accuracy of the processed results is improved further. Furthermore, for example, the accuracy of the mixture ratio $\alpha$ which is calculated by applying a method of least squares to a plurality of components is higher than the accuracy of the mixture ratio $\alpha$ calculated by processing using a single component signal or a single composite signal.

Figure 94:
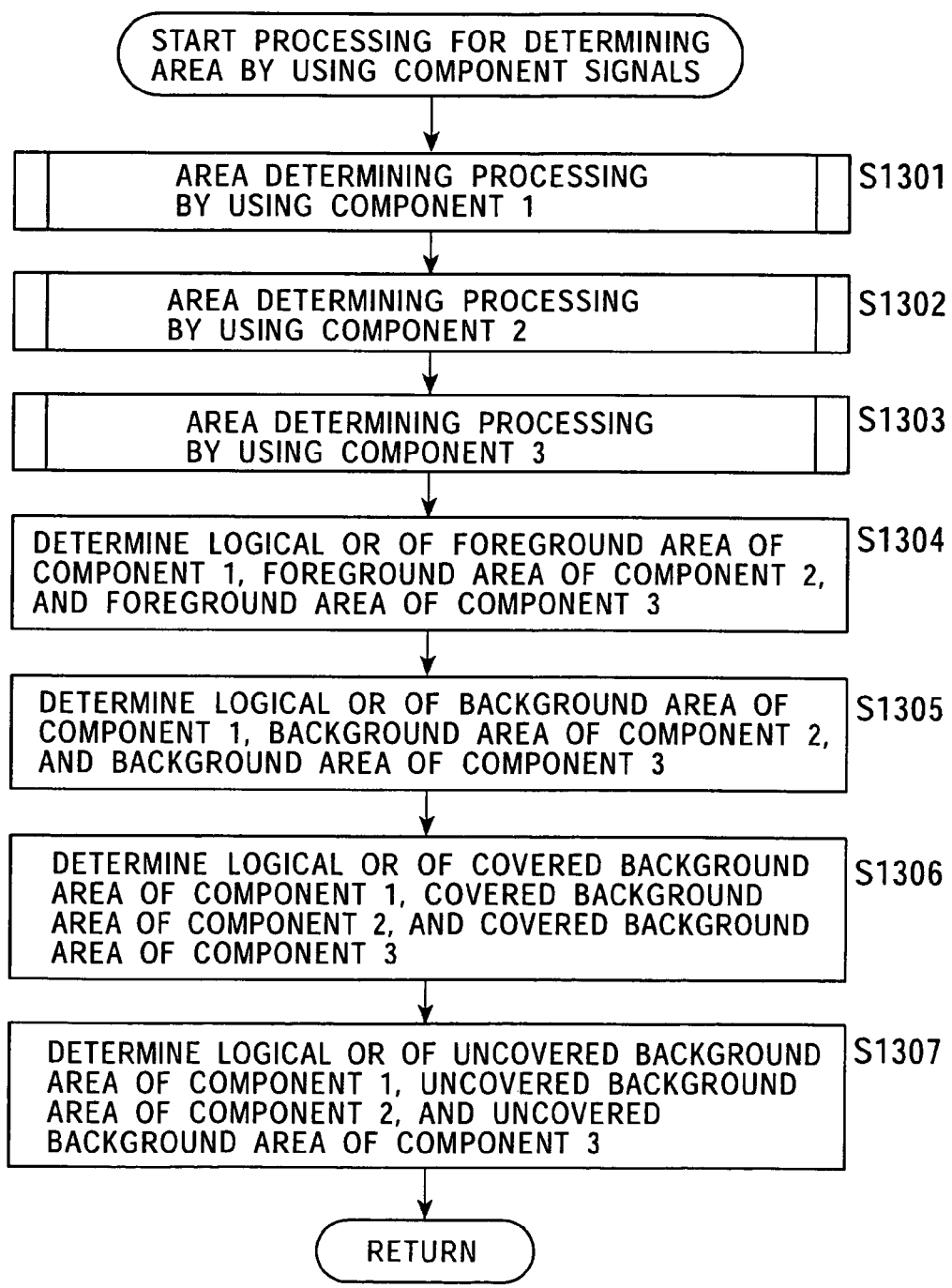
FIG. 94 is a flowchart illustrating the processing for determining the area using component signals.

Next, referring to the flowchart in FIG. 94, a description will now be given of area determining processing using a component signal by the image processing apparatus configured as shown in FIG. 92.

In step S1301, the area specifying unit 103-1 executes area specifying processing on the basis of the component 1 in order to generate area information 1, and supplies the generated area information 1 to the logical OR processor 1301. The processing of step S1301 is the same as the processing of step S11, and a detailed explanation thereof is thus omitted.

In step S1302, the area specifying unit 103-2 executes area specifying processing based on the component 2 in order to generate area information 2, and supplies the generated area information 2 to the logical OR processor 1301. The processing of step S1302 is the same as the processing of step S11, and a detailed explanation thereof is thus omitted.

In step S1303, the area specifying unit 103-3 executes area specifying processing based on the component 3 in order to generate area information 3, and supplies the generated area information 3 to the logical OR processor 1301. The processing of step S1303 is the same as the processing of step S11, and an explanation thereof is thus omitted.

In step S1304, the logical OR processor 1301 calculates the logical OR of the foreground area specified by the component 1, the foreground area specified by the component 2, and the foreground area specified by the component 3, and sets the foreground area calculated by logical OR as area information.

In step S1305, the logical OR processor 1301 calculates the logical OR of the background area specified by the component 1, the background area specified by the component 2, and the background area specified by the component 3, and sets the background area calculated by logical OR as area information.

In step S1306, the logical OR processor 1301 calculates the logical OR of the covered background area specified by the component 1, the covered background area specified by the component 2, and the covered background area specified by the component 3, and sets the covered background area calculated by logical OR as area information.

In step S1307, the logical OR processor 1301 determines the logical OR of the uncovered background area specified by the component 1, the uncovered background area specified by the component 2, and the uncovered background area specified by the component 3, and sets the uncovered background area calculated by logical OR as area information. The logical OR processor 1301 outputs the area information in which the foreground area, the background area, the covered background area, and the uncovered background area are set, and then the processing is terminated.

As discussed above, the image processing apparatus configured as shown in FIG. 92 specifies an area for each component of the component signal and determines the logical OR of the specified areas in order to generate final area information. The image processing apparatus configured as shown in FIG. 92 is able to thoroughly output the area information in which the foreground area, the background area, the covered background area, and the uncovered background area are specified.

Figure 95:
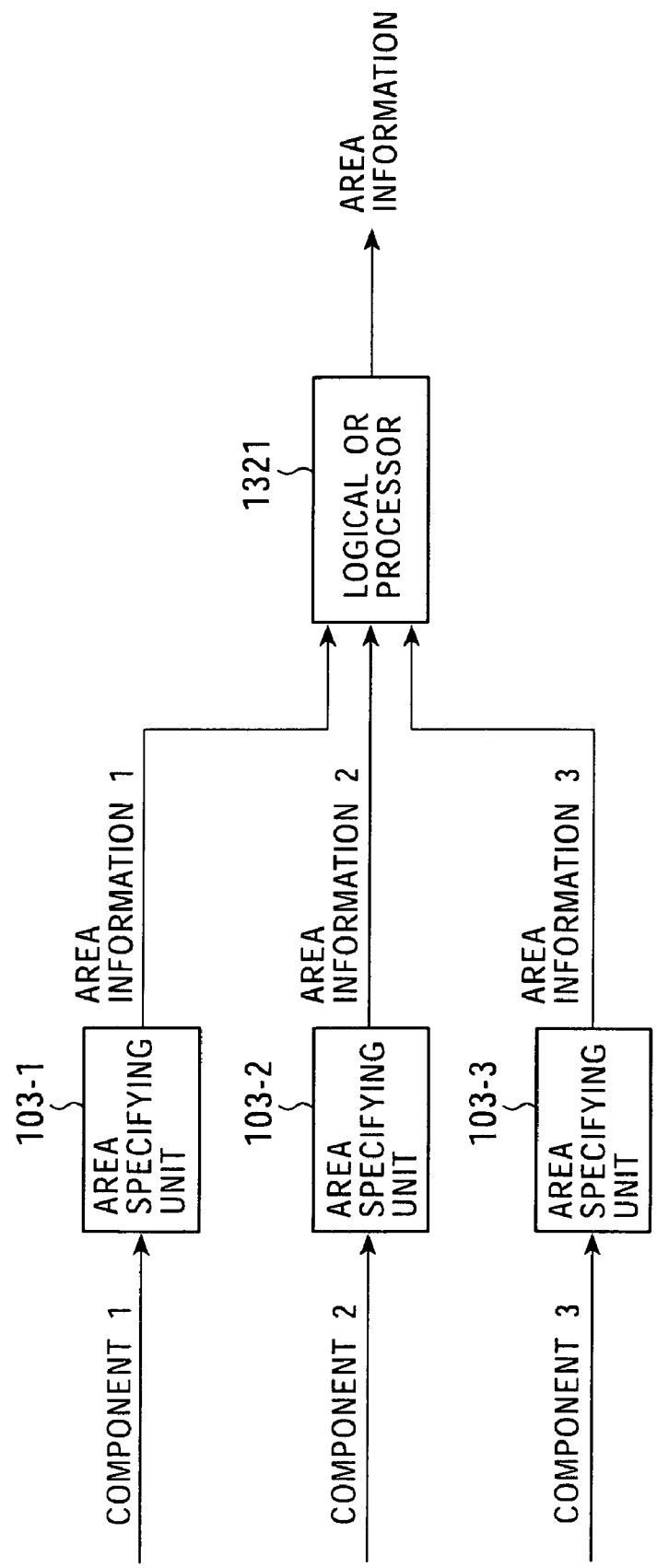
FIG. 95 shows another embodiment of an image processing apparatus for generating area information on the basis of input images which are input as component signals.

FIG. 95 shows another embodiment of the image processing apparatus for generating area information on the basis of an input image which is input as component signals.

The same elements as those shown in FIG. 92 are designated with like reference numerals, and an explanation thereof is thus omitted.

Based on the area information supplied from the area specifying unit 103-1, the area information 2 supplied from the area specifying unit 103-2, and the area information 3 supplied from the area specifying unit 103-3, a logical AND processor 1321 calculates the logical AND of the foreground area indicated by the area information 1, the foreground area indicated by the area information 2, the foreground area indicated by the area information 3, and generates area information in which the foreground area calculated by logical AND is set. Based on the area information supplied from the area specifying unit 103-1, the area information 2 supplied from the area specifying unit 103-2, and the area information 3 supplied from the area specifying unit 103-3, the logical AND processor 1321 calculates the logical AND of the background area indicated by the area information 1, the background area indicated by the area information 2, the background area indicated by the area information 3, and generates area information in which the background area calculated by logical AND is set.

Based on the area information supplied from the area specifying unit 103-1, the area information 2 supplied from the area specifying unit 103-2, and the area information 3 supplied from the area specifying unit 103-3, the logical AND processor 1321 calculates the logical AND of the covered background area indicated by the area information 1, the covered background area indicated by the area information 2, the covered background area indicated by the area information 3, and generates area information in which the covered background area calculated by logical AND is set. Based on the area information supplied from the area specifying unit 103-1, the area information 2 supplied from the area specifying unit 103-2, and the area information 3 supplied from the area specifying unit 103-3, the logical AND processor 1321 calculates the logical AND of the uncovered background area indicated by the area information 1, the uncovered background area indicated by the area information 2, the uncovered background area indicated by the area information 3, and generates area information in which the uncovered background area calculated by logical AND is set.

The logical AND processor 1321 outputs the area information in which the foreground area, the background area, the covered background area, and the uncovered background area are set.

Figure 96:
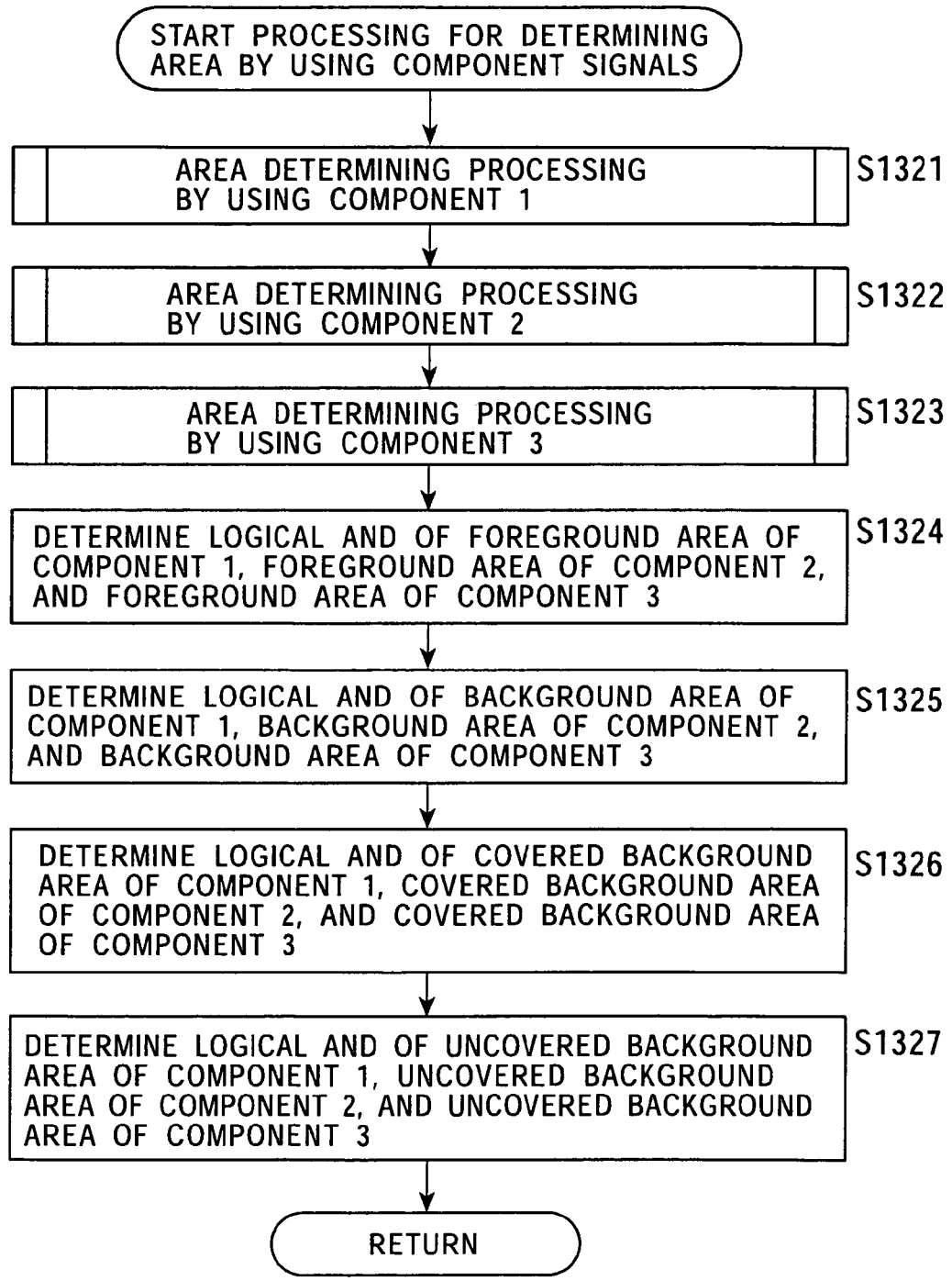
FIG. 96 is a flowchart illustrating another processing for determining the area using component signals.

Next, referring to the flowchart in FIG. 96, a description will now be given of area determining processing using components, performed by the image processing apparatus configured as shown in FIG. 95.

In step S1321, the area specifying unit 103-1 executes area specifying processing on the basis of the component 1 in order to generate area information 1 and supplies the generated area information 1 to the logical AND processor 1321. The processing of step S1321 is the same as the processing of step S11, and a detailed explanation thereof is thus omitted.

In step S1322, the area specifying unit 103-2 executes area specifying processing on the basis of the component 2 in order to generate area information 2 and supplies the generated area information 2 to the logical AND processor 1321. The processing of step S1322 is the same as the processing of step S11, and a detailed explanation thereof is thus omitted.

In step S1323, the area specifying unit 103-3 executes area specifying processing on the basis of the component 3 in order to generate area information 3 and supplies the generated area information 3 to the logical AND processor 1321. The processing of step S1323 is the same as the processing of step S11, and a detailed explanation thereof is thus omitted.

In step S1324, the logical AND processor 1321 determines the logical AND of the foreground area specified by the component 1, the foreground area specified by the component 2, and the foreground area specified by the component 3, and sets the foreground area calculated by logical AND as area information.

In step S1325, the logical AND processor 1321 determines the logical AND of the background area specified by the component 1, the background area specified by the component 2, and the background area specified by the component 3, and sets the background area calculated by logical AND as area information.

In step S1326, the logical AND processor 1321 determines the logical AND of the covered background area specified by the component 1, the covered background area specified by the component 2, and the covered background area specified by the component 3, and sets the covered background area calculated by logical AND as area information.

In step S1327, the logical AND processor 1321 determines the logical AND of the uncovered background area specified by the component 1, the uncovered background area specified by the component 2, and the uncovered background area specified by the component 3, and sets the uncovered background area calculated by logical AND as area information. The logical AND processor 1321 outputs the area information in which the foreground area, the background area, the covered background area, and the uncovered background area are set, and the processing is then terminated.

As discussed above, the image processing apparatus configured as shown in FIG. 95 specifies an area for each component, and determines the logical AND of the specified areas in order to generate final area information. The image processing apparatus configured as shown in FIG. 95 is able to output area information having a small amount of errors.

Figures 97, 98:
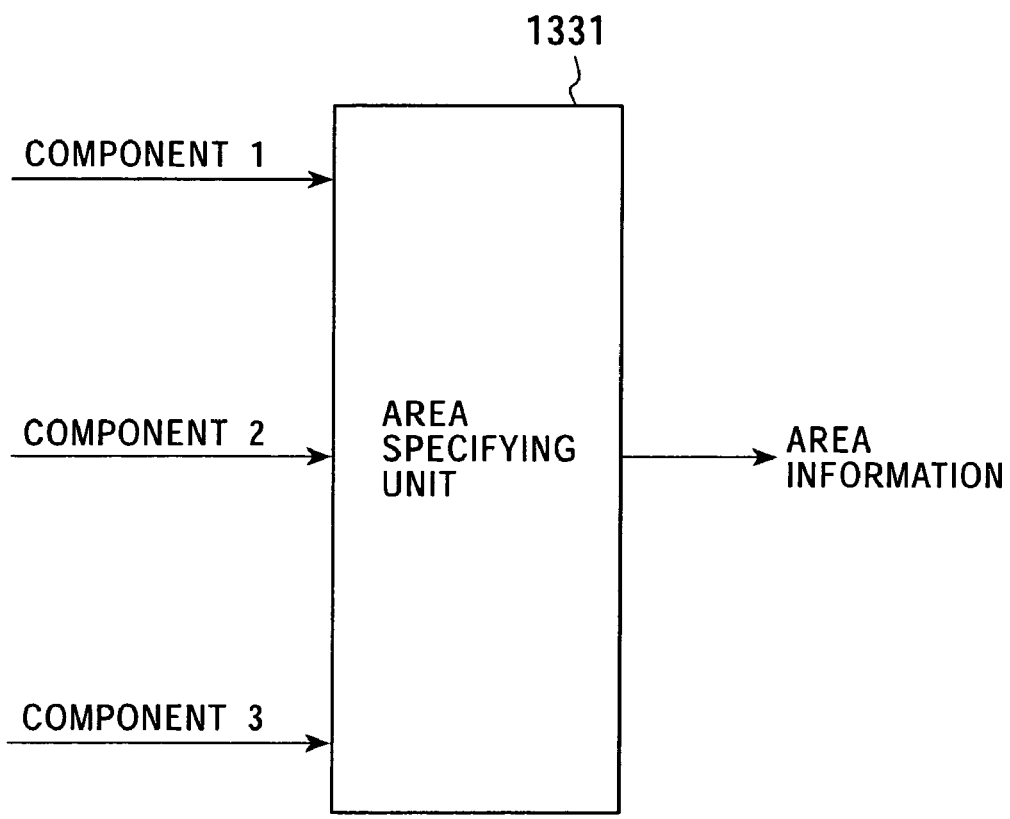
FIG. 97 shows still another embodiment of an image processing apparatus for generating area information on the basis of input images which are input as component signals.
FIG. 98 shows the relationship between a space correlation and a time correlation in a stationary area and in a moving area.

FIG. 97 shows still another embodiment of the image processing apparatus for generating area information on the basis of an input image which is input as component signals.

An area specifying unit 1331 adds, for each pixel, the component 1, the component 2, and the component 3, contained in the input component signals, and determines whether the pixel belongs to a moving area or a stationary area on the basis of the component 1, the component 2, and the component 3, which are added for each pixel. The area specifying unit 1331 generates area information on the basis of the result of the determination of the moving area or the stationary area, and outputs the generated area information.

Referring to FIGS. 98 to 102, the processing of the area specifying unit 1331 will now be described.

As shown in FIG. 98, from the viewpoint of statistical characteristics of images, the time correlation is stronger than the space correlation in the stationary area of the image. Furthermore, in the moving area of the image, conversely, the space correlation is stronger than the time correlation.

Figure 99:
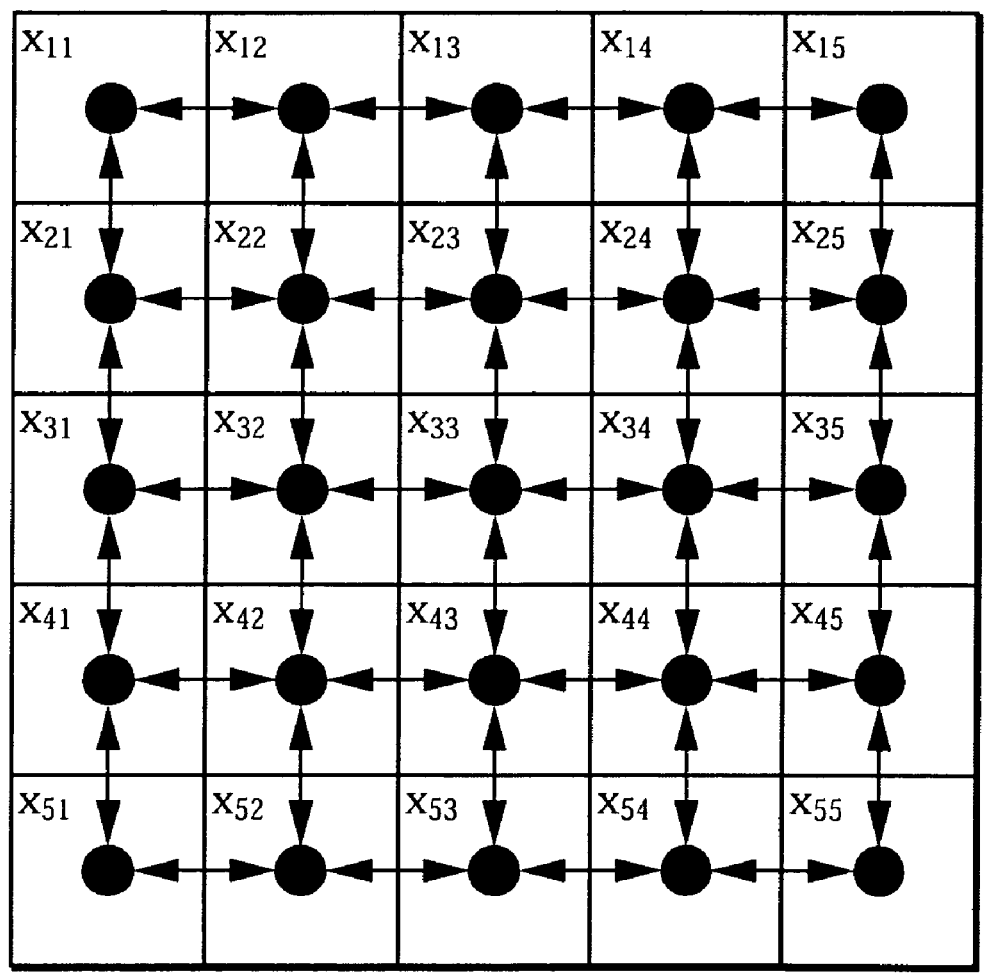
FIG. 99 illustrates an example of the calculation of a space correlation.

When the space correlation for the determination of the moving area or the stationary area is to be calculated, as shown in FIG. 99, for example, with regard to the pixels of a block of 5×5 pixels with the designated pixel being the center, the area specifying unit 1331 calculates the differences of the pixel values of the adjacent pixels, and calculates the total sum of the absolute values of the calculated differences. The area specifying unit 1331 calculates the correlation value corresponding to the space correlation by dividing the total sum of the absolute values of the calculated differences by the number of the differences.

For example, when the designated pixel is x33 and the pixel values of the pixels contained in the block are x11 to x55, the area specifying unit 1331 calculates the sum of the absolute values the differences, which is the total sum of the absolute values of the differences of the pixel values of the adjacent pixels, shown in equation (119):

$$\text{Sum of absolute values of differences} = |(x11-x12)| + |(x12-x13)| + |(x13-x14)| + \ldots + \\ |(x52-x53)| + |(x53-x54)| + |(x54-x55)| + \\ |(x11-x21)| + |(x21-x31)| + |(x31-x41)| + \ldots + \\ |(x25-x35)| + |(x35-x45)| + |(x45-x55)| + \quad (119)$$

The area specifying unit 1331 calculates the correlation value corresponding to the space correlation by dividing the sum of the absolute values the differences by the difference number, i.e., 40.

When the time correlation for determining whether or not it is a moving area or a stationary area is to be calculated, the area specifying unit 1331 calculates the difference between the pixel value of the designated pixel and the pixel value of the pixel at the corresponding position in the previous frame, and also calculates the difference between the pixel value of the designated pixel and the pixel value of the pixel at the corresponding position in the subsequent frame. In order to prevent the area from being determined to be wide in the boundary as a result of using a difference indicating a stronger correlation, the area specifying unit 1331 selects either the difference with respect to the pixel value of the pixel at the corresponding position in the previous frame or the difference with respect to the pixel value of the pixel at the corresponding position in the previous frame, which is smaller.

The area specifying unit 1331 calculates the total sum of the absolute values of the selected differences. The area specifying unit 1331 calculates the correlation value corresponding to the time correlation by dividing the total sum of the absolute values of the calculated differences by the number of differences.

Figure 100:
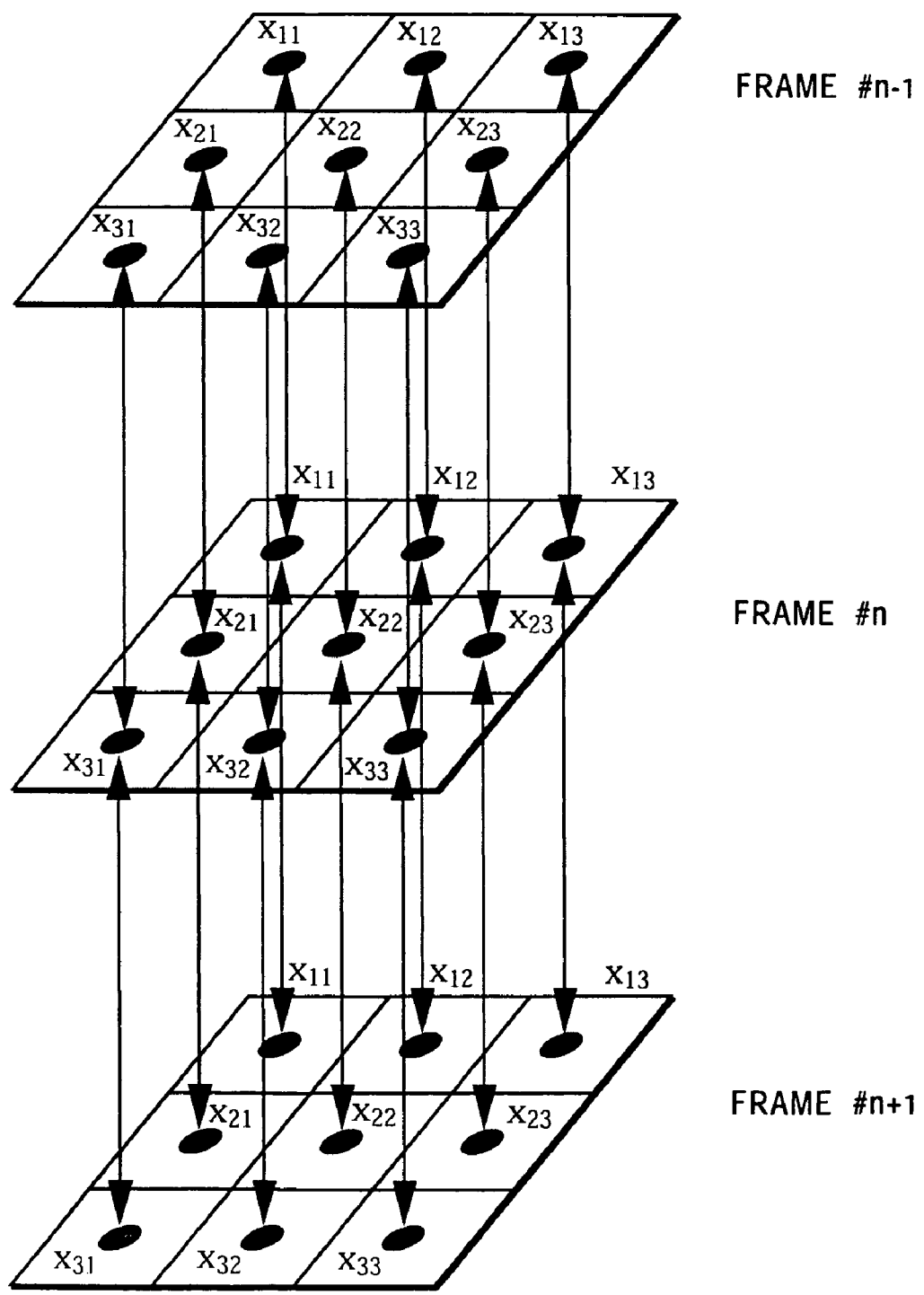
FIG. 100 illustrates an example of the calculation of a time correlation.

For example, when the designated frame is frame #n, as shown in FIG. 100, the area specifying unit 1331 calculates the differences between respective pixels of a block of 3×3 pixels, for example, with the designated pixel x22 being the center.

The area specifying unit 1331 calculates the difference between the pixel value x11 of the pixel in frame #n and the pixel value x11 of the pixel at the corresponding position in frame #n−1, and the difference between the pixel value x11 of the pixel in frame #n and the pixel value x11 of the pixel at the corresponding position in frame #n+1. The area specifying unit 1331 selects either the difference with respect to the pixel value x11 of the pixel at the corresponding position in frame #n−1 or the difference with respect to the pixel value x11 of the pixel at the corresponding position in frame #n+1, which is smaller.

Similarly, the area specifying unit 1331 calculates the difference between each of the pixel values x12 to x33 of the pixels in frame #n and each of the pixel values x12 to x33 of the pixels at the corresponding positions in frame #n−1, and the difference between each of the pixel values x12 to x33 of the pixels in frame #n and each of the pixel values x12 to x33 of the pixels at the corresponding positions in frame #n+1. The area specifying unit 1331 selects either the corresponding difference with each of the pixel values x12 to x33 of the pixels at the corresponding positions in frame #n−1 or the corresponding difference with each of the pixel values x12 to x33 of the pixels at the corresponding positions in frame #n+1, which is smaller.

The area specifying unit 1331 determines the total sum of the absolute values of the selected nine differences. The area specifying unit 1331 calculates the correlation value corresponding to the time correlation by dividing the total sum of the absolute values of the calculated differences by the number of differences, i.e., 9.

Furthermore, the area specifying unit 1331 may calculate the time correlation and the space correlation for each pixel. Furthermore, the area specifying unit 1331 may calculate, in addition to the sum of the absolute values of the differences, values indicating other correlations, such as the sum of squares of differences, as values indicating the time correlation and the space correlation.

The number of pixels contained in the block for which the time correlation and the space correlation are to be calculated does not limit the present invention.

Figure 101:
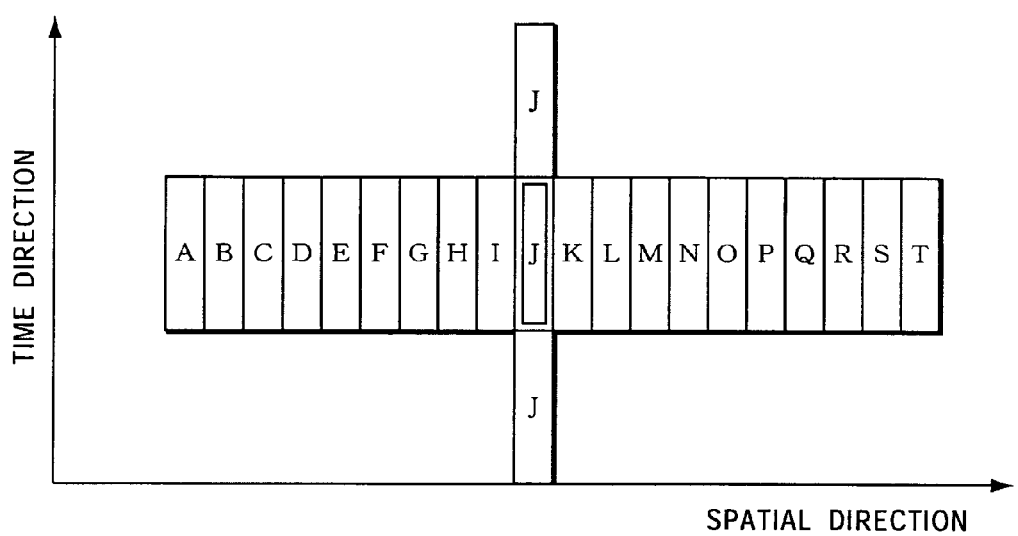
FIG. 101 illustrates a time correlation and a space correlation in a stationary area.

FIG. 101 illustrates a time correlation and a space correlation in a stationary area. For example, in the stationary area, since the image is stationary, the pixel value J of the designated pixel is the same as the pixel value J of the pixel at the corresponding position. Therefore, in the stationary area, the time correlation is very strong.

In contrast, the pixel adjacent to the designated pixel has a pixel value I or a pixel value K differing from the pixel value J.

As discussed above, in the stationary area, the space correlation is weaker than the time correlation.

Figure 102:
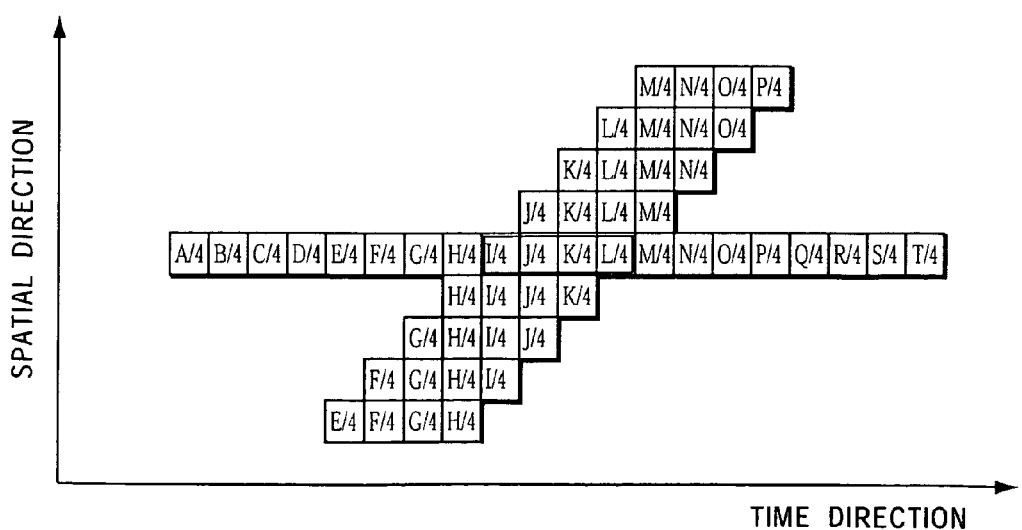
FIG. 102 illustrates a time correlation and a space correlation in a moving area.

FIG. 102 illustrates a time correlation and a space correlation in a moving area. For example, of the components I/4, J/4, K/4, and L/4 of the image, contained in the designated pixel in the moving area, the components I/4, J/4, and K/4 of the image are contained in the adjacent pixels, and the components J/4, K/4, and L/4 of the image are contained in other adjacent pixels. Therefore, in the moving area, the space correlation is strong.

In contrast, the pixel of the adjacent frame, corresponding to the designated pixel, contains different image components.

As discussed above, in the moving area, the time correlation is weaker than the space correlation.

As is seen from the above description, by determining the space correlation and the time correlation and by comparing the space correlation with the time correlation, the area specifying unit 1331 is able to know whether the designated pixel is contained in the moving area or in the stationary area.

The area specifying unit 1331 performs the determination of the moving area or the stationary area with respect to all the pixels contained in the frame.

Based on the determination result of the moving area or the stationary area, the area specifying unit 1331 determines to which one of the foreground area, the background area, the covered background area, and the uncovered background area each pixel belongs, and generates area information.

For example, when the same area as the foreground area is determined to be a moving area, the area specifying unit 1331 makes a determination as to the foreground area, the background area, the covered background area, and the uncovered background area for each pixel in the following manner. When the designated pixel in frame #n is determined to be moving, the area specifying unit 1331 determines that the designated pixel in frame #n belongs to the foreground area.

When the designated pixel in frame #n is determined to be stationary, and when the pixel in frame #n+1 located at the same position as the position of the designated pixel in frame #n in the image, is determined to be moving, the area specifying unit 1331 determines that the designated pixel in frame #n belongs to the covered background area.

When the designated pixel in frame #n is determined to be stationary, and when the pixel in frame #n−1 located at the same position as the position of the designated pixel in frame #n in the image, is determined to be moving, the area specifying unit 1331 determines that the designated pixel in frame #n belongs to the uncovered background area.

The area specifying unit 1331 determines that the pixel which is determined to be stationary and which does not belong to the covered background area or the uncovered background area belongs to the background area.

When the area formed of the background area and the mixed area is determined to be a moving area, the area specifying unit 1331 makes a determination as to the foreground area, the background area, the covered background area, and the uncovered background area for each pixel by referring to the stationary area of the adjacent frame.

A description will now be given of an example of processing results with reference to FIGS. 103 to 106.

Figure 103:
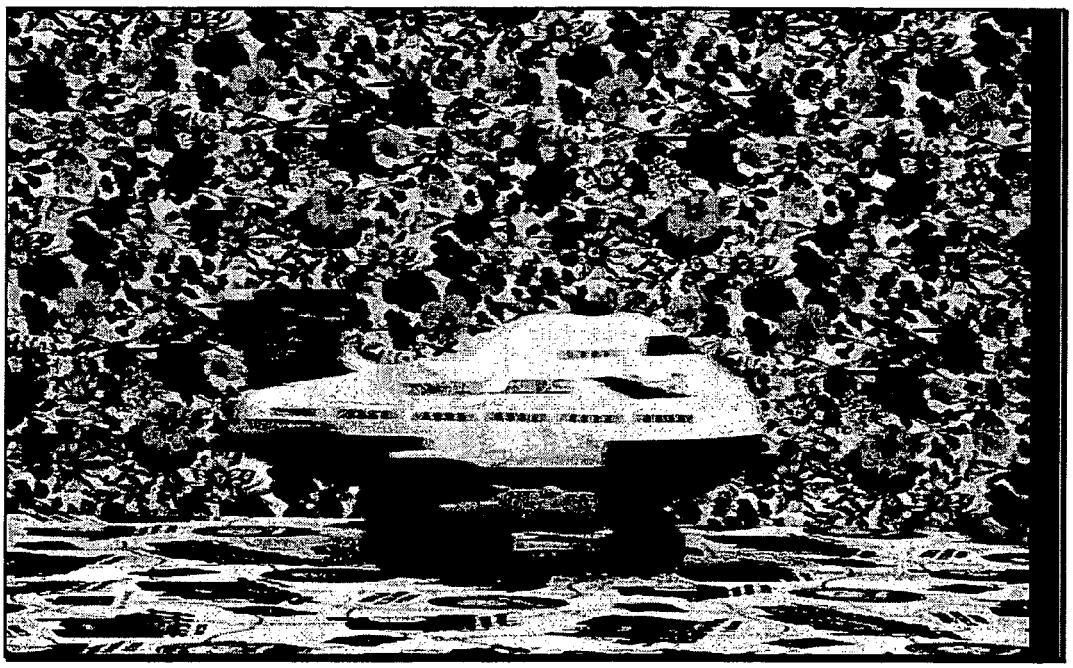
FIG. 103 shows an example of an input image.

FIG. 103 shows an example of an input image corresponding to the component 1, the component 2, and the component 3, which are input to the area specifying unit 1331.

Figure 104:
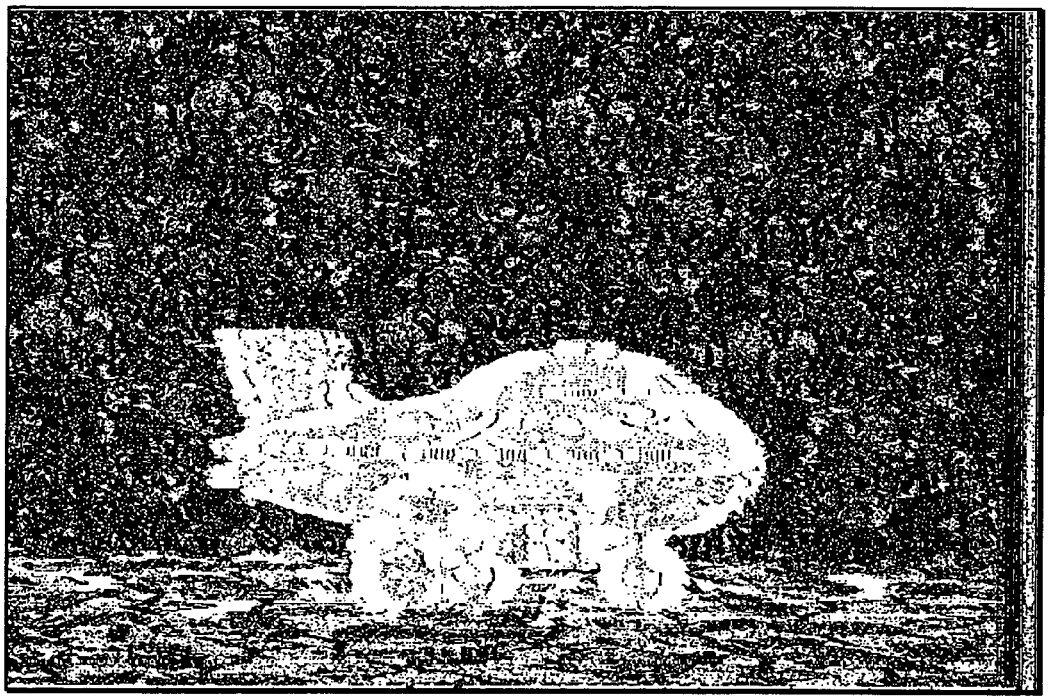
FIG. 104 shows results of the determination of a moving area or a stationary area.

FIG. 104 shows results in which the area specifying unit 1331 makes a determination as to the moving area or the stationary area for each pixel in such a manner as to correspond to the input image shown in FIG. 103. In FIG. 104, white indicates a moving area, and black indicates a stationary area. It can be seen that, although there are incorrectly determined portions, the moving area or the stationary area is nearly specified as a whole.

Figure 105:
FIG. 105 shows results of the determination of a moving area or a stationary area by using a block of 15×15 pixels as units.

FIG. 105 shows results in which the area specifying unit 1331 has made the determination of the moving area or the stationary area by using a block of 15×15 pixels as units in such a manner as to correspond to the input image shown in FIG. 103. In FIG. 105, white indicates a moving area, and black indicates a stationary area. It can be seen that the moving area or the stationary area is specified nearly accurately.

Figure 106:
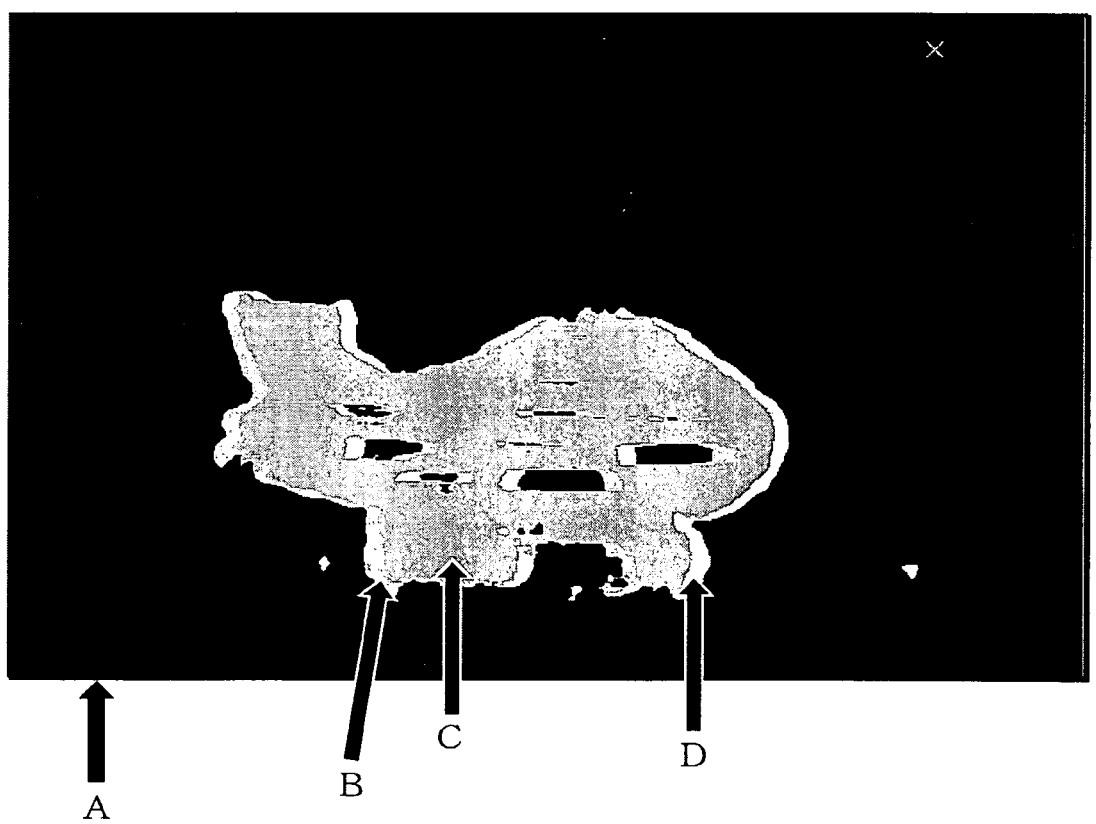
FIG. 106 shows results of the determination of a foreground area, a background area, a covered background area, and an uncovered background area.

FIG. 106 shows results in which the area specifying unit 1331 has made the determination of the foreground area, the background area, the covered background area, and the uncovered background area on the basis of the results of the determination of the moving area or the stationary area shown in FIG. 105. In FIG. 106, reference letter A indicates a background area. Reference letter B indicates an uncovered background area. Reference letter C indicates a foreground area. Reference letter D indicates a covered background area.

It can be seen that, since the area is determined based on the almost accurate specification of the moving area or the stationary area, the foreground area, the background area, the covered background area, and the uncovered background area can almost be specified accurately.

Figure 107:
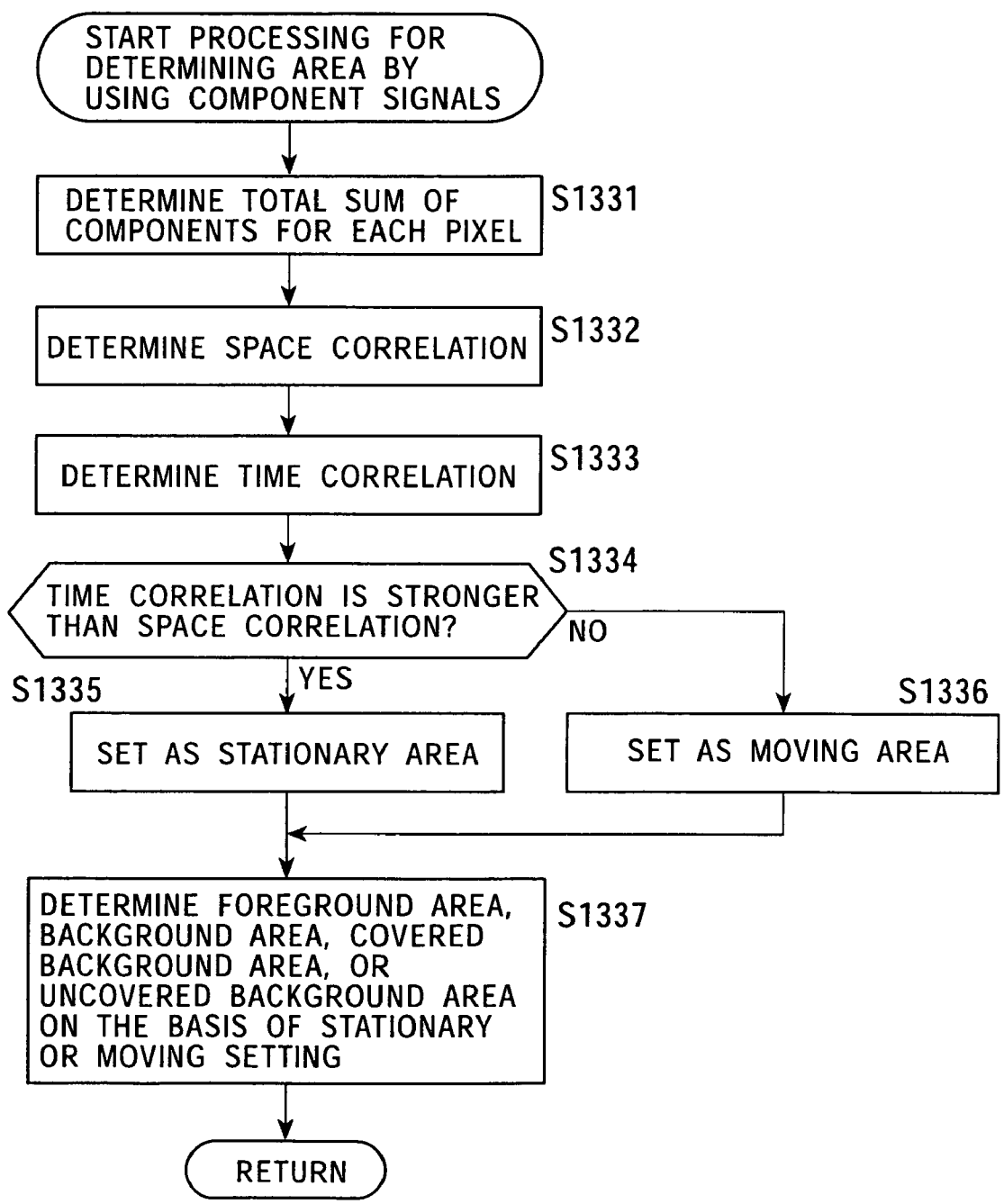
FIG. 107 is a flowchart illustrating the processing for determining the area using component signals.

The area specifying processing using components, performed by the area specifying unit 331, is described below with reference to the flowchart of FIG. 107.

In step S1331, the area specifying unit 1331 calculates the total sum of the components for each pixel.

In step S1332, the area specifying unit 1331 determines the space correlation by using, for example, a block composed of a predetermined number of pixels as units. In step S1333, the area specifying unit 1331 determines the time correlation by using, for example, a block composed of a predetermined number of pixels as units.

In step S1334, the area specifying unit 1331 compares the space correlation with the time correlation for each pixel in order to determine whether or not the time correlation is stronger than the space correlation. When it is determined that the time correlation is stronger than the space correlation, the process proceeds to step S1335, where the area specifying unit 1331 sets the designated pixel as being in a stationary area, and then the process proceeds to step S1337.

When it is determined in step S1334 that the time correlation is not stronger than the space correlation, since the space correlation is stronger than the time correlation, the process proceeds to step S1336, where the area specifying unit 1331 sets the designated pixel as being in a moving area, and then the process proceeds to step S1337.

Processings of steps S1334 through S1336 are performed from each of all the pixels within the frame.

In step S1337, based on the stationary or moving setting, the area specifying unit 1331 makes a determination as to the foreground area, the background area, the covered background area, or the uncovered background area, and then the processing is terminated.

For example, when it is determined in step S1337 that the designated pixel in frame #n is determined to be moving, the area specifying unit 1331 determines that the designated pixel in frame #n belongs to the foreground area.

When it is determined that the designated pixel in frame #n is stationary, and when it is determined that the pixel in frame #n+1 located at the same position as the position of the designated pixel in frame #n in the image is moving, the area specifying unit 1331 determines that the designated pixel in frame #n belongs to the covered background area.

When it is determined that the designated pixel in frame #n is stationary, and when it is determined that the pixel in frame #n−1 located at the same position as the position of the designated pixel in frame #n in the image is moving, the area specifying unit 1331 determines that the designated pixel in frame #n belongs to the uncovered background area.

The area specifying unit 1331 determines that the pixel which is determined to be stationary and which does not belong to the covered background area or the uncovered background area belongs to the background area.

As discussed above, based on the components, the area specifying unit 1331 shown in FIG. 97 is able to specify the foreground area, the background area, the covered background area, or the uncovered background area.

Figure 108:
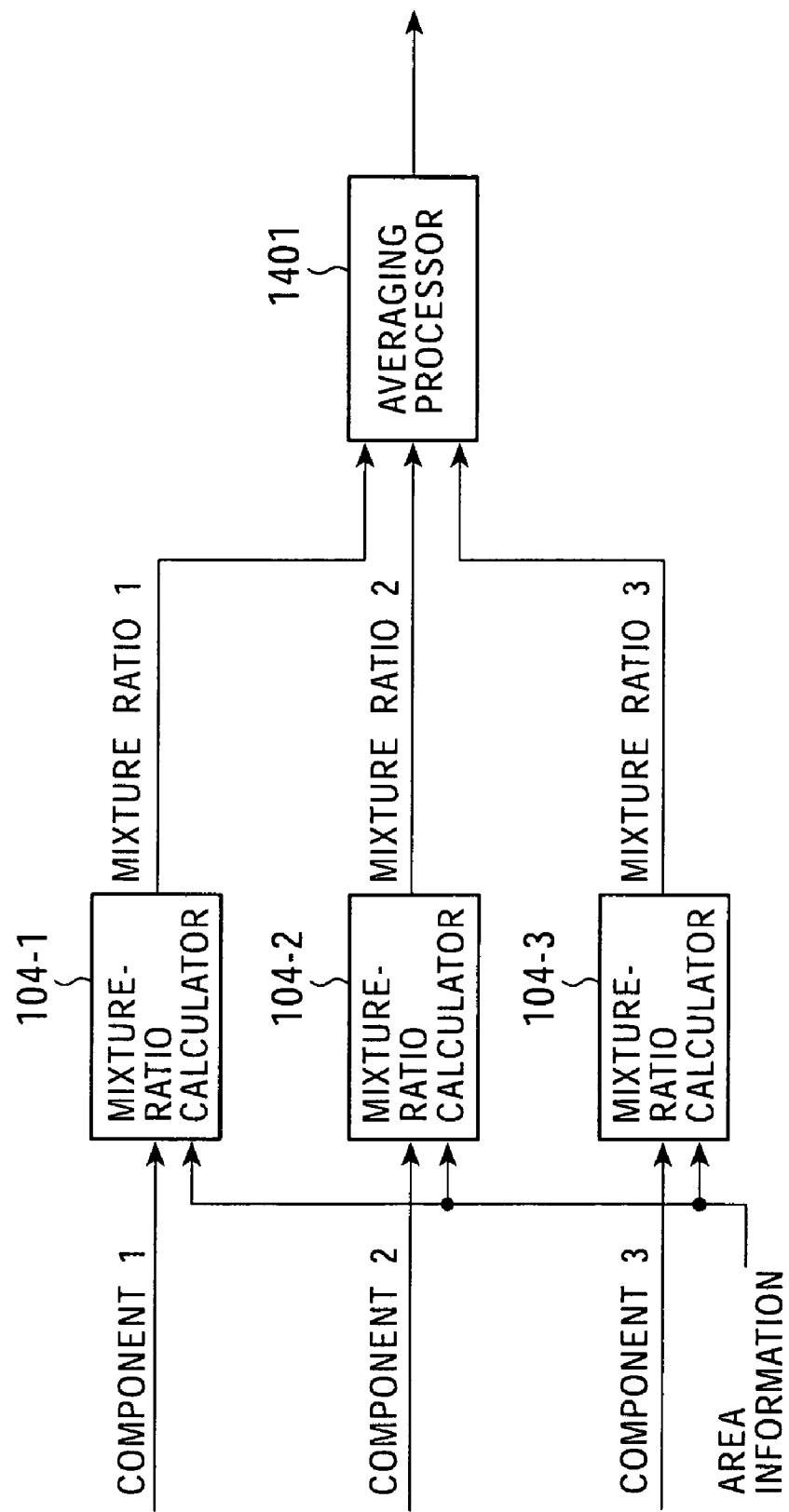
FIG. 108 shows an embodiment of an image processing apparatus for calculating a mixture ratio on the basis of an input image and area information, which are input as component signals.

FIG. 108 shows an embodiment of an image processing apparatus for calculating the mixture ratio $\alpha$ on the basis of input images and area information, which are input as component signals.

A mixture-ratio calculator 104-1 calculates a mixture ratio 1 on the basis of the area information and the component 1, and supplies the calculated mixture ratio 1 to an averaging processor 1401. The mixture-ratio calculator 104-1 has the same configuration as that of the estimated-mixture-ratio calculator 104, and an explanation thereof is thus omitted.

A mixture-ratio calculator 104-2 calculates a mixture ratio 2 on the basis of the area information and the component 2, and supplies the calculated mixture ratio 2 to the averaging processor 1401. The mixture-ratio calculator 104-2 has the same configuration as that of the estimated-mixture-ratio calculator 104, and an explanation thereof is thus omitted.

A mixture-ratio calculator 104-3 calculates a mixture ratio 3 on the basis of the area information and the component 3, and supplies the calculated mixture ratio 3 to the averaging processor 1401. The mixture-ratio calculator 104-3 has the same configuration as that of the estimated-mixture-ratio calculator 104, and an explanation thereof is thus omitted.

The averaging processor 1401 calculates the average value of the mixture ratio 1 supplied from the mixture-ratio calculator 104-1, the mixture ratio 2 supplied from the mixture-ratio calculator 104-2, and the mixture ratio 3 supplied from the mixture-ratio calculator 104-3, and outputs the calculated average value as the mixture ratio $\alpha$.

Figure 109:
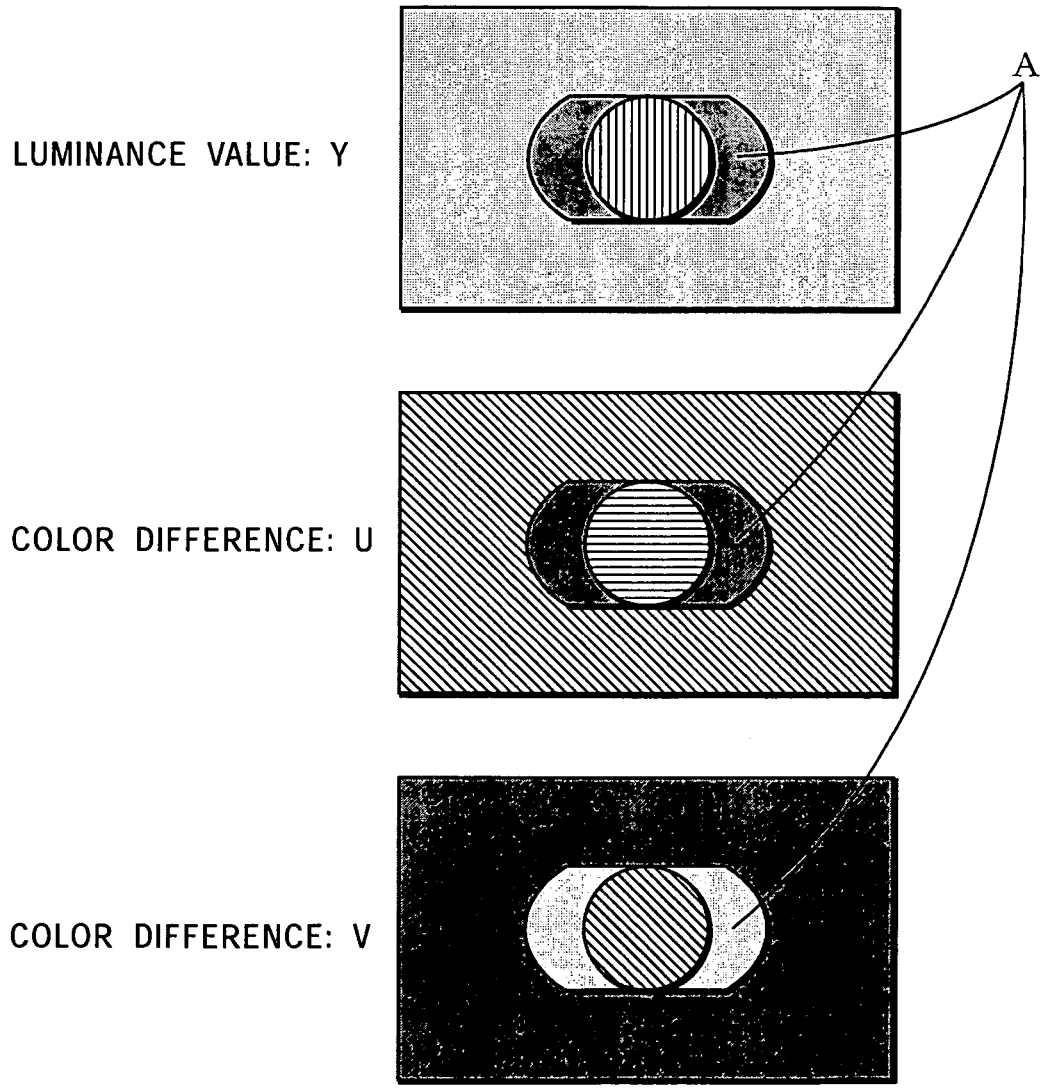
FIG. 109 illustrates the relationship of the mixture ratios in each component signal.

As indicated by "A" in FIG. 109, the mixture ratio $\alpha$ corresponding to the luminance value Y which is the component 1, the mixture ratio $\alpha$ corresponding to the color difference U which is the component 2, and the mixture ratio $\alpha$ corresponding to the color difference V which is the component 3 in a predetermined pixel are the same. The image processing apparatus configured as shown in FIG. 108 is able to calculate the mixture ratio $\alpha$ more accurately by calculating the mixture ratio $\alpha$ using the component 1, the component 2, and the component 3.

Figure 110:
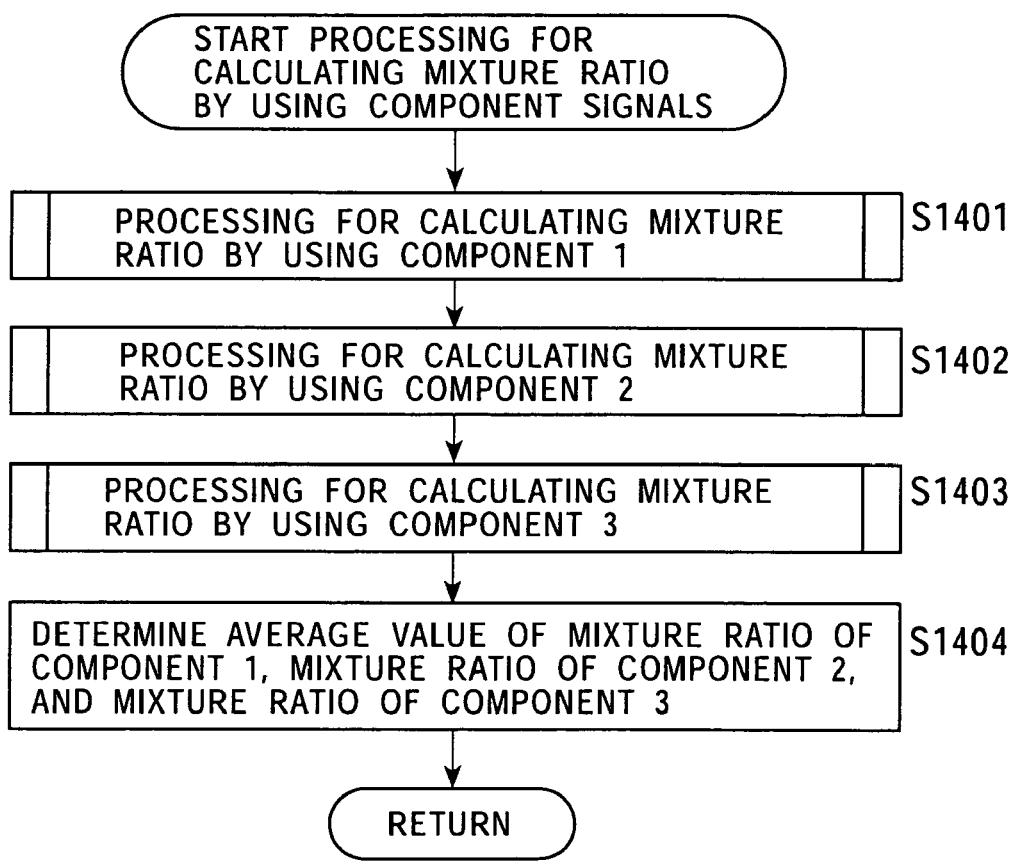
FIG. 110 is a flowchart illustrating the processing for calculating a mixture ratio using component signals.

Referring to the flowchart of FIG. 110, a description is given of the processing for calculating the mixture ratio α using component signals, performed by the image processing apparatus configured as shown in FIG. 108.

In step S1401, the mixture-ratio calculator 104-1 calculates the mixture ratio 1 on the basis of the area information and the component 1. The mixture-ratio calculator 104-1 supplies the calculated mixture ratio 1 to the averaging processor 1401. The processing of step S1401 is similar to that of step S12, and a detailed explanation thereof is thus omitted.

In step S1402, the mixture-ratio calculator 104-2 calculates the mixture ratio 2 on the basis of the area information and the component 2. The mixture-ratio calculator 104-2 supplies the calculated mixture ratio 2 to the averaging processor 1401. The processing of step S1402 is similar to that of step S12, and a detailed explanation thereof is thus omitted.

In step S1403, the mixture-ratio calculator 104-3 calculates the mixture ratio 3 on the basis of the area information and the component 3. The mixture-ratio calculator 104-3 supplies the calculated mixture ratio 3 to the averaging processor 1401. The processing of step S1403 is similar to that of step S12, and a detailed explanation thereof is thus omitted.

In step S1404, the averaging processor 1401 calculates the average value of the mixture ratio 1 based on the component 1, the mixture ratio 2 based on the component 2, and the mixture ratio 3 based on the component 3, and outputs the calculated average value as the mixture ratio α. The processing is then terminated.

As discussed above, the image processing apparatus configured as shown in FIG. 108 calculates the mixture ratio for each component, and calculates the average value of the calculated mixture ratios in order to generate the final mixture ratio α. The image processing apparatus configured as shown in FIG. 108 is able to calculate the mixture ratio α in which an influence due to an error which occurs in one component is reduced.

Figure 111:
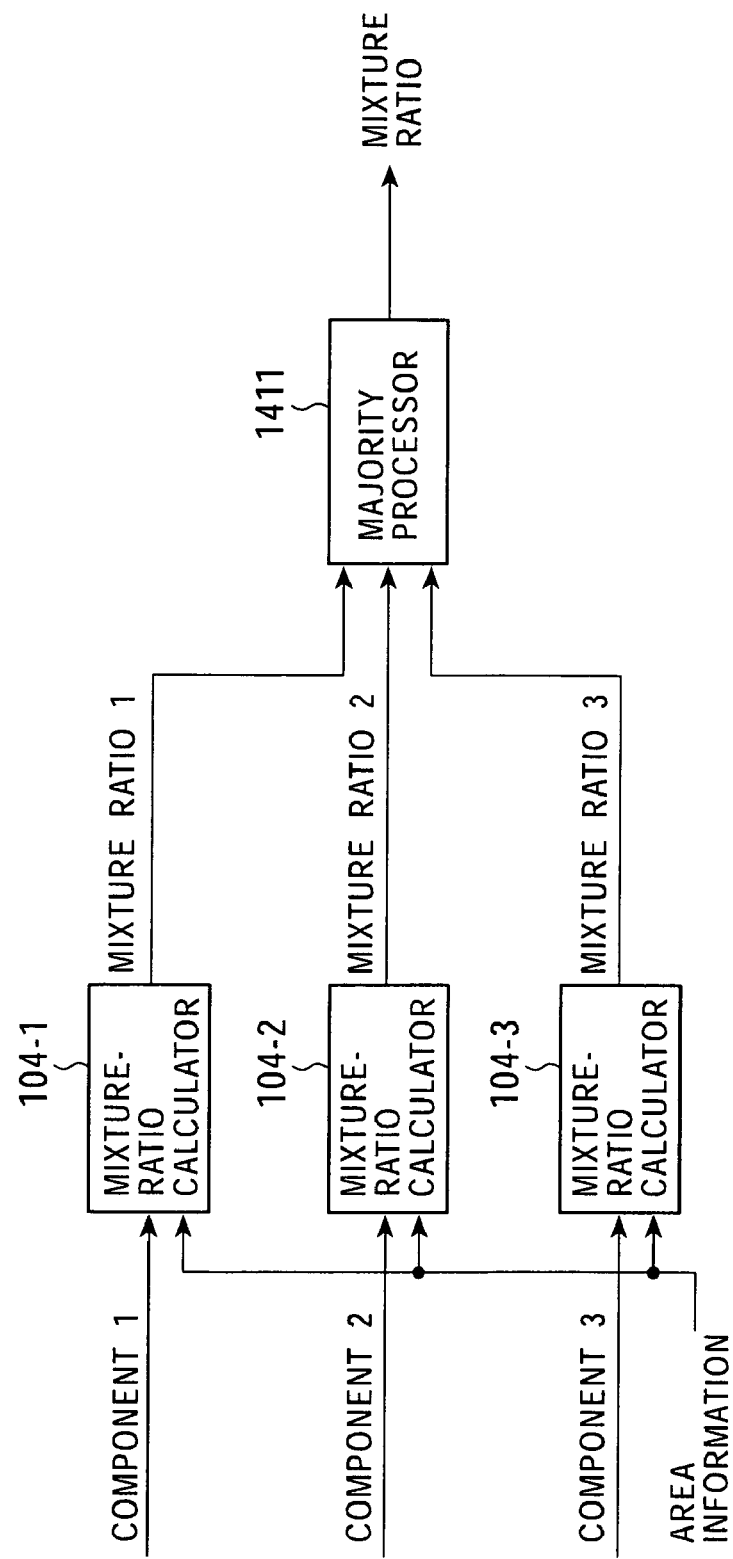
FIG. 111 shows another embodiment of an image processing apparatus for calculating a mixture ratio on the basis of input images and area information, which are input as component signals.

FIG. 111 shows another embodiment of an image processing apparatus for calculating the mixture ratio α on the basis of input images and area information, which are input as component signals. The same elements as those shown in FIG. 108 are designated with like reference numerals, and an explanation thereof is thus omitted.

A majority processor 1411 classifies the mixture ratio 1 supplied from the mixture-ratio calculator 104-1, the mixture ratio 2 supplied from the mixture-ratio calculator 104-2, and the mixture ratio 3 supplied from the mixture ratio calculator 104-3 at a predetermined interval, and determines the frequency corresponding to the representative value of the interval. The majority processor 1411 determines the mixture ratio α on the basis of the frequency corresponding to the representative value and outputs the determined mixture ratio α.

For example, when the width of the interval is 0.1 and the representative values are 0.0, 0.1, 0.2, 0.3, 0.4, 0.5, 0.6, 0.7, 0.8, 0.9, and 1.0, and when the mixture ratio 1 is 0.12, the mixture ratio 2 is 0.13, and the mixture ratio 3 is 0.41, the majority processor 1411 determines the frequency of the representative value 0.1 to be 2 and determines the frequency of the representative value 0.4 to be 1. The majority processor 1411 sets the representative value 0.1 corresponding to the largest frequency 2 to the mixture ratio α.

Figure 112:
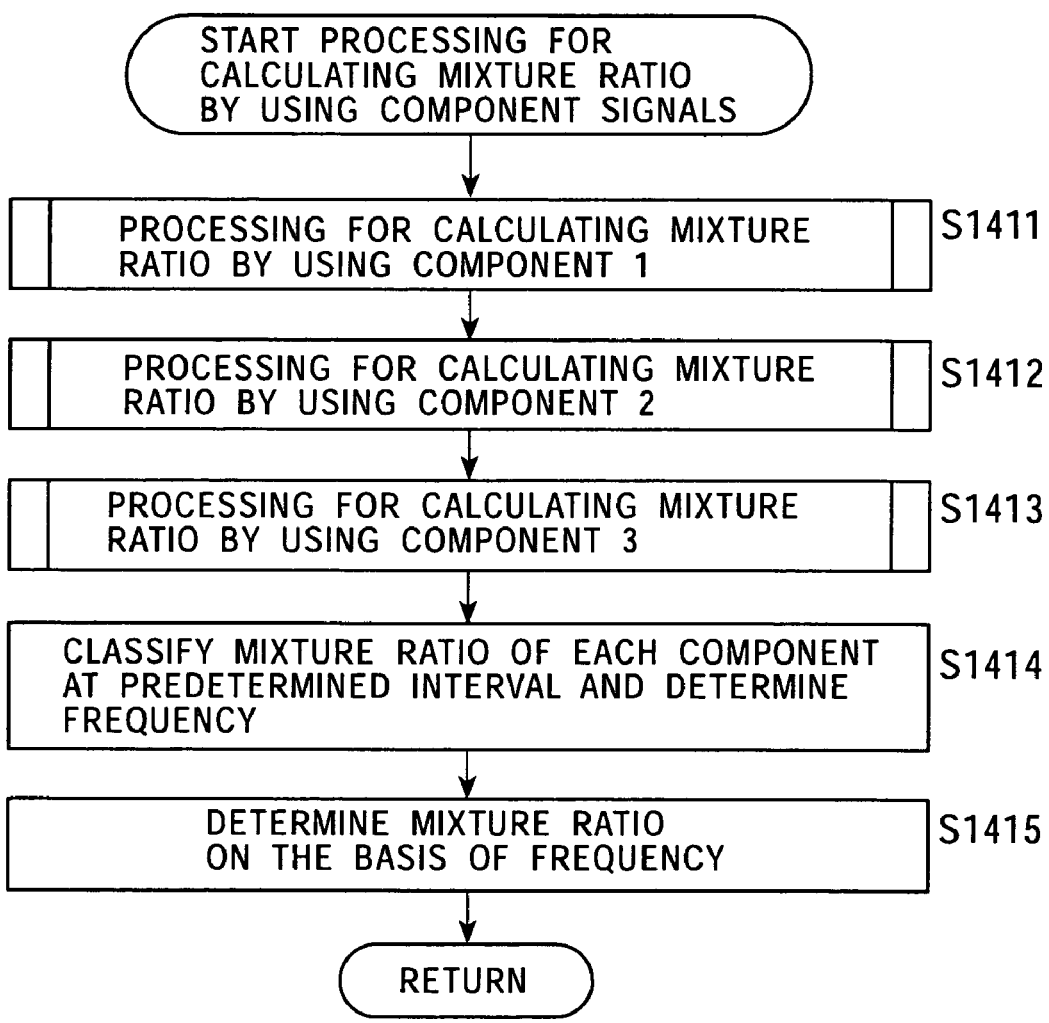

Referring to the flowchart of FIG. 112, a description is given of the processing for calculating the mixture ratio α, using components, performed by the area specifying unit 331 configured as shown in FIG. 111.

The processings of step S1411 through step S1413 are similar to those of step S1401 through step S1403, respectively, and an explanation thereof is thus omitted.

In step S1414, the majority processor 1411 classifies the mixture ratio of each component at a predetermined interval, and determines the frequency.

In step S1415, the majority processor 1411 determines the mixture ratio α on the basis of the frequency, and then the processing is terminated.

As discussed above, the image processing apparatus configured as shown in FIG. 111 calculates the mixture ratio for each component, and generates the final mixture ratio α on the basis of the frequency of the calculated mixture ratio. The image processing apparatus configured as shown in FIG. 111 is able to calculate a highly reliable mixture ratio α in which an influence of a mixture ratio whose value differs greatly due to an error of a single component is eliminated.

Figure 113:
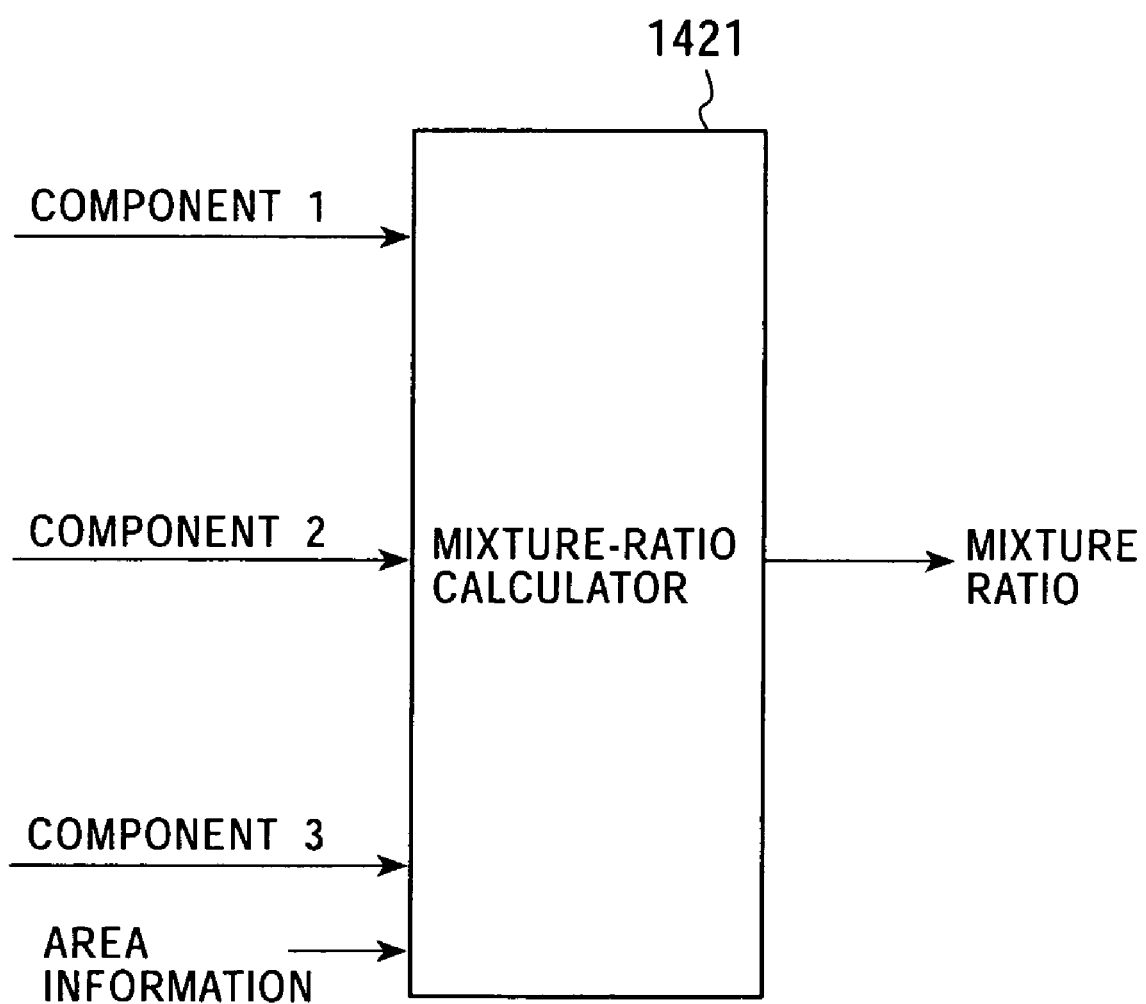

FIG. 113 shows still another embodiment of the image processing apparatus for calculating the mixture ratio α on the basis of input images and the area information, which are inputs as component signals.

A mixture-ratio calculator 1421 adds, for each pixel, the pixel values of the input component 1, component 2, and component 3, calculates the mixture ratio α on the basis of the added pixel values of the component 1, the component 2, and the component 3 and the area information, and outputs the calculated mixture ratio α.

Figure 114:
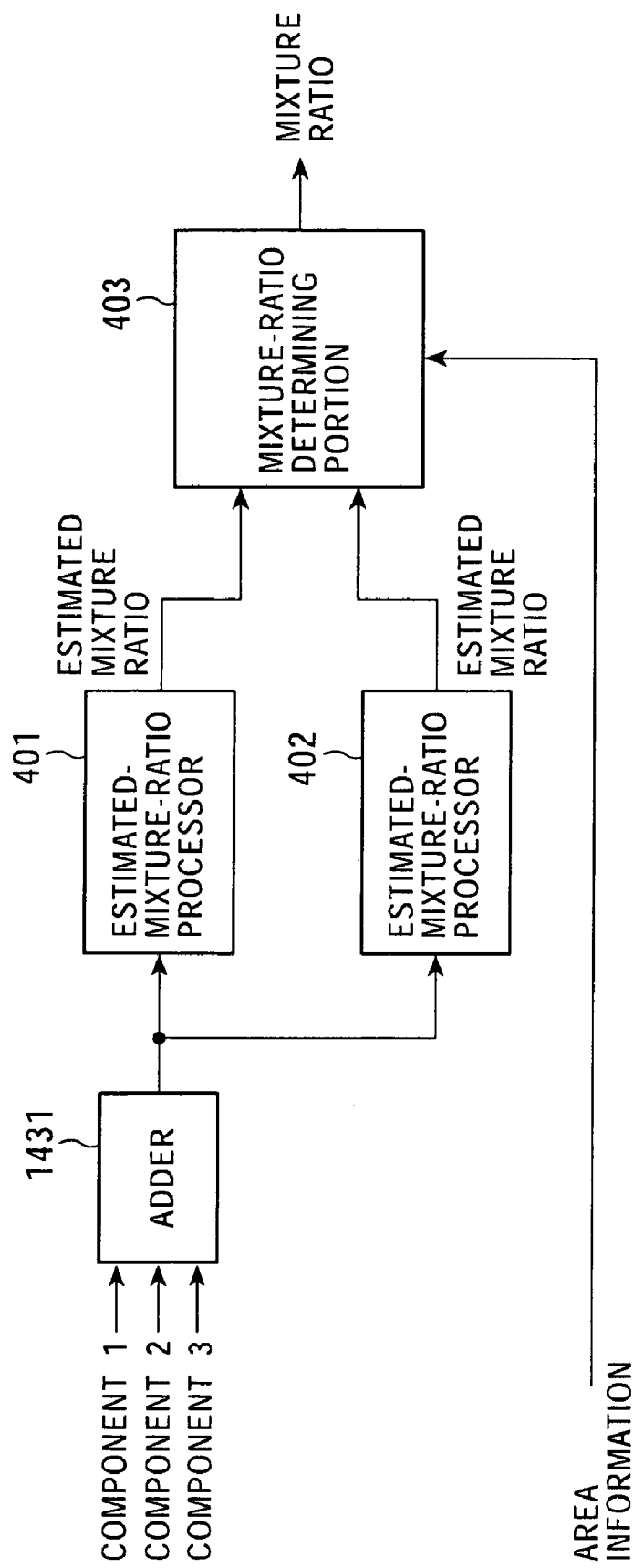

FIG. 114 is a block diagram illustrating the configuration of the mixture-ratio calculator 1421. An adder 1431 adds, for each pixel, the pixel values of the input component 1, component 2, and component 3, and supplies the added value to the estimated-mixture-ratio processor 401 and the estimated-mixture-ratio processor 402.

Based on the value in which the pixel values of the component 1, the component 2, and the component 3 are added for each pixel, the estimated-mixture-ratio processor 401 calculates the estimated mixture ratio for each pixel by calculations corresponding to a model in the covered background area, and supplies the calculated estimated mixture ratio to the mixture-ratio determining portion 403.

Equation (21) showing the mixture ratio α of the pixel belonging to the covered background area can be expressed by equation (120) through equation (122) for each component:

$$\alpha Y \approx (CY-NY)/(PY-NY) \tag{120}$$

$$\alpha U \approx (CU-NU)/(PU-NU) \tag{121}$$

$$\alpha V \approx (CV-NV)/(PV-NV) \tag{122}$$

CY denotes a pixel value of frame #n in the component 1, which is the luminance value Y. NY denotes a pixel value of frame #n+1 which is subsequent to frame #n in the component 1. PY denotes a pixel value of frame #n−1 which is previous to frame #n in the component 1.

CU denotes a pixel value of frame #n in the component 2, which is the color difference U. NU denotes a pixel value of frame #n+1 which is subsequent to frame #n in the component 2. PU denotes a pixel value of frame #n−1 which is previous to frame #n in the component 2.

CV denotes a pixel value of frame #n in the component 3, which is the color difference V. NV denotes a pixel value of frame #n+1 which is subsequent to frame #n in the component 3. PV denotes a pixel value of frame #n−1 which is previous to frame #n in the component 3.

Since the mixture ratio α to be calculated is the same value in the components 1 to 3, equation (123) holds:

$$\alpha Y = \alpha U = \alpha V \qquad (123)$$

Equation (124) can be derived from equations (120) to (123).

$$(CY-NY)-(PY-NY)=(CU-NU)/(PU-NU)=(CV-NV)/(PV-NV) \qquad (124)$$

Furthermore, equation (125) for calculating the mixture ratio α can be derived from equation (124).

$$\alpha=((CY+CU+CV)-(NY+NU+NV))/((PY+PU+PV)-(NY+NU+NV)) \qquad (125)$$

As discussed above, the mixture ratio α can be calculated based on the value in which the pixel values of the component 1, the component 2, and the component 3 are added.

The estimated-mixture-ratio processor 402 calculates an estimated mixture ratio for each pixel by calculations corresponding to a model of an uncovered background area based on the value in which the pixel values of the component 1, the component 2, and the component 3 are added for each pixel, and supplies the calculated estimated mixture ratio to the mixture-ratio determining portion 403.

The mixture-ratio determining portion 403 sets the mixture ratio α to 0 when the target pixel belongs to the foreground area, and sets the mixture ratio α to 1 when the target pixel belongs to the background area. When the target pixel belongs to the covered background area, the mixture-ratio determining portion 403 sets the estimated mixture ratio supplied from the estimated-mixture-ratio processor 401 as the mixture ratio α. When the target pixel belongs to the uncovered background area, the mixture-ratio determining portion 403 sets the estimated mixture ratio supplied from the estimated-mixture-ratio processor 402 as the mixture ratio α. The mixture-ratio determining portion 403 outputs the mixture ratio α which has been set based on the area information.

As discussed above, by using the component 1, the component 2, and the component 3, the mixture-ratio calculator 1421 is able to calculate the mixture ratio α having a higher accuracy than the mixture ratio α calculated based on a single signal.

Next, referring to the flowchart of FIG. 115, a description is given of the processing for calculating the mixture ratio α based on the input image and the area information, which are input as component signals, performed by the image processing apparatus of FIG. 113. In step S1421, an adder 1431 adds up the pixel values of the input component 1, component 2, and component 3 for each pixel. The adder 1431 supplies the added-up pixel value to the estimated-mixture-ratio processor 401 and the estimated-mixture-ratio processor 402.

In step S1422, based on the added-up pixel value, the estimated-mixture-ratio processor 401 calculates the estimated mixture ratio for each pixel by a calculation corresponding to a model of a covered background area. The estimated-mixture-ratio processor 401 supplies the calculated estimated mixture ratio to the mixture-ratio determining portion 403. Details of the processing of step S1422 are similar to those of the processing of step S402, and an explanation thereof is thus omitted.

In step S1423, based on the added-up pixel value, the estimated-mixture-ratio processor 402 calculates the estimated mixture ratio for each pixel by calculations corresponding to a model of the uncovered background area. The estimated-mixture-ratio processor 402 supplies the calculated estimated mixture ratio to the mixture-ratio determining portion 403. Details of the processing of step S1423 are similar to those of the processing of step S403, and an explanation thereof is thus omitted.

In step S1424, the mixture-ratio calculator 104 determines whether the mixture ratios have been estimated for the whole frame. If it is determined that the mixture ratios have not yet been estimated for the whole frame, the process returns to step S1422, and the processing for estimating the mixture ratio for the subsequent pixel is repeated.

If it is determined in step S1424 that the mixture ratios have been estimated for the whole frame, the process proceeds to step S1425. In step S1425, the mixture-ratio determining portion 403 sets the mixture ratio α based on the area information indicating to which of the foreground area, the background area, the covered background area, or the uncovered background area the pixel belongs. The mixture-ratio determining portion 403 sets the mixture ratio α to 0 when the target pixel belongs to the foreground area, and sets the mixture ratio α to 1 when the target pixel belongs to the background area. When the target pixel belongs to the covered background area, the mixture-ratio determining portion 403 sets the estimated mixture ratio supplied from the estimated-mixture-ratio processor 401 as the mixture ratio α. When the target pixel belongs to the uncovered background area, the mixture-ratio determining portion 403 sets the estimated mixture ratio supplied from the estimated-mixture-ratio processor 402 as the mixture ratio α. The processing is then terminated.

As discussed above, the image processing apparatus configured as shown in FIG. 113 is able to calculate the mixture ratio α, which is a feature quantity, corresponding to each pixel, with higher accuracy on the basis of the area information, the component 1, the component 2, and the component 3.

The embodiment has been discussed above by setting the mixture ratio α to the ratio of the background components contained in the pixel values. However, the mixture ratio α may be set to the ratio of the foreground components contained in the pixel values.

The embodiment has been discussed above by setting the moving direction of the foreground object to the direction from the left to the right. However, the moving direction is not restricted to the above-described direction. In the above description, a real-space image having a three-dimensional space and time axis information is projected onto a time space having a two-dimensional space and time axis information by using a video camera. However, the present invention is not restricted to this example, and can be applied to the following case. When a greater amount of first information in one-dimensional space is projected onto a smaller amount of second information in a two-dimensional space, distortion generated by the projection can be corrected, significant information can be extracted, or a more natural image can be synthesized.

The sensor is not restricted to a CCD, and may be another type of sensor, such as a solid-state image-capturing device, for example, a CMOS (Complementary Metal Oxide Semiconductor) a BBD (Bucket Brigade Device), a CID (Charge Injection Device), or a CPD (Charge Priming Device). Also, the sensor does not have to be a sensor in which detection devices are arranged in a matrix, and may be a sensor in which detection devices are arranged in one line.

A recording medium in which a program for performing the signal processing of the present invention is recorded may be formed of a packaged medium in which the program is recorded, which is distributed for providing the program to a user separately from the computer, as shown in FIG. 1, such as the magnetic disk 51 (including a floppy (registered trade name) disk), the optical disc 52 (CD-ROM (Compact Disc-Read Only Memory) and a DVD (Digital Versatile Disc)), the magneto-optical disk 53 (including MD (Mini-Disc) (registered trade name)), or the semiconductor memory 54. The recording medium may also be formed of the ROM 22 or a hard disk contained in the storage unit 28 in which the program is recorded, such recording medium being provided to the user while being prestored in the computer.

The steps forming the program recorded in a recording medium may be executed chronologically according to the orders described in the specification. However, they do not have to be executed in a time-series manner, and they may be executed concurrently or individually.

INDUSTRIAL APPLICABILITY

According to a first aspect of the invention, the mixture state of images can be recognized.

According to a second aspect of the invention, the mixture state of images can be recognized.

The invention claimed is:

1. An image processing apparatus for processing image data which is formed of a predetermined number of pixel data, having a plurality of types of components at the same pixel position, obtained by an image-capturing device including a predetermined number of pixels, the pixels having a time integrating function, said image processing apparatus comprising:

an area specifying unit configured to specify, in correspondence with said image data, a mixed area in which foreground object components which form a foreground object and background object components which form a background object are mixed; and a mixture-ratio detection unit configured to detect, in correspondence with said image data, the mixture ratio indicating the ratio of the mixture of said foreground object components to the mixture of said background object components in a mixed area in which said foreground object components and said background object components are mixed, wherein at least one of said area specifying unit and said mixture-ratio detection unit performs image processing on the basis of said plurality of types of components, wherein the plurality of types of components at the same pixel position refers to an individual signal, including a luminance signal, a color-difference signal, or an RGB signal in the component signal.

2. An image processing apparatus according to claim 1, wherein said area specifying unit comprises:

a component mixed-area detection unit configured to detect said mixed area for each of said plurality of types of components and for outputting the detection result corresponding to individual components as component mixed-area information; and a mixed-area specifying unit configured to specify said mixed area corresponding to said image data on the basis of the detection result of said mixed area corresponding to said plurality of types of components detected by said component mixed-area detection unit.

3. An image processing apparatus according to claim 1, wherein said area specifying unit comprises:

a space-correlation-value calculation unit configured to calculate a space correlation value indicating a correlation between designated pixel data corresponding to a designated pixel of a designated frame of said image data and pixel data of a space neighboring pixel positioned in the neighborhood of said designated pixel in the spatial direction on the basis of said plurality of types of components corresponding to said designated pixel;

a time-correlation-value calculation unit configured to calculate a time correlation value indicating a correlation between said designated pixel data and pixel data of a time neighboring pixel positioned in the neighborhood of said designated pixel in the time direction on the basis of said plurality of types of components corresponding to said designated pixel; and a foreground area specifying unit configured to specify a foreground area formed of only said foreground object components on the basis of said space correlation value and said time correlation value corresponding to said designated pixel.

4. An image processing apparatus according to claim 3, wherein said area specifying unit further comprises a mixed-area specifying unit configured to specify said mixed area on the basis of said foreground area of said designated frame and said foreground area of a neighboring frame in the neighborhood of said designated frame.

5. An image processing apparatus according to claim 1, wherein said mixture-ratio detection unit comprises:

a component mixture-ratio detection unit configured to detect the mixture ratio for each of said plurality of types of components; and a component integrated mixture-ratio detection unit configured to detect the mixture ratio corresponding to said image data by integrating the detection results of the mixture ratios corresponding to said plurality of types of components detected by said component mixture-ratio detection unit.

6. An image processing apparatus according to claim 1, wherein said mixture-ratio detection unit comprises:

an integration unit configured to integrate the pixel values of said plurality of types of components for each pixel and for outputting the value as integrated data; and an integrated data mixture-ratio detection unit configured to detect the mixture ratio corresponding to said image data on the basis of said integrated data.

7. An image processing apparatus according to claim 6, wherein said integration unit adds said pixel values of said plurality of types of components for each pixel and outputs the added result as said integrated data.

8. An image processing method for use with an image processing apparatus for processing image data which is formed of a predetermined number of pixel data, having a plurality of types of components at the same pixel position, obtained by an image-capturing device including a predetermined number of pixels, the pixels having a time integrating function, said image processing method comprising:

an area specifying step of specifying, in correspondence with said image data, a mixed area in which foreground object components which form a foreground object and background object components which form a background object are mixed;

a mixture-ratio detection step of detecting, in correspondence with said image data, the mixture ratio indicating the ratio of the mixture of said foreground object components to the mixture of said background object components in a mixed area in which said foreground object components and said background object components are mixed; and an output control step of controlling the output of said detected mixture ratio, wherein at least one of said area specifying step and said mixture-ratio detection step performs image processing on the basis of said plurality of types of components wherein the plurality of types of components at the same pixel position refers to an individual signal, including a luminance signal, a color-difference signal, or an RGB signal in the component signal.

9. An image processing method according to claim 8, wherein said area specifying step comprises:

a component mixed-area detection step of detecting said mixed area for each of said plurality of types of components and for outputting the detection result corresponding to individual components as component mixed-area information; and a mixed-area specifying step of specifying said mixed area corresponding to said image data on the basis of the detection result of said mixed area corresponding to said plurality of types of components detected in said component mixed-area detection step.

10. An image processing method according to claim 8, wherein said area specifying step comprises:

a space-correlation-value calculation step of calculating a space correlation value indicating a correlation between designated pixel data corresponding to a designated pixel of a designated frame of said image data and pixel data of a space neighboring pixel positioned in the neighborhood of said designated pixel in the spatial direction on the basis of said plurality of types of components corresponding to said designated pixel;

a time-correlation-value calculation step of calculating a time correlation value indicating a correlation between said designated pixel data and pixel data of a time neighboring pixel positioned in the neighborhood of said designated pixel in the time direction on the basis of said plurality of types of components corresponding to said designated pixel; and a foreground area specifying step of specifying a foreground area formed of only said foreground object components on the basis of said space correlation value and said time correlation value corresponding to said designated pixel.

11. An image processing method according to claim 10, wherein said area specifying step further comprises:

a mixed-area specifying step of specifying said mixed area on the basis of said foreground area of said designated frame and said foreground area of a neighboring frame in the neighborhood of said designated frame.

12. An image processing method according to claim 8, wherein said mixture-ratio detection step comprises:

a component mixture-ratio detection step of detecting the mixture ratio for each of said plurality of types of components; and a component integrated mixture-ratio detection step of detecting the mixture ratio corresponding to said image data by integrating the detection results of the mixture ratios corresponding to said plurality of types of components detected in said component mixture-ratio detection step.

13. An image processing method according to claim 8, wherein said mixture-ratio detection step comprises:

an integration step of integrating the pixel values of said plurality of types of components for each pixel and for outputting the value as integrated data; and a data mixture-ratio detection step of detecting the mixture ratio corresponding to said image data on the basis of said integrated data.

14. An image processing method according to claim 13, wherein, in said integration step, said pixel values of said plurality of types of components are added for each pixel, and the added result is output as said integrated data.

15. A program stored in a computer-readable medium, the program, when executed by a computer being used to process image data which is formed of a predetermined number of pixel data, having a plurality of types of components at the same pixel position, obtained by an image-capturing device including a predetermined number of pixels, the pixels having a time integrating function:

an area specifying step of specifying, in correspondence with said image data, a mixed area in which foreground object components which form a foreground object and background object components which form a background object are mixed;

a mixture-ratio detection step of detecting, in correspondence with said image data, the mixture ratio indicating the ratio of the mixture of said foreground object components to the mixture of said background object in a mixed area in which said foreground object components and said background object components are mixed; and an output control step of controlling the output of said detected mixture ratio, wherein, in at least one of said area specifying step and said mixture-ratio detection step, image processing is performed on the basis of said plurality of types of components, wherein the plurality of types of components at the same pixel position refers to an individual signal, including a luminance signal, a color-difference signal, or an RGB signal in the component signal.

16. A program according to claim 15, wherein said area specifying step comprises:

a component mixed-area detection step of detecting said mixed area for each of said plurality of types of components and for outputting the detection result corresponding to individual components as component mixed-area information; and a mixed-area specifying step of specifying said mixed area corresponding to said image data on the basis of the detection result of said mixed area corresponding to said plurality of types of components detected in said component mixed-area detection step.

17. A program according to claim 15, wherein said area specifying step comprises:

a space-correlation-value calculation step of calculating a space correlation value indicating a correlation between designated pixel data corresponding to a designated pixel of a designated frame of said image data and pixel data of a space neighboring pixel positioned in the neighborhood of said designated pixel in the spatial direction on the basis of said plurality of types of components corresponding to said designated pixel;

a time-correlation-value calculation step of calculating a time correlation value indicating a correlation between said designated pixel data and pixel data of a time neighboring pixel positioned in the neighborhood of said designated pixel in the time direction on the basis of said plurality of types of components corresponding to said designated pixel; and a foreground area specifying step of specifying a foreground area formed of only said foreground object components on the basis of said space correlation value and said time correlation value corresponding to said designated pixel.

18. A program according to claim 17, wherein said area specifying step further comprises:
a mixed-area specifying step of specifying said mixed area on the basis of said foreground area of said designated frame and said foreground area of a neighboring frame in the neighborhood of said designated frame.

19. A program according to claim 15, wherein said mixture-ratio detection step comprises:
a component mixture-ratio detection step of detecting the mixture ratio for each of said plurality of types of components; and
a component integrated mixture-ratio detection step of detecting the mixture ratio corresponding to said image data by integrating the detection results of the mixture ratios corresponding to said plurality of types of components detected in said component mixture-ratio detection step.

20. A program according to claim 15, wherein said mixture-ratio detection step comprises:
an integration step of integrating the pixel values of said plurality of types of components for each pixel and for outputting the value as integrated data; and
an integrated data mixture-ratio detection step of detecting the mixture ratio corresponding to said image data on the basis of said integrated data.

21. A program according to claim 20, wherein said integration step adds said pixel values of said plurality of types of components for each pixel and outputs the added result as said integrated data.

22. An image-capturing apparatus comprising:
an image-capturing unit configured to output a subject image captured by an image-capturing device including a predetermined number of pixels, the pixels having a time integrating function, as image data which is formed of a predetermined number of pixel data having a plurality of types of components at the same pixel position;
an area specifying unit configured to specify, in correspondence with said image data, a mixed area in which foreground object components which form a foreground object and background object components which form a background object are mixed; and
a mixture-ratio detection unit configured to detect, in correspondence with said image data, the mixture ratio indicating the ratio of the mixture of said foreground object components to the mixture of said background object components in a mixed area in which said foreground object components and said background object components are mixed,
wherein at least one of said area specifying unit and said mixture-ratio detection unit performs image processing on the basis of said plurality of types of components,
wherein the plurality of types of components at the same pixel position refers to an individual signal, including a luminance signal, a color-difference signal, or an RGB signal in the component signal.

23. An image-capturing apparatus according to claim 22, wherein said area specifying unit comprises:
a component mixed-area detection unit configured to detect said mixed area for each of said plurality of types of components and for outputting the detection result corresponding to individual components as component mixed-area information; and
a mixed-area specifying unit configured to specify said mixed area corresponding to said image data on the basis of the detection result of said mixed area corresponding to said plurality of types of components detected by said component mixed-area detection unit.

24. An image-capturing apparatus according to claim 22, wherein said area specifying unit comprises:
a space-correlation-value calculation unit configured to calculate a space correlation value indicating a correlation between designated pixel data corresponding to a designated pixel of a designated frame of said image data and pixel data of a space neighboring pixel positioned in the neighborhood of said designated pixel in the spatial direction on the basis of said plurality of types of components corresponding to said designated pixel;
a time-correlation-value calculation unit configured to calculate a time correlation value indicating a correlation between said designated pixel data and pixel data of a time neighboring pixel positioned in the neighborhood of said designated pixel in the time direction on the basis of said plurality of types of components corresponding to said designated pixel; and
a foreground area specifying unit configured to specify a foreground area formed of only said foreground object components on the basis of said space correlation value and said time correlation value corresponding to said designated pixel.

25. An image-capturing apparatus according to claim 24, wherein said area specifying unit further comprises:
a mixed-area specifying unit configured to specify said mixed area on the basis of said foreground area of said designated frame and said foreground area of a neighboring frame in the neighborhood of said designated frame.

26. An image-capturing apparatus according to claim 22, wherein said mixture-ratio detection unit comprises:
a component mixture-ratio detection unit configured to detect the mixture ratio for each of said plurality of types of components; and
a component integrated mixture-ratio detection unit configured to detect the mixture ratio for detecting the mixture ratio corresponding to said image data by integrating the detection results of the mixture ratios corresponding to said plurality of types of components detected by said component mixture-ratio detection unit.

27. An image-capturing apparatus according to claim 22, wherein said mixture-ratio detection unit comprises:
an integration unit configured to integrate the pixel values of said plurality of types of components for each pixel and for outputting the value as integrated data; and
an integrated data mixture-ratio detection unit configured to detect the mixture ratio corresponding to said image data on the basis of said integrated data.

28. An image-capturing apparatus according to claim 27, wherein said integration unit adds said pixel values of said plurality of types of components for each pixel and outputs the added result as said integrated data.

29. An image processing apparatus for processing image data which is formed of a predetermined number of pixel data, having a plurality of types of components at the same pixel position, obtained by an image-capturing device including a predetermined number of pixels, the pixels having a time integrating function, said image processing apparatus comprising:

an image data obtaining unit configured to obtain said image data; and a processing performing unit configured to perform, on the basis of said plurality of types of components of said obtained image data, one of processings of (i) an area specifying step of specifying, in correspondence with said image data, a mixed area in which foreground object components which form a foreground object and background object components which form a background object are mixed and (ii) a mixture-ratio detection step of detecting, in correspondence with said image data, the mixture ratio indicating the ratio of the mixture of said foreground object components to the mixture of said background object components in a mixed area in which said foreground object components and said background object components are mixed, wherein the plurality of types of components at the same pixel position refers to an individual signal, including a luminance signal, a color-difference signal, or an RGB signal in the component signal.

30. An image processing apparatus according to claim 29, wherein said processing performing unit performs, on the basis of said plurality of types of components of said obtained image data, an area specifying step of specifying, in correspondence with said image data, a mixed area in which foreground object components which form a foreground object and background object components which form a background object are mixed.

31. An image processing apparatus according to claim 29, wherein said processing performing unit performs, on the basis of said plurality of types of components of said obtained image data, a mixture-ratio detection step of detecting, in correspondence with said image data, the mixture ratio indicating the ratio of the mixture of said foreground object components to the mixture of said background object components in a mixed area in which said foreground object components and said background object components are mixed.

32. An image processing method for processing image data which is formed of a predetermined number of pixel data, having a plurality of types of components at the same pixel position, obtained by an image-capturing device including a predetermined number of pixels, the pixels having a time integrating function, said image processing method comprising:

an image data obtaining step of obtaining said image data; and a processing performing step of performing, on the basis of said plurality of types of components of said obtained image data, one of processings of (i) an area specifying step of specifying, in correspondence with said image data, a mixed area in which foreground object components which form a foreground object and background object components which form a background object are mixed and (ii) a mixture-ratio detection step of detecting, in correspondence with said image data, the mixture ratio indicating the ratio of the mixture of said foreground object components to the mixture of said background object components in a mixed area in which said foreground object components and said background object components are mixed, wherein the plurality of types of components at the same pixel position refers to an individual signal, including a luminance signal, a color-difference signal, or an RGB signal in the component signal.

33. An image processing method according to claim 32, wherein, in said processing performing step, on the basis of said plurality of types of components of said obtained image data, an area specifying step of specifying, in correspondence with said image data, a mixed area in which foreground object components which form a foreground object and background object components which form a background object are mixed is performed.

34. An image processing method according to claim 32, wherein, in said processing performing step, on the basis of said plurality of types of components of said obtained image data, a mixture-ratio detection step of detecting, in correspondence with said image data, the mixture ratio indicating the ratio of the mixture of said foreground object components to the mixture of said background object components in a mixed area in which said foreground object components and said background object components are mixed is performed.

35. A program stored in a computer-readable medium, the program when executed by a computer being used to process image data which is formed of a predetermined number of pixel data, having a plurality of types of components at the same pixel position, obtained by an image-capturing device including a predetermined number of pixels, the pixels having a time integrating function:

an image data obtaining step of obtaining said image data; and a processing performing step of performing, on the basis of said plurality of types of components of said obtained image data, one of processings of:

(i) an area specifying step of specifying, in correspondence with said image data, a mixed area in which foreground object components which form a foreground object and background object components which form a background object are mixed and (ii) a mixture-ratio detection step of detecting, in correspondence with said image data, the mixture ratio indicating the ratio of the mixture of said foreground object components to the mixture of said background object components in a mixed area in which said foreground object components and said background object components are mixed, wherein the plurality of types of components at the same pixel position refers to an individual signal, including a luminance signal, a color-difference signal, or an RGB signal in the component signal.

36. A program according to claim 35, wherein, in said processing performing step, on the basis of said plurality of types of components of said obtained image data, an area specifying step of specifying, in correspondence with said image data, a mixed area in which foreground object components which form a foreground object and background object components which form a background object are mixed is performed.

37. A program according to claim 35, wherein, in said processing performing step, on the basis of said plurality of types of components of said obtained image data, a mixture-ratio detection step of detecting, in correspondence with said image data, the mixture ratio indicating the ratio of the mixture of said foreground object components to the mixture of said background object components in a mixed area in which said foreground object components and said background object components are mixed is performed.

38. An image-capturing apparatus comprising:

an image-capturing unit configured to output a subject image captured by an image-capturing device including a predetermined number of pixels, the pixels having a time integrating function, as image data which is formed of a predetermined number of pixel data having a plurality of types of components at the same pixel position; and a processing performing unit configured to perform, on the basis of said plurality of types of components of said image data, one of processings of
  (i) an area specifying step of specifying, in correspondence with said image data, a mixed area in which foreground object components which form a foreground object and background object components which form a background object are mixed and
  (ii) a mixture-ratio detection step of detecting, in correspondence with said image data, the mixture ratio indicating the ratio of the mixture of said foreground object components to the mixture of said background object components in a mixed area in which said foreground object components and said background object components are mixed, wherein the plurality of types of components at the same pixel position refers to an individual signal, including a luminance signal, a color-difference signal, or an RGB signal in the component signal.

39. An image-capturing apparatus according to claim 38, wherein said processing performing unit performs, on the basis of said plurality of types of components of said image data, an area specifying step of specifying, in correspondence with said image data, a mixed area in which foreground object components which form a foreground object and background object components which form a background object are mixed.

40. An image processing apparatus according to claim 38, wherein said processing performing unit performs, on the basis of said plurality of types of components of said image data, a mixture-ratio detection step of detecting, in correspondence with said image data, the mixture ratio indicating the ratio of the mixture of said foreground object components to the mixture of said background object components in a mixed area in which said foreground object components and said background object components are mixed.

* * * * *